United States Patent [19]

Rose

[11] Patent Number: 5,200,816
[45] Date of Patent: Apr. 6, 1993

[54] METHOD AND APPARATUS FOR COLOR PROCESSING WITH NEURAL NETWORKS

[75] Inventor: Oded M. Rose, Herzliya, Israel

[73] Assignee: Scitex Corporation Ltd., Herzliya, Israel

[21] Appl. No.: 734,310

[22] Filed: Jul. 19, 1991

[30] Foreign Application Priority Data

Jun. 25, 1991 [IL] Israel ........................................ 98622

[51] Int. Cl.$^5$ ............................................... H04N 1/40
[52] U.S. Cl. ............................................................ 358/80
[58] Field of Search ................................... 358/75–80, 358/433

[56] References Cited

U.S. PATENT DOCUMENTS

| 4,500,919 | 2/1985 | Schreiber | 358/78 |
| 4,717,954 | 1/1988 | Fujita | 358/80 |
| 5,041,916 | 8/1991 | Yoshida et al. | 358/433 |

FOREIGN PATENT DOCUMENTS

| 0144188A2 | 12/1985 | European Pat. Off. |
| 2214987 | 8/1990 | Japan |
| 2215277 | 8/1990 | Japan |
| 2216971 | 8/1990 | Japan |
| 2231760A | 11/1990 | United Kingdom |

OTHER PUBLICATIONS

"Application of Neural Networks to Computer Recipe Prediction", Color Research & Application, Feb. 1991, 16(1). (Bishop et al).
R. K. Molla, "Electronic Color Separation", R. K. Printing & Publishing, New York, 1988.
G. Wyszecki et al. "Color Science", Wiley & Sons, 1982.
Rumelhart et al, "Parallel Distributed Processing", MIT Press, 1986.
J. Stoer, "Introduction to Numerical Analysis", Springer-Verlag, New York, 1980, chapter 2.
Marquet M., "Dehalftoning of Negatives by Optical Filtering", Optica Acta 6, pp. 404–405, 1959.
M. Stone et al, "Color Gamut Mapping and the Printing of Digital Color Images", ACM Trans. on Graphics, 7(4), Oct. 1988, pp. 249-292.
Wasserman P. D., "Neural Computing Theory and Practice", Van Nostrand Reinhold, New York, 1989, pp. 43-59.
Anderson, J. A. et al, "Neurocomputing", MIT Press, 1988.
Marquet M. et al, "Interpretation of Particular Aspects of Dehalftoned Images", Optica Acta 8, pp. 267-277, 1961.
Kermisch D. et al, "Fourier Spectra of Halftone Screens", J. Opt. Soc. Amer., 65, pp. 716-723, 1975.
P. G. Engeldrum, "Almost Color Mixture Functions", Jou. of Imaging Technology, 14(4), Aug., 1988.
M. Wright, "Neural Networks Tackle Real-World Problems", Technology Update, EDN, Nov. 8, 1990.
IT8.7/2, "Color Reflection Target for Input Scanner Calibration", Graphic Arts Perpress, Draft 1, May 13, 1991.

Primary Examiner—Stephen Brinich
Attorney, Agent, or Firm—Ladas & Parry

[57] ABSTRACT

A method and apparatus for constructing, training and utilizing an artificial neural network (also termed herein a "neural network", an ANN, or an NN) in order to transform a first color value in a first color coordinate system into a second color value in a second color coordinate system.

40 Claims, 19 Drawing Sheets

METHOD AND APPARATUS FOR COLOR PROCESSING WITH NEURAL NETWORKS

FIELD OF THE INVENTION

The present invention relates to artificial neural networks generally and to techniques for tone and color reproduction control in graphic arts generally.

BACKGROUND OF THE INVENTION

Neural networks, or artificial neural networks, are a branch of study related to the discipline of artificial intelligence. A neural network "learns" a set of training data and subsequently can use the "experience" it has acquired by learning the training data to process other data. It is now being realized that neural networks have applications in practical problems outside the research laboratory.

UK Published Patent Application No. 2231760A (Application No. 9009467.3) to Apple Computer Inc. discusses use of a neural network for processing RGB signals, in order to assist in selecting color combinations. The associative memory system disclosed is said to have particular application in the design of color interfaces for computer systems based on user preferences.

Japanese patents 90-215277, 90-216971 and 90-214987, all to Matsushita Electric Industries Co. Ltd., seem to disclose uses of neural networks for color image processing.

A British journal article published February, 1991 in Color Research and Application, 16(1) and entitled "Application of neural networks to computer recipe prediction" discusses uses of neural networks for computerized prediction of color recipes. The article teaches that the use of neural networks offers several potential advantages including that it is not necessary to prepare a special database in order to use the neural network method.

Scanning methods are reviewed in R. K. Molla, *Electronic Color Separation*, R. K. Printing & Publishing, New York, 1988, the disclosure of which is incorporated herein by reference. The principles of color are explained in G. Wyszecki and W. S. Stiles, *Color Science*, Wiley & Sons, 1982, the disclosure of which is incorporated herein by reference.

Generally speaking, tone and color reproduction control in high quality graphic arts reproduction is still far from a science. This is particularly evident when a given acceptable result, already realized using given reproduction apparatus, is sought to be realized using other apparatus or using the same apparatus but with a different setting, such as a GCR setting relative to a normal "key black" setting. In such cases, a high degree of expertise, combined with time, effort, expense and patience is required to calibrate the additional apparatus. The results are not always satisfactory.

Unidimensional calibrations in graphic arts, in which a plurality of calibrations are carried out, each being a function of only one color, are known. State of the art techniques include gray balance correction and plotter output calibration techniques. Another example of unidimensional calibration is the automatic TCR (tone and color reproduction) correction process disclosed in published European Application 84307997.1 of Xerox Corporation (Publication number 0144188 A2).

The disadvantage of unidimensional calibrations is that they are only accurate in certain portions of the color space, since a full determination of color is multidimensional, typically having three or four components. For example, the teaching of the above-mentioned published European Application 8437997.1 is relatively inaccurate except in the area of a particular machine's primary color coordinate axes. Gray balance techniques are relatively inaccurate except for a relatively small volume of the color space, comprising gray colors only. Also, the apparatus disclosed in the above-cited published European Application 8437997.1 can be calibrated only by its own output.

Methods of computing a multidimensional function to fit a given set of vectors are known. Interpolative methods may be used if the data is suitably distributed. However the desired conditions regarding the distribution do not always hold in color processing applications, because the data is often not produced directly but rather is the end result of certain procedures (such as scanning, printing, etc.) which are performed on initial preselected data.

In color image processing, there are a number of applications, such as gamut mapping, in which it is desired to compare a first color coordinate system to a second color coordinate system.

Gamut mapping is discussed in the following article: Stone, Maureen et al, "Color Gamut Mapping and the Printing of Digital Color images", ACT Transactions on Graphics 7(4), October 1988, pp. 249-292.

U.S. Pat. No. 4,500,919 to Schreiber discloses a LUT system for producing color reproductions of an image in which an operator may interactively manipulate a display of the scanned image in order to introduce aesthetic, psychophysically referenced corrections therein. Schreiber teaches that it is desirable for such a system to provide automatic compensation for the effects of ink and paper while allowing the operator to input aesthetic alterations.

U.S. Pat. No. 4,719,954 to Fujita et al. describes a method and apparatus for creating a color conversion table between scanned colors of a color chart, typically in the Red-Green-Blue (RGB) color coordinate system, and printable colors, typically in the Cyan-Magenta-Yellow-Black (CMYK) color coordinate system, and for using the color conversion table to reproduce a selected measured color in a color specimen. If the selected measured color does not coincide with a value in the color conversion table, an interpolation step is performed.

The method of Fujita et al also includes a correction step when reproduction is performed under different printing conditions. The correction step compensates for the difference between the two printing conditions.

Image creation systems typically comprise a computer with associated graphic software for generating digital representations of color images and/or modifying digital representations of color images, and a plotter or other color output device for transforming the digital representations into analog representations. The analog representation may be created on any suitable substrate, such as on a dia. If desired, e.g. in pre-press applications, the resulting dia can be scanned.

Examples of commercially available graphic software are Photoshop, by Adobe Systems Inc., Mountainview, Calif., USA, usable in conjunction with the Mac II by Apple Computer Inc., USA; and PC Paintbrush Plus, by ZSoft, San Francisco, Calif., USA, usable in conjunction with the IMB PC. Examples of commercially available color printer are 4cast, by DuPont, Wilmington, Del., USA, and the LVT Model 1620 digital image recorder by Light Valve Technology, Rochester, N.Y., USA.

SUMMARY OF THE INVENTION

The following terms as used in the present specification and claims should be construed in the following manner:

Analog representation of a color image: A representation of a color image which is perceivable by the human eye as a color image. The representation may appear upon a transparency, a photograph, a CRT display, a printed page, etc.

Digital representation of a color image: Any representation of a color image which is expressed in discrete symbols, such as numerical symbols. A common digital representation of a color image is a digital file comprising a plurality of numerical values corresponding to a plurality of pixels into which the color image has been divided, each such numerical value representing some aspect pertaining to the color appearance of the corresponding pixel.

Substrate: Physical apparatus bearing or displaying an analog representation of an image, e.g. transparency, Cromalin (registered trademark), CRT display, photograph, paper, surfaces suitable for painting on, etc.

Range of color processing apparatus: The totality of color values which can be output by the color processing apparatus.

Domain of color processing apparatus: The totality of color values which can be input by the color processing apparatus.

Color processing apparatus: Apparatus which inputs a first representation of a color image (digital or analog) and converts it into a second representation of a color image (digital or analog), thereby to define a transformation from at least a portion of the range of the color processing apparatus into the domain.

Image creation system: Apparatus which creates an image internally or one which takes as input a representation of a color image and modifies it. Such a system can create the color image from geometrical shapes, can alter the shape and can select and/or modify the color of the color image.

Color reading apparatus: Apparatus which inputs an analog representation of a color image and converts it to a digital representation thereof. e.g., ECSS, DECSS, colorimeters, spectrum analyzers, densitometers. Typically, the digital representation is expressed in a coordinate system such as XYZ, CMYK, RGB, etc.

Color output device; printing, machine/device/system; output apparatus, recording apparatus, color writing device, etc.: Any apparatus which inputs a digital representation of a color image and converts it into an analog representation thereof. For example: conventional, offset, gravure, or other printing apparatus employing inks, conventional or direct digital proofing machines, plotters or color recorders which expose photographic materials, electrostatic printing systems employing powder colorants, color monitors, and color CRT displays.

Calibration: Adjusting color processing apparatus in order to obtain representations, having predetermined substantially objective color characteristics, of color images sought to be processed.

Color value: A representation of a color, typically in a color coordinate system such as but not limited to RGB, $L^*a^*b^*$, XYZ coordinate systems and device dependent coordinate systems such as color head signals e.g. RGB, ink percentages e.g. CMYK, etc.

Colorant, ink, etc.: Any stimulant of the human eye's light energy receptors, typically through emission, transmission or reflection of photons, including liquid colorants, powder colorants, photographic colorants, phosphors, etc.

Colorant values: A digital representation of the amount of a colorant which it is sought to use.

Color coordinate system: A coordinate system in which color values are defined, including but not limited to RGB, CMY, CMYK, LHS, LAB, XYZ and 7 dimensional color coordinate systems. In some coordinate systems, particularly coordinate systems having more than three dimensions, a single color, as perceived by the human eye, may be represented in more than one way.

The term "color coordinate system" is intended to include color spaces.

A variety of color spaces are discussed in the above-referenced volume by Wyszecki and Stiles.

It is appreciated that any references to color, color images, color values, colorant values, etc. in the present specification are intended to include the instances of black and white as colors or color values, black and white images, black colorant and black ink. The following abbreviations are used:

TCR: tone and color reproduction
GCR: gray component replacement
UCR: Undercolor removal
UCA: Undercolor addition
RGB: red, green, blue. More generally, the term as used herein may refer to any color signals produced by a color reading device. In a color separation scanner, the term normally refers to the color separation signals of the scanner prior to processing thereof.
CMYK: cyan, magenta, yellow, black (colorants such as inks). More generally, the term as used herein refers to any signals which may serve as input for a color printing device.
ECSS: electronic color separation scanner
DECSS: digital electronic color separation scanner The present invention seeks to provide a method and apparatus for constructing, training and utilizing an artificial neural network (also termed herein a "neural network", an ANN, or an NN) in order to transform a first color value in a first color coordinate system into a second color value in a second color coordinate system.

The present invention also seeks to provide a technique for multidimensional calibration of graphic arts reproduction apparatus, which simplifies and greatly expedites the process of calibration of graphic arts reproduction apparatus to faithfully reproduce desired color and tone. Preferably, the technique provides generally accurate calibration of the apparatus throughout substantially the entirety of the range of colors producible by the apparatus.

The present invention also seeks to provide an improved method for comparing a first color value or set of color values from among a first plurality of color values to a second color value or set of color values from among a second plurality of color values which may or may not be the same as the first plurality of color values. Preferably, the method also comprises the step of transforming at least some of the first set of color values in accordance with the results of the comparing step.

There is also provided in accordance with a preferred embodiment of the present invention, a technique for calibrating graphic arts reproduction apparatus using color measuring apparatus (such as the "Smart Scanner" available from Scitex Corporation, Herzlia, Israel, colorimeters, densitometers, etc.) including the steps of providing a transformation of or function, which may or may not have an analytic form, from first color values to second color values and employing the transformation to control operation of graphic arts reproduction apparatus. The terms "transformation" and "function" are used interchangeably throughout the present specification. The transformation may be employed to provide a LUT (look up table) which may be stored as employed as a color transformation tool.

The following procedures, among others, may be greatly simplified and rendered more time efficient and effecting using preferred embodiments of the present invention:

1. Incorporating a new color separation scanner (CSS), such as a digital electronic color separation scanner, into an existing reproduction system using automatic calibration that emulates the tone and color reproduction of the existing system.

2. Compensating for a different printing or proofing machine or a different setting on the same machine, by adjustment of the tone and color transformation of a digital electronic color separation scanner, or by adjustment of the digital representation of the picture, such that the printed picture characteristics of tone and color are nearly identical notwithstanding which printing machine or setting is employed.

3. Creating upon a first substrate a duplication of an analog representation of a color image upon a second substrate. Preferably, both substrates are formed of the same medium or of similar media.

4. Restoring an input copy for given color processing apparatus from an available output copy thereof. Typically, the input and output copies are hard copies. Preferably, the restored input copy, if input to the color processing apparatus, will result in an output copy substantially identical to the available output copy.

5. Incorporating a new digital electronic color separation scanner into an existing reproduction system using automation calibration to achieve emulation of a UCR (under color removal), GCR (gray component replacement) or UCA (under color addition) reproduction produced by the existing system, or to emulate any other special reproduction setting to which the existing system may be set.

6. Calibration of a color monitor display with reference to output apparatus, thereby to provide a representation of a color image on a color monitor display which is substantially identical to a hard copy representation of that image processed on a given printing device.

There is thus provided in accordance with a preferred embodiment of the present invention a method for providing a neural network including the steps of providing a neural network structure including a plurality of neurons for receiving a first color value from among a first set of color values which first color value is to be transformed into a corresponding second color value from among a second set of color values and for providing an output indication of the corresponding second color value, and training the neural network structure on a plurality of ordered pairs, each ordered pair including a first color value from among the first set of color values and a corresponding second color value from among the second set of color values, one or both of the plurality of first values and the plurality of second color values being a systematic representation of the corresponding one of the first and second sets of color values.

Further in accordance with a preferred embodiment of the present invention, one of the first and second sets of color values is defined within a color coordinate system and each region of a predetermined size within the color coordinate system is represented by at least one color value within the plurality of color values corresponding to the set of color values defined within the color coordinate system.

Further in accordance with a preferred embodiment of the present invention, one of the first and second sets of color values is defined within a color coordinate system which may be partitioned into regions and each region within the partition is represented by at least one color value within the plurality of color values corresponding to the set of color values defined within the color coordinate system.

Still further in accordance with the preferred embodiment of the present invention, the first set of color values is identical to the second set of color values.

Additionally in accordance with a preferred embodiment of the present invention, each second color value, represented in visual form, is substantially identical in appearance to the corresponding first color value, represented in visual form.

Further in accordance with a preferred embodiment of the present invention, the plurality of neurons includes an input layer of neurons including at least one input neuron, at least one hidden layer of neurons each including at least one hidden neuron, and an output layer of neurons including at least one output neuron.

Additionally in accordance with a preferred embodiment of the present invention, the first color value is also to be transformed into a corresponding third color value from among a third set of color values, the neural network structure is operative to provide an output indication of the corresponding second and third color values, the output layer of neurons includes at least a first plurality of output neurons corresponding to the dimension of the second color value and a second plurality of output neurons corresponding to the dimension of a third color value and each ordered pair includes a first color value and a corresponding concatenation of a second color value and a third color value.

Still further in accordance with a preferred embodiment of the present invention, the appearance of the second color value, when represented using a predetermined first color output device, is similar to the appearance of the third color value, when represented using a predetermined second color output device.

Additionally in accordance with a preferred embodiment of the present invention, each neuron in the at least one hidden layer and in the output layer includes summing apparatus for computing a weighted sum of a plurality of inputs.

Still further in accordance with a preferred embodiment of the present invention, each neuron in the at least one hidden layer and in the output layer also includes apparatus for computing a nonlinear function of the output of the summing apparatus.

Additionally in accordance with a preferred embodiment of the present invention, the nonlinear functions corresponding to substantially all of the neurons in the at least one hidden layer and in the output layer are equal.

Still further in accordance with a preferred embodiment of the present invention, the neural network structure is a feed-forward network structure.

Additionally in accordance with a preferred embodiment of the present invention, each ordered pair is characterized in that there is a predetermined relationship between the second color value and the corresponding first color value.

Still further in accordance with a preferred embodiment of the present invention, the plurality of regions includes regions of non-equal size.

Additionally in accordance with a preferred embodiment of the present invention, the plurality of regions includes regions of equal size.

Further in accordance with a preferred embodiment of the present invention, the method also includes the step of subsequently employing the neural network for transforming a first color value from the first plurality of color values into a second color value from the second plurality of color values.

Still further in accordance with a preferred embodiment of the present invention, the method also includes the step of employing the second color value obtained by transforming the first color value in order to control operation of a color processing system to be calibrated.

Further in accordance with a preferred embodiment of the present invention, at least one interneuron connection is defined between a pair of neurons from among the plurality of neurons in the neural network and the step of training includes the steps of providing the first color value of an individual ordered pair to the neural network, back-propagating an error value indicative of the difference between the second color value of the individual ordered pair and the output of the neural network for the first color value, and modifying at least one of the at least one interneuron connections.

Further in accordance with a preferred embodiment of the present invention, at least one interneuron connection defines a weight associated therewith and the step of modifying includes the step of changing the value of the weight.

Still further in accordance with a preferred embodiment of the present invention, the first set of color values is defined within an individual one of the following coordinate systems: RGB, CMY, CMYK, LHS, CieLab, RGBCMY, RGBCMYK, XYZ, DIN, Munsell, X*Y*Z*, Ridgway, Oswald, Luv, Lu'v', OSA, W.D.W, TCM.

Additionally in accordance with a preferred embodiment of the present invention, the second set of color values is defined within an individual one of the following coordinate systems: RGB, CMY, CMYK, LHS, CieLab, RGBCMY, RGBCMYK, XYZ, DIN, Munsell, X*Y*Z*, Ridgway, Oswald, Luv, Lu'v', OSA, W.D.W, TCM.

There is also provided in accordance with a further preferred embodiment of the present invention apparatus for providing a neural network including a neural network structure including a plurality of neurons for receiving a first color value from among a first set of color values which first color value is to be transformed into a corresponding second color value from among a second set of color values and for providing an output indication of the corresponding second color value, and apparatus for training the neural network structure on a plurality of ordered pairs, each ordered pair including a first color value from among the first set of color values and a corresponding second color value from among the second set of color values, one or both of the plurality of first values and the plurality of second color values being a systematic representation of the corresponding one of the first and second sets of color values.

There is also provided in accordance with still a further preferred embodiment of the present invention a neural network including a trained neural network structure including a plurality of neurons for receiving a first color value from among a first set of color values which first color value is to be transformed into a corresponding second color value from among a second set of color values and for providing an output indication of the corresponding second color value, wherein the trained neural network structure was trained on a plurality of ordered pairs, each ordered pair including a first color value from among the first set of color values and a corresponding second color value from among the second set of color values, one or both of the plurality of first values and the plurality of second color values being a systematic representation of the corresponding one of the first and second sets of color values.

Further in accordance with a preferred embodiment of the present invention, the second color value includes a black component and the neural network structure is characterized in that at least some of the color content of the first color value is transformed to the black component of the second color value.

In accordance with still a further preferred embodiment of the present invention, there is provided a method for transforming a first color value from among a first set of color values into a second color value from among a second set of color values, the method including the steps of providing a trained neural network structure including a plurality of neurons for receiving a first color value from among the first set of color values which first color value is to be transformed into a corresponding second color value from among the second set of color values and for providing an output indication of the corresponding second color value, wherein the trained neural network structure was trained on a plurality of ordered pairs, each ordered pair including a first color value from among the first set of color values and a corresponding second color value from among the second set of color values, one or both of the plurality of first values and the plurality of second color values being a systematic representation of the corresponding one of the first and second sets of color values, and employing the trained neural network structure in order to transform a first color value from among the first set of color values into a second color value from among the second set of color values.

Further in accordance with a preferred embodiment of the present invention, the method also includes the step of controlling operation of a color processing system to be calibrated using the second color value obtained in the employing step.

Still further in accordance with a preferred embodiment of the present invention, the step of controlling includes the step of using the color writing device to create upon a second substrate a duplicate of an analog representation of a color image upon a first substrate.

Additionally in accordance with a preferred embodiment of the present invention, the step of controlling includes the step of using the color processing system to create an input copy of a color image which, when processed by the calibrated system, will result in a given output copy of the color image.

Further in accordance with a preferred embodiment of the present invention, the color processing system to be calibrated includes a color reading device operative to convert an analog representation of a color image into a digital representation thereof.

Still further in accordance with a preferred embodiment of the present invention, the color processing system to be calibrated includes a color writing device operative to convert a digital representation of a color image into an analog representation thereof.

Additionally in accordance with a preferred embodiment of the present invention, the color writing device includes a color monitor display.

According to yet a further preferred embodiment of the present invention there is provided a method for constructing a look-up table relating a first multiplicity of values to a second multiplicity of values including the steps of providing an artifical neural network relating the first multiplicity of values to the second multiplicity of values, providing a plurality of LUT addresses, operating the artificial neural network on the plurality of LUT addresses, thereby to obtain a plurality of processed LUT addresses, and storing the plurality of processed LUT addresses as the contents of the look-up table.

Further in accordance with a preferred embodiment of the present invention, the first and second multiplicities of values respectively include first and second multiplicities of color values.

Additionally in accordance with a preferred embodiment of the present invention, the step of providing an artificial neural network includes the steps of providing artificial neural network training data representing the first and second multiplicity of values and employing the artificial neural network training data to train an artificial neural network.

There is also provided in accordance with a further preferred embodiment of the present invention apparatus for constructing a look-up table relating a first multiplicity of values to a second multiplicity of values including an artificial neural network relating the first multiplicity of values to the second multiplicity of values, apparatus for operating the artificial neural network on a plurality of LUT addresses, thereby to obtain a plurality of processed LUT addresses, and apparatus for storing the plurality of processed LUT addresses as the contents of the LUT.

There is also provided in accordance with still a further preferred embodiment of the present invention digital storage apparatus including a representation of a look-up table relating a first multiplicity of values to a second multiplicity of values, the look-up table having been constructed by a method including the steps of providing an artificial neural network relating the first multiplicity of values to the second multiplicity of values, providing a plurality of LUT addresses, operating the artificial neural network on the plurality of LUT addresses, thereby to obtain a plurality of processed LUT addresses, and storing the plurality of processed LUT addresses as the contents of the look-up table.

According to still a further preferred embodiment of the present invention there is provided a method for constructing apparatus for sampling the color processing characteristics of a color processing device, the color processing device being operative to convert a first representation of a color image into a second representation thereof, the method including the step of repeating at least once the steps of providing first and second representations of a color image, the representations respectively including a first multiplicity of first color values and a second multiplicity of second color values corresponding thereto, the first and second representations being characterized in that processing the first representation with the color processing device defines the second representation, providing an artificial neural network which, when operated on each individual one of the second multiplicity of second color values, gives a value substantially equal to the corresponding one of the first multiplicity of first color values, and operating the artificial neural network on the first representation of the color image, thereby to provide a third representation thereof.

There is provided in accordance with still a further preferred embodiment of the present invention a system for constructing apparatus for sampling the color processing characteristics of a color processing device, the color processing device being operative to convert a first representation of a color image to a second representation thereof, the system including apparatus for providing first and second representations of a color image, the representations respectively including a first multiplicity of first color values and a second multiplicity of second color values corresponding thereto, the first and second representations being characterized in that processing the first representation with the color processing device defines the second representation, an artificial neural network which, when operated on each individual one of the second multiplicity of second color values, gives a value substantially equal to the corresponding one of the first multiplicity of first color values, and apparatus for operating the artificial neural network on the first representation of the color image, thereby to provide a third representation thereof.

BRIEF DESCRIPTION OF THE DRAWINGS

The present invention will be understood and appreciated from the following detailed description, taken in conjunction with the drawings in which.

DETAILED DESCRIPTION OF PREFERRED EMBODIMENTS

Figure 1:
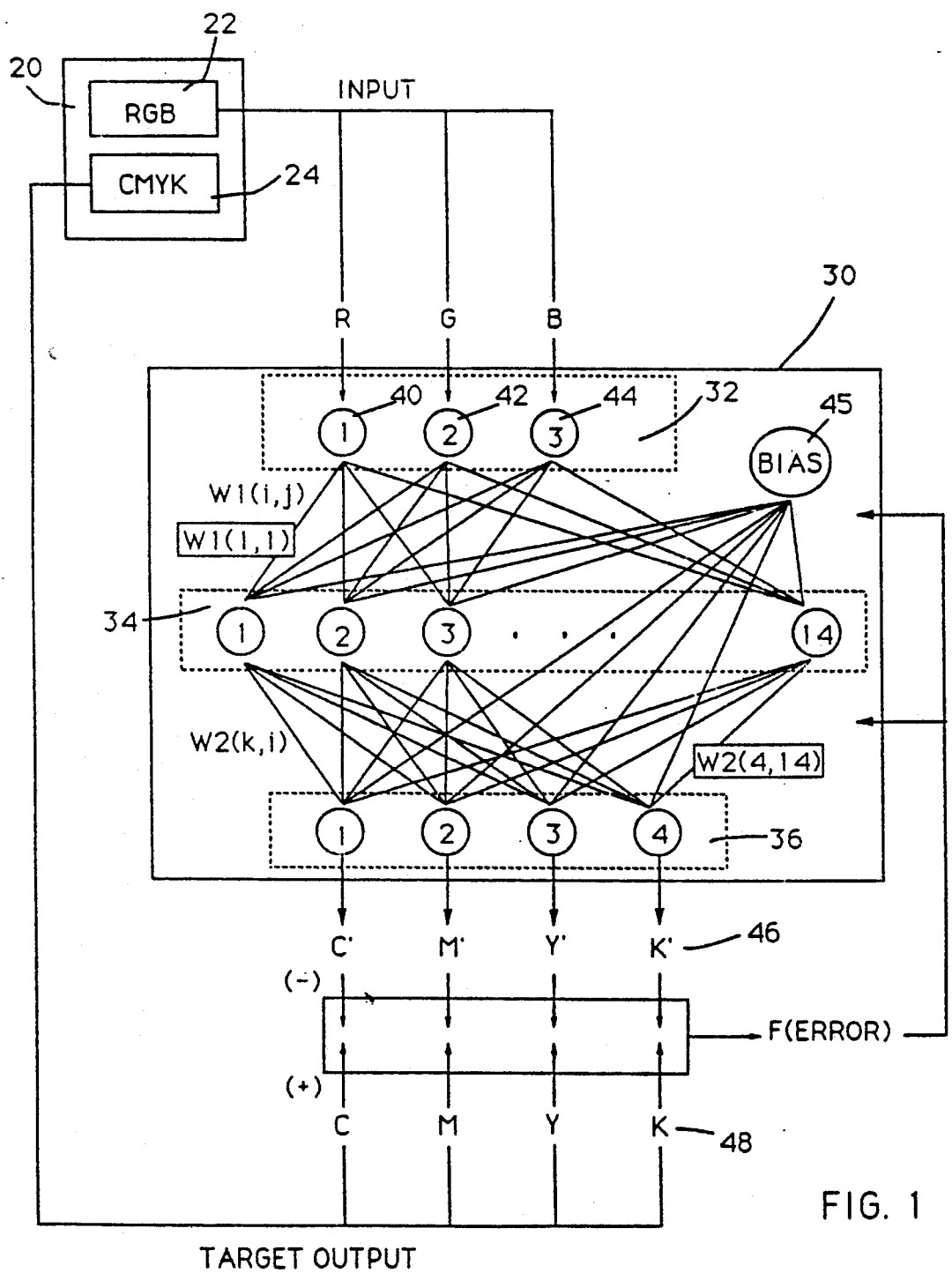
FIG. 1 is a conceptual illustration of a neural network of the feed forward type and of a back propagation training method which employs the generalized delta rule for training the neural network.

It is an object of the present invention to provide a method and apparatus for transforming colors in a first color coordinate system into colors in a second color coordinate system.

It is a further object of the present invention to provide a technique for multidimensional and preferably full range calibration of graphic arts reproduction apparatus, which simplifies and greatly expedites the process of calibration of graphic arts reproduction apparatus to faithfully reproduce desired tone and color. The calibration is accomplished by the following 2 steps:

(a) providing a database which may comprise a set of color values representing a color image which it is sought to reproduce using output apparatus employing a plurality of inks or other colorants in amounts defined by the set of color values. A database which is useful in implementing the present invention may be provided by scanning the Q60 transparency, commercially available from Kodak Corporation, using conventional scanning apparatus such as a Smart Scanner, commercially available from Scitex Corporation. The database may be provided, via suitable communication means such as PC-Link, commercially available from Scitex Corporation, to a suitable device for implementing a neural network training and using system, such as an IBM PC.

In accordance with a preferred implementation of the present invention, a database may be constructed as described in detail below.

The second step in the calibration technique of a preferred embodiment of the present invention is as follows:

(b) training a neural network (NN), also termed an "artificial neural network" (ANN), to reflect the relationship between two digital representations of the database. The neural network preferably allows relatively accurate transformation procedures to be carried out on color values which fall outside of the convex hull spanned by the color values in the database. The neural network may be employed to construct a look up table (LUT). Alternatively, the neural network may be stored directly in any suitable form.

If conditions are constant, a neural network may be trained once and then employed for many subsequent color transformation tasks. If conditions change, for example, if it is desired to change the type of printing inks employed by a printing machine, then additional training data may be supplied in order to retrain the neural network.

Neural networks are discussed in the following publications:

Wasserman, Philip D. *Neural Computing, Theory and Practice*, Van Nostrand Reinhold: New York, 1989.

Anderson, J. A. and Rosenfeld, E. *Neurocomputing*, MIT press, 1988.

Rumelhart, D. E. and McClelland, J. L. *Parallel Distributed Processing*, MIT press, 1986.

The disclosures of the above publications and of the publications cited therein are incorporated herein by reference.

THE STEP OF TRAINING A NEURAL NETWORK

A mathematical formulation of a typical problem is as follows: given is a suitable number of values from a suitable color coordinate system, such as 236 RGB values read by a color reading device. Each value is an ordered 3-member set (r, g, b) defining the respective quantities of Red, Green and Blue detected at each of 236 locations upon a multicolored input image which is to be read. The values r, g and b are scalars and typically $0 <= r, g, b <= 255$. Each of the 236 points of the multicolored input image is to be represented by an output image in a suitable coordinate system such as CMYK, corresponding to the printing inks which it is desired to employ, which in this case are Cyan, Magenta, Yellow and Black inks. An ANN is to be defined from the three dimensional (r, g, b) color coordiante system to a four dimensional (c, m, y, k) color coordinate system which will determine a quantity of each of the four inks which is to be provided to reproduce any particular color (r, g, b). A typical integer value range for each of the four CMYK variables is [0,255]. Alternatively, the CMYK variables may be provided or transformed into ink percentages.

Any suitable device can be employed to "read" the color values of the database in any of the various embodiments described herein. Inter alia, any of the following devices may be employed: colorimeters, analog electronic color separation scanners, digital electronic color separation scanners, densitometers, spectrum analyzers.

Any suitable color reading device may be used as a calibration reference, such as the Smart Scanner available from Scitex. In some applications, such as Application No. 2 described hereinbelow, it may be desirable to use a scanner whose colorimetric response is similar to that of the human eye, or a scanner whose colorimetric response is mathematically transformable to a response similar to that of a human eye. Any coordinate system suitable for the particular application may be used to represent the color values (XYZ, RGB, etc.). Preferably, substantially all of the colors of the reference color coordinate system should be distinguishable by the device used as a calibration reference.

The procedure disclosed hereinbelow is relatively insensitive to the selection of the particular set of 236 points. In particular, the selected points need not be arranged at regular intervals and do not even need to be distributed homogeneously. However, it is generally preferable to provide a minimum density of data distribution throughout the color coordinate system or space of interest. It is appreciated that any suitable number of color values may be employed.

Reference is now made to FIG. 1 which is a conceptual illustration of a neural network of the feed forward type and of a back propagation training method which employs the generalized delta rule for training the neural network in order to transform a first color value defined in a first color coordinate system into a second color value defined in a second color coordiante system. It is appreciated that the present invention is not limited to any particular type of neural network or to any particular training method and that use of the particular example illustrated herein is intended to be merely illustrative and not limiting.

The training method of FIG. 1 employs training data 20 comprising a plurality of ordered pairs, each ordered pair comprising a first color value 22 defined in the first color coordinate system and a corresponding second color value 24 defined in the second color coordinate system. Each component of each first color value and each component of each second color value is typically normalized to the range of 0 to 1, rather than the range of the components of the raw data which may be 0 to 255. For convenience, the first color values 22 and first color coordinate system are termed herein "RGB color values 22" and "RGB coordinate system", respectively, whereas the second color values 24 and second color coordinate system are termed "CMYK color values 24" and "CMYK coordinate system", respectively. However, it is appreciated that the method of FIG. 1 is suitable for transforming values from any first color coordiante system to any second color coordinate system. First normalized color value data 22 is also termed "input data" whereas second normalized color value data 24 is termed "target output data". The term "input data" is abbreviated as "IN" on some of the drawings and the term "target output data" is abbreviated as "T.O." on some of the drawings.

The appropriate method for providing suitable training data 20 depends upon the particular application. Several sample applications of a trained neural network of the type shown and described in FIG. 1 are described below. For each application, a method of providing suitable training data 20 is described in detail.

It is believed that the neural network 30 need not be of the feed forward type and that training methods other than the back propagation method may be employed.

The neural network 30 typically comprises an input layer 32 of neurons, one hidden layer 34 of neurons and an output layer 36 of neurons. It is appreciated that more than one hidden layer of neurons may alternatively be provided. Each interconnection between two neurons is assigned a weight defining the strength and direction (positive or negative) of the relationship between the two interconnected neurons. These weights are assigned initial values such as values randomly selected from a suitable number set, such as the set of real numbers from $-1$ to $+1$. Alternatively, the initial values may be selected to be values which are believed, on the basis of previous experience, to be relatively "good" values.

According to a preferred embodiment of the present invention, a bias neuron 37 for providing a constant output of a suitable value such as 1, may be provided which is connected to the hidden and output layers. The theory supporting provision of a bias neuron is discussed, inter alia, in the above-referenced publication by Wasserman entitled *Neural Computing, Theory and Practice*.

It is appreciated that the neural network 30 may have any suitable configuration such as but not limited to the following configuration:
Input layer: 3 nodes or neurons;
Hidden layer: 14 nodes;
Output layer: 4 nodes.

The RGB value 22 of each ordered pair from among the training data 20 is received by the input layer 32 of neurons. The neural network computes a CMYK value 46 corresponding to the RGB value of the current ordered pair.

The actual CMYK output 46 is compared to the desired CMYK value, which is the second value 24 of the current ordered pair in the training data 20. The result of the comparison is some error vector corresponding in dimension to the dimension of output values 24 and representing the deviation of the CMYK values 46 from the CMYK values 24. The weights of at least one neuron interconnection within the neuron network 30 are adjusted in accordance with the error vector. The weights may be adjusted after each ordered pair of alternatively a single adjustment of the weights may be made only after an entire training epoch has terminated, in other words, only after a predetermined number of the ordered pairs in training data 20 have been processed.

Any suitable stopping criterion may be employed for terminating the training stage. For example, training data may be processed once or more until the adjustment or adjustments computed by the correction algorithm are smaller than a predetermined value. Alternatively, each value of the training data 20 may be presented a predetermined number of times.

Once trained, the neural network 30 is operative to receive an RGB value and output a CMYK value, in accordance with what may be "learned" from training data set 20.

The neural network training method is now described in detail. In the forgoing discussion, indices i, j and k are used for the neurons of the hidden, input and output layers respectively. For example, in the illustrated embodiment, $i=1, \ldots, 14$; $j=1,2,3$; and $k=1,2,3,4$.

The output H(i) of a neuron i in the hidden layer is computed as follows:

$$H(i) = f_1 (sum_{j=1,2,3}[I(j) \times W(i,j)])$$

where
$f_1$ is preferably a singular and continuous function, such as the sigmoid function $\exp(bx)/[\exp(bx)+1]$, where the slope of the function b, may be any suitable value such as 2;

I(j) is the value of input neuron j and W(i, j) is the weight of the interconnection of input neuron j and hidden neuron i.

The output Out(k) of a neuron k in the output layer is computed as follows:

$$Out(k)=f_2(sum_{i=1...14}[H(i)\times W(k,i)])$$

where $f_2$ is preferably a singular and continuous function, such as a sigmoid function and W(k, i) is the weight of the interconnection of output neuron k and hidden neuron i. Typically, $f_2$ is chosen to be the same as $f_1$.

The error value Err(k) for a neuron k of the output layer is computed as follows:

$$Err(k)=IC(k)-Out(k),$$

where IC(k) is the kth component of the CMYK component of the current ordered pair from among the set 38 of ordered pairs.

A correction value to be added to W(k,i), $D_2(k,i)$ is computed as follows:

$$D_2(k,i)=Err(k)\times H(i)\times f_2'(Out[k]),$$

where $f_2'$ is the derivative of $f_2$.

A correction value to be added to W(i,j), $D_1(i,j)$ is computed as follows:

$$D_1(i,j)=f_1'(H(i))\times I(j)\times sum_{k=1,2,3,4}\{Err(k)\times f_2'(Out[k])\times W(k,i)\}$$

where $f_1'$ is the derivative of $f_1$.

The above computations are performed for each ordered pair from among the set 20 of ordered pairs. According to a first preferred embodiment of the present invention, the corrections to the weights, termed herein $D_1$ values and $D_2$ values, may be added to the weights after each individual element in the training data is processed. According to an alternative preferred embodiment of the present invention, the corrections to the weights computed as each element in the training data is employed may be accumulated until all elements in the training data have been used. Then, for each input layer-hidden layer interconnection weight, an algebraic sum of the accumulated $D_1$ values corresponding thereto is computed and added to that weight. For each hidden layer-input layer interconnection weight, an algebraic sum of the accumulated $D_2$ values corresponding thereto is computed and added to that weight.

It is appreciated that the particular neural network training technique shown and described above is merely exemplary of possible techniques and any suitable state of the art technique may be employed. For example, momentum may be added and/or the step size may be varied during training, all as explained in texts such as the above-referenced publication by Wasserman.

THE STEP OF PROVIDING A DATABASE

As stated hereinabove, the method of the present invention includes the step of providing a database comprising a representation of a plurality of colors, which database may then be processed by color processing apparatus. For example, the original database, whose characteristics can be directly controlled by the operator, may be the unprocessed RGB values and these values may be recorded, e.g. on a transparency, and then scanned. The data which forms the basis for the neural network training procedure described above with reference to FIG. 1 will then be pairs of data elements, the first data element being from the original database and the second data element being the corresponding element from the processed data, i.e. the transformed form of the first data element, obtained by processing (recording and scanning) the original database.

It is therefore appreciated that a "good" database for sampling the operation of color processing apparatus over a range or subrange thereof has the property that, *once processed* by the color processing apparatus, it will, for generally any region of a predetermined size overlapping or contained within the range or subrange, include at least a predetermined number of color values located interiorly of that region. A more general requirement for a "good" database is that, *once processed*, it is of a predetermined degree of closeness to a "target" comprising a predetermined plurality of color values. However, it is generally the case that if a database which possessed this property *prior* to being processed is subsequently processed by the color processing apparatus, the processed data will no longer possess the desired property but rather will be "distorted" due to the transformations of the data induced by the color processing procedure.

The neural network training procedure described above can be used in accordance with the method described hereinbelow to produce a "good" database, in the sense set forth hereinabove, from an initial database which may be far from possessing the desired characteristic set forth hereinabove. According to one preferred embodiment, the initial database, prior to being processed by the color processing apparatus, comprises a set of points distributed generally evenly throughout generally the entirety of the domain of the apparatus.

The improvement process of the initial database may, if desired, be continued iteratively until any desired degree of "quality", in the sense described hereinabove, of the final database, is attained. Typically, only three or less such iterations are necessary.

A preferred method in which the neural network training procedure described hereinabove is used to provide an improved database will now be described with reference to FIGS. 2A-2B, which are schematic illustrations of the steps of the method. Each of steps (a)-(e) of the method is designated in FIG. 2A by the appropriate letter. Step (f) is illustrated in FIG. 2B.

Figure 2A:
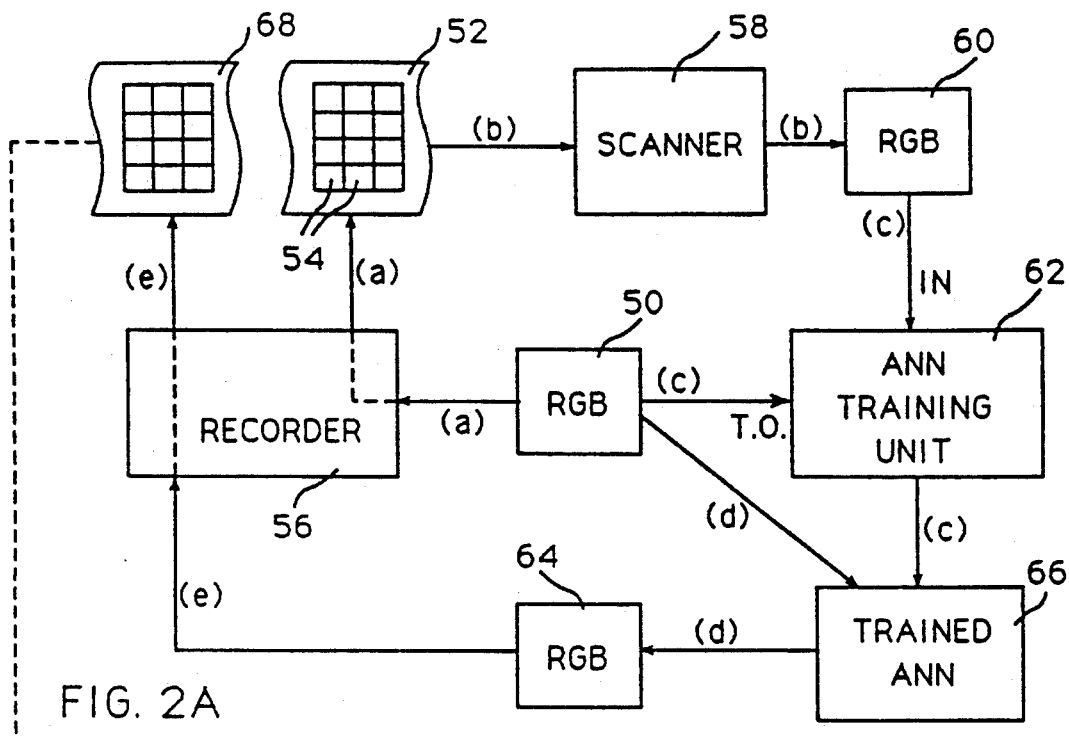
FIGS. 2A-2B are schematic illustrations of a reiterative method for providing an improved database for sampling the color processing characteristics of color processing apparatus.
Figure 2B:
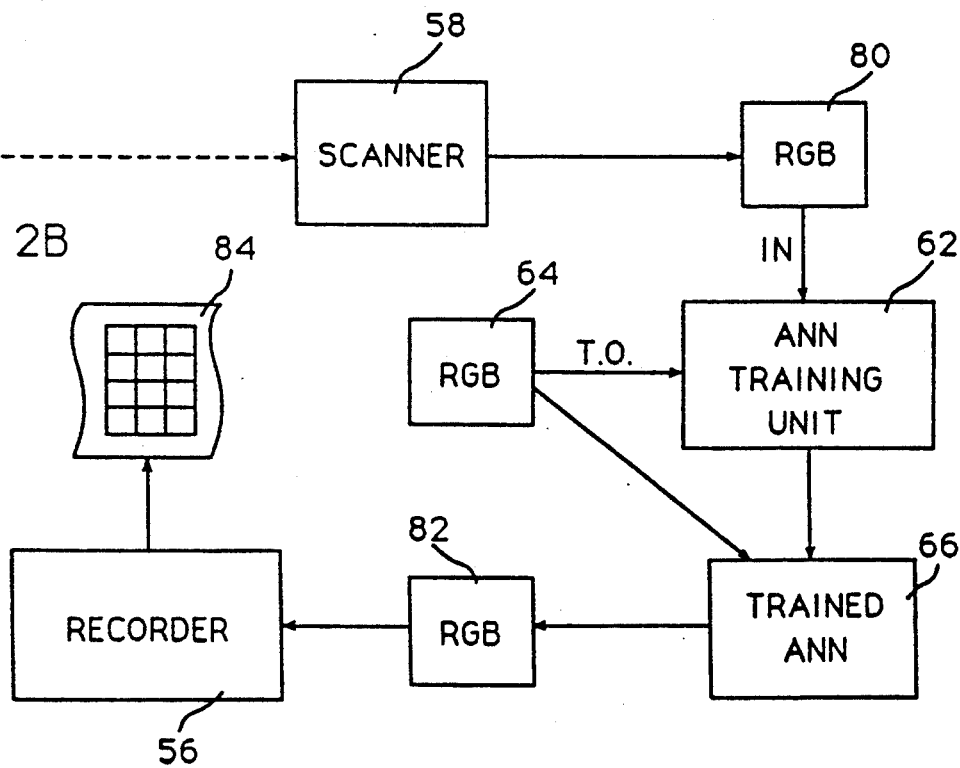

It is appreciated that the method of FIGS. 2A-2B may be employed to construct a first database which, once processed by given color processing apparatus, provides a second, processed database which defines a plurality of color values, each of which is substantially equal to a corresponding one of any predetermined "target" plurality of color values physically obtainable by means of the color processing apparatus. The steps illustrated in FIG. 2A are as follows:

(a) Provide an initial digital representation 50 of a color image, the color image comprising a plurality of colored locations. The digital representation 50 comprises a plurality of color values such as RGB values, to be referred to as "$RGB_0$ data", which corresponds to the plurality of colored locations. Record the $RGB_0$ data with a color recording device 56 (such as a 4cast, commercially available from DuPont) to obtain an analog representation 52 of the color image comprising a plurality of colored locations 54. Preferably, the initial digital representation 50 of the initial color image will span generally the entirety of the color space defined by the color recording device.

Appendix B is a plurality of digital values which may be employed to create a digital representation 50 of a color image comprising a plurality of color patches. To create digital representation 50, each digital value in Appendix B should be duplicated a multiplicity of times, thereby to obtain a plurality of "patches", respectively corresponding in color value to the digital values in Appendix B, each patch comprising a multiplicity of pixels.

(b) Read the image 52 using desired input apparatus 58 and sample the resulting digital representation of the patches or colored locations 54, thereby to obtain a plurality 60 of color values such as RGB values, to be referred to as "$RGB_1$ data", which correspond to the plurality of color locations 54. It is noted that, generally, the $RGB_1$ data obtained from the original $RGB_0$ data by recording and scanning will no longer have the same values as the original $RGB_0$ data. If the values of the $RGB_1$ data are not sufficiently close to a "target" predetermined plurality of color values, follow steps (c) to (f) below:

(c) Quantify the relationship between the input $RGB_1$ data 60 and the target output $RGB_0$ data 50 by pairing each $RGB_1$ data element with the value of the corresponding $RGB_0$ data element and by using the neural network training method referred to hereinabove. Training of the neural network may be performed by any suitable neural network training unit 62, such as the neural network training option in the software implemented neural network training and using system provided herein and referenced Appendix A.

The neural network 66 may be stored and operated by any suitable means such as an IBM PC.

(d) Define $RGB_2$ data 64 by passing the $RGB_0$ values through the trained neural network 66 or through a LUT constructed from trained neural network 66, using the LUT construction method shown and described below with reference to FIGS. 3A and 3B. The $RGB_2$ data is a digital representation of an "improved" database (relative to the initial $RGB_0$ database) in the sense described hereinabove with reference to the term "good" database.

(e) If an analog representation of the improved database is desired, output the $RGB_2$ file 64, which may be stored by any suitable means, such as the storage module of the Smart Scanner, using color output device 56 as a color printing device and using a substrate 68 of a medium generally identical to the medium of the substrate 52.

(f) If it is desired to continue the above procedure to obtain a still further improved database, i.e. a database whose values are still closer to the "target" predetermined plurality of color values, continue as in FIG. 2B: Provide a digital representation of the output 68 of (e), as in (b), using input apparatus 58, thereby defining a plurality of color values such as RGB values, to be referred to as "$RGB'_2$ data" 80.

Construct a neural network quantifying the relationship between the $RGB'_2$ data 80 to the $RGB_2$ data 64 and store it in module 66, as in (c) above.

Define and store $RGB_3$ data 82 by operating the new neural network on each of the $RGB_2$ values 64, as in (d) above.

If desired, output the $RGB_3$ data file, as in (e) above. The resulting picture 84 is an analog representation of the still further improved database.

The reiteration or loop of FIG. 2B may be repeated as many times as desired to cause the resultant database to approach the "target" predetermined plurality of color values to any desired degree of closeness.

The results of a sample use of the method of FIG. 2A are now described:

Appendix C discloses the plurality of digital values which correspond to the color values of each of a plurality of color patches in a digital file which was employed as digital representation 50 of FIG. 2A. In other words, to obtain the digital file which was employed in the present experiment as digital representation 50 of FIG. 2A, each digital value in Appendix C may be duplicated a multiplicity of times, thereby to obtain a plurality of "patches", respectively corresponding in color value to the digital values in Appendix C, each patch comprising a multiplicity of pixels.

One iteration of the method of FIG. 2A was performed on the digital "patches" file corresponding to Appendix C. The parameters of the resulting ANN 66 are appended hereto and are referenced Appendix D. The digital database 64 resulting from the single iteration of the method of FIG. 2A is appended hereto and is referenced Appendix E. If it is desired to use Appendix E in the method of FIG. 2B, the following step is performed:

The color values of Appendix E are employed to create digital representation 68 of FIG. 2A comprising a plurality of color patches. To create digital representation 68, each digital value in Appendix E should be duplicated a multiplicity of times, thereby to obtain a plurality of "patches", respectively corresponding in color value to the digital values in Appendix E, each path comprising a multiplicity of pixels. The resulting digital "patches" is recorded by recorder 56 and the method of FIG. 2B may then be employed.

The database of Appendix E is particularly useful in conjunction with a Smart Scanner, commercially available from Scitex Corporation, Herzlia, Israel.

An alternative to the database provision method shown and described above with reference to FIGS. 2A and 2B is now described:

As explained above, an initial database which may be useful in implementing the present invention may be provided by scanning the Q60 transparency, commercially available from Kodak Corporation, using conventional scanning apparatus such as a Smart Scanner, commercially available from Scitex Corporation. Appendix F is a plurality of color values sampled from a digital representation of the Q60 transparency, obtained by scanning with the Smart Scanner. One color value was sampled from each patch of the Q60 transparency.

The database may be provided, via suitable communication means such as PC-Link, commercially available from Scitex Corporation, to a suitable device for implementing a neural network training and using system, such as an IBM PC.

It is appreciated that the method of providing a data base and the method of training a neural network, both as shown and described hereinabove, have a wide variety of applications when used independently or in conjunction with one another. For example, the method of providing a database described hereinabove is useful not merely for the purpose of constructing a neural network as described hereinabove, but also in any situation in which it is desired to sample the functioning or the characteristics of color processing apparatus, e.g. in quality control and repeatability test situations such as those presented in the foregoing examples. It is appreciated that the foregoing examples are merely illustrative of possible applications in which it is desired to sample the functioning or the characteristics of color processing apparatus.

EXAMPLE A

A typical situation in which the method of providing a database as shown and described hereinabove is useful in quality control is that of a printing machine or other output apparatus which is found to produce somewhat varying output as a function of fluctuating environmental factors. A database designed to sample the characteristics of the printing machine, constructed in accordance with the method shown an described hereinabove, may be printed periodically on the printing machine. The database is preferably constructed to sample the printing of colors which are known to be sensitive or problematic when printed on that particular machine. The hard copy is then scanned and a suitable neural network is constructed to compensate for any drift which may have occurred relative to a previously defined standard.

EXAMPLE B

The method of providing a database may also be useful in quality control of color reading apparatus such as scanners. For example, if a scanner is thought to be defective, a database designed to sample the characteristics of that scanner, constructed in accordance with the method shown and described hereinabove, may be scanned by the putatively defective scanner and the result compared to the results of scanning the same database using results from a scanner known to be properly functional. The database is preferably constructed to sample the scanning of colors which are known to be sensitive or problematic when scanned on that particular scanner.

It is appreciated that the above examples are merely illustrative of possible quality control applications. The term "quality control" is here employed to describe any application in which the quality of performance of color processing apparatus is of interest. More generally, it also applies to any situation in which it is of interest to sample the performance of color processing apparatus.

EXAMPLE C

A typical situation in which the method of providing a database as shown and described hereinabove is useful in repeatability control is that of a scanner which is suspected of being improperly functional for a certain subregion (or the entire region) of the output space, comprising a plurality of colors. The database provision method shown and described hereinabove may be employed to provide a transparency or other representation which, when scanned, will be mapped onto the subregion in question. This transparency may be used to test the scanner and effect suitable corrective procedures thereupon. It is appreciated that this example is merely illustrative of possible repeatability control applications. The term "repeatability control" or "repeatability testing" is here employed to describe any application in which the repeatability of performance of color processing apparatus over time and/or over changing environmental conditions is of interest.

A number of color image processing applications in which a neural network, such as a neural network trained using a database provided in accordance with the method of FIGS. 2A and 2B, may usefully be employed, will be described in detail herein. The color image processing applications described herein are intended to be merely illustrative of the range of possible applications and are not intended to limit the range of color processing applications in which a neural network may be employed using the methods disclosed herein.

It is appreciated that only one or a few embodiments of each of the applications disclosed is described in detail hereinbelow, and that the details of implementation described herein are merely illustrative and by way of example, and that the embodiments described herein may be modified in any suitable manner. For example, any of the applications herein may be implemented on any suitable computer, such as an IBM PC, by performing the required transformation on the digital output file of any ECSS. Measurements of the database may be carried out automatically, using the automatic calibration function provided on the Smart Scanner, commercially available from Scitex Corporation, Herzlia, Israel. Alternatively, the database may be measured manually, using any suitable equipment such as a spectrum analyzer. The measured data may then be input into the computer either automatically or manually.

APPLICATION #1

Figure 3A:
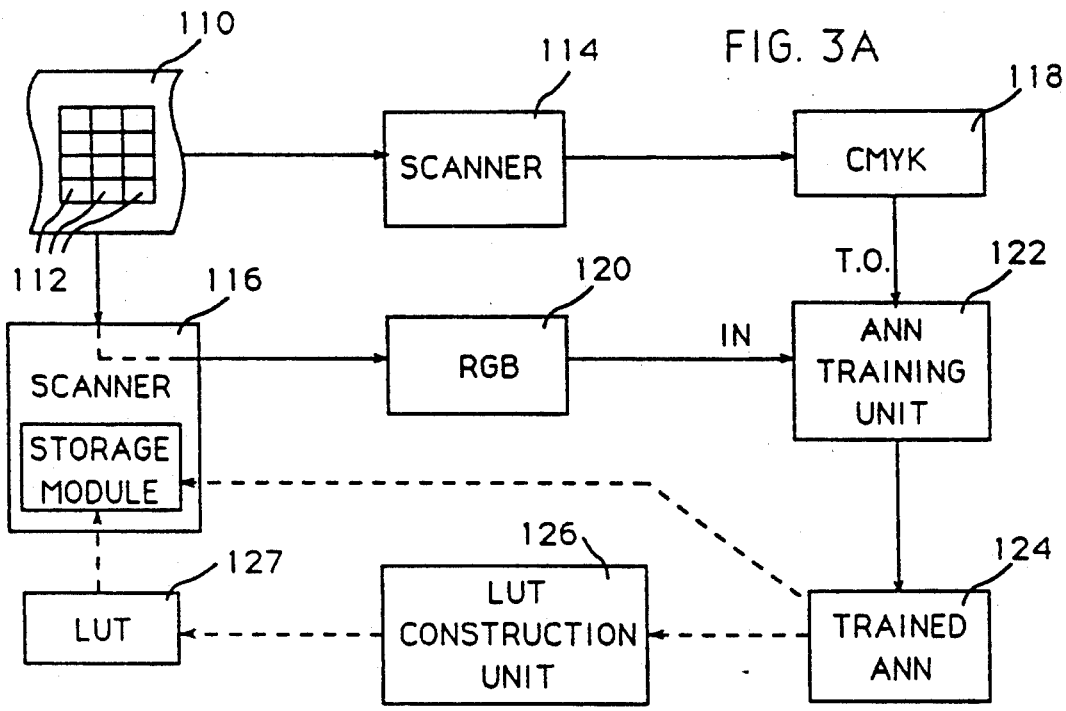
FIGS. 3A and 3B are schematic illustrations respectively of the generation of a calibration transformation or function and its employment in the incorporation of a new color separation scanner or other color reading device into an existing reproduction system employing automatic calibration in accordance with a preferred embodiment of the present invention.
Figure 3B:
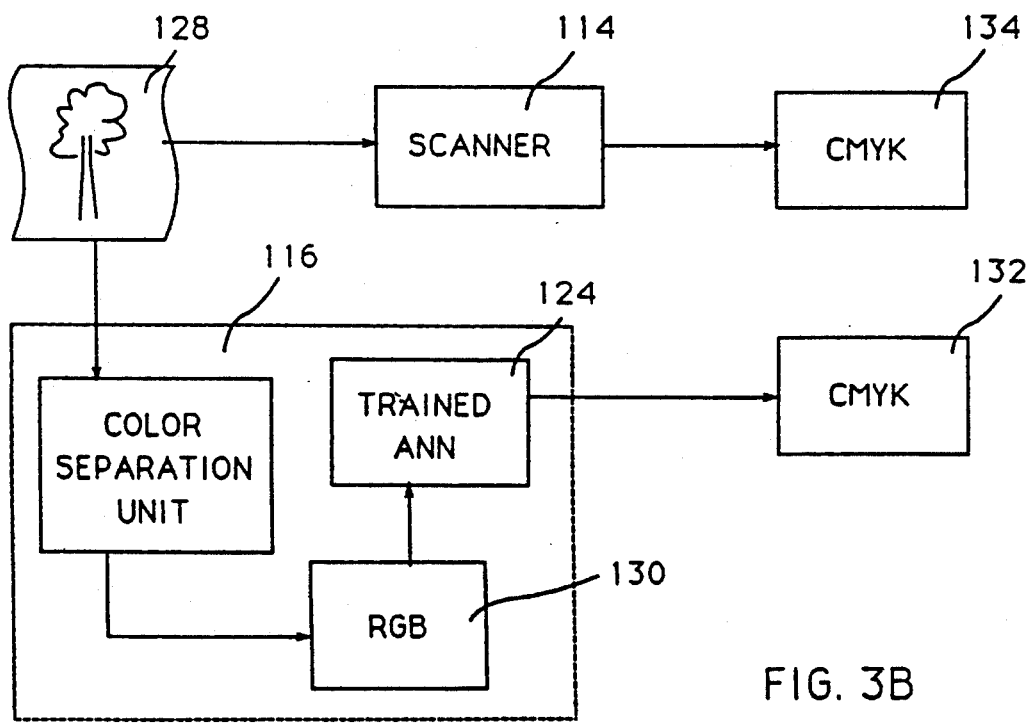

Calibration of a First Color Scanner with Reference to a Second Color Scanner Reference is now made to FIGS. 3A and 3B which illustrate respectively the generation of a calibration transformation and its employment in the incorporation of a new digital electronic color separation scanner into an existing reproduction system employing automatic calibration in accordance with a preferred embodiment of the present invention.

Conventionally, an existing reproduction work shop that purchases a new electronic color separation scanner (CSS) already owns one or more CSSs. During years of work and interaction with their customers, the shop has developed its own unique tone and color reproduction parameters that characterize the reproductions they produce. The tone and color reproduction parameters may depend on at least the following factors:

The type of originals employed, i.e. the brand and type of transparency or reflective copy;

The color separation scanner employed and its calibration;

The plotting system employed;

The printing system employed; and Aesthetic considerations.

The introduction of a new ECSS normally changes the tone and color reproduction parameters that are realized. A long and tedious process of adjustment of the new ECSS is normally required, involving numerous adjustments by trial and error. Normally the tone and color reproduction parameters existing prior to introduction of the new ECSS are never fully realized.

In accordance with the present invention, the trial and error techniques currently in use are replaced by a fully- or, if desired, semi-automated well-defined and generally algorithmic technique.

In accordance with a preferred embodiment of the present invention, as illustrated in FIG. 3A, there is provided a substrate, such as a transparency, bearing an analog representation of a color image 110 which typically comprises a plurality of colored locations 112. Preferably, the color image will comprise a "good" database constructed in accordance with the database provision method shown and described hereinabove. Here a "good" database is one which, *once scanned* by the scanner 114 of FIG. 3A, has a predetermined pattern such as a pattern in which there is a minimum density of data in every area of interest. The predetermined pattern may, for example, be a generally even distribution throughout generally the entirety of the physically producible color space, if it is desired to sample generally the entirety of the color space. Therefore, when constructing the color image 110 in accordance with the database provision method of FIG. 2, the scanner 114 should preferably be used to scan the color image 52. Alternatively, scanner 116 can be used.

The color image 110 is scanned both by an existing ECSS 114 which it is sought to emulate and by the new digital ECSS 116. From the existing ECSS 114 a digital representation 118, comprising color values (preferably CMYK values) each corresponding to an individual one of the locations 112, is obtained. These values relate to the amounts of each colorant to be provided by a printing machine.

From the DECSS 116, a digital representation 120 of the locations 112, comprising color values (preferably RGB values) corresponding to each location 112 is provided.

It is appreciated that references to RGB values and CMYK values, etc. throughout the present specification are intended to be examples of suitable color coordinates which can be replaced by any other suitable color coordinates, such as XYZ or LAB coordinates. Furthermore, there need not be exactly three input dimensions, or exactly three or four output dimensions. Any suitable number of dimensions may be employed.

A neural network training unit 122 receives pluralities of corresponding color values 118 and 120 and computes a weight for each pair of connected nodes of a neural network relating input color values 120 and output color values 118 in accordance with the neural network training procedure shown and described hereinabove with reference to FIG. 1. Color values 120 are used as the first color values 22 of training data set 20 of FIG. 1. Color values 118 are used as the second color values 24 of training data set 20 of FIG. 1. The trained neural network 124 may be stored in any suitable storage device, such as the TCR module of the scanner 116, and may be employed to calibrate the scanner.

Alternatively, the trained neural network may be employed to construct a LUT 127 relating the colorant values 118 to the RGB values 120. A preferred method for constructing a LUT using an artificial neural network comprises the following steps:

(a) providing RGB addresses of the LUT.

For example, the following set of values may be employed as addresses. The set of values includes all triplets in which each of the three components in the triplet has one of the following values: 0, 16, 32, ..., 255.

| 0 | 0 | 0 |
|---|---|---|
| 16 | 0 | 0 |
| 32 | 0 | 0 |
| ... | | |
| 255 | 0 | 0 |
| 0 | 16 | 0 |
| 16 | 16 | 0 |
| 32 | 16 | 0 |
| ... | | |
| 255 | 16 | 0 |
| ... | | |
| 0 | 255 | 0 |
| 16 | 255 | 0 |
| 32 | 255 | 0 |
| ... | | |
| 255 | 255 | 0 |
| ... | | |
| 0 | 255 | 255 |
| 16 | 255 | 255 |
| 32 | 255 | 255 |
| ... | | |
| 255 | 255 | 255 |

(b) The above addresses are normalized by dividing by 255.

(c) The normalized addresses are provided to the trained neural network as input.

(d) The output obtained from the neural network is multiplied by a suitable factor such as 255 and is stored as the contents of the LUT in any suitable storage unit such as in the TCR module of the scanner 116.

Appendix A is a software implementation of a preferred method for training an ANN and for constructing a LUT based on the trained ANN.

It is appreciated that the applicability of the above method for employing an artificial neural network to construct a LUT and for subsequently employing the LUT as a transformation tool, rather than employing the artificial neural network itself as a transformation tool, is not limited to situations in which the input values and output values of the artificial neural network are color values. Rather, it is believed that the above method for constructing a LUT and subsequently employing it to replace the ANN as a transformation tool is suitable for transformations between any type of values to any type of values.

It is appreciated that the neural network training unit and the LUT construction unit described in the present specification may be formed as a single unit, such as a computer program.

As a result of the foregoing technique, an input of any particular input material to the DECSS will produce DECSS outputs with substantially identical CMYK values as those produced on the existing ECSS from the same input material.

FIG. 3B illustrates the reproduction of input material using the existing ECSS 114 as opposed to the calibrated DECSS 116. The DECSS 116 scans the input 128, resulting in a first digital representation 130 thereof, which is then converted by the trained neural network 124, or by a LUT 127 representing the trained neural network 124, into a second digital representation 132 of the input 128, representing the required amounts of each colorant. It is seen that the digital representation 134 of the image 128 resulting from scanning by the ECSS 114 will normally be substantially identical to the output 132, as scanned by the DECSS 116.

If the neural network 124 was employed to construct a LUT, the color values of the first digital representation which do not appear in the LUT constructed by LUT construction unit 126 may be interpolated therefrom, using standard methods, such as those disclosed in chapter 2 of J. Stoer, *Introduction to Numerical Analysis*, Springer-Verlag, New York, 1980.

It is appreciated that the same or similar interpolation methods may be used in all of the applications of the present invention shown and described subsequently. The interpolation methods are preferably carried out automatically by suitable hardware, such as that commercially available from Zoran Corporation, Santa Clara, Calif., USA, or from INMOS Limited, Bristol, UK. A particular advantage of directly employing an ANN as a color transformation tool rather than constructing a LUT on the basis of the ANN and using the LUT as a construction tool, is that no interpolation procedures are necessary. All output values are directly computed by the ANN.

In accordance with the embodiment of FIG. 3A, the ECSS 114 output of color values 118, corresponding to the color patches 112, can be stored as a digital file and can be transmitted to neural network training unit 122 by any suitable technique, such as via a cable connection, or by employing magenta tape or other medium.

The above-described technique is not limited to automatic reading of colorant values. These values may be manually read by one from the scanner. The operator may then input into the neural network training unit 122, as via a keyboard or via any other suitable input means, a list of RGB values and corresponding colorant values.

Figure 3C:
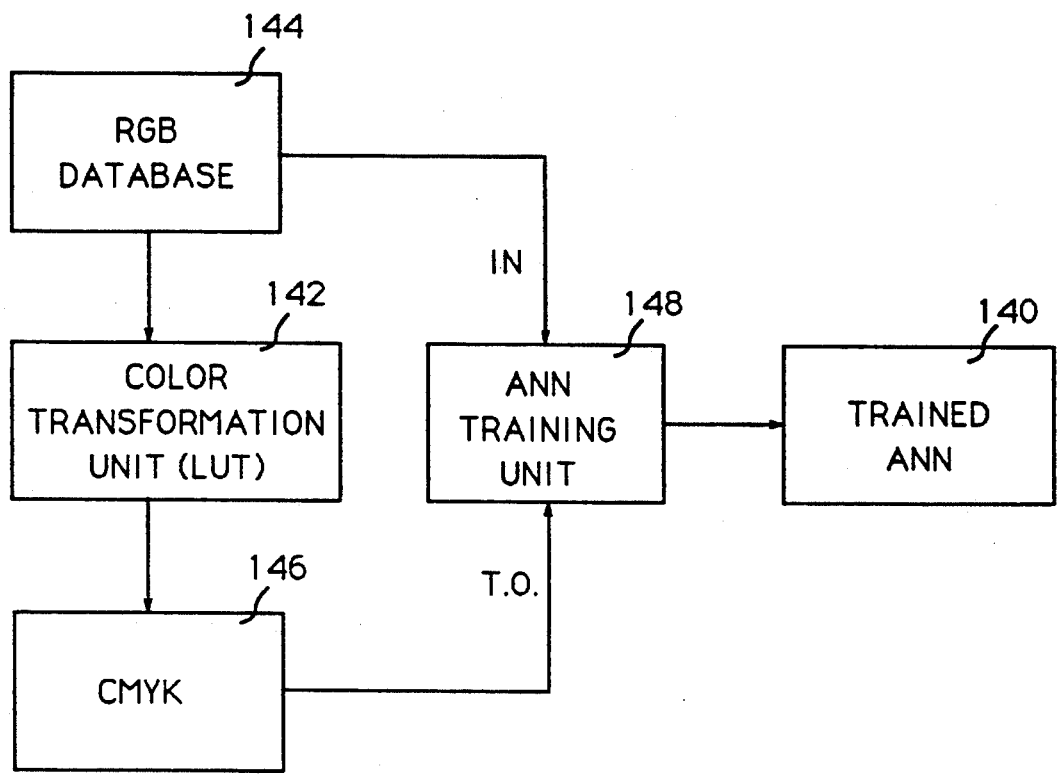
FIG. 3C is a conceptual illustration of a method which is a generalization of the methods of FIGS. 3A and 3B.

Reference is now made to FIG. 3C which is a conceptual illustration of a generalization of the method of FIGS. 3A and 3B. The method and apparatus of FIG. 3C are useful in any application in which it is desired to train an ANN 140 to mimic an existing color transformation which may be represented in any suitable form such as in the form of a LUT 142 for transforming a first color value from among a first plurality of color values such as RGB color values, into a second color value from among a second plurality of color values such as CMYK color values.

Preferably, the method for training ANN 140 comprises the following steps:

a. Provide a database 144 which suitably represents the first plurality of color values. A database may be provided by scanning the Q60 transparency, commercially available from Kodak Corporation, as explained above. Alternatively, a database may be constructed using the database construction method shown and described herein with reference to FIGS. 2A–2B.

b. Transform the database values using, in the present embodiment, the LUT 142, thereby to obtain a set of LUT-processed database values 146, such as CMYK values.

c. Compute a weight for each pair of connected nodes of ANN 140, employing the method of FIG. 1, and using database 144 as the input training data and CMYK data 146 as the target output training data.

APPLICATION #2

Output to Output Calibration

Figure 4A:
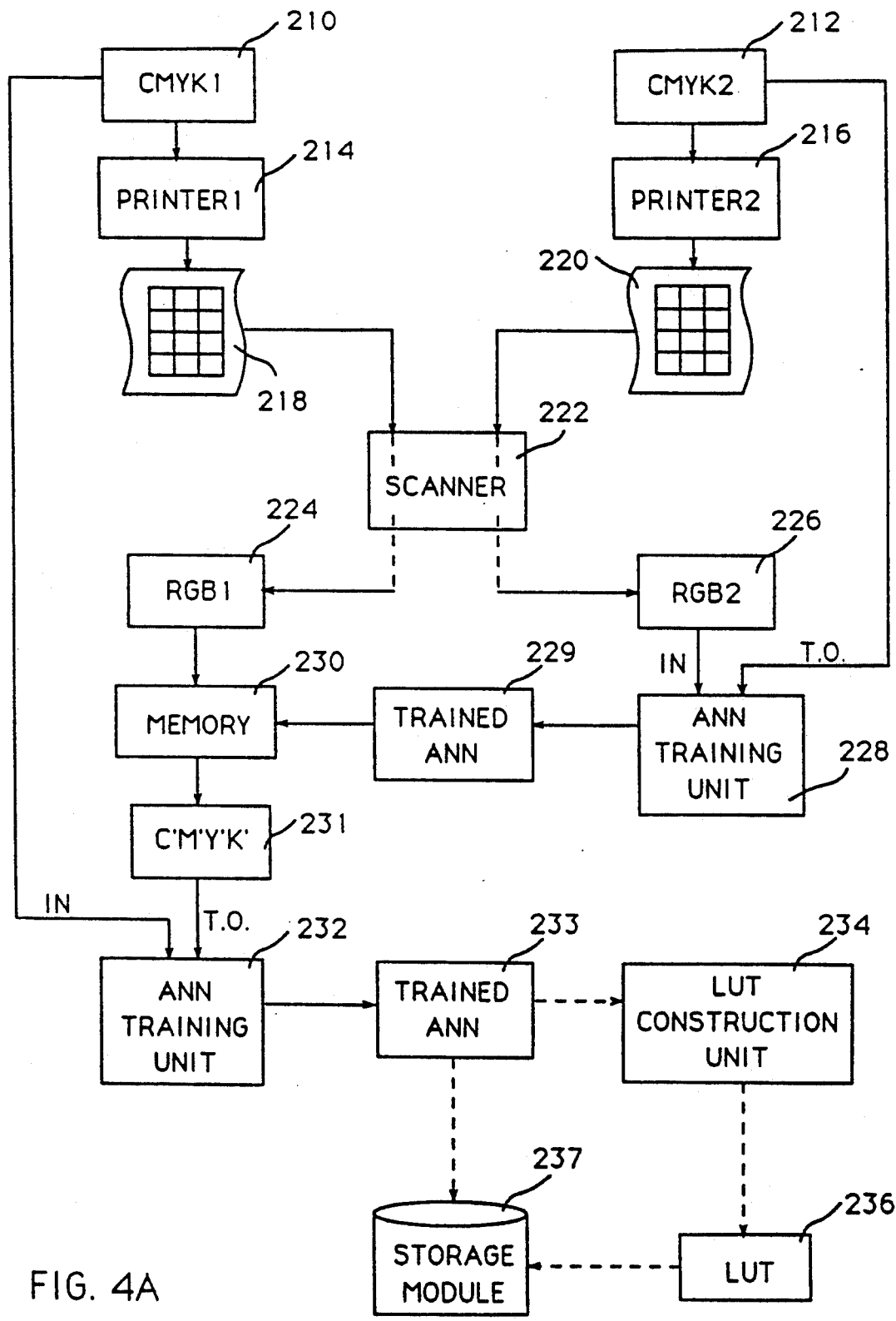
FIG. 4A is a schematic illustration of compensation for a new printing or proofing machine in accordance with a preferred embodiment of the present invention.

Reference is now made to FIG. 4A which is a schematic illustration of calibration procedures for producing a first printing system output substantially identical to the output from a second printing system.

The embodiment of FIG. 4A is particularly useful in calibrating a proofing machine, used to prepare a single copy of a reproduction for preliminary proofing purposes, to emulate a printing machine which it is intended to use to produce the final reproduction. The state of the art technology, such as the Cromalin (registered trademark) system available from DuPont (U.K.) Limited, Hertfordshire, UK, produces a reproduction which may differ substantially from the output of the printing machine that the proofing system is intended to emulate. Consequently, the proof must be evaluated by an expert who can judge the quality thereof while attempting to mentally adjust for the expected discrepancies between proof and eventual printed reproduction. The present invention enables the proofing machine to be accurately and algorithmically calibrated so as to emulate the printing machine.

Since they may exist colors that can be printed by the final printing machine but cannot be printed by the proofing machine using any combination of colorants, it is desirable to choose a proofing machine that is compatible with the printing machine. For example, the Cromalin (registered trade mark) proofing system available from DuPont is generally compatible with offset printing machines. Otherwise, "unprintable" colors may be dealt with using any suitable technique, such as the techniques described in the above-referenced article by Stone et al (particularly pages 275–279 thereof), the disclosure of which is incorporated herein by reference.

A further application is when a printing machine needs to be replaced or when it is desired to add an additional printing machine to an existing workshop. Since the new machine may be of a different brand, type or model than the old machine, it is typically found that printing with the same colorant values on the new machine will produce a color with a different appearance. Therefore, it is generally the case that the new printing machine must be adjusted manually, by a trial and error process, until the reproductions obtained therefrom roughly resemble the reproductions obtained from the existing machine. It is typically impossible to obtain complete concordance between the appearances of the reproductions produced by the first and second machines.

The different appearances obtained from different printing or proofing machines may be the result of at least the following reasons: different colorant materials employed, different technologies employed (offset, gravure, web, Cromalin (registered trade-mark), ink-jet, heat transfer, etc.), dot shape of half-tone film or plates, room temperature, humidity, etc.

Comparison of the results from the respective printing devices is preferably carried out in a CIE (Commission International d'Eclairage) standard color space but may also be carried out in any other suitable color space.

A preferred procedure for using a graphic arts reproduction system comprising a first printing device as a reference in order to calibrate a graphic arts reproduction system comprising a second printing device is the following, described with reference to FIG. 4A:

a. Provide a first database 210 and a second database 212 for the first, reference, and second, to be calibrated, printing devices 214 and 216 respectively. The two databases comprise first and second pluralities of colorant values, preferably CMYK values. Preferably, databases 210 and 212 are "good" databases for sampling the operations of output devices 214 and 216 respectively, in the sense that, once printed by printers 214 and 216 respectively and scanned by the scanner 222, each database has a predetermined pattern such as a pattern in which there is a minimum density of data in every area of interest. The predetermined pattern may, for example, be a generally even distribution throughout generally the entirety of the physically producible color space, if it is desired to sample generally the entirety of the color space.

The two databases may be constructed in accordance with the database provision method shown and described hereinabove. When constructing database 210, using the database provision method of FIGS. 2A-2B, the printer 214 should be used. When constructing database 212, the printer 216 should be used. Preferably, the pluralities of colorant values 210 and 212 include only colorant values that are actually used in reproduction tasks, by printers 214 and 216 respectively.

b. Databases 210 and 212 are printed by printing devices 214 and 216 respectively. The resulting images 218 and 220 respectively are scanned by a color reading device 222 such as the Smart Scanner available from Scitex. The digital representations of images 218 and 220 respectively resulting from the scanning thereof are referenced as 224 and 226. Digital representations 224 and 226 each comprise a plurality of color values, such as RGB values. In some applications it may be desirable to convert the pluralities of RGB values 224 and 226 to corresponding pluralities of CIELab, XYZ values or values from another suitable coordinate system, using known techniques.

c. Neural network training unit 228 receives pluralities of corresponding color values 226 and 212 as input data and target output data respectively, and trains a neural network 229 accordingly in accordance with the method shown and described herein with reference to FIG. 1. Neural network training unit 228 is constructed and operative in accordance with the neural network training procedure shown and described hereinabove. The ANN 229 trained by ANN training unit 228 is stored in storage unit 230 and outputs the amounts of cyan, magenta, yellow and black inks required to print, using printing device 216, a color to be read as a given RGB value by color reading device 222.

d. The ANN 229 trained by training unit 228 is operated on the RGB values of representation 224, resulting in a plurality 231 of CMYK values. For each CMYK value of database 210, the corresponding C'M'Y'K' value in digital representation 231 represents the amounts of the colorants required to produce, by means of printer 216, a colored location which would be read by color reading device 222 as a value substantially equal to the corresponding RGB value in digital representation 224.

e. A second ANN training unit 232 is operative to receive pluralities of color values 210 and 231 as input data and target output data respectively and to train an ANN 233 quantifying the relationship between the color values 210 and the color values 231. The ANN 233 may be received by LUT construction unit 234 and used to construct a LUT 236. Alternatively, the ANN 233 may be stored in any other suitable manner, as by storing the set of weights and network parameters defining ANN 233, such as the size of the layers. The weights and parameters of ANN 233 or the LUT 236 representing ANN 233 may be stored in any suitable storage device 237, such as a disc.

ANN 233 therefore represents the conversions of the amounts of cyan, magenta, yellow and black inks required to print using printing device 216, such that the output will appear to the color reading device 222 to be substantially identical to the RGB values read from the unconverted values of c, m, y and k printed by printing device 214.

According to a first preferred embodiment, when scanning image representations 218 and 220, the white point is selected to be as close as possible to the white-point CMY values of the corresponding printers 214 and 216 respectively. If the selected white point cannot coincide exactly with the corresponding white-point CMY value, a slightly higher white point is typically selected. All other controls are put on their default setting.

According to an alternative preferred embodiment, the white point is taken on a blank portion of the white paper or background. All other controls are put on their default setting.

It is appreciated that the most appropriate selection of the white point may vary as a function of the particular application and of the particular graphic arts reproduction system employed.

Preferably, color image representations 218 and 220 are each automatically scanned, thereby to define a plurality of color values corresponding to a plurality of colored locations into which each image is divided. Any suitable procedure may be employed to accomplish this, which procedure may comprise the steps of: automatically passing from pixel to pixel of the color image while reading and storing the color values of each pixel, defining a plurality of colored locations each comprising a plurality of pixels, and averaging or otherwise combining the values of at least some of the pixels in each colored location, thereby to define a color value for each colored location. A commercially available function for automatically scanning an analog representation of color patches is the automatic calibration function provided on the Smart Scanner, commercially available from Scitex Corporation.

Once constructed, LUT 236 or trained ANN 233 may be utilized in at least two different ways:

(i) If it is desired to print, on printer 216, an image represented as a digital file originally intended for printing by printer 214 so that its appearance to the color reading device 222 will be substantially as when the digital file is printed on printer 214, the digital file is passed through LUT 236 or trained ANN 233 and the resulting transformed digital file is printed on printer 216. The results of printing the digital file on printer 214 and subsequently reading it using color reading device 222 are substantially identical to the results that would be obtained by printing the transformed file on printer 216 and subsequently reading it using color reading device.

Figure 4B:
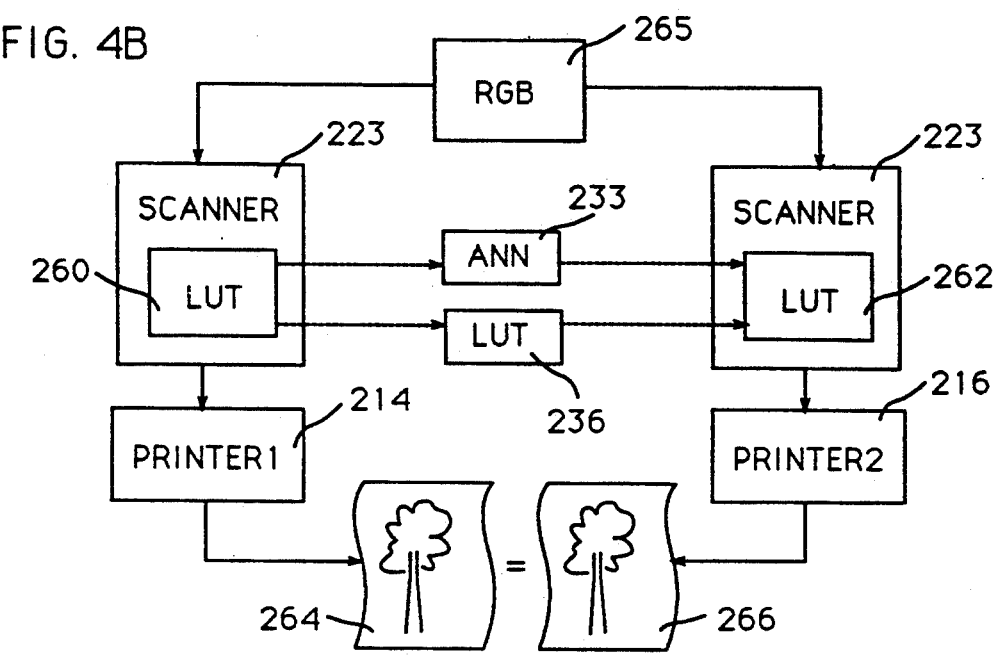
FIG. 4B is a schematic illustration of an alternative method of utilizing the calibration information provided by the technique of FIG. 4A.

(ii) Reference is made to FIG. 4B which illustrates modification of an RGB-to-CMYK LUT 260 incorporated in a color reading device 233 which may be identical to scanner 222 of FIG. 4A. LUT 260 is suitable for use in conjunction with printing device 214. It is desired to modify LUT 260 and thereby to obtain a modified RGB-to-CMYK LUT 262 which, when loaded onto scanner 223 and used in conjunction with printing device 216 will result in pictures substantially identical to those produced by scanner 223 located with LUT 260 and printing device 214, where the term "substantially identical" implies that pictures produced by the two processes will be "seen" as substantially identical by a scanner.

As shown in FIG. 4B, LUT 236 or ANN 233 is operated on the values of LUT 260, transforming each CMYK value intended for printer 214 to a CMYK value suitable for printer 216, thereby to obtain LUT 262. Consequently, the result 264 of scanning a particular image 265 using scanner 222 loaded with LUT 260 and subsequently printing with printer 214 are substantially the same as the result 266 of scanning the image using scanner 222 loaded with LUT 262 and subsequently printing with printer 216. This implies that a scanned representation of picture 264 will comprise generally the same values as a scanned representation, using the same scanner, of picture 266.

It is appreciated that the operation of LUT 236 on a body of data is substantially equivalent to the operation of ANN 233 on the same body of data, since the structure of LUT 236 reflects the structure of ANN 233.

Figure 4C:
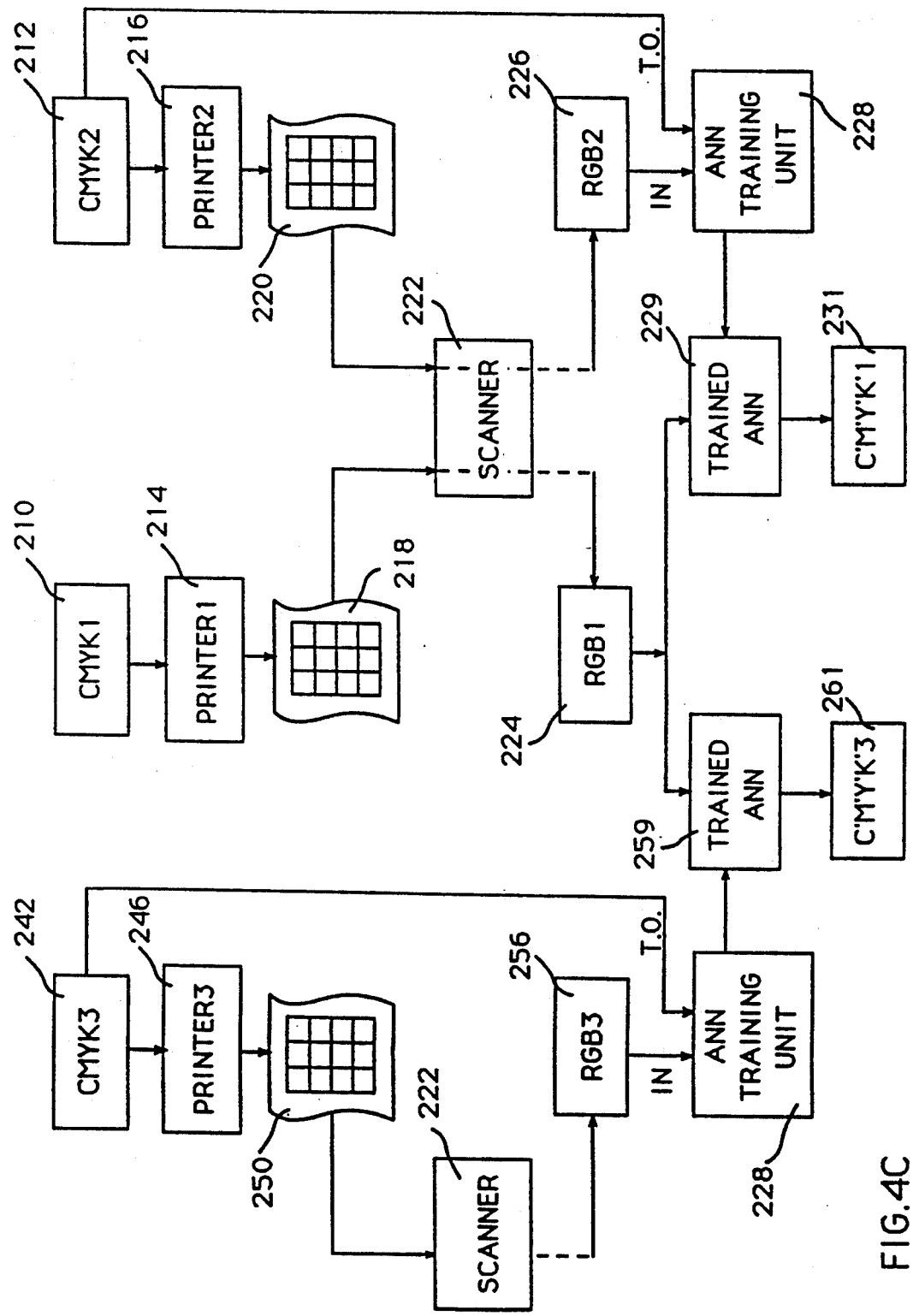
FIGS. 4C-4D illustrate a variation of the technique of FIG. 4A useful for simultaneously calibrating a plurality of printing systems, such as two printing systems, relative to a reference printing system.
Figure 4D:
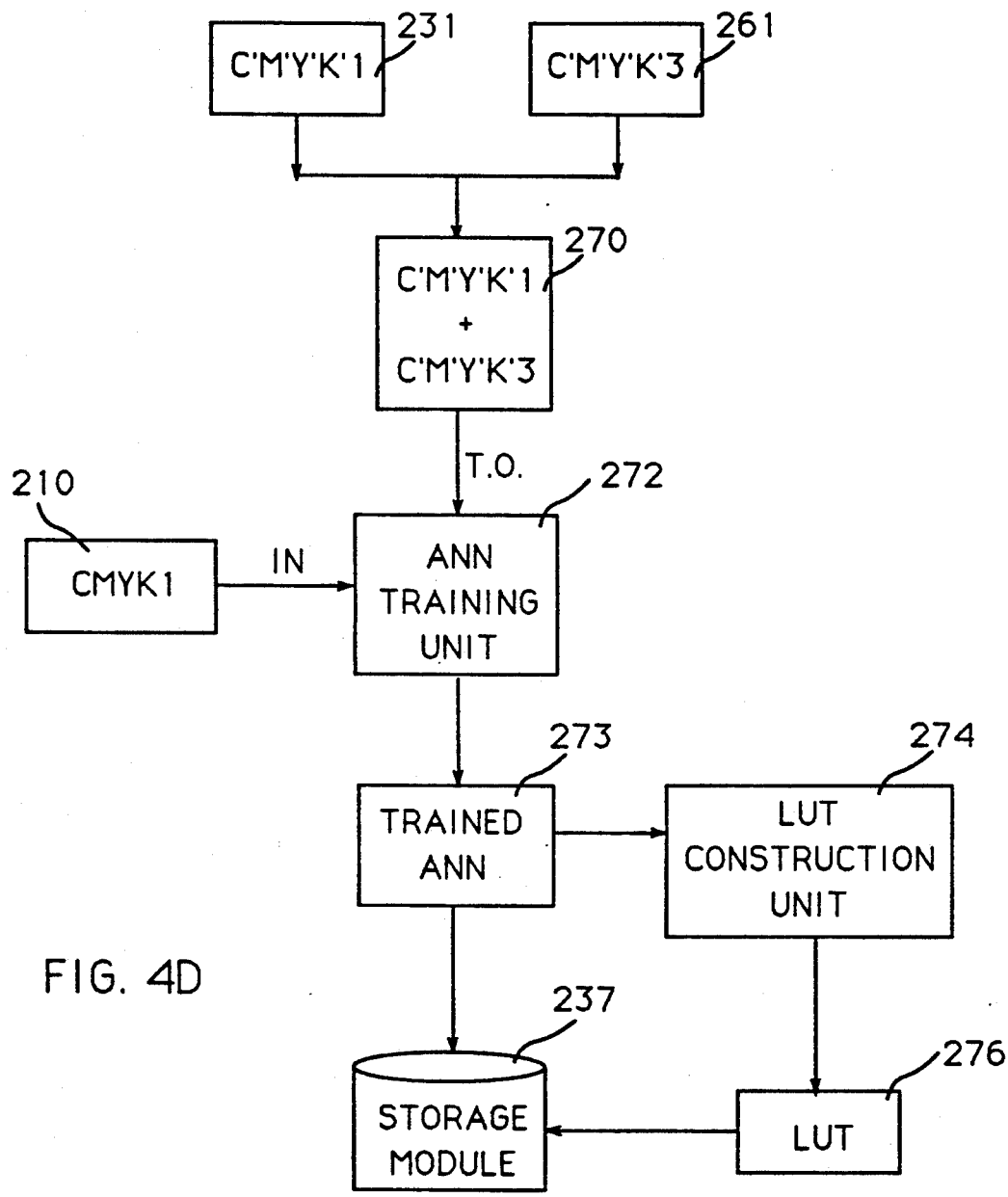

Reference is now made to FIGS. 4C–4D which illustrate a method and apparatus for simultaneously calibrating a plurality of printing systems, such as two printing systems, relative to a reference printing system.

A preferred method for simultaneously calibrating two or more printing system is as follows:

a. Steps a–d of the method of FIG. 4A are carried out in order to initiate calibration of printer 216 relative to printer 214.

b. Steps a–d of the method of FIG. 4A are carried out, using the same reference scanner output 224 but replacing CMYK database 212 with CMYK database 242 and printer 216 with printer 246. In FIG. 4C, the output of printer 246 is referenced 250, the output of scanner 222 is referenced 256, the ANN trained by training unit 228 is referenced 259, and the output of trained ANN 259 is referenced 261. Database 242 may be selected to appropriately sample the operation of printer 246 in the same way that database 212 is selected to appropriately sample the operation of printer 216.

c. Referring now to FIG. 4D, pluralities 231 and 261 of CMYK values are concatenated, thereby to provide a plurality 270 of 8 dimensional vectors, each vector comprising the four components of the corresponding element in CMYK data 231 and the four components of the corresponding element in CMYK data 261.

d. The plurality 270 of 8 dimensional data is provided as target output to ANN training unit 272. The input data is CMYK data 210. The ANN training unit 272 trains an ANN 273 whose output layer typically comprises 8 neurons. The configuration parameters and weights of ANN 273 may be stored in any suitable storage means 237 such as the TCR module of a scanner. Alternatively or in addition, a LUT 276 may be constructed based upon the ANN 273, using the LUT construction method shown and described above with reference to FIGS. 3A and 3B. The contents of the LUT is typically 8 dimensional, corresponding to the two four-dimensional ink coordinate values stored at each location of the LUT.

Figure 4E:
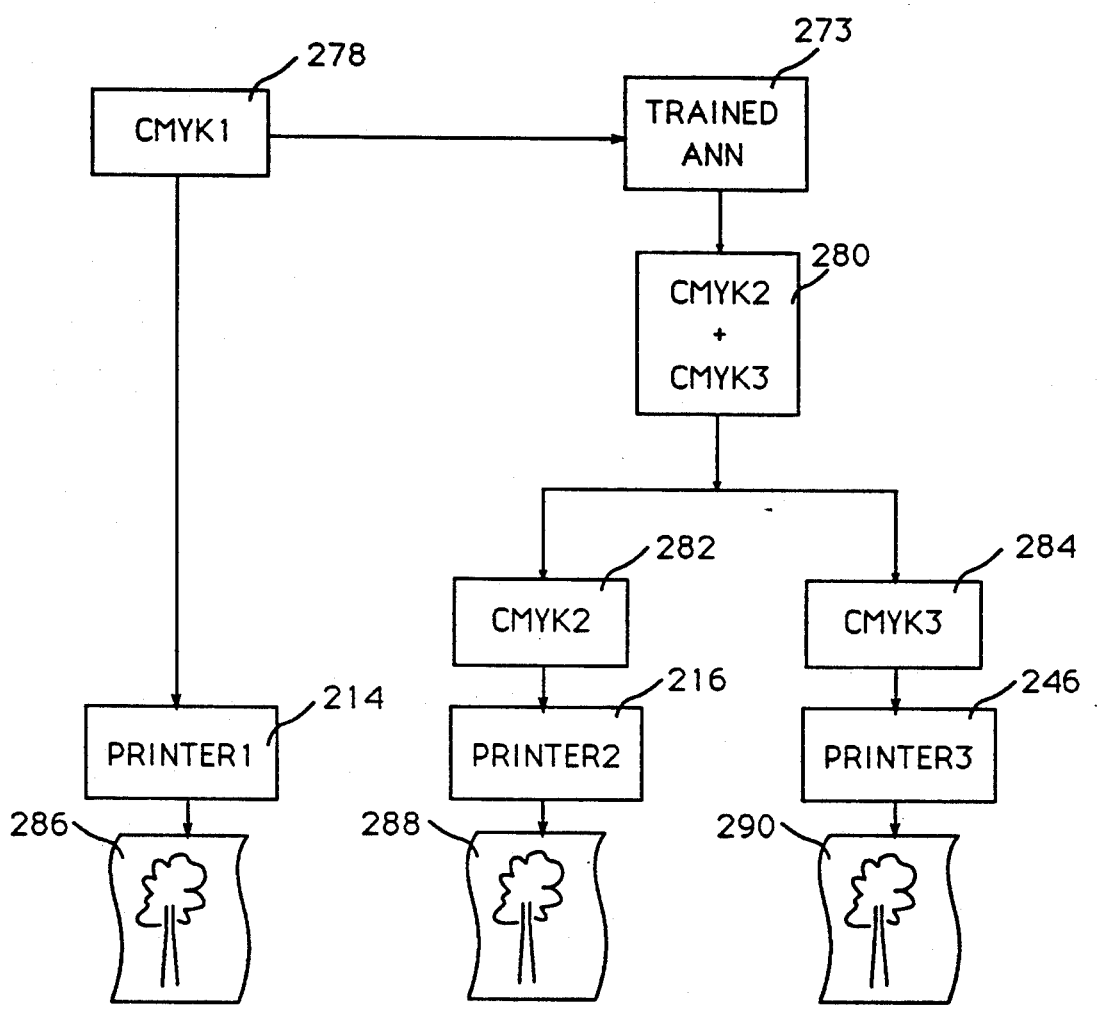
FIG. 4E illustrates a method for employing two printing systems calibrated relative to a third, reference printing systems in order to provide two respective output representations substantially similar in appearance to one another and to the output of the reference printing system.

Reference is now made to FIG. 4E which illustrates a method for employing the two printing systems 216 and 246 calibrated relative to the third, reference printing system 214 in order to provide two respective output representations substantially similar in appearance to one another and to the output of the reference printing system. A sample application of the method of FIG. 4E is when a Chromalin proof has been produced using a Dupont Chromalin system and it is desired to print the image represented by the proof using both offset and gravure printing processes and to ensure that the appearances of the proof and of the outputs of the offset and gravure processes are substantially identical. In this example, the reference printing system may be the gravure printing machine or the offset printing machine.

A CMYK file 278 is provided which is a digital representation to be printed on printing system 214, and on printing systems 216 and 246, while preserving the appearance of the CMYK file 278 when printed on printing system 214. The CMYK file 278 is provided as input to trained ANN 273, thereby providing an output file 280 which comprises a plurality of 8 dimensional values (CMYKCMYK). The CMYKCMYK values 280 are split into first and second pluralities 282 and 284 of CMYK values which are then printed on printers 216 and 246 respectively. The appearances of the outputs 288 and 290 from printers 216 and 246 respectively are substantially identical to the appearance of analog representation 286 which was printed directly from CMYK file 278, using reference printing system 214.

APPLICATION #3

Duplication of Originals

Figure 5A:
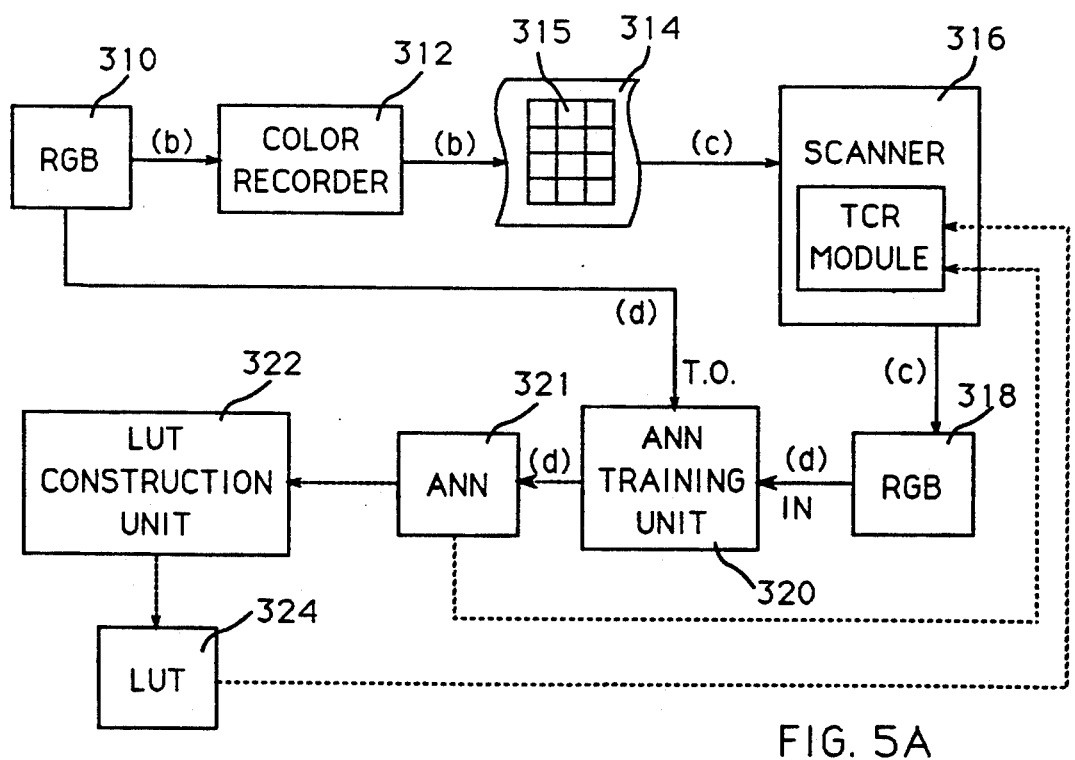
FIGS. 5A, 5B and 5C are schematic illustrations which illustrate respectively a calibration method and two alternative subsequent uses therefore for generating duplications in accordance with a preferred embodiment of the present invention.
Figure 5B:
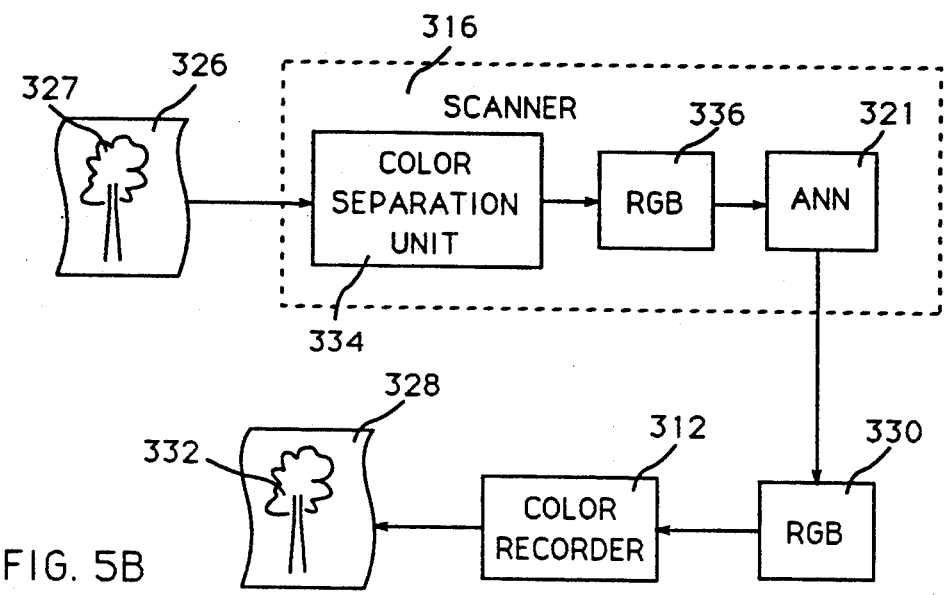

Reference is now made to the schematic illustrations of FIGS. 5A and 5B, which illustrate an embodiment of the invention useful in producing duplications of images existing as hard copies on a particular medium (such as but not limited to a transparency or reflective copy). It is noted that a half-toned printed picture can be duplicated entirely analogously to what will be described herein, except that the picture may be descreened, using conventional techniques.

Conventional descreening techniques are described in Marquet, M., "Dehalftoning of negatives by optical filtering,", Optica Acta 6, 404–405, 1959; Marquet, M. and J. Tsujiuchi, "Interpretation of Particular Aspects of Dehalftoned Images," Optica Acta 8, 267–277, 1961; and Kermisch, D. and P. G. Roetling, "Fourier Spectra of Halftone Screens", J. Opt. Soc. Amer. 65, 716–723, 1975. The disclosures of these documents are incorporated herein by reference.

A preferred method for providing for duplication of images represented on a given medium will now be described. Steps (a)–(d) are illustrated in FIG. 5A. Step (e) comprises two alternative methods for duplicating a given image once steps (a)–(d) have been carried out, illustrated in FIGS. 5B and 5C respectively.

a. Provide a first digital representation 310 of a color image, typically comprising a first plurality of RGB values, using any suitable procedure such as the database provision method shown and described hereinabove. Here a "good" database 310 is one which is suitable for sampling the operation of recorder 312 used in conjunction with recording medium 314 and scanner 316, as explained hereinabove in the section on database construction, and is preferably constructed in accordance with the method of FIGS. 2A–2B. Therefore, when using the database provision method of FIGS. 2A–2B to construct the database 310, the scanner 316 and the recorder 312 should be used for scanning and recording the initial database.

b. Place a substrate 314 of the desired medium in a color recorder 312 such as a 4cast commercially available from DuPont. According to a preferred embodiment of the present invention, the medium of the substrate 314 is the same as the medium of the original 326 (FIG. 5B) which it is desired to duplicate. Load the color recording apparatus 312 with the digital file 310, thereby to provide an analog representation 315 corresponding to the digital representation 310 of the color image.

c. Read the analog representation 315 using a color reading device 316 such as an analog ECSS or a DECSS, thereby to obtain a second digital representation 318 of the color image, preferably comprising a second plurality of RGB values corresponding to the plurality 310 of RGB values.

d. Input digital representations 310 and 318 to ANN training unit 320, which is operative to train an ANN 321 to transform the plurality of color values 318 to the plurality of color values 310 in accordance with the ANN training procedure described hereinabove. As explained above with reference to FIG. 1, neural network training unit 320 receives pluralities of corresponding color values 22 and 24 and computes a set of weights for a neural network based upon the relationship between the color values 22 and the color values 24. In the present embodiment, color values 318 are used as the first color values 22 of training data set 20 of FIG. 1. Color values 310 are used as the second color values 24 of training data set 20 of FIG. 1.

The trained ANN 321 computed by ANN training unit 320 may be stored in any suitable storage unit such as the TCR module of scanner 316. Alternatively, the ANN may be received by LUT construction unit 322. LUT construction unit 322 is operative to construct a LUT 324 relating the RGB values 318 to the RGB values 310 as dictated by ANN 321 and to store the LUT 324 in the TCR module of the scanner 316. The LUT 324 or the trained ANN 321 may now be used as follows:

e. Reference is made to FIG. 5B. Given a substrate 326 (preferably of the same medium as substrate 314) bearing an analog representation of a color image 327, and when it is sought to duplicate the color image 327 onto a second substrate 328 (preferably of the same medium as substrate 326), the image 327 is scanned by the scanner 316 whose TCR module contains the LUT 324 or the trained ANN 321, thereby to obtain a digital representation 330 of the color image. The digital representation is then recorded by color recording apparatus 312, thereby to obtain a substantially accurate duplicate 332 of the original color image 327 on substrate 328.

Figure 5C:
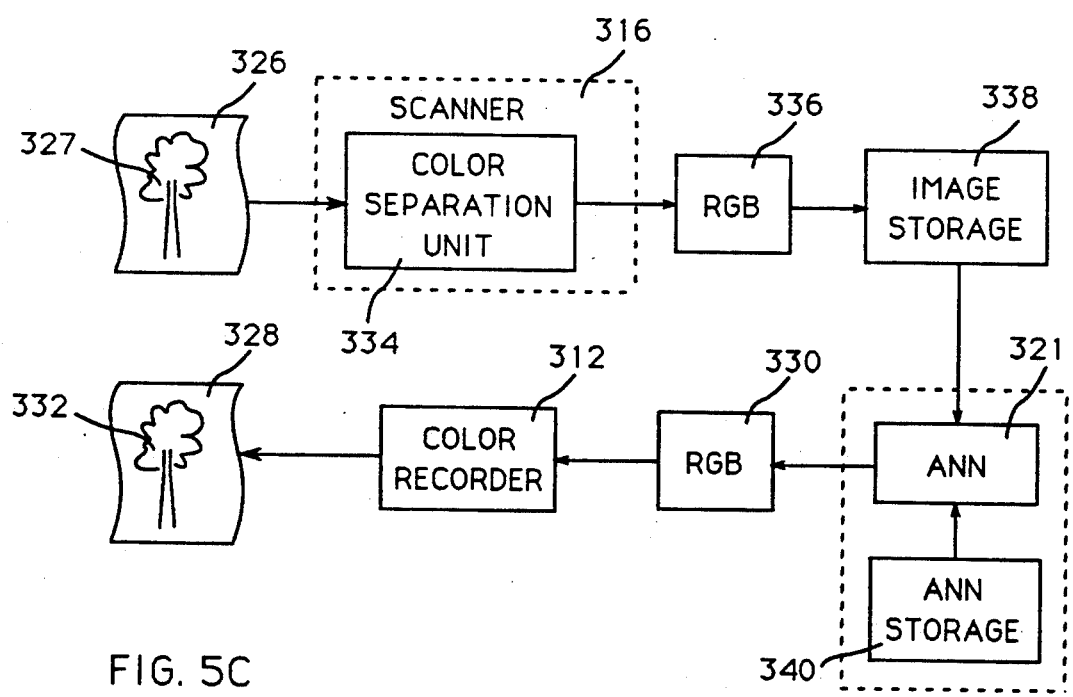

Alternatively, the color image 327 may be reproduced as in FIG. 5C. As shown, the image 327 is scanned by the scanner 316 using only the color separation unit 334, thereby to define a digital representation 336, preferably comprising a plurality of RGB values, of image 327. The digital representation 336 is stored in storage unit 338.

The weights and configuration parameters of ANN 321 trained by ANN training unit 320 may be stored in any suitable storage unit 340, such as the memory of a suitable computer. Alternatively, ANN 321 may be employed to construct LUT 324. ANN 321 then operates on digital representation 336 which is read from storage unit 338, thereby to provide a modified digital representation 330 of image 327. Digital representation 330 is then recorded by color recording apparatus 312, thereby to obtain a substantially accurate duplicate 332 of the original color image 327 on substrate 328.

If desired, certain of the above steps can be performed manually. Specifically, the RGB color values of the patches 314 may be manually measured with a color separation scanner and then manually input into ANN training unit 320, as by a keyboard, instead of being scanned.

According to an alternative embodiment, the image 327 on the substrate 326 is scanned itself to provide digital representation 310 (FIG. 5A). This embodiment is particularly useful in certain applications as it employs precisely those colors required for the duplication of the particular image 327.

APPLICATION #4

Reconstruction of Input from Output

Reference is now made to FIGS. 6A-6E, which illustrate a further embodiment of the present invention useful in reconstructing a hard copy produced using a given tone and color reproduction system.

Figure 6A:
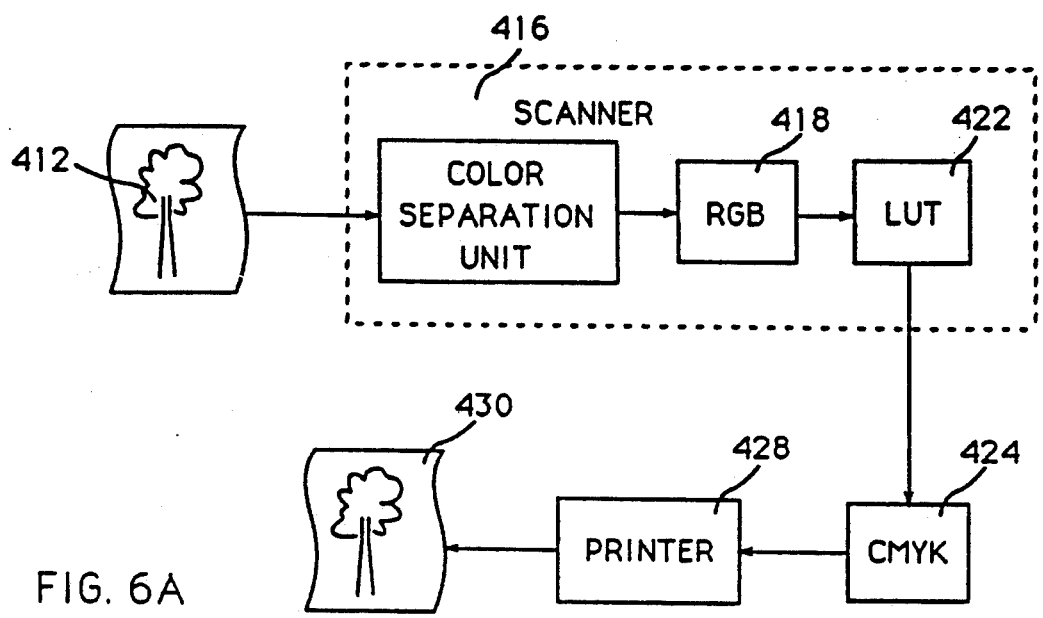
FIGS. 6A–6E are schematic illustrations of a technique for restoring an input copy from an output copy in accordance with a preferred embodiment of the present invention.

FIG. 6A describes a standard reproduction process of an image 412 which is printed as a reflective copy 430. If the original transparency 412 is unavailable, it can be reconstructed using either the processed digital file 424 or the reflective output 430.

Figure 6B:
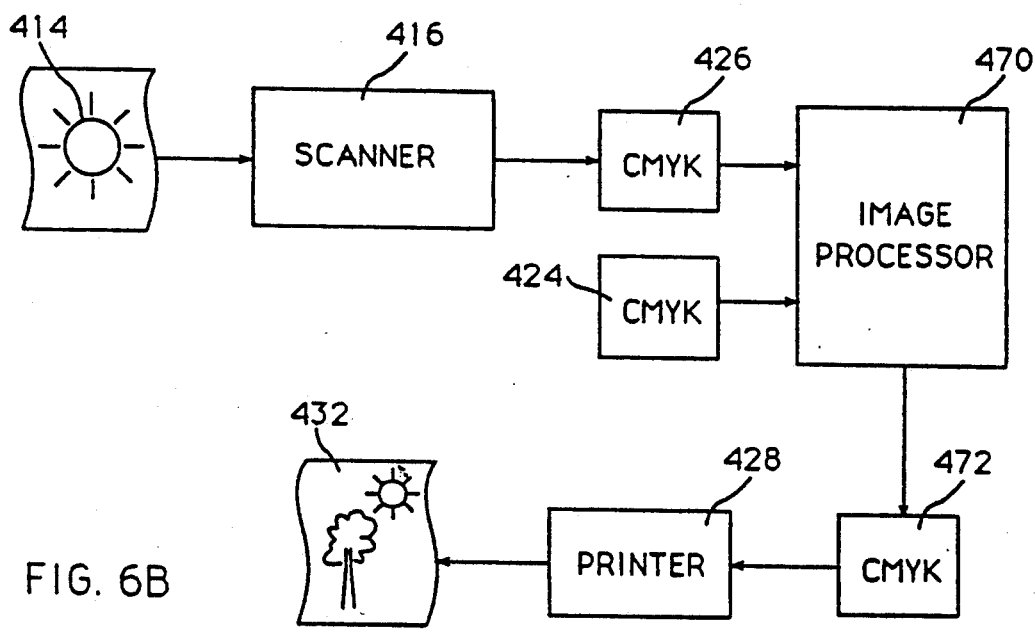

FIG. 6B describes an application in which it is desired to create a single image comprising the tree in picture 412 and the sun in picture 414, and to represent it upon a single substrate, thereby to obtain a single representation 432 (such as a reflective copy) of both the sun and the tree. It may be desired to provide transparencies of the representation of the combined image in which the tree resembles the tree in the original picture 412 and the sun resembles the sun in the original picture 414. Preferably, the medium of the original picture 412 is substantially identical to the medium of the original picture 414.

Figure 6C:
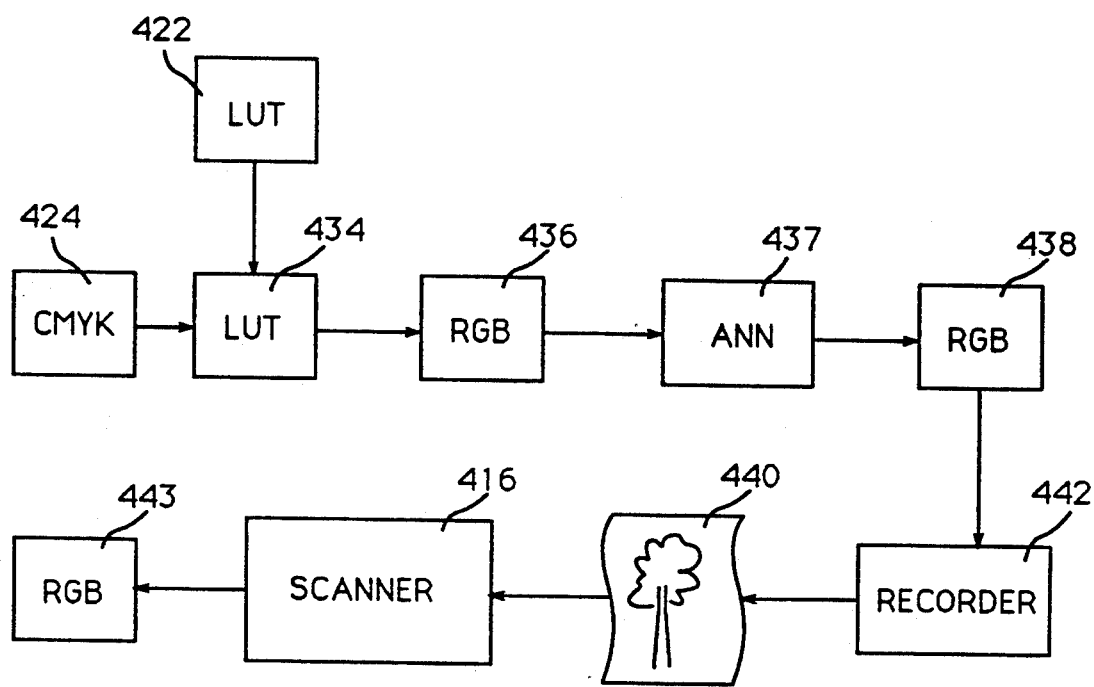

FIG. 6C illustrates a preferred method of reconstructing the input copy 412 assuming that a LUT 422 was constructed on the basis of the ANN used to transform the RGB representation 418 of the image 412 into a CMYK representation 424, using the LUT construction method of FIGS. 3A and 3B, and assuming that LUT 422 and digital file 424 are still available.

First, LUT 422 is inverted, using known methods such as those disclosed on page 267 of the above referenced article by Stone et al, thereby to provide an inverted LUT 434. LUT 434 is then operated on digital file 424, thereby to provide a digital file 436, typically comprising a plurality of RGB values, which values are substantially identical to the plurality of RGB values 418 scanned from the input copy 412 (FIG. 6A).

Alternatively, the LUT 422 inversion step may be replaced by the step of providing an ANN for transforming CMYK representation 424 into RGB representation 418 of the image 412, particularly if the ANN used to transform the RGB representation 418 of the image 412 into a CMYK representation 424 was not employed to create a LUT. The LUT 434 operation step is then replaced by the following steps:

i. Providing a CMYK-RGB database which may be constructed using the database provision method shown and described above with reference to FIGS. 2A-2B.

ii. Providing an ANN for transforming CMYK values into RGB values, using the ANN training method shown and described above with reference to FIG. 1 and using the database provided in step (i) as training data. The CMYK values are the input data and the RGB values are the target output data.

iii. Operating the CMYK-to-RGB ANN provided in step ii on CMYK representation 424.

Subsequently an operator 437 is constructed, which, when operated on digital file 436, will result in a digital file 438 which when recorded on a substrate 440 (preferably of the same medium as the original 412) by a recorder 442, will result in an analog representation which has the following property: If scanned by scanner 416, analog representation 440 will provide a digital representation 443 substantially identical to digital file 436 (and digital file 418). Preferably, the analog representation also has the property of appearing to the human eye to have substantially the same tone and color as the original 412. The operator 437 may comprise an ANN, as in the illustrated embodiment, or a LUT constructed to correspond to the ANN, using the LUT construction method shown and described above with reference to FIGS. 3A and 3B.

A preferred method of training an ANN 437 with at least the former property and typically both properties has been shown and described hereinabove with reference to FIG. 5A, in which the ANN with the desired properties is referenced as ANN 321. Alternatively, the ANN 437 may be replaced by a LUT constructed in accordance with the ANN, using the LUT construction method described above with reference to FIGS. 3A-3B.

Figure 6D:
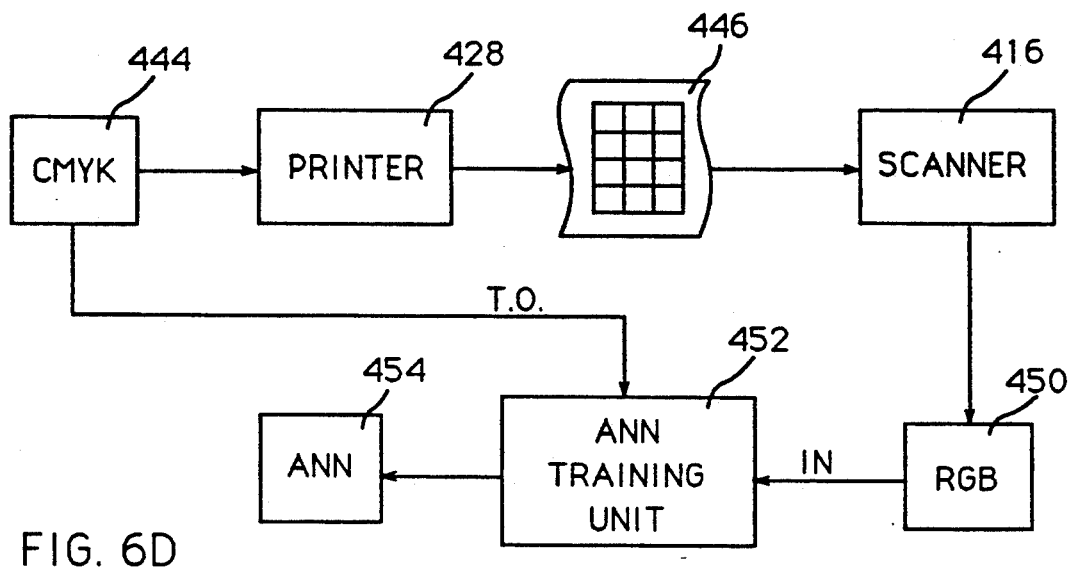
Figure 6E:
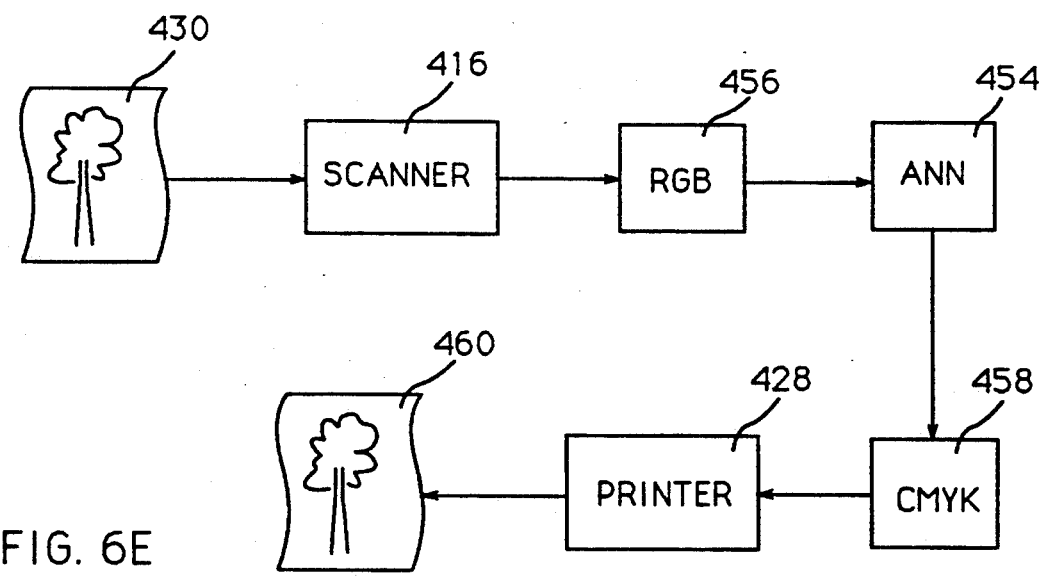

A preferred method of reconstructing the input copy 412 from the output copy 430 when digital file 424 is not available, whereas the printed picture 430 of FIG. 6A is available, is illustrated in FIGS. 6D and 6E. As shown, the method comprises providing a database 444, which is preferably a "good" database for sampling the operation of printer 428 in conjunction with scanner 416 and which typically comprises a plurality of CMYK values. The database 444 is printed by printer 428, thereby to provide a printed representation 446 such as a reflective copy and is subsequently scanned by scanner 416, thereby to provide a digital file 450. Alternatively, digital file 450 may be predetermined and database 444 may be constructed therefrom using the database construction method shown and described hereinabove with reference to FIGS. 2A-2B.

ANN training unit 452 receives corresponding pluralities of color values 450 and 444 and trains an ANN relating input RGB values 450 to target output CMYK values 444, using the method described herein with reference to FIG. 1. The weights and configuration parameters of the ANN may be stored in any suitable form, thereby to enable the ANN itself to be directly employed as a color transformation tool. Alternatively, the ANN may be employed to construct a LUT 454, which is then stored and employed as a color transformation tool.

As explained above with reference to FIG. 1, neural network training unit 452 receives pluralities of corresponding color values 450 and 444 and constructs a set of weights for a neural network approximating the relationship between the color values 450 and the color values 444. In the present embodiment, color values 450 are used as the first color values 22 of training data set 20 of FIG. 1. Color values 444 are used as the second color values 24 of training data set 20 of FIG. 1.

As shown in FIG. 6E, output copy 430 is scanned by scanner 416 and the resulting digital file 456, typically comprising RGB values, is passed through the stored form 454 of the ANN, thereby to provide a digital file 458 preferably comprising a plurality of CMYK values. The plurality 458 of CMYK values, when output by printer 428, will result in a hard copy 460 of the original image which is substantially identical to the hard copy 430. The digital file 458 is substantially identical to digital file 424 of FIG. 6A. Therefore, digital file 458 may be employed to restore the original transparency 412 using the procedure of FIG. 6C.

The color recording apparatus 442 may comprise any suitable color recording apparatus, such as the 4cast plotter available from DuPont.

The computations described hereinabove need not be carried out by the scanner but may alternatively be carried out by any suitable computation means, typically a standard computer such as an IBM PC, which may communicate with the remainder of the apparatus using any suitable conventional communication method.

APPLICATION #5

Calibration of a First Color Separation Scanner with Reference to a Second Color Separation Scanner on a Special Setting The following embodiment of the present invention is useful when it is desired to calibrate a scanner or other color reading device relative to a reference scanner/reading device on a special setting such as but not limited to GCR, UCR, UCA, etc. This embodiment is particularly useful if the operator is relatively unfamiliar with the special setting.

Figure 7A:
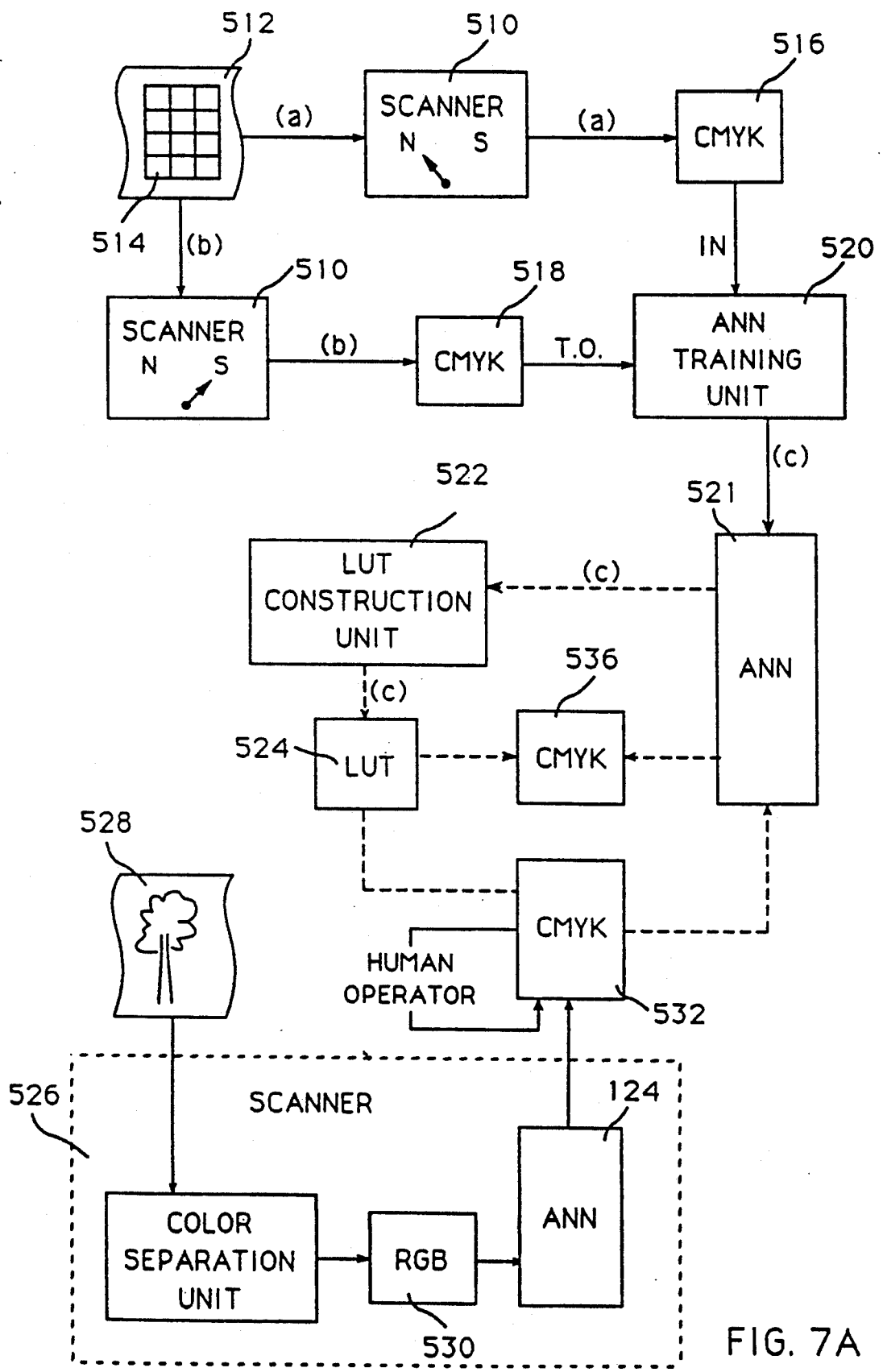
FIGS. 7A and 7B are schematic illustrations of the generation of a calibration transformation or function and its employment in incorporation of a new digital electronic color separation scanner in an existing system for producing UCR, GCR and UCA and any other special setting tone and color reproductions, in accordance with respective alternative embodiments of the present invention.

Reference is now made to FIG. 7A which illustrates an embodiment of the present invention useful in incorporating a new DECSS into an existing TCR system comprising a currently used ECSS (or DECSS) on a special setting.

It is appreciated that, by putting the currently used ECSS onto its special setting, an ANN may be constructed which will allow the new DECSS to emulate the existing TCR system, by using the method of FIGS. 3A and 3B shown and described hereinabove. However, normally, a modified implementation of an ANN or of a look up table constructed in accordance therewith is undesirable since operators generally find it difficult to perceive and interpret the special setting CMYK values in the course of subsequent operator controlled tone and color adjustment. Therefore, it is preferable to initially scan the image with a scanner located with a "regular" ANN or LUT in order to enable the operator to carry out the desired tone and color modifications. Once the modifications have been completed, the modified color values may be converted to the special setting values, thereby to implement the calibration of the scanner to be calibrated with reference to the special setting of the reference scanner.

A preferred procedure for calibrating a first color scanner with reference to a second color scanner on a special setting comprises the following steps:

a. The existing scanner 510 is put onto its normal setting N and an analog representation 512 of a color image comprising a plurality of colored locations 514 is scanned, thereby to obtain a digital representation 516 comprising a plurality of color values, typically CMYK values, corresponding to the plurality of colored locations 514.

The color image 512 is preferably a "good" database constructed in accordance with the database provision method shown and described hereinabove. Here a "good" database 512 is one whose values are as close as desired to a "target" predetermined plurality of color values. For example, database 512 may comprise a database which is so constructed that it samples the operation of scanner 510 on its special setting in the subrange in which use of a special rather than normal setting makes a substantial difference. Construction of such a database is explained hereinabove in connection with the database construction method of FIGS. 2A-2B.

b. The existing scanner 510 is put onto the desired special setting S and the same color image is scanned, thereby to obtain a digital representation 518 comprising a plurality of color values, typically CMYK values, corresponding to the plurality of colored locations 514.

c. Digital representations 516 and 518 are input to ANN training unit 520, which is operative to train an ANN 521 relating the plurality of input color values 516 to the plurality of target output color values 518 in accordance with the ANN training procedure shown and described hereinabvoe.

Typically, as explained above with reference to FIG. 1, neural network training unit 520 receives pluralities of corresponding color values 516 and 518 and constructs a set of weights for a neural network approximating the relationship between the color values 516 and the color values 518. In the present embodiment, color values 516 are used as the first color values 22 of training data set 20 of FIG. 1. Color values 518 are used as the second color values 24 of training data set 20 of FIG. 1.

The weights and configuration parameters of ANN 521 may be stored in a suitable storage device such as the TCR module of a scanner, thereby to enable the ANN 521 to be directly employed as a color transformation tool. Alternatively, ANN 521 may be employed by a LUT construction unit 522 to construct a LUT 524 representing the relationship between CMYK values 518 to CMYK values 516. LUT 524 may be stored in any suitable storage device such as in the TCR module of the scanner 526.

d. When it is desired to use the new DECSS 526 to scan an input copy 528, the input 528 is scanned with the scanner 526, thereby to obtain a digital representation 530 of the input 528. The RGB (typically) values of digital representation 530 are typically converted using either ANN 124 of FIG. 3A or the standard LUT 127 constructed by LUT construction unit 126 of FIG. 3A. The result is a second digital representation 532 of input 528, preferably comprising a plurality of CMYK values which are "standard" in that they are familiar to a human operator accustomed to working on a normal setting and thus easily modifiable by the operator.

e. Desired tone and color manipulations may be carried out by a human operator, resulting in modifications of digital representation 532 and of subsequent versions thereof.

Once the operator has completed the step of manipulating tone and color, the ANN 521 or a stored form of ANN 521 such as LUT 524 is employed to convert each of the normal setting CMYK values of the digital representation 532 to the corresponding special setting CMYK values, resulting in a final digital representation 536 of the input 528, which is substantially identical to the digital representation of input 528 which would result by scanning input 528 with scanner 510 on its special setting and performing the same operator-input tone and color manipulations.

Figure 7B:
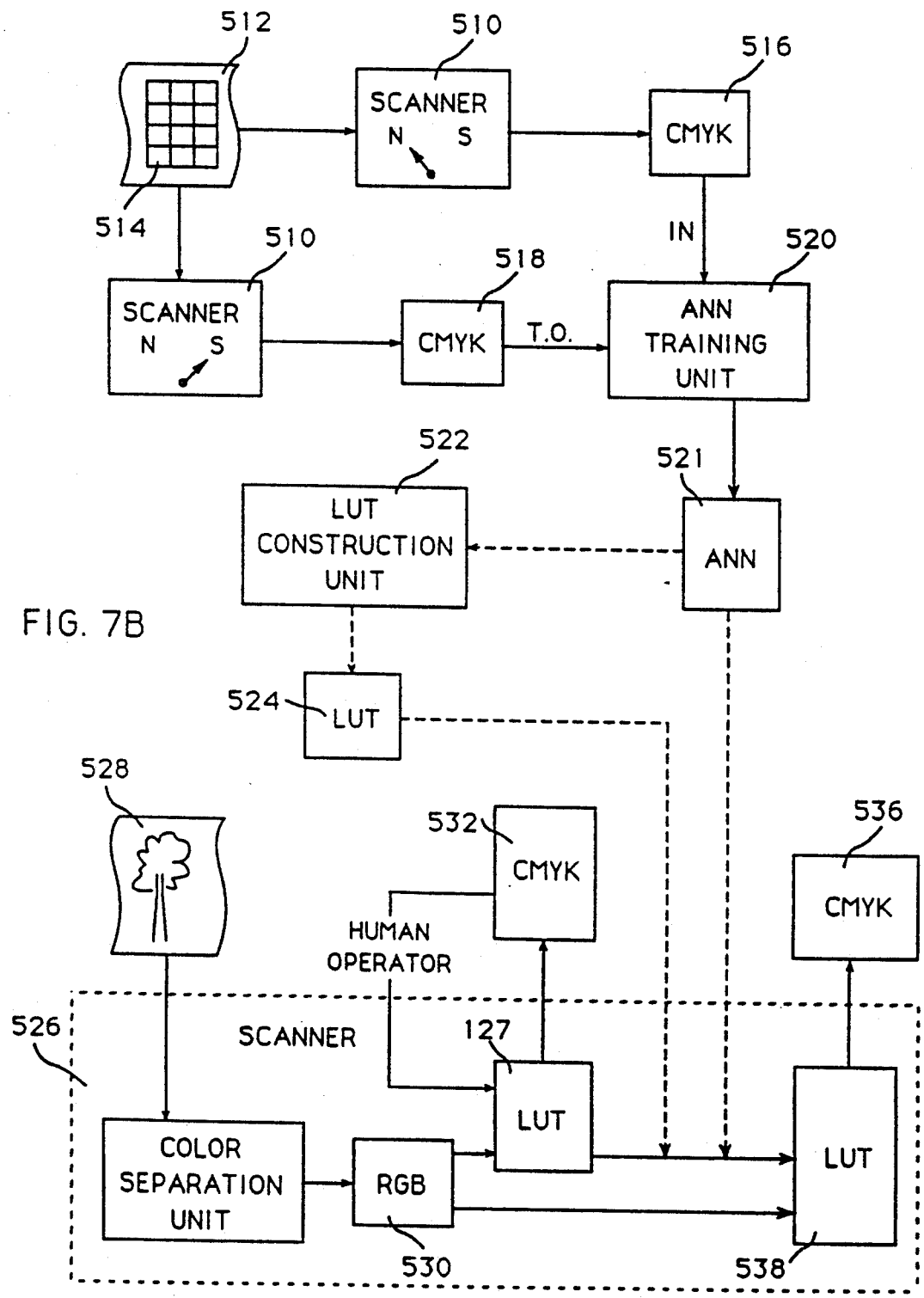

An alternative method is illustrated in FIG. 7B, in which a LUT is employed in the TCR module as a color transformation tool. In the embodiment of FIG. 7B, following the execution of tone and color modifications by the operator, the modified CMYK values of LUT 127 may be converted, thereby to define a converted LUT 538, by using the conversion stored in LUT 524 or by operating ANN 521 on LUT 127. LUT 538 may be stored in the TCR module of the scanner 526. Digital representation 530 may then be directly converted by LUT 538, preferably on the fly, to provide the final digital representation 536.

It is noted that here as throughout the present specification, the ANN training unit and the parameters of the ANN constructed thereby may be stored in the memory of any suitable commercially available computing means, such as an IBM PC communicating with a color reproduction system such as a Macintosh computer, commercially available from Apple, Inc. and running Photoshop software, commercially available from Adobe Systems, Inc., Mountainview, Calif., USA, via commercially available communication means such as the public domain KERMIT communication package in conjunction with an RS232 cable. Alternatively, the ANN training unit and the parameters of the ANN constructed thereby may be stored integrally with a color reproduction system.

APPLICATION #6

Calibration of a Color Monitor Display with Reference to Output Apparatus

Figure 8:
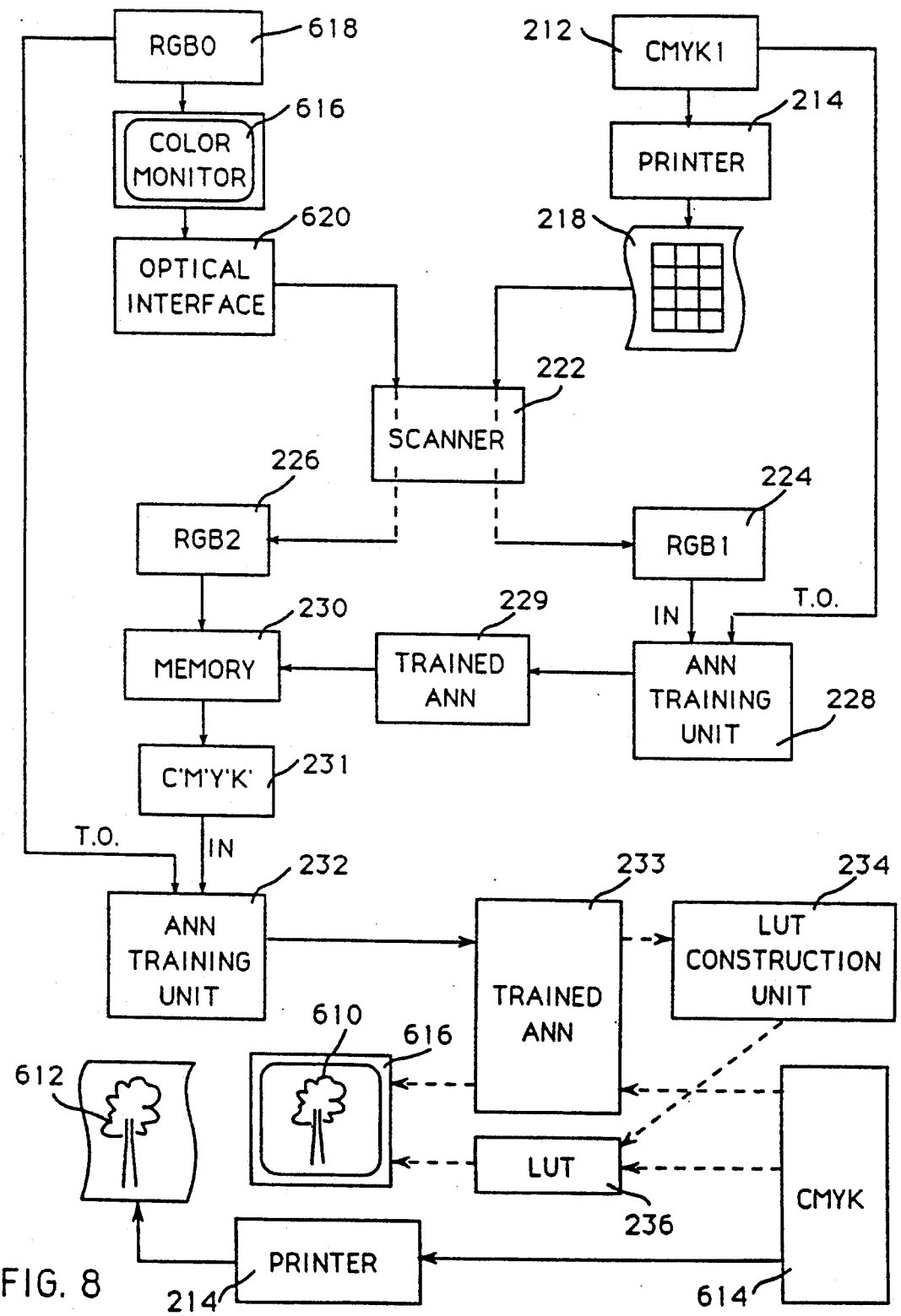
FIG. 8 is a schematic illustration of a method for calibration of a color monitor display with reference to output apparatus in accordance with a further preferred embodiment of the present invention.

Reference is now made to FIG. 8 which is a schematic illustration of a method for calibration of a CRT with reference to output apparatus. The objective is to provide an analog representation 610, on a CRT display 616, of a color image, which representation resembles a hard copy representation 612 of the color image output from a printing device 214.

The present method and apparatus are generally similar to the method and apparatus of FIG. 4A, where a printing device 216 (rather than a CRT) is calibrated with reference to output apparatus 214. Identical reference numerals are employed to reference identical elements in FIGS. 4A and 8 to facilitate understanding of the similarity. The distinguishing elements of the method and apparatus of FIG. 8 will now be discussed.

As shown in FIG. 8, an optical interface 620 is required to enable scanner 222 to receive input from CRT 616. The particular interface required varies according to the scanner 222. For example, the Scitex Smart Scanner may be optically coupled to the screen of the monitor 616 by mechanically disconnecting and removing the color separation head of the scanner from the interior of the scanner while maintaining the electrical wiring connections and placing the head in front of the monitor.

A plurality 618 of RGB values is provided which is a "good" database in the sense that it samples the operation of color monitor 616 such that, once represented on the monitor, the values cover substantially the entirety of the space physically producible by the color monitor 616 at least a predetermined density. The RGB values 618 are preferably displayed one after the other on the CRT screen 616 and are received one at a time by the scanner 222. Synchronization of the scanner with the monitor is required. This procedure is provided on the Smart Scanner available from Scitex.

As in Application #2, it may be desirable to convert pluralities of RGB values 224 and 226 to XYZ values or values from any other suitable coordinate system, using conventional apparatus and techniques, such as those described in P. G. Engeldrum, "Almost Color Mixture Functions", Journal of Imaging Technology, 14(4), August 1988, and in references 2 and 5-7 cited therein. The disclosures of this article and of all references cited therein are incorporated herein by reference. Also, it is appreciated that any suitable color reading device may replace the scanner 222.

If desired, RGB values 226 may be read in CMC (Color Mixture Curves) form by optical interface 620. The filter arrangement of the normally used color separation head of the Smart Scanner may be replaced by a CMC filter arrangement which emulates the human eye. CMC filter arrangements and methods for constructing them are described in the above referenced article entitled "Almost color mixture functions" as well as in references 2, 5 and 6 thereof.

The method of FIG. 8 is most easily understood by comparison to the method of FIG. 4A. In the method of FIG. 4A, CMYK values 212 and RGB values 226 are employed as target output data and input data, respectively, to train a first ANN 229. Also in the method of FIG. 4A, a plurality of RGB values 226 is provided by scanner 222 which reads analog representation 220 provided by printer to be calibrated 216 which inputs CMYK values 212. In contrast, in the method of FIG. 8, CMYK values 212 are printed on the reference printer 214 and are used as target output data to train first ANN 229, the input data being RGB values 224. Therefore, in FIG. 8, ANN 229 is a tool for transforming given RGB values into CMYK values, such that, once the CMYK values are printed on reference printer 214 and are subsequently read by scanner 222, the resulting RGB values will be generally identical to the given RGB values.

Furthermore, when the second ANN 233 is trained in FIG. 4A, the target output data is the plurality 231 of CMYK values, which is the output of first ANN 229 which receives RGB input 224. The training input data for ANN 233 in the method of FIG. 4A is the plurality of CMYK values used for printing on the reference printer 214. In contrast, in the embodiment of FIG. 8, ANN 233 is trained using RGB values 618 as target output data and the CMYK values 231 are the input data for the training process.

Preferably, the illumination of analog representations 610 and 612 should be such that their respective white areas will be of substantially the same brightness.

It is appreciated that ANN 233 may be employed itself as a color transformation tool to transform CMYK values 614 into RGB values suitable for display on monitor 616. Alternatively, ANN 233 may be employed in order to construct a LUT 236, using the LUT construction method described above in connection with FIGS. 3A and 3B. The LUT 236 then replaces ANN 233 as the tool for transforming CMYK values 614 into RGB values suitable for display on monitor 616.

Figure 9A:
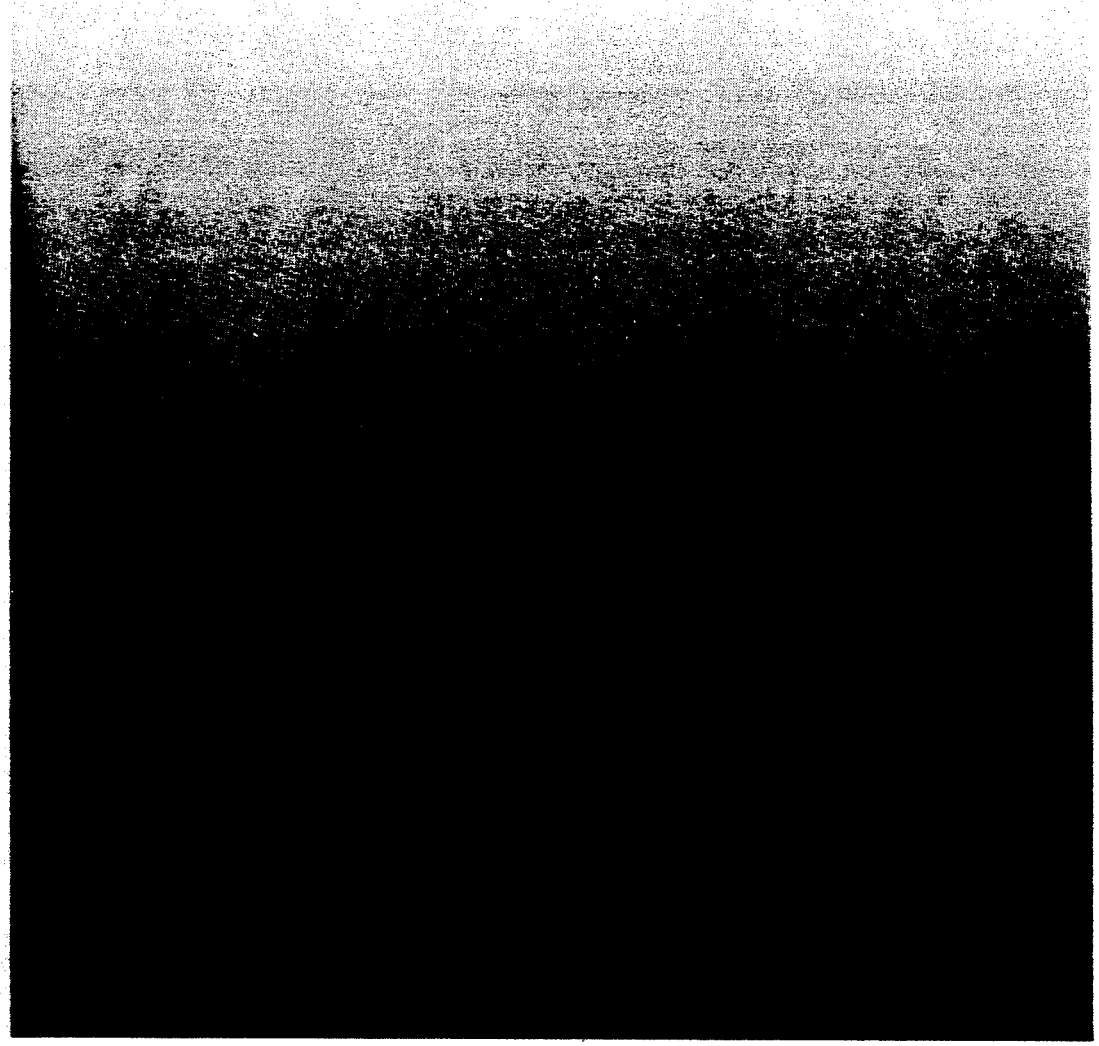
FIGS. 9A and 9B are color illustrations of the results of an experiment performed in order to demonstrate an advantage of the color transformation method of the present invention.
Figure 9B:
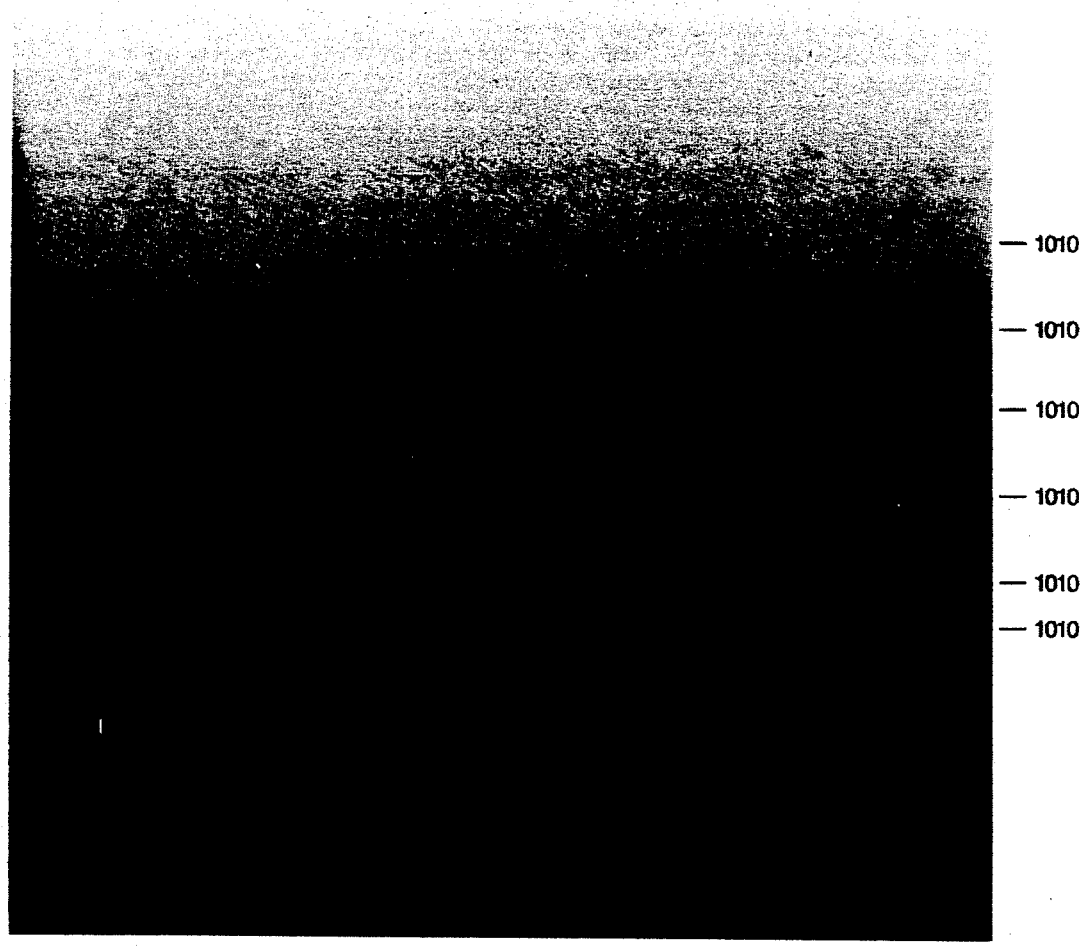

Reference is now made to FIGS. 9A-9B which are color illustrations of the results of an experiment performed in order to demonstrate a particular advantage of the color transformation method shown and described herein, in which the color transformation is stored as a neural network, relative to state of the art color transformation methods in which the color transformation is stored as a LUT.

A particular advantage of the color transformation method shown and described herein is that, generally, it does not introduce discontinuities, whereas state of the art color transformations stored as LUTs do generally introduce discontinuities when a linear interpolation process is employed.

In state of the art methods, the color transformation function, which is generally defined from a relatively large plurality of points such as an entire color space, is stored as a LUT having a relatively small number of discrete points. The color transformation between the points of the LUT is not stored but rather is computed by a suitable method such as linear interpolation. Therefore, a LUT representation of a color transformation, even a relatively smooth color transformation, is generally not smooth but rather includes breaking points.

Figure 10:
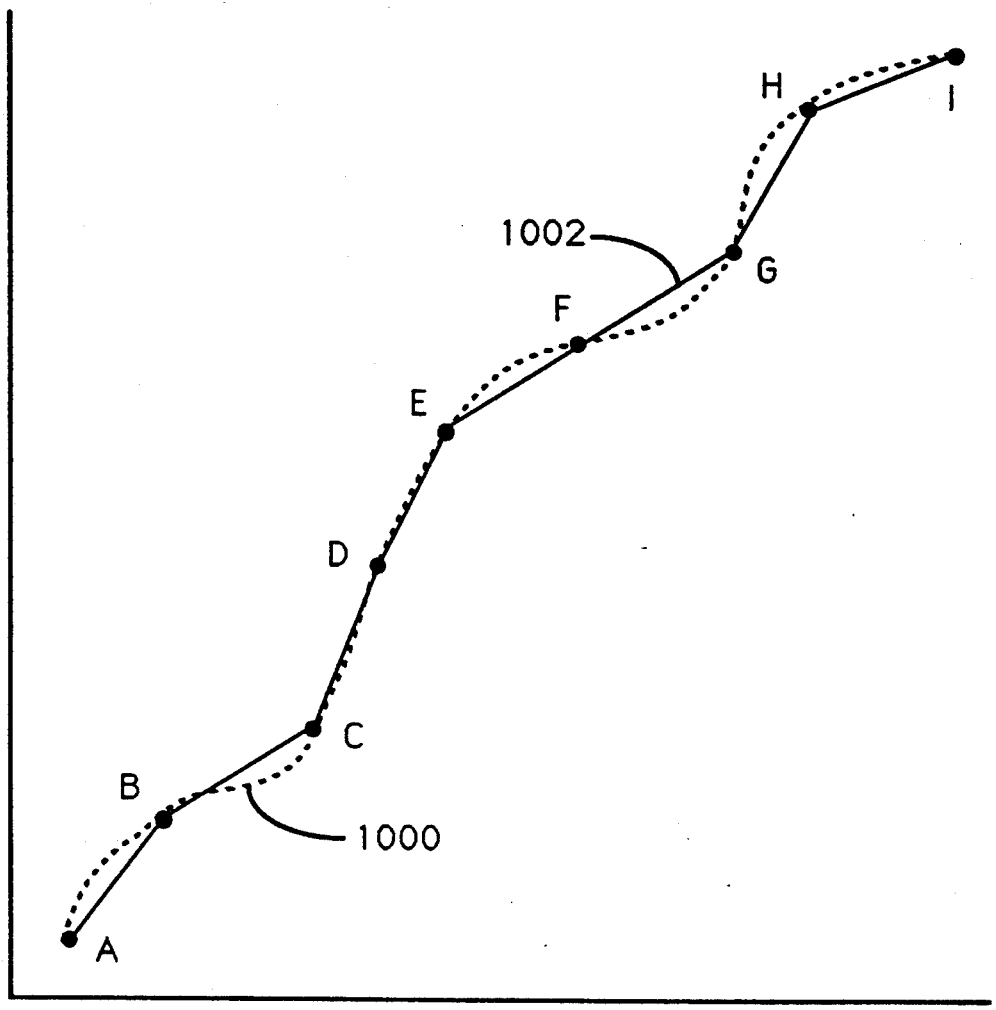
FIG. 10 illustrates a very simple transformation function from a one-dimensional space represented by the horizontal axis to a second one-dimensional space represented by the vertical axis.

Introduction of discontinuities by color transformation methods in which the color transformation is stored in a LUT may be understood with reference to FIG. 10 which illustrates a very simple transformation function from a one-dimensional space represented by the horizontal axis to a scanned one-dimensional space represented by the vertical axis. The transformation function is indicated by a dotted line 1000, and a LUT, storing the transformation, is indicated by a solid line 1002. The points of the LUT are referenced A, B, C, .. .. Points B, C, E, G and H are seen to be breaking points because their right slope is far from equal to their left slope. For example, point B is a breaking point because the slope of segment AB is considerably larger than the slope of segment BC. Therefore, if a color vignette, which includes gradual color variations, is transformed using the LUT 1002, discontinuities will be apparent at the locations of the color vignette corresponding to the breaking points of LUT 1002.

Referring back to FIGS. 9A-9B, the experiment was conducted as follows:

a. A plurality of RGB values, read from a Q60 transparency, commercially available from Kodak Corporation, was read by a Scitex Smart Scanner loaded with an RGB-CMYK LUT, thereby to obtain a plurality of RGB-CMYK pairs.

b. An ANN was trained by presenting it with the plurality of RGB-CMYK pairs obtained in step a, using the method shown and described above with reference to FIGS. 3C and 1.

c. A set of RGB LUT addresses is provided, such as the RGB LUT addresses specified above in step (a) of the LUT construction method described with reference to FIGS. 3A-3B. The set of RGB LUT addresses is passed through the trained ANN of step b, thereby to obtain a plurality of CMYK values.

d. An RGB digital file was constructed in which, for each pixel, R=G=B. The digital file comprised 256 pluralities of adjacent lines, each plurality of adjacent lines comprising a suitable number of identical lines, each line comprising a plurality of identical pixels. The following is a representation of the R values of the first line of each of the pluralities of adjacent lines within the RGB digital file:

| | |
|---|---|
| First plurality: | 255, 255, . . . , 255 |
| Second plurality: | 254, 254, . . . , 254 |
| . | |
| . | |
| . | |
| 255th plurality: | 1, 1, . . . , 1 |
| 256th plurality: | 0, 0, . . . , 0 |

Since, for each pixel, R=G=B, the above is also a representation of the B values and of the G values of the first line of each plurality of adjacent lines within the RGB digital file.

It is noted that all pixel color values within any given row of the RGB digital file are identical. Also, the pixel color values of the RGB digital file vary linearly between pluralities of adjacent lines. The difference between pixel color values in adjacent pluralities of lines is 1.

e. The RGB file from d was transformed twice, once using the ANN of step b and once using the LUT of step C. The two transformations resulted in two CMYK files. FIGS. 9A and 9B are printed copies of the CMYK file resulting from the ANN transformation procedure and the CMYK file resulting from the LUT transformation procedure, respectively.

It is seen that the vignette of FIG. 9A, which was created using an ANN, as shown and described in the present invention, substantially retains the smoothness of the precursor RGB digital file in step d. In contrast, the vignette of FIG. 9B, which was created using a LUT, does not retain the smoothness of the precursor RGB digital file in step d. Instead, it is possible to observe points of discontinuity 1010 at the vertical locations of the color vignette corresponding to the breaking points of the LUT.

The results of the experiment show that points of discontinuity substantially do not occur when the transformation tool employed is an ANN, whereas points of discontinuity do occur when the transformation tool employed is a LUT, even though the LUT itself was created using the ANN.

Although the method of employing an ANN as shown and described in the present invention, is believed to have certain advantages relative to state of the art LUT methods, such as smoothness of appearance of the printed product. However, use of a LUT corresponding to an ANN as a color transformation tool may, in certain situations, be more efficient than direct use of the ANN itself as a color transformation tool.

A particular advantage of employing an artificial neural network as a color transformation tool is that the artificial neural network is implementable in hardware. For example, a commercially available chip suitable for designing a hardware implementation of a neural network is the analog neural network IC 80170 chip by Intel Corporation, Santa Clara, Calif., USA.

Reference is now made to Appendix A which is a software implementation of ANN training and operating apparatus constructed in accordance with a preferred embodiment of the present invention and operative in conjunction with an IBM PC, using the DOS operating system and a Turbo Pascal package, commercially available from Borland International, Scotts Valley, Calif., USA.

It will be appreciated by persons skilled in the art that the present invention is not limited to what has been particularly shown and described hereinabove. Rather, the scope of the present invention is defined only by the claims that follow:

APPENDIX A

```
program backward_propagation;
{$N+,E-} uses       crt, graph, scrnio;

const
           I_size = 3;              (* Input Layer size *)
           Isizel = 4;              (* Input size + Bias Neuron *)
           h_size = 14;             (* Hidden Layer size *)
           hsizel = 15;             (* Hidden size + Bias Neuron *)
           O_size = 4;              (* Output layer size *)
           S = #32;
           Graphstep = 1;
           maxyX = 630;

learn_str  = 'E:\nworks\all.dat';
           recall_str = 'E:\nworks\LUTDATA.dat';
           output_str = 'E:\nworks\NNlut.dat';
           weights_str = 'E:\nworks\weight.dat';
           screen_file = 'E:\nworks\screen.bit';

var        input         : array [1..Isizel] of real;
           hidden        : array [1..hsizel] of real;
           output        : array [1..O_size] of real;
           Target        : array [1..O_size] of real;
           error_mat     : array [1..O_size] of real;
           mat1          : array [1..h_size,1..Isizel] of real;
           mat2          : array [1..O_size,1..hsizel] of real;

learn_data    : text;
           recall_data   : text;
           output_data   : text;
           weights_file  : text;

d_mat1        : array [1..h_size,1..Isizel] of real;
           d_mat2        : array [1..O_size,1..hsizel] of real;
           delta_mat     : array [1..O_size] of real;
```

```
        k,main_count          : longint;
        beta                  : real;
        alfa, eta   : real;
        delta                 : real;
        gama                  : real;

answer,ch             : char;
        str1,str2             : string[8];
        val,X,out1            : real;
        i,j,y,minY  : integer;
        range,Gd,Gm,Gx,Gy,Colnum     : integer;
        OldPattern            : FillPatternType;

procedure GRAPH_INIT;
begin
        Gd:=detect; InitGraph(Gd,Gm, '');
        if graphResult <> grOk then halt(1);
        GetFillPattern(OldPattern);
        SetFillPattern (OldPattern,LightGray);
        Bar(0,0,maxyX,200);
        Colnum:=8;
        Setcolor(Colnum);
        SetLineStyle(solidln,solidfill,normwidth);
        LineTo(0,100);
        Gx:=0;
end;

procedure GRAPHIT;
begin
        Gx:=Gx+1;
        if (Gx = maxyX+1) then begin
                Colnum:=Colnum+1;
                Setcolor(Colnum);
                str (k,str2);
                y:=y+8;
                OutTextXY (0,y,str2);
                MoveTo (0,200);
                Gx:=0;
                minY:=200;
        end;
        Gy:=trunc(200-(8*out1));
        if (Gy<minY) then begin
                minY:=Gy;
                bar(Gx,(Gy+3),630,200);
        end;
        LineTo(Gx,Gy);

end;

procedure initialise_parameters;
begin
        beta:=1.2;
    alfa:=0.6;
        eta:=0.9;
    delta:=0;
        y:=242; minY:=200;
        input[Isize1]:=1.0;
        hidden[hsize1]:=1.0;

for i:=1 to h_size do
        for j:=1 to Isize1 do
            d_mat1[i,j]:=0;
    for i:=1 to O_size do
        for j:=1 to hsize1 do
```

```pascal
                    d_mat2[i,j]:=0;
end;

procedure initialise_weights;
var     trans           : integer;
begin
        range:=10000;
   for i:=1 to h_size do begin
           for j:= 1 to Isizel do begin
                        trans:=random(range);
                        val:=1.0-trans/5000;
                        mat1 [i,j]:=val;
           end;
   end;
   for i:=1 to O_size do
           for j:=1 to hsizel do begin
                        trans:=random(range);
                        val:=1.0-trans/5000;
                        mat2[i,j]:=val;
                end;
end;

procedure read_weights;
begin
        assign (weights_file,weights_str);
        reset (weights_file);

readln(weights_file);
   for i:=1 to h_size do begin
           for j:=1 to Isizel do
                   read (weights_file,mat1[i,j]);
           readln(weights_file);
        end;

readln(weights_file);
        for i:=1 to O_size do begin
           for j:=1 to Hsizel do
                   read (weights_file,mat1[i,j]);
           readln (weights_file);
        end;
        close(weights_file);
end;

function func(x: real): real;
var   tmp        : real;
begin
(*      SIGMOID         *)
        tmp:=1/(exp(beta*x));
        func:= 1/(1+tmp);

(*      Hyperbolic Tangent - TANH tmp:= exp(2*beta*x);
   func:= (tmp-1)/(tmp+1);
*)
end;

function dx_func(x2: real): real;
begin
        dx_func:=beta*x2*(1-x2);
(*
        Hyperbolic Tangent - TANH
   dx_func:= beta*(1-sqr(x2));
```

```
*)
end;

procedure produce_hidden;
begin
    for i:=1 to h_size do begin
            val:=0;
        for j:=1 to Isizel do
                val:=val+input[j]*mat1[i,j];
            hidden[i]:=func(val);
        end;
end;

procedure produce_output;
begin
        val:=0;
    for i:=1 to O_size do begin
            val:=0;
            for j:=1 to hsizel do
                val:=val+hidden[j]*mat2[i,j];
            output[i]:=func(val);
        end
end;

procedure learn_mat2;
begin
    for i:=1 to O_size do begin
            val:=output[i];
            error_mat[i]:=target[i]-val;
        delta:=error_mat[i] * dx_func(val);
            for j:=1 to hsizel do begin
                gama:= d_mat2[i,j]*alfa;
                d_mat2[i,j]:= eta*delta*hidden[j]+ gama;
                    mat2[i,j]:=mat2[i,j]+d_mat2[i,j];
            end;
            delta_mat[i]:=delta;
        end;
end;

procedure learn_mat1;
begin
    for i:=1 to h_size do begin
            delta:=0;
            for j:=1 to O_size do
                    delta:=delta+(delta_mat[j]*mat2[j,i]);
            for j:=1 to Isizel do begin
                gama:= d_mat1[i,j]*alfa;
                d_mat1[i,j]:=eta * (dx_func(hidden[i]) *
                            delta * Input[j]) + gama;
                    mat1[i,j]:=mat1[i,j]+d_mat1[i,j];
            end;
        end;
end;

procedure produce_weight_file;
begin
        textcolor(7);
        OutTextXY(1,(GetMaxY-100),'Save weights in file
(name/[weight..dat]): ');
        readln(str1);
        if length (str1) = 0 then
                assign (weights_file,'E:\nworks\weight.dat')
        else
```

```
                assign (weights_file,'E:\nworks\'+ str1 +'.dat');
        rewrite (weights_file);

writeln(weights_file,'**  Input -> Hidden Matrix  **');
        for i:=1 to H_size do begin
            for j:=1 to Isize1 do
                write (weights_file,mat1[i,j]:9:7,S);
            writeln(weights_file);
        end;

writeln(weights_file,'**  Hidden -> output Matrix  **');
        for i:=1 to O_size do begin
            for j:=1 to Hsize1 do
                write (weights_file,mat2[i,j]:9:7,S);
            writeln(weights_file);
        end;
        close (weights_file);
end;

procedure RECALL;
begin
        read_weights;
        assign (recall_data,recall_str);
        reset (recall_data);
        assign (output_data,output_str);
        rewrite (output_data);

k:=0;
    while not eof (recall_data) do begin
                k:=k+1;
                read (recall_data,ch);
                for i:=1 to I_size do
                    read (recall_data,ch,input[i]);
                readln(recall_data);
            produce_hidden;
            produce_output;
                append (output_data);
                for i:=1 to O_size do
                    write (output_data,round(output[i]*255));
                writeln (output_data);
                gotoxy(1,2);
                writeln('# ',k);
        end;
        close (recall_data);
        close (output_data);
        textcolor(3);
        write(' output file: ');
        textcolor(12);
        write (output_str);
        textcolor(3);
        writeln (' successfully created');
end;

procedure LEARN;
begin
        assign (learn_data,learn_str);
        reset (learn_data);
        graph_init;

for k:=1 to main_count do begin
                if (eof(learn_data)) then begin
                    reset (learn_data);
                end;
```

```
            read (learn_data,ch);
            for i:=1 to i_size do
                read (learn_data,ch,input[i]);
            readln(learn_data);
        produce_hidden;
        produce_output;
            read (learn_data,ch);
            for i:=1 to O_size do
                read (learn_data,target[i]);
            readln(learn_data);
        learn_mat2;
        learn_mat1;

if (trunc(k/Graphstep)*Graphstep = k) then begin
                for i:=1 to O_size do
                    out1:=out1+sqr(error_mat[i]*100);
                out1:=sqrt(out1)/O_size;
                GRAPHIT;
            end;

end;
        produce_weight_file;
        CloseGraph;
        close (learn_data);
end;

procedure DIALOGUE;
begin
        answer:=' ';
        write ('[Learn] or Recall : ');
        readln (answer);
        if (answer = 'r') then
                RECALL
        else begin
                write ('randomize weights (Y/[N]): ');
                readln (answer);
                if (answer = 'y') then
                        initialise_weights
                else
                        read_weights;
                write ('Number of learning cycles: ');
                readln (main_count);
                writeln(main_count);
                readln;
                LEARN;
        end;
end;
(* M A I N   P R O G R A M *)
begin
        clrscr;
    randomize;
    initialise_parameters;
        DIALOGUE;
end.
```

APPENDIX B
Original.rgb: data for possible original database

| Patch # | R | G | B |
|---|---|---|---|
| 1 | 0 | 0 | 0 |
| 2 | 0 | 0 | 0 |
| 3 | 3 | 3 | 0 |
| 4 | 3 | 0 | 3 |
| 5 | 0 | 3 | 3 |
| 6 | 2 | 2 | 2 |
| 7 | 5 | 6 | 7 |
| 8 | 12 | 2 | 2 |
| 9 | 2 | 12 | 2 |
| 10 | 12 | 12 | 2 |
| 11 | 2 | 2 | 12 |
| 12 | 12 | 2 | 12 |
| 13 | 2 | 12 | 12 |
| 14 | 12 | 12 | 12 |
| 15 | 17 | 3 | 3 |
| 16 | 3 | 17 | 3 |
| 17 | 3 | 3 | 17 |
| 18 | 16 | 16 | 16 |
| 19 | 27 | 26 | 25 |
| 20 | 34 | 3 | 3 |
| 21 | 37 | 6 | 7 |
| 22 | 51 | 3 | 3 |
| 23 | 48 | 16 | 16 |
| 24 | 59 | 26 | 25 |
| 25 | 3 | 34 | 3 |
| 26 | 5 | 38 | 7 |
| 27 | 3 | 51 | 3 |
| 28 | 16 | 48 | 16 |
| 29 | 27 | 58 | 25 |
| 30 | 3 | 3 | 34 |
| 31 | 5 | 6 | 39 |
| 32 | 3 | 3 | 50 |
| 33 | 16 | 16 | 48 |
| 34 | 27 | 26 | 57 |
| 35 | 5 | 5 | 5 |
| 36 | 5 | 5 | 5 |
| 37 | 3 | 3 | 68 |
| 38 | 5 | 6 | 71 |
| 39 | 3 | 3 | 85 |
| 40 | 16 | 16 | 80 |
| 41 | 27 | 26 | 89 |
| 42 | 5 | 38 | 39 |
| 43 | 16 | 48 | 48 |
| 44 | 27 | 58 | 57 |
| 45 | 3 | 68 | 3 |
| 46 | 5 | 70 | 7 |
| 47 | 3 | 85 | 3 |
| 48 | 16 | 80 | 16 |
| 49 | 27 | 90 | 25 |
| 50 | 37 | 38 | 7 |
| 51 | 48 | 48 | 16 |
| 52 | 59 | 58 | 25 |
| 53 | 37 | 6 | 39 |
| 54 | 48 | 16 | 48 |
| 55 | 59 | 26 | 57 |
| 56 | 68 | 3 | 3 |
| 57 | 69 | 6 | 7 |
| 58 | 85 | 3 | 3 |
| 59 | 80 | 16 | 16 |
| 60 | 91 | 26 | 25 |
| 61 | 102 | 3 | 3 |
| 62 | 101 | 6 | 7 |
| 63 | 119 | 3 | 3 |
| 64 | 112 | 16 | 16 |
| 65 | 123 | 26 | 25 |
| 66 | 69 | 38 | 7 |
| 67 | 80 | 48 | 16 |
| 68 | 91 | 58 | 25 |
| 69 | 10 | 10 | 10 |
| 70 | 10 | 10 | 10 |
| 71 | 69 | 6 | 39 |
| 72 | 80 | 16 | 48 |
| 73 | 91 | 26 | 57 |
| 74 | 37 | 6 | 71 |
| 75 | 48 | 16 | 80 |
| 76 | 59 | 26 | 89 |
| 77 | 37 | 38 | 39 |
| 78 | 59 | 58 | 57 |
| 79 | 37 | 70 | 7 |
| 80 | 48 | 80 | 16 |
| 81 | 59 | 90 | 25 |
| 82 | 3 | 102 | 3 |
| 83 | 5 | 102 | 7 |
| 84 | 3 | 119 | 3 |
| 85 | 16 | 112 | 16 |
| 86 | 27 | 122 | 25 |
| 87 | 5 | 70 | 39 |
| 88 | 16 | 80 | 48 |
| 89 | 27 | 90 | 57 |
| 90 | 5 | 38 | 71 |
| 91 | 16 | 48 | 80 |
| 92 | 27 | 58 | 89 |
| 93 | 3 | 3 | 102 |
| 94 | 5 | 6 | 103 |
| 95 | 3 | 3 | 119 |
| 96 | 16 | 16 | 112 |
| 97 | 27 | 26 | 121 |
| 98 | 5 | 6 | 135 |
| 99 | 3 | 3 | 136 |
| 100 | 3 | 3 | 152 |
| 101 | 16 | 16 | 144 |
| 102 | 27 | 26 | 153 |
| 103 | 16 | 16 | 16 |
| 104 | 16 | 16 | 16 |
| 105 | 5 | 38 | 103 |
| 106 | 16 | 48 | 112 |
| 107 | 27 | 58 | 121 |
| 108 | 5 | 70 | 71 |
| 109 | 16 | 80 | 80 |
| 110 | 27 | 90 | 89 |
| 111 | 5 | 102 | 39 |
| 112 | 16 | 112 | 48 |
| 113 | 27 | 122 | 57 |
| 114 | 5 | 134 | 7 |
| 115 | 3 | 136 | 3 |
| 116 | 3 | 153 | 3 |
| 117 | 16 | 144 | 16 |
| 118 | 27 | 154 | 25 |
| 119 | 37 | 102 | 7 |
| 120 | 48 | 112 | 16 |
| 121 | 59 | 122 | 25 |
| 122 | 37 | 70 | 39 |
| 123 | 59 | 90 | 57 |
| 124 | 37 | 38 | 71 |
| 125 | 59 | 58 | 89 |
| 126 | 37 | 6 | 103 |
| 127 | 48 | 16 | 112 |
| 128 | 59 | 26 | 121 |
| 129 | 69 | 6 | 71 |
| 130 | 80 | 16 | 80 |
| 131 | 91 | 26 | 89 |
| 132 | 69 | 38 | 39 |
| 133 | 91 | 58 | 57 |
| 134 | 69 | 70 | 7 |
| 135 | 80 | 80 | 16 |
| 136 | 91 | 90 | 25 |
| 137 | 21 | 21 | 21 |
| 138 | 21 | 21 | 21 |
| 139 | 101 | 38 | 7 |
| 140 | 112 | 48 | 16 |
| 141 | 123 | 58 | 25 |
| 142 | 101 | 6 | 39 |
| 143 | 112 | 16 | 48 |
| 144 | 123 | 26 | 57 |
| 145 | 133 | 6 | 7 |
| 146 | 136 | 3 | 3 |
| 147 | 153 | 3 | 3 |
| 148 | 144 | 16 | 16 |
| 149 | 155 | 26 | 25 |
| 150 | 165 | 6 | 7 |
| 151 | 170 | 3 | 3 |
| 152 | 187 | 3 | 3 |
| 153 | 176 | 16 | 16 |
| 154 | 187 | 26 | 25 |
| 155 | 133 | 38 | 7 |
| 156 | 144 | 48 | 16 |

-continued

APPENDIX B
Original.rgb: data for possible original database

| Patch # | R | G | B |
|---|---|---|---|
| 157 | 155 | 58 | 25 |
| 158 | 133 | 6 | 39 |
| 159 | 144 | 16 | 48 |
| 160 | 155 | 26 | 57 |
| 161 | 101 | 6 | 71 |
| 162 | 112 | 16 | 80 |
| 163 | 123 | 26 | 89 |
| 164 | 101 | 38 | 39 |
| 165 | 123 | 58 | 57 |
| 166 | 101 | 70 | 7 |
| 167 | 112 | 80 | 16 |
| 168 | 119 | 90 | 23 |
| 169 | 69 | 102 | 7 |
| 170 | 80 | 112 | 16 |
| 171 | 26 | 26 | 26 |
| 172 | 26 | 26 | 26 |
| 173 | 91 | 122 | 25 |
| 174 | 69 | 70 | 39 |
| 175 | 91 | 90 | 57 |
| 176 | 69 | 38 | 71 |
| 177 | 91 | 58 | 89 |
| 178 | 69 | 6 | 103 |
| 179 | 80 | 16 | 112 |
| 180 | 91 | 26 | 121 |
| 181 | 37 | 6 | 135 |
| 182 | 48 | 16 | 144 |
| 183 | 59 | 26 | 153 |
| 184 | 37 | 38 | 103 |
| 185 | 59 | 58 | 121 |
| 186 | 37 | 70 | 71 |
| 187 | 59 | 90 | 89 |
| 188 | 37 | 102 | 39 |
| 189 | 59 | 122 | 57 |
| 190 | 37 | 134 | 7 |
| 191 | 48 | 144 | 16 |
| 192 | 59 | 154 | 25 |
| 193 | 5 | 166 | 7 |
| 194 | 3 | 170 | 3 |
| 195 | 3 | 187 | 3 |
| 196 | 16 | 176 | 16 |
| 197 | 27 | 186 | 25 |
| 198 | 5 | 134 | 39 |
| 199 | 16 | 144 | 48 |
| 200 | 27 | 154 | 57 |
| 201 | 5 | 102 | 71 |
| 202 | 16 | 112 | 80 |
| 203 | 27 | 122 | 89 |
| 204 | 5 | 70 | 103 |
| 205 | 31 | 31 | 31 |
| 206 | 31 | 31 | 31 |
| 207 | 16 | 80 | 112 |
| 208 | 27 | 90 | 121 |
| 209 | 5 | 38 | 135 |
| 210 | 16 | 48 | 144 |
| 211 | 27 | 58 | 153 |
| 212 | 5 | 6 | 167 |
| 213 | 3 | 3 | 170 |
| 214 | 3 | 3 | 187 |
| 215 | 16 | 16 | 176 |
| 216 | 27 | 26 | 185 |
| 217 | 5 | 6 | 199 |
| 218 | 3 | 3 | 204 |
| 219 | 3 | 3 | 221 |
| 220 | 16 | 16 | 208 |
| 221 | 27 | 26 | 217 |
| 222 | 5 | 38 | 167 |
| 223 | 16 | 48 | 176 |
| 224 | 27 | 58 | 185 |
| 225 | 5 | 70 | 135 |
| 226 | 16 | 80 | 144 |
| 227 | 27 | 90 | 153 |
| 228 | 5 | 102 | 103 |
| 229 | 16 | 112 | 112 |
| 230 | 27 | 122 | 121 |
| 231 | 5 | 134 | 71 |
| 232 | 16 | 144 | 80 |
| 233 | 27 | 154 | 89 |
| 234 | 5 | 166 | 39 |
| 235 | 16 | 176 | 48 |
| 236 | 25 | 186 | 53 |
| 237 | 5 | 198 | 7 |
| 238 | 3 | 204 | 3 |
| 239 | 36 | 36 | 36 |
| 240 | 36 | 36 | 36 |
| 241 | 3 | 221 | 3 |
| 242 | 16 | 208 | 16 |
| 243 | 27 | 218 | 25 |
| 244 | 37 | 166 | 7 |
| 245 | 48 | 176 | 16 |
| 246 | 59 | 186 | 25 |
| 247 | 37 | 134 | 39 |
| 248 | 59 | 154 | 57 |
| 249 | 37 | 102 | 71 |
| 250 | 58 | 122 | 89 |
| 251 | 37 | 70 | 103 |
| 252 | 59 | 90 | 121 |
| 253 | 37 | 38 | 135 |
| 254 | 59 | 58 | 153 |
| 255 | 37 | 6 | 167 |
| 256 | 48 | 16 | 176 |
| 257 | 59 | 26 | 185 |
| 258 | 69 | 6 | 135 |
| 259 | 80 | 16 | 144 |
| 260 | 91 | 26 | 153 |
| 261 | 69 | 38 | 103 |
| 262 | 91 | 58 | 121 |
| 263 | 69 | 70 | 71 |
| 264 | 91 | 90 | 89 |
| 265 | 69 | 102 | 39 |
| 266 | 91 | 122 | 57 |
| 267 | 69 | 134 | 7 |
| 268 | 80 | 144 | 16 |
| 269 | 91 | 154 | 25 |
| 270 | 101 | 102 | 7 |
| 271 | 112 | 112 | 16 |
| 272 | 123 | 122 | 25 |
| 273 | 42 | 42 | 42 |
| 274 | 42 | 42 | 42 |
| 275 | 101 | 70 | 39 |
| 276 | 123 | 90 | 57 |
| 277 | 101 | 38 | 71 |
| 278 | 123 | 58 | 89 |
| 279 | 101 | 6 | 103 |
| 280 | 112 | 16 | 112 |
| 281 | 123 | 26 | 121 |
| 282 | 133 | 6 | 71 |
| 283 | 144 | 16 | 80 |
| 284 | 155 | 26 | 89 |
| 285 | 133 | 38 | 39 |
| 286 | 155 | 58 | 57 |
| 287 | 133 | 70 | 7 |
| 288 | 144 | 80 | 16 |
| 289 | 155 | 90 | 25 |
| 290 | 165 | 38 | 7 |
| 291 | 176 | 48 | 16 |
| 292 | 187 | 58 | 25 |
| 293 | 165 | 6 | 39 |
| 294 | 176 | 16 | 48 |
| 295 | 187 | 26 | 57 |
| 296 | 197 | 6 | 7 |
| 297 | 204 | 3 | 3 |
| 298 | 221 | 3 | 3 |
| 299 | 208 | 16 | 16 |
| 300 | 219 | 26 | 25 |
| 301 | 229 | 6 | 7 |
| 302 | 238 | 3 | 3 |
| 303 | 241 | 2 | 2 |
| 304 | 251 | 2 | 1 |
| 305 | 253 | 3 | 0 |
| 306 | 253 | 0 | 3 |
| 307 | 47 | 47 | 47 |
| 308 | 47 | 47 | 47 |
| 309 | 255 | 3 | 3 |
| 310 | 241 | 12 | 2 |
| 311 | 251 | 12 | 2 |
| 312 | 241 | 2 | 12 |

APPENDIX B
Original.rgb: data for possible original database

| Patch # | R | G | B |
|---|---|---|---|
| 313 | 251 | 2 | 12 |
| 314 | 241 | 12 | 12 |
| 315 | 251 | 12 | 12 |
| 316 | 253 | 17 | 3 |
| 317 | 253 | 3 | 17 |
| 318 | 240 | 16 | 16 |
| 319 | 251 | 26 | 25 |
| 320 | 197 | 38 | 7 |
| 321 | 208 | 48 | 16 |
| 322 | 219 | 58 | 25 |
| 323 | 197 | 6 | 39 |
| 324 | 208 | 16 | 48 |
| 325 | 219 | 26 | 57 |
| 326 | 165 | 6 | 71 |
| 327 | 176 | 16 | 80 |
| 328 | 187 | 26 | 89 |
| 329 | 165 | 38 | 39 |
| 330 | 187 | 58 | 57 |
| 331 | 165 | 70 | 7 |
| 332 | 176 | 80 | 16 |
| 333 | 187 | 90 | 25 |
| 334 | 133 | 102 | 7 |
| 335 | 144 | 112 | 16 |
| 336 | 155 | 122 | 25 |
| 337 | 133 | 70 | 39 |
| 338 | 153 | 86 | 57 |
| 339 | 133 | 38 | 71 |
| 340 | 155 | 58 | 89 |
| 341 | 52 | 52 | 52 |
| 342 | 52 | 52 | 52 |
| 343 | 133 | 6 | 103 |
| 344 | 144 | 16 | 112 |
| 345 | 155 | 26 | 121 |
| 346 | 101 | 6 | 135 |
| 347 | 112 | 16 | 144 |
| 348 | 123 | 26 | 153 |
| 349 | 101 | 38 | 103 |
| 350 | 123 | 58 | 121 |
| 351 | 101 | 70 | 71 |
| 352 | 123 | 90 | 89 |
| 353 | 101 | 102 | 39 |
| 354 | 123 | 122 | 57 |
| 355 | 101 | 134 | 7 |
| 356 | 112 | 144 | 16 |
| 357 | 123 | 154 | 25 |
| 358 | 69 | 166 | 7 |
| 359 | 80 | 176 | 16 |
| 360 | 91 | 186 | 25 |
| 361 | 69 | 134 | 39 |
| 362 | 91 | 154 | 57 |
| 363 | 69 | 102 | 71 |
| 364 | 91 | 122 | 89 |
| 365 | 69 | 70 | 103 |
| 366 | 91 | 90 | 121 |
| 367 | 69 | 38 | 135 |
| 368 | 91 | 58 | 153 |
| 369 | 69 | 6 | 167 |
| 370 | 80 | 16 | 176 |
| 371 | 91 | 26 | 185 |
| 372 | 37 | 6 | 199 |
| 373 | 48 | 16 | 208 |
| 374 | 59 | 26 | 217 |
| 375 | 57 | 57 | 57 |
| 376 | 57 | 57 | 57 |
| 377 | 37 | 38 | 167 |
| 378 | 59 | 58 | 185 |
| 379 | 37 | 70 | 135 |
| 380 | 59 | 90 | 153 |
| 381 | 37 | 102 | 103 |
| 382 | 59 | 122 | 121 |
| 383 | 37 | 134 | 71 |
| 384 | 59 | 154 | 89 |
| 385 | 37 | 166 | 39 |
| 386 | 59 | 186 | 57 |
| 387 | 37 | 198 | 7 |
| 388 | 48 | 208 | 16 |
| 389 | 59 | 218 | 25 |
| 390 | 5 | 230 | 7 |
| 391 | 3 | 238 | 3 |
| 392 | 2 | 241 | 2 |
| 393 | 12 | 241 | 2 |
| 394 | 2 | 251 | 2 |
| 395 | 3 | 253 | 0 |
| 396 | 0 | 253 | 3 |
| 397 | 3 | 255 | 3 |
| 398 | 12 | 251 | 2 |
| 399 | 2 | 241 | 12 |
| 400 | 12 | 241 | 12 |
| 401 | 2 | 251 | 12 |
| 402 | 12 | 251 | 12 |
| 403 | 17 | 253 | 3 |
| 404 | 3 | 253 | 17 |
| 405 | 16 | 240 | 16 |
| 406 | 25 | 246 | 25 |
| 407 | 5 | 198 | 39 |
| 408 | 31 | 187 | 57 |
| 409 | 62 | 62 | 62 |
| 410 | 62 | 62 | 62 |
| 411 | 27 | 218 | 57 |
| 412 | 5 | 166 | 71 |
| 413 | 16 | 176 | 80 |
| 414 | 27 | 186 | 89 |
| 415 | 5 | 134 | 103 |
| 416 | 16 | 144 | 112 |
| 417 | 27 | 154 | 121 |
| 418 | 5 | 102 | 135 |
| 419 | 16 | 112 | 144 |
| 420 | 27 | 122 | 153 |
| 421 | 5 | 70 | 167 |
| 422 | 16 | 80 | 176 |
| 423 | 27 | 90 | 185 |
| 424 | 5 | 38 | 199 |
| 425 | 16 | 48 | 208 |
| 426 | 27 | 58 | 217 |
| 427 | 5 | 6 | 231 |
| 428 | 3 | 3 | 238 |
| 429 | 2 | 2 | 241 |
| 430 | 12 | 2 | 241 |
| 431 | 2 | 12 | 241 |
| 432 | 12 | 12 | 241 |
| 433 | 2 | 2 | 251 |
| 434 | 3 | 0 | 253 |
| 435 | 0 | 3 | 253 |
| 436 | 3 | 3 | 255 |
| 437 | 12 | 2 | 251 |
| 438 | 2 | 12 | 251 |
| 439 | 12 | 12 | 251 |
| 440 | 16 | 3 | 253 |
| 441 | 3 | 17 | 253 |
| 442 | 31 | 31 | 213 |
| 443 | 68 | 68 | 68 |
| 444 | 68 | 68 | 68 |
| 445 | 27 | 26 | 249 |
| 446 | 5 | 38 | 231 |
| 447 | 3 | 34 | 253 |
| 448 | 3 | 51 | 253 |
| 449 | 16 | 48 | 240 |
| 450 | 27 | 58 | 249 |
| 451 | 5 | 70 | 199 |
| 452 | 16 | 80 | 208 |
| 453 | 27 | 90 | 217 |
| 454 | 5 | 102 | 167 |
| 455 | 16 | 112 | 176 |
| 456 | 27 | 122 | 185 |
| 457 | 5 | 134 | 135 |
| 458 | 16 | 144 | 144 |
| 459 | 27 | 154 | 153 |
| 460 | 5 | 166 | 103 |
| 461 | 16 | 176 | 112 |
| 462 | 27 | 186 | 121 |
| 463 | 5 | 198 | 71 |
| 464 | 16 | 208 | 80 |
| 465 | 27 | 218 | 89 |
| 466 | 5 | 230 | 39 |
| 467 | 3 | 253 | 34 |
| 468 | 3 | 253 | 51 |

APPENDIX B
Original.rgb: data for possible original database

| Patch # | R | G | B |
|---|---|---|---|
| 469 | 16 | 240 | 48 |
| 470 | 27 | 250 | 57 |
| 471 | 37 | 230 | 7 |
| 472 | 34 | 253 | 3 |
| 473 | 50 | 251 | 4 |
| 474 | 48 | 240 | 16 |
| 475 | 59 | 250 | 25 |
| 476 | 48 | 179 | 50 |
| 477 | 73 | 73 | 73 |
| 478 | 73 | 73 | 73 |
| 479 | 59 | 218 | 57 |
| 480 | 37 | 166 | 71 |
| 481 | 59 | 186 | 89 |
| 482 | 37 | 134 | 103 |
| 483 | 59 | 154 | 121 |
| 484 | 37 | 102 | 135 |
| 485 | 59 | 122 | 153 |
| 486 | 37 | 70 | 167 |
| 487 | 59 | 90 | 185 |
| 488 | 37 | 38 | 199 |
| 489 | 59 | 58 | 217 |
| 490 | 37 | 6 | 231 |
| 491 | 34 | 3 | 253 |
| 492 | 51 | 3 | 253 |
| 493 | 48 | 16 | 240 |
| 494 | 59 | 26 | 249 |
| 495 | 69 | 6 | 199 |
| 496 | 80 | 16 | 208 |
| 497 | 91 | 26 | 217 |
| 498 | 69 | 38 | 167 |
| 499 | 91 | 58 | 185 |
| 500 | 69 | 70 | 135 |
| 501 | 91 | 90 | 153 |
| 502 | 69 | 102 | 103 |
| 503 | 91 | 122 | 121 |
| 504 | 70 | 135 | 72 |
| 505 | 91 | 154 | 89 |
| 506 | 69 | 166 | 39 |
| 507 | 88 | 187 | 50 |
| 508 | 69 | 198 | 7 |
| 509 | 80 | 208 | 16 |
| 510 | 92 | 195 | 39 |
| 511 | 78 | 78 | 78 |
| 512 | 78 | 78 | 78 |
| 513 | 101 | 166 | 7 |
| 514 | 112 | 176 | 16 |
| 515 | 123 | 186 | 25 |
| 516 | 101 | 134 | 39 |
| 517 | 123 | 154 | 57 |
| 518 | 101 | 102 | 71 |
| 519 | 123 | 122 | 89 |
| 520 | 101 | 70 | 103 |
| 521 | 123 | 90 | 121 |
| 522 | 101 | 38 | 135 |
| 523 | 123 | 58 | 153 |
| 524 | 101 | 6 | 167 |
| 525 | 112 | 16 | 176 |
| 526 | 123 | 26 | 185 |
| 527 | 133 | 6 | 135 |
| 528 | 144 | 16 | 144 |
| 529 | 155 | 26 | 153 |
| 530 | 133 | 38 | 103 |
| 531 | 155 | 58 | 121 |
| 532 | 133 | 70 | 71 |
| 533 | 155 | 90 | 89 |
| 534 | 133 | 102 | 39 |
| 535 | 155 | 122 | 57 |
| 536 | 133 | 134 | 7 |
| 537 | 144 | 144 | 16 |
| 538 | 155 | 150 | 23 |
| 539 | 165 | 102 | 7 |
| 540 | 176 | 112 | 16 |
| 541 | 184 | 115 | 26 |
| 542 | 166 | 71 | 40 |
| 543 | 187 | 90 | 57 |
| 544 | 152 | 49 | 76 |
| 545 | 83 | 83 | 83 |
| 546 | 83 | 83 | 83 |
| 547 | 187 | 58 | 89 |
| 548 | 165 | 6 | 103 |
| 549 | 176 | 16 | 112 |
| 550 | 187 | 26 | 121 |
| 551 | 197 | 6 | 71 |
| 552 | 208 | 16 | 80 |
| 553 | 219 | 26 | 89 |
| 554 | 197 | 38 | 39 |
| 555 | 219 | 58 | 57 |
| 556 | 197 | 70 | 7 |
| 557 | 208 | 80 | 16 |
| 558 | 219 | 90 | 25 |
| 559 | 229 | 38 | 7 |
| 560 | 253 | 34 | 3 |
| 561 | 253 | 51 | 3 |
| 562 | 240 | 48 | 16 |
| 563 | 251 | 58 | 25 |
| 564 | 229 | 6 | 39 |
| 565 | 253 | 3 | 34 |
| 566 | 253 | 3 | 51 |
| 567 | 240 | 16 | 48 |
| 568 | 251 | 26 | 57 |
| 569 | 229 | 6 | 71 |
| 570 | 253 | 3 | 68 |
| 571 | 253 | 3 | 85 |
| 572 | 240 | 16 | 80 |
| 573 | 251 | 26 | 89 |
| 574 | 229 | 38 | 39 |
| 575 | 241 | 49 | 49 |
| 576 | 249 | 58 | 53 |
| 577 | 229 | 70 | 7 |
| 578 | 224 | 74 | 21 |
| 579 | 88 | 88 | 88 |
| 580 | 88 | 88 | 88 |
| 581 | 253 | 85 | 3 |
| 582 | 240 | 80 | 16 |
| 583 | 251 | 90 | 25 |
| 584 | 197 | 102 | 7 |
| 585 | 208 | 112 | 16 |
| 586 | 219 | 122 | 25 |
| 587 | 197 | 70 | 39 |
| 588 | 219 | 90 | 57 |
| 589 | 197 | 38 | 71 |
| 590 | 219 | 58 | 89 |
| 591 | 197 | 6 | 103 |
| 592 | 208 | 16 | 112 |
| 593 | 219 | 26 | 121 |
| 594 | 165 | 6 | 135 |
| 595 | 176 | 16 | 144 |
| 596 | 187 | 26 | 153 |
| 597 | 165 | 38 | 103 |
| 598 | 187 | 58 | 121 |
| 599 | 165 | 70 | 71 |
| 600 | 187 | 90 | 89 |
| 601 | 165 | 102 | 39 |
| 602 | 187 | 122 | 57 |
| 603 | 165 | 134 | 7 |
| 604 | 176 | 144 | 16 |
| 605 | 187 | 154 | 25 |
| 606 | 133 | 166 | 7 |
| 607 | 144 | 176 | 16 |
| 608 | 155 | 186 | 25 |
| 609 | 135 | 136 | 41 |
| 610 | 153 | 150 | 57 |
| 611 | 133 | 102 | 71 |
| 612 | 144 | 117 | 91 |
| 613 | 94 | 94 | 94 |
| 614 | 94 | 94 | 94 |
| 615 | 133 | 70 | 103 |
| 616 | 155 | 90 | 121 |
| 617 | 133 | 38 | 135 |
| 618 | 155 | 58 | 153 |
| 619 | 133 | 6 | 167 |
| 620 | 144 | 16 | 176 |
| 621 | 155 | 26 | 185 |
| 622 | 101 | 6 | 199 |
| 623 | 112 | 16 | 208 |
| 624 | 123 | 26 | 217 |

APPENDIX B
Original.rgb: data for possible original database

| Patch # | R | G | B |
|---|---|---|---|
| 625 | 101 | 38 | 167 |
| 626 | 123 | 58 | 185 |
| 627 | 101 | 70 | 135 |
| 628 | 123 | 90 | 153 |
| 629 | 101 | 102 | 103 |
| 630 | 123 | 122 | 121 |
| 631 | 101 | 134 | 71 |
| 632 | 123 | 154 | 89 |
| 633 | 101 | 166 | 39 |
| 634 | 123 | 186 | 57 |
| 635 | 101 | 198 | 7 |
| 636 | 112 | 208 | 16 |
| 637 | 123 | 218 | 25 |
| 638 | 69 | 230 | 7 |
| 639 | 68 | 253 | 3 |
| 640 | 84 | 252 | 3 |
| 641 | 80 | 240 | 16 |
| 642 | 91 | 250 | 25 |
| 643 | 71 | 200 | 41 |
| 644 | 89 | 214 | 57 |
| 645 | 69 | 166 | 71 |
| 646 | 92 | 169 | 91 |
| 647 | 99 | 99 | 99 |
| 648 | 99 | 99 | 99 |
| 649 | 69 | 134 | 103 |
| 650 | 91 | 154 | 121 |
| 651 | 69 | 102 | 135 |
| 652 | 91 | 122 | 153 |
| 653 | 69 | 70 | 167 |
| 654 | 91 | 90 | 185 |
| 655 | 69 | 38 | 199 |
| 656 | 91 | 58 | 217 |
| 657 | 69 | 6 | 231 |
| 658 | 68 | 3 | 253 |
| 659 | 85 | 3 | 253 |
| 660 | 80 | 16 | 240 |
| 661 | 91 | 26 | 249 |
| 662 | 37 | 38 | 231 |
| 663 | 48 | 48 | 240 |
| 664 | 59 | 58 | 249 |
| 665 | 37 | 70 | 199 |
| 666 | 59 | 90 | 217 |
| 667 | 37 | 102 | 167 |
| 668 | 59 | 122 | 185 |
| 669 | 37 | 134 | 135 |
| 670 | 59 | 154 | 153 |
| 671 | 37 | 166 | 103 |
| 672 | 59 | 186 | 121 |
| 673 | 37 | 198 | 71 |
| 674 | 57 | 218 | 85 |
| 675 | 37 | 230 | 39 |
| 676 | 48 | 240 | 48 |
| 677 | 52 | 247 | 58 |
| 678 | 4 | 231 | 70 |
| 679 | 3 | 253 | 68 |
| 680 | 21 | 224 | 87 |
| 681 | 104 | 104 | 104 |
| 682 | 104 | 104 | 104 |
| 683 | 16 | 240 | 80 |
| 684 | 27 | 250 | 89 |
| 685 | 5 | 198 | 103 |
| 686 | 16 | 208 | 112 |
| 687 | 27 | 218 | 121 |
| 688 | 5 | 166 | 135 |
| 689 | 16 | 176 | 144 |
| 690 | 27 | 186 | 153 |
| 691 | 5 | 134 | 167 |
| 692 | 16 | 144 | 176 |
| 693 | 27 | 154 | 185 |
| 694 | 5 | 102 | 199 |
| 695 | 16 | 112 | 208 |
| 696 | 27 | 122 | 217 |
| 697 | 5 | 70 | 231 |
| 698 | 3 | 68 | 253 |
| 699 | 3 | 85 | 253 |
| 700 | 16 | 80 | 240 |
| 701 | 27 | 90 | 249 |
| 702 | 5 | 102 | 231 |
| 703 | 3 | 102 | 253 |
| 704 | 3 | 119 | 253 |
| 705 | 16 | 112 | 240 |
| 706 | 27 | 122 | 249 |
| 707 | 5 | 134 | 199 |
| 708 | 16 | 144 | 208 |
| 709 | 27 | 154 | 217 |
| 710 | 5 | 166 | 167 |
| 711 | 17 | 177 | 177 |
| 712 | 25 | 186 | 181 |
| 713 | 5 | 198 | 135 |
| 714 | 31 | 187 | 135 |
| 715 | 109 | 109 | 109 |
| 716 | 109 | 109 | 109 |
| 717 | 27 | 218 | 153 |
| 718 | 5 | 230 | 103 |
| 719 | 3 | 253 | 102 |
| 720 | 3 | 253 | 119 |
| 721 | 16 | 240 | 112 |
| 722 | 27 | 250 | 121 |
| 723 | 37 | 230 | 71 |
| 724 | 48 | 240 | 80 |
| 725 | 59 | 250 | 89 |
| 726 | 37 | 198 | 103 |
| 727 | 59 | 218 | 121 |
| 728 | 37 | 166 | 135 |
| 729 | 59 | 186 | 153 |
| 730 | 37 | 134 | 167 |
| 731 | 59 | 154 | 185 |
| 732 | 37 | 102 | 199 |
| 733 | 59 | 122 | 217 |
| 734 | 37 | 70 | 231 |
| 735 | 48 | 80 | 240 |
| 736 | 59 | 90 | 249 |
| 737 | 69 | 38 | 231 |
| 738 | 80 | 48 | 240 |
| 739 | 91 | 58 | 249 |
| 740 | 69 | 70 | 199 |
| 741 | 91 | 90 | 217 |
| 742 | 70 | 103 | 168 |
| 743 | 91 | 122 | 185 |
| 744 | 69 | 134 | 135 |
| 745 | 88 | 155 | 146 |
| 746 | 70 | 167 | 104 |
| 747 | 91 | 186 | 121 |
| 748 | 74 | 179 | 76 |
| 749 | 114 | 114 | 114 |
| 750 | 114 | 114 | 114 |
| 751 | 91 | 218 | 89 |
| 752 | 69 | 230 | 39 |
| 753 | 80 | 240 | 48 |
| 754 | 91 | 250 | 57 |
| 755 | 101 | 230 | 7 |
| 756 | 102 | 253 | 3 |
| 757 | 119 | 253 | 3 |
| 758 | 112 | 240 | 16 |
| 759 | 123 | 250 | 25 |
| 760 | 101 | 198 | 39 |
| 761 | 123 | 218 | 57 |
| 762 | 101 | 166 | 71 |
| 763 | 123 | 186 | 89 |
| 764 | 101 | 134 | 103 |
| 765 | 123 | 154 | 121 |
| 766 | 101 | 102 | 135 |
| 767 | 123 | 122 | 153 |
| 768 | 101 | 70 | 167 |
| 769 | 123 | 90 | 185 |
| 770 | 101 | 38 | 199 |
| 771 | 123 | 58 | 217 |
| 772 | 101 | 6 | 231 |
| 773 | 102 | 3 | 253 |
| 774 | 119 | 3 | 253 |
| 775 | 112 | 16 | 240 |
| 776 | 123 | 24 | 245 |
| 777 | 133 | 6 | 199 |
| 778 | 144 | 16 | 208 |
| 779 | 152 | 27 | 210 |
| 780 | 134 | 39 | 168 |

APPENDIX B
Original.rgb: data for possible original database

| Patch # | R | G | B |
|---|---|---|---|
| 781 | 155 | 58 | 185 |
| 782 | 126 | 75 | 128 |
| 783 | 120 | 120 | 120 |
| 784 | 120 | 120 | 120 |
| 785 | 155 | 90 | 153 |
| 786 | 133 | 102 | 103 |
| 787 | 155 | 122 | 121 |
| 788 | 133 | 134 | 71 |
| 789 | 155 | 154 | 89 |
| 790 | 133 | 166 | 39 |
| 791 | 155 | 186 | 57 |
| 792 | 133 | 198 | 7 |
| 793 | 144 | 208 | 16 |
| 794 | 155 | 218 | 25 |
| 795 | 165 | 166 | 7 |
| 796 | 176 | 176 | 16 |
| 797 | 187 | 186 | 25 |
| 798 | 165 | 134 | 39 |
| 799 | 187 | 154 | 57 |
| 800 | 165 | 102 | 71 |
| 801 | 187 | 122 | 89 |
| 802 | 165 | 70 | 103 |
| 803 | 187 | 90 | 121 |
| 804 | 165 | 38 | 135 |
| 805 | 187 | 58 | 153 |
| 806 | 165 | 6 | 167 |
| 807 | 176 | 16 | 176 |
| 808 | 187 | 26 | 185 |
| 809 | 197 | 6 | 135 |
| 810 | 208 | 16 | 144 |
| 811 | 219 | 26 | 153 |
| 812 | 197 | 38 | 103 |
| 813 | 216 | 59 | 114 |
| 814 | 198 | 71 | 72 |
| 815 | 219 | 90 | 89 |
| 816 | 178 | 101 | 50 |
| 817 | 125 | 125 | 125 |
| 818 | 125 | 125 | 125 |
| 819 | 219 | 122 | 57 |
| 820 | 197 | 134 | 7 |
| 821 | 208 | 144 | 16 |
| 822 | 219 | 154 | 25 |
| 823 | 229 | 102 | 7 |
| 824 | 253 | 102 | 3 |
| 825 | 253 | 119 | 3 |
| 826 | 240 | 112 | 16 |
| 827 | 251 | 122 | 25 |
| 828 | 229 | 70 | 39 |
| 829 | 240 | 80 | 48 |
| 830 | 251 | 90 | 57 |
| 831 | 229 | 38 | 71 |
| 832 | 240 | 48 | 80 |
| 833 | 251 | 58 | 89 |
| 834 | 229 | 6 | 103 |
| 835 | 253 | 3 | 102 |
| 836 | 253 | 3 | 119 |
| 837 | 240 | 16 | 112 |
| 838 | 251 | 26 | 121 |
| 839 | 229 | 6 | 135 |
| 840 | 253 | 3 | 136 |
| 841 | 253 | 3 | 153 |
| 842 | 240 | 16 | 144 |
| 843 | 251 | 26 | 153 |
| 844 | 229 | 38 | 103 |
| 845 | 240 | 48 | 112 |
| 846 | 251 | 58 | 121 |
| 847 | 230 | 71 | 72 |
| 848 | 240 | 80 | 80 |
| 849 | 251 | 90 | 89 |
| 850 | 204 | 101 | 50 |
| 851 | 130 | 130 | 130 |
| 852 | 130 | 130 | 130 |
| 853 | 240 | 112 | 48 |
| 854 | 251 | 122 | 57 |
| 855 | 229 | 134 | 7 |
| 856 | 253 | 136 | 3 |
| 857 | 253 | 153 | 3 |
| 858 | 240 | 144 | 16 |
| 859 | 251 | 154 | 25 |
| 860 | 197 | 166 | 7 |
| 861 | 208 | 176 | 16 |
| 862 | 219 | 186 | 25 |
| 863 | 197 | 134 | 39 |
| 864 | 219 | 154 | 57 |
| 865 | 197 | 102 | 71 |
| 866 | 219 | 122 | 89 |
| 867 | 197 | 70 | 103 |
| 868 | 219 | 90 | 121 |
| 869 | 197 | 38 | 135 |
| 870 | 219 | 58 | 153 |
| 871 | 197 | 6 | 167 |
| 872 | 208 | 16 | 176 |
| 873 | 219 | 26 | 185 |
| 874 | 165 | 6 | 199 |
| 875 | 176 | 16 | 208 |
| 876 | 187 | 26 | 217 |
| 877 | 165 | 38 | 167 |
| 878 | 185 | 58 | 181 |
| 879 | 165 | 70 | 135 |
| 880 | 187 | 90 | 153 |
| 881 | 167 | 104 | 105 |
| 882 | 185 | 122 | 117 |
| 883 | 165 | 134 | 71 |
| 884 | 170 | 143 | 91 |
| 885 | 135 | 135 | 135 |
| 886 | 135 | 135 | 135 |
| 887 | 165 | 166 | 39 |
| 888 | 187 | 186 | 57 |
| 889 | 165 | 198 | 7 |
| 890 | 176 | 208 | 16 |
| 891 | 187 | 218 | 25 |
| 892 | 133 | 230 | 7 |
| 893 | 136 | 253 | 3 |
| 894 | 153 | 253 | 3 |
| 895 | 144 | 240 | 16 |
| 896 | 155 | 250 | 25 |
| 897 | 133 | 198 | 39 |
| 898 | 155 | 218 | 57 |
| 899 | 133 | 166 | 71 |
| 900 | 155 | 186 | 89 |
| 901 | 133 | 134 | 103 |
| 902 | 155 | 154 | 121 |
| 903 | 133 | 102 | 135 |
| 904 | 155 | 122 | 153 |
| 905 | 133 | 70 | 167 |
| 906 | 155 | 90 | 185 |
| 907 | 133 | 38 | 199 |
| 908 | 155 | 58 | 217 |
| 909 | 133 | 6 | 231 |
| 910 | 136 | 3 | 253 |
| 911 | 153 | 3 | 253 |
| 912 | 144 | 16 | 240 |
| 913 | 155 | 26 | 249 |
| 914 | 101 | 38 | 231 |
| 915 | 113 | 49 | 241 |
| 916 | 121 | 58 | 245 |
| 917 | 101 | 70 | 199 |
| 918 | 118 | 91 | 195 |
| 919 | 141 | 141 | 141 |
| 920 | 141 | 141 | 141 |
| 921 | 101 | 102 | 167 |
| 922 | 123 | 122 | 185 |
| 923 | 101 | 134 | 135 |
| 924 | 123 | 154 | 153 |
| 925 | 101 | 166 | 103 |
| 926 | 123 | 186 | 121 |
| 927 | 101 | 198 | 71 |
| 928 | 123 | 218 | 89 |
| 929 | 101 | 230 | 39 |
| 930 | 112 | 240 | 48 |
| 931 | 123 | 250 | 57 |
| 932 | 69 | 230 | 71 |
| 933 | 80 | 240 | 80 |
| 934 | 91 | 250 | 89 |
| 935 | 69 | 198 | 103 |
| 936 | 91 | 218 | 121 |

APPENDIX B
Original.rgb: data for possible original database

| Patch # | R | G | B |
|---|---|---|---|
| 937 | 69 | 166 | 135 |
| 938 | 91 | 186 | 153 |
| 939 | 69 | 134 | 167 |
| 940 | 91 | 154 | 185 |
| 941 | 69 | 102 | 199 |
| 942 | 91 | 122 | 217 |
| 943 | 69 | 70 | 231 |
| 944 | 80 | 80 | 240 |
| 945 | 91 | 90 | 249 |
| 946 | 37 | 102 | 231 |
| 947 | 48 | 112 | 240 |
| 948 | 59 | 122 | 249 |
| 949 | 39 | 136 | 201 |
| 950 | 57 | 154 | 213 |
| 951 | 42 | 171 | 171 |
| 952 | 66 | 169 | 169 |
| 953 | 146 | 146 | 146 |
| 954 | 146 | 146 | 146 |
| 955 | 37 | 198 | 135 |
| 956 | 59 | 218 | 153 |
| 957 | 37 | 230 | 103 |
| 958 | 48 | 240 | 112 |
| 959 | 59 | 250 | 121 |
| 960 | 5 | 230 | 135 |
| 961 | 3 | 253 | 136 |
| 962 | 3 | 253 | 153 |
| 963 | 16 | 240 | 144 |
| 964 | 27 | 250 | 153 |
| 965 | 5 | 198 | 167 |
| 966 | 16 | 208 | 176 |
| 967 | 27 | 218 | 185 |
| 968 | 5 | 166 | 199 |
| 969 | 16 | 176 | 208 |
| 970 | 27 | 186 | 217 |
| 971 | 5 | 134 | 231 |
| 972 | 3 | 136 | 253 |
| 973 | 3 | 153 | 253 |
| 974 | 16 | 144 | 240 |
| 975 | 27 | 154 | 249 |
| 976 | 5 | 166 | 231 |
| 977 | 3 | 170 | 253 |
| 978 | 3 | 187 | 253 |
| 979 | 16 | 176 | 240 |
| 980 | 25 | 186 | 245 |
| 981 | 5 | 198 | 199 |
| 982 | 18 | 209 | 209 |
| 983 | 24 | 219 | 210 |
| 984 | 4 | 231 | 167 |
| 985 | 3 | 253 | 174 |
| 986 | 21 | 224 | 170 |
| 987 | 151 | 151 | 151 |
| 988 | 151 | 151 | 151 |
| 989 | 16 | 240 | 176 |
| 990 | 27 | 250 | 185 |
| 991 | 37 | 230 | 135 |
| 992 | 48 | 240 | 144 |
| 993 | 59 | 250 | 153 |
| 994 | 37 | 198 | 167 |
| 995 | 59 | 218 | 185 |
| 996 | 37 | 166 | 199 |
| 997 | 59 | 186 | 217 |
| 998 | 37 | 134 | 231 |
| 999 | 48 | 144 | 240 |
| 1000 | 59 | 154 | 249 |
| 1001 | 69 | 102 | 231 |
| 1002 | 80 | 112 | 240 |
| 1003 | 91 | 122 | 249 |
| 1004 | 69 | 134 | 199 |
| 1005 | 91 | 154 | 217 |
| 1006 | 69 | 166 | 167 |
| 1007 | 91 | 186 | 185 |
| 1008 | 69 | 198 | 135 |
| 1009 | 91 | 218 | 153 |
| 1010 | 69 | 230 | 103 |
| 1011 | 80 | 240 | 112 |
| 1012 | 91 | 250 | 121 |
| 1013 | 102 | 231 | 72 |
| 1014 | 112 | 240 | 80 |
| 1015 | 123 | 250 | 89 |
| 1016 | 105 | 201 | 106 |
| 1017 | 120 | 211 | 122 |
| 1018 | 108 | 167 | 129 |
| 1019 | 123 | 173 | 150 |
| 1020 | 106 | 127 | 149 |
| 1021 | 156 | 156 | 156 |
| 1022 | 156 | 156 | 156 |
| 1023 | 123 | 154 | 185 |
| 1024 | 101 | 102 | 199 |
| 1025 | 123 | 122 | 217 |
| 1026 | 101 | 70 | 231 |
| 1027 | 112 | 80 | 240 |
| 1028 | 123 | 90 | 249 |
| 1029 | 133 | 38 | 231 |
| 1030 | 144 | 48 | 240 |
| 1031 | 155 | 58 | 249 |
| 1032 | 133 | 70 | 199 |
| 1033 | 155 | 90 | 217 |
| 1034 | 133 | 102 | 167 |
| 1035 | 155 | 122 | 185 |
| 1036 | 133 | 134 | 135 |
| 1037 | 155 | 154 | 153 |
| 1038 | 133 | 166 | 103 |
| 1039 | 155 | 186 | 121 |
| 1040 | 133 | 198 | 71 |
| 1041 | 155 | 218 | 89 |
| 1042 | 133 | 230 | 39 |
| 1043 | 144 | 240 | 48 |
| 1044 | 155 | 248 | 53 |
| 1045 | 165 | 230 | 7 |
| 1046 | 170 | 253 | 3 |
| 1047 | 185 | 251 | 4 |
| 1048 | 176 | 240 | 16 |
| 1049 | 187 | 250 | 25 |
| 1050 | 169 | 201 | 42 |
| 1051 | 184 | 211 | 58 |
| 1052 | 166 | 167 | 72 |
| 1053 | 181 | 173 | 92 |
| 1054 | 152 | 127 | 102 |
| 1055 | 161 | 161 | 161 |
| 1056 | 161 | 161 | 161 |
| 1057 | 187 | 154 | 121 |
| 1058 | 165 | 102 | 135 |
| 1059 | 187 | 122 | 153 |
| 1060 | 165 | 70 | 167 |
| 1061 | 187 | 90 | 185 |
| 1062 | 165 | 38 | 199 |
| 1063 | 187 | 58 | 217 |
| 1064 | 165 | 6 | 231 |
| 1065 | 170 | 3 | 253 |
| 1066 | 187 | 3 | 253 |
| 1067 | 176 | 16 | 240 |
| 1068 | 187 | 26 | 249 |
| 1069 | 197 | 6 | 199 |
| 1070 | 208 | 16 | 208 |
| 1071 | 219 | 26 | 217 |
| 1072 | 197 | 38 | 167 |
| 1073 | 219 | 58 | 185 |
| 1074 | 197 | 70 | 135 |
| 1075 | 219 | 90 | 153 |
| 1076 | 197 | 102 | 103 |
| 1077 | 219 | 122 | 121 |
| 1078 | 198 | 135 | 72 |
| 1079 | 219 | 154 | 89 |
| 1080 | 197 | 166 | 39 |
| 1081 | 216 | 187 | 50 |
| 1082 | 197 | 198 | 7 |
| 1083 | 208 | 208 | 16 |
| 1084 | 220 | 208 | 21 |
| 1085 | 232 | 166 | 6 |
| 1086 | 253 | 171 | 3 |
| 1087 | 249 | 184 | 6 |
| 1088 | 213 | 161 | 31 |
| 1089 | 167 | 167 | 167 |
| 1090 | 167 | 167 | 167 |
| 1091 | 251 | 186 | 25 |
| 1092 | 229 | 134 | 39 |

APPENDIX B
Original.rgb: data for possible original database

| Patch # | R | G | B |
|---|---|---|---|
| 1093 | 240 | 144 | 48 |
| 1094 | 251 | 154 | 57 |
| 1095 | 229 | 102 | 71 |
| 1096 | 240 | 112 | 80 |
| 1097 | 251 | 122 | 89 |
| 1098 | 229 | 70 | 103 |
| 1099 | 240 | 80 | 112 |
| 1100 | 251 | 90 | 121 |
| 1101 | 229 | 38 | 135 |
| 1102 | 240 | 48 | 144 |
| 1103 | 251 | 58 | 153 |
| 1104 | 229 | 6 | 167 |
| 1105 | 253 | 3 | 170 |
| 1106 | 253 | 3 | 187 |
| 1107 | 240 | 16 | 176 |
| 1108 | 251 | 26 | 185 |
| 1109 | 229 | 6 | 199 |
| 1110 | 253 | 3 | 204 |
| 1111 | 253 | 3 | 221 |
| 1112 | 240 | 16 | 208 |
| 1113 | 251 | 26 | 217 |
| 1114 | 229 | 38 | 167 |
| 1115 | 241 | 49 | 177 |
| 1116 | 249 | 58 | 181 |
| 1117 | 229 | 70 | 135 |
| 1118 | 242 | 81 | 145 |
| 1119 | 248 | 91 | 146 |
| 1120 | 229 | 102 | 103 |
| 1121 | 242 | 114 | 114 |
| 1122 | 215 | 100 | 136 |
| 1123 | 172 | 172 | 172 |
| 1124 | 172 | 172 | 172 |
| 1125 | 229 | 134 | 71 |
| 1126 | 240 | 144 | 80 |
| 1127 | 251 | 154 | 89 |
| 1128 | 229 | 166 | 39 |
| 1129 | 240 | 176 | 48 |
| 1130 | 251 | 186 | 57 |
| 1131 | 229 | 198 | 7 |
| 1132 | 253 | 204 | 3 |
| 1133 | 253 | 221 | 3 |
| 1134 | 240 | 208 | 16 |
| 1135 | 251 | 218 | 25 |
| 1136 | 197 | 230 | 7 |
| 1137 | 204 | 253 | 3 |
| 1138 | 221 | 253 | 3 |
| 1139 | 208 | 240 | 16 |
| 1140 | 219 | 250 | 25 |
| 1141 | 197 | 198 | 39 |
| 1142 | 219 | 218 | 57 |
| 1143 | 197 | 166 | 71 |
| 1144 | 219 | 186 | 89 |
| 1145 | 197 | 134 | 103 |
| 1146 | 217 | 150 | 121 |
| 1147 | 197 | 102 | 135 |
| 1148 | 219 | 122 | 153 |
| 1149 | 199 | 72 | 169 |
| 1150 | 217 | 86 | 185 |
| 1151 | 197 | 38 | 199 |
| 1152 | 214 | 48 | 219 |
| 1153 | 197 | 5 | 233 |
| 1154 | 205 | 3 | 253 |
| 1155 | 217 | 6 | 249 |
| 1156 | 187 | 31 | 213 |
| 1157 | 177 | 177 | 177 |
| 1158 | 177 | 177 | 177 |
| 1159 | 219 | 26 | 249 |
| 1160 | 165 | 38 | 231 |
| 1161 | 176 | 48 | 240 |
| 1162 | 187 | 58 | 249 |
| 1163 | 165 | 70 | 199 |
| 1164 | 187 | 90 | 217 |
| 1165 | 165 | 102 | 167 |
| 1166 | 187 | 122 | 185 |
| 1167 | 165 | 134 | 135 |
| 1168 | 187 | 154 | 153 |
| 1169 | 165 | 166 | 103 |
| 1170 | 187 | 186 | 121 |
| 1171 | 165 | 198 | 71 |
| 1172 | 187 | 218 | 89 |
| 1173 | 165 | 230 | 39 |
| 1174 | 176 | 240 | 48 |
| 1175 | 187 | 250 | 57 |
| 1176 | 133 | 230 | 71 |
| 1177 | 144 | 240 | 80 |
| 1178 | 155 | 250 | 89 |
| 1179 | 133 | 198 | 103 |
| 1180 | 142 | 209 | 132 |
| 1181 | 124 | 167 | 145 |
| 1182 | 145 | 186 | 162 |
| 1183 | 126 | 142 | 172 |
| 1184 | 144 | 157 | 188 |
| 1185 | 123 | 114 | 195 |
| 1186 | 140 | 125 | 215 |
| 1187 | 126 | 88 | 227 |
| 1188 | 130 | 95 | 236 |
| 1189 | 127 | 109 | 240 |
| 1190 | 92 | 113 | 205 |
| 1191 | 182 | 182 | 182 |
| 1192 | 182 | 182 | 182 |
| 1193 | 112 | 112 | 240 |
| 1194 | 123 | 122 | 249 |
| 1195 | 101 | 134 | 199 |
| 1196 | 123 | 154 | 217 |
| 1197 | 101 | 166 | 167 |
| 1198 | 123 | 186 | 185 |
| 1199 | 101 | 198 | 135 |
| 1200 | 123 | 218 | 153 |
| 1201 | 101 | 230 | 103 |
| 1202 | 112 | 240 | 112 |
| 1203 | 123 | 250 | 121 |
| 1204 | 69 | 230 | 135 |
| 1205 | 80 | 240 | 144 |
| 1206 | 91 | 250 | 153 |
| 1207 | 69 | 198 | 167 |
| 1208 | 91 | 218 | 185 |
| 1209 | 69 | 166 | 199 |
| 1210 | 91 | 186 | 217 |
| 1211 | 69 | 134 | 231 |
| 1212 | 80 | 144 | 240 |
| 1213 | 91 | 154 | 249 |
| 1214 | 37 | 166 | 231 |
| 1215 | 48 | 176 | 240 |
| 1216 | 59 | 186 | 249 |
| 1217 | 39 | 200 | 201 |
| 1218 | 57 | 218 | 213 |
| 1219 | 37 | 230 | 167 |
| 1220 | 50 | 241 | 177 |
| 1221 | 52 | 247 | 186 |
| 1222 | 4 | 231 | 199 |
| 1223 | 3 | 253 | 208 |
| 1224 | 21 | 224 | 198 |
| 1225 | 187 | 187 | 187 |
| 1226 | 187 | 187 | 187 |
| 1227 | 16 | 240 | 208 |
| 1228 | 27 | 250 | 217 |
| 1229 | 5 | 198 | 231 |
| 1230 | 3 | 204 | 253 |
| 1231 | 3 | 221 | 253 |
| 1232 | 16 | 208 | 240 |
| 1233 | 27 | 218 | 249 |
| 1234 | 5 | 230 | 231 |
| 1235 | 3 | 253 | 238 |
| 1236 | 3 | 238 | 253 |
| 1237 | 2 | 241 | 241 |
| 1238 | 12 | 241 | 241 |
| 1239 | 2 | 251 | 241 |
| 1240 | 12 | 251 | 241 |
| 1241 | 2 | 241 | 251 |
| 1242 | 12 | 241 | 251 |
| 1243 | 2 | 251 | 251 |
| 1244 | 0 | 253 | 253 |
| 1245 | 3 | 255 | 253 |
| 1246 | 3 | 253 | 255 |
| 1247 | 12 | 251 | 251 |
| 1248 | 16 | 240 | 240 |

APPENDIX B
Original.rgb: data for possible original database

| Patch # | R | G | B |
|---|---|---|---|
| 1249 | 17 | 253 | 253 |
| 1250 | 27 | 250 | 249 |
| 1251 | 38 | 231 | 200 |
| 1252 | 48 | 240 | 208 |
| 1253 | 59 | 250 | 217 |
| 1254 | 39 | 199 | 232 |
| 1255 | 49 | 209 | 241 |
| 1256 | 59 | 214 | 247 |
| 1257 | 71 | 168 | 233 |
| 1258 | 83 | 161 | 213 |
| 1259 | 193 | 193 | 193 |
| 1260 | 193 | 193 | 193 |
| 1261 | 91 | 186 | 249 |
| 1262 | 69 | 198 | 199 |
| 1263 | 91 | 218 | 217 |
| 1264 | 69 | 230 | 167 |
| 1265 | 80 | 240 | 176 |
| 1266 | 91 | 250 | 185 |
| 1267 | 101 | 230 | 135 |
| 1268 | 112 | 240 | 144 |
| 1269 | 123 | 250 | 153 |
| 1270 | 101 | 198 | 167 |
| 1271 | 123 | 218 | 185 |
| 1272 | 101 | 166 | 199 |
| 1273 | 123 | 186 | 217 |
| 1274 | 101 | 134 | 231 |
| 1275 | 112 | 144 | 240 |
| 1276 | 123 | 154 | 249 |
| 1277 | 133 | 102 | 231 |
| 1278 | 144 | 112 | 240 |
| 1279 | 155 | 122 | 249 |
| 1280 | 133 | 134 | 199 |
| 1281 | 155 | 154 | 217 |
| 1282 | 134 | 167 | 168 |
| 1283 | 155 | 186 | 185 |
| 1284 | 145 | 204 | 115 |
| 1285 | 163 | 223 | 127 |
| 1286 | 150 | 234 | 93 |
| 1287 | 161 | 238 | 91 |
| 1288 | 175 | 245 | 89 |
| 1289 | 180 | 235 | 58 |
| 1290 | 189 | 240 | 64 |
| 1291 | 194 | 238 | 74 |
| 1292 | 165 | 188 | 86 |
| 1293 | 198 | 198 | 198 |
| 1294 | 198 | 198 | 198 |
| 1295 | 187 | 218 | 121 |
| 1296 | 165 | 166 | 135 |
| 1297 | 187 | 186 | 153 |
| 1298 | 165 | 134 | 167 |
| 1299 | 187 | 154 | 185 |
| 1300 | 165 | 102 | 199 |
| 1301 | 187 | 122 | 217 |
| 1302 | 165 | 70 | 231 |
| 1303 | 176 | 80 | 240 |
| 1304 | 187 | 90 | 249 |
| 1305 | 197 | 38 | 231 |
| 1306 | 208 | 48 | 240 |
| 1307 | 219 | 58 | 249 |
| 1308 | 197 | 70 | 199 |
| 1309 | 219 | 90 | 217 |
| 1310 | 197 | 102 | 167 |
| 1311 | 219 | 122 | 185 |
| 1312 | 197 | 134 | 135 |
| 1313 | 219 | 154 | 153 |
| 1314 | 197 | 166 | 103 |
| 1315 | 219 | 186 | 121 |
| 1316 | 198 | 199 | 72 |
| 1317 | 219 | 218 | 89 |
| 1318 | 197 | 230 | 39 |
| 1319 | 209 | 241 | 49 |
| 1320 | 219 | 248 | 53 |
| 1321 | 229 | 230 | 7 |
| 1322 | 250 | 240 | 3 |
| 1323 | 238 | 251 | 2 |
| 1324 | 241 | 241 | 2 |
| 1325 | 248 | 243 | 2 |
| 1326 | 214 | 222 | 20 |
| 1327 | 203 | 203 | 203 |
| 1328 | 203 | 203 | 203 |
| 1329 | 251 | 251 | 2 |
| 1330 | 253 | 253 | 0 |
| 1331 | 255 | 253 | 3 |
| 1332 | 253 | 255 | 3 |
| 1333 | 241 | 241 | 12 |
| 1334 | 251 | 241 | 12 |
| 1335 | 241 | 251 | 12 |
| 1336 | 251 | 251 | 12 |
| 1337 | 240 | 240 | 16 |
| 1338 | 253 | 253 | 17 |
| 1339 | 251 | 250 | 25 |
| 1340 | 229 | 198 | 39 |
| 1341 | 240 | 208 | 48 |
| 1342 | 251 | 218 | 57 |
| 1343 | 229 | 153 | 87 |
| 1344 | 241 | 161 | 97 |
| 1345 | 249 | 172 | 104 |
| 1346 | 231 | 125 | 118 |
| 1347 | 241 | 135 | 125 |
| 1348 | 248 | 145 | 128 |
| 1349 | 230 | 99 | 142 |
| 1350 | 241 | 110 | 151 |
| 1351 | 248 | 120 | 154 |
| 1352 | 230 | 74 | 167 |
| 1353 | 242 | 85 | 177 |
| 1354 | 247 | 91 | 180 |
| 1355 | 230 | 48 | 193 |
| 1356 | 242 | 60 | 203 |
| 1357 | 246 | 63 | 207 |
| 1358 | 231 | 22 | 219 |
| 1359 | 248 | 21 | 228 |
| 1360 | 211 | 37 | 209 |
| 1361 | 208 | 208 | 208 |
| 1362 | 208 | 208 | 208 |
| 1363 | 241 | 2 | 241 |
| 1364 | 251 | 2 | 241 |
| 1365 | 241 | 12 | 241 |
| 1366 | 251 | 12 | 241 |
| 1367 | 241 | 2 | 251 |
| 1368 | 251 | 2 | 251 |
| 1369 | 253 | 0 | 253 |
| 1370 | 255 | 3 | 253 |
| 1371 | 253 | 3 | 255 |
| 1372 | 241 | 12 | 251 |
| 1373 | 251 | 12 | 251 |
| 1374 | 240 | 16 | 240 |
| 1375 | 253 | 17 | 253 |
| 1376 | 251 | 26 | 249 |
| 1377 | 229 | 38 | 231 |
| 1378 | 253 | 34 | 253 |
| 1379 | 240 | 48 | 240 |
| 1380 | 253 | 51 | 253 |
| 1381 | 251 | 58 | 249 |
| 1382 | 229 | 70 | 199 |
| 1383 | 240 | 80 | 208 |
| 1384 | 249 | 90 | 213 |
| 1385 | 229 | 102 | 167 |
| 1386 | 240 | 112 | 176 |
| 1387 | 224 | 127 | 185 |
| 1388 | 216 | 140 | 159 |
| 1389 | 217 | 150 | 150 |
| 1390 | 227 | 165 | 153 |
| 1391 | 211 | 177 | 114 |
| 1392 | 224 | 189 | 123 |
| 1393 | 222 | 202 | 107 |
| 1394 | 191 | 189 | 86 |
| 1395 | 213 | 213 | 213 |
| 1396 | 213 | 213 | 213 |
| 1397 | 240 | 208 | 80 |
| 1398 | 251 | 218 | 89 |
| 1399 | 229 | 230 | 39 |
| 1400 | 253 | 253 | 34 |
| 1401 | 240 | 240 | 48 |
| 1402 | 253 | 253 | 51 |
| 1403 | 251 | 250 | 57 |
| 1404 | 197 | 230 | 71 |

APPENDIX B
Original.rgb: data for possible original database

| Patch # | R | G | B |
|---|---|---|---|
| 1405 | 208 | 240 | 80 |
| 1406 | 219 | 250 | 89 |
| 1407 | 197 | 198 | 103 |
| 1408 | 219 | 218 | 121 |
| 1409 | 197 | 166 | 135 |
| 1410 | 219 | 186 | 153 |
| 1411 | 197 | 134 | 167 |
| 1412 | 219 | 154 | 185 |
| 1413 | 197 | 102 | 199 |
| 1414 | 219 | 122 | 217 |
| 1415 | 197 | 70 | 231 |
| 1416 | 208 | 80 | 240 |
| 1417 | 219 | 90 | 249 |
| 1418 | 165 | 102 | 231 |
| 1419 | 176 | 112 | 240 |
| 1420 | 187 | 122 | 249 |
| 1421 | 167 | 136 | 201 |
| 1422 | 185 | 154 | 213 |
| 1423 | 165 | 166 | 167 |
| 1424 | 182 | 188 | 175 |
| 1425 | 167 | 200 | 137 |
| 1426 | 185 | 218 | 149 |
| 1427 | 167 | 232 | 105 |
| 1428 | 161 | 213 | 109 |
| 1429 | 219 | 219 | 219 |
| 1430 | 219 | 219 | 219 |
| 1431 | 187 | 250 | 121 |
| 1432 | 133 | 230 | 135 |
| 1433 | 144 | 240 | 144 |
| 1434 | 155 | 250 | 153 |
| 1435 | 133 | 198 | 167 |
| 1436 | 155 | 218 | 185 |
| 1437 | 133 | 166 | 199 |
| 1438 | 155 | 186 | 217 |
| 1439 | 133 | 134 | 231 |
| 1440 | 144 | 144 | 240 |
| 1441 | 155 | 154 | 249 |
| 1442 | 101 | 166 | 231 |
| 1443 | 112 | 176 | 240 |
| 1444 | 123 | 186 | 249 |
| 1445 | 101 | 198 | 199 |
| 1446 | 127 | 222 | 208 |
| 1447 | 111 | 234 | 170 |
| 1448 | 122 | 238 | 167 |
| 1449 | 133 | 248 | 176 |
| 1450 | 92 | 234 | 189 |
| 1451 | 97 | 231 | 199 |
| 1452 | 108 | 240 | 211 |
| 1453 | 88 | 191 | 224 |
| 1454 | 101 | 203 | 235 |
| 1455 | 100 | 202 | 243 |
| 1456 | 64 | 214 | 234 |
| 1457 | 64 | 233 | 252 |
| 1458 | 78 | 214 | 240 |
| 1459 | 83 | 224 | 250 |
| 1460 | 92 | 220 | 241 |
| 1461 | 95 | 216 | 229 |
| 1462 | 98 | 208 | 218 |
| 1463 | 224 | 224 | 224 |
| 1464 | 224 | 224 | 224 |
| 1465 | 80 | 240 | 240 |
| 1466 | 85 | 253 | 253 |
| 1467 | 91 | 250 | 249 |
| 1468 | 101 | 230 | 199 |
| 1469 | 112 | 240 | 208 |
| 1470 | 123 | 250 | 217 |
| 1471 | 101 | 198 | 231 |
| 1472 | 112 | 208 | 240 |
| 1473 | 123 | 218 | 249 |
| 1474 | 133 | 166 | 231 |
| 1475 | 144 | 176 | 240 |
| 1476 | 155 | 186 | 249 |
| 1477 | 133 | 198 | 199 |
| 1478 | 155 | 218 | 217 |
| 1479 | 133 | 230 | 167 |
| 1480 | 144 | 240 | 176 |
| 1481 | 155 | 250 | 185 |
| 1482 | 165 | 230 | 135 |
| 1483 | 176 | 240 | 144 |
| 1484 | 187 | 250 | 153 |
| 1485 | 165 | 198 | 167 |
| 1486 | 185 | 214 | 185 |
| 1487 | 165 | 166 | 199 |
| 1488 | 187 | 186 | 217 |
| 1489 | 166 | 135 | 232 |
| 1490 | 206 | 114 | 245 |
| 1491 | 211 | 117 | 244 |
| 1492 | 220 | 96 | 240 |
| 1493 | 224 | 104 | 243 |
| 1494 | 221 | 116 | 235 |
| 1495 | 221 | 125 | 222 |
| 1496 | 203 | 130 | 202 |
| 1497 | 229 | 229 | 229 |
| 1498 | 229 | 229 | 229 |
| 1499 | 197 | 166 | 167 |
| 1500 | 219 | 186 | 185 |
| 1501 | 197 | 198 | 135 |
| 1502 | 219 | 218 | 153 |
| 1503 | 197 | 230 | 103 |
| 1504 | 208 | 240 | 112 |
| 1505 | 221 | 242 | 126 |
| 1506 | 231 | 225 | 82 |
| 1507 | 250 | 247 | 74 |
| 1508 | 240 | 236 | 86 |
| 1509 | 252 | 249 | 91 |
| 1510 | 248 | 248 | 90 |
| 1511 | 231 | 203 | 102 |
| 1512 | 240 | 211 | 112 |
| 1513 | 251 | 221 | 120 |
| 1514 | 231 | 174 | 133 |
| 1515 | 235 | 181 | 143 |
| 1516 | 246 | 191 | 152 |
| 1517 | 228 | 145 | 165 |
| 1518 | 235 | 149 | 175 |
| 1519 | 247 | 160 | 185 |
| 1520 | 226 | 109 | 199 |
| 1521 | 237 | 119 | 208 |
| 1522 | 242 | 114 | 220 |
| 1523 | 229 | 77 | 234 |
| 1524 | 248 | 77 | 251 |
| 1525 | 235 | 89 | 242 |
| 1526 | 245 | 95 | 251 |
| 1527 | 241 | 101 | 246 |
| 1528 | 230 | 112 | 234 |
| 1529 | 242 | 116 | 245 |
| 1530 | 207 | 119 | 207 |
| 1531 | 234 | 234 | 234 |
| 1532 | 234 | 234 | 234 |
| 1533 | 253 | 119 | 253 |
| 1534 | 251 | 122 | 249 |
| 1535 | 229 | 134 | 199 |
| 1536 | 240 | 144 | 208 |
| 1537 | 251 | 154 | 217 |
| 1538 | 229 | 166 | 167 |
| 1539 | 240 | 176 | 176 |
| 1540 | 251 | 186 | 185 |
| 1541 | 229 | 198 | 135 |
| 1542 | 240 | 208 | 144 |
| 1543 | 251 | 218 | 153 |
| 1544 | 229 | 230 | 103 |
| 1545 | 253 | 253 | 102 |
| 1546 | 240 | 240 | 112 |
| 1547 | 253 | 253 | 119 |
| 1548 | 251 | 250 | 121 |
| 1549 | 184 | 236 | 169 |
| 1550 | 191 | 243 | 176 |
| 1551 | 202 | 244 | 166 |
| 1552 | 190 | 210 | 179 |
| 1553 | 206 | 221 | 196 |
| 1554 | 188 | 176 | 209 |
| 1555 | 206 | 192 | 223 |
| 1556 | 196 | 157 | 236 |
| 1557 | 206 | 151 | 238 |
| 1558 | 213 | 161 | 245 |
| 1559 | 181 | 174 | 234 |
| 1560 | 184 | 185 | 229 |

APPENDIX B
Original.rgb: data for possible original database

| Patch # | R | G | B |
|---------|-----|-----|-----|
| 1561 | 193 | 197 | 233 |
| 1562 | 180 | 212 | 194 |
| 1563 | 190 | 227 | 196 |
| 1564 | 165 | 210 | 158 |
| 1565 | 239 | 239 | 239 |
| 1566 | 239 | 239 | 239 |
| 1567 | 176 | 240 | 176 |
| 1568 | 187 | 250 | 185 |
| 1569 | 133 | 230 | 199 |
| 1570 | 144 | 240 | 208 |
| 1571 | 155 | 250 | 217 |
| 1572 | 133 | 198 | 231 |
| 1573 | 144 | 208 | 240 |
| 1574 | 155 | 218 | 249 |
| 1575 | 101 | 230 | 231 |
| 1576 | 102 | 253 | 253 |
| 1577 | 112 | 240 | 240 |
| 1578 | 119 | 253 | 253 |
| 1579 | 123 | 250 | 249 |
| 1580 | 133 | 230 | 231 |
| 1581 | 136 | 253 | 253 |
| 1582 | 144 | 240 | 240 |
| 1583 | 155 | 250 | 249 |
| 1584 | 153 | 253 | 253 |
| 1585 | 165 | 230 | 199 |
| 1586 | 176 | 240 | 208 |
| 1587 | 184 | 243 | 218 |
| 1588 | 165 | 198 | 231 |
| 1589 | 176 | 208 | 240 |
| 1590 | 188 | 208 | 245 |
| 1591 | 198 | 167 | 232 |
| 1592 | 208 | 176 | 240 |
| 1593 | 213 | 189 | 236 |
| 1594 | 226 | 226 | 193 |
| 1595 | 231 | 234 | 199 |
| 1596 | 200 | 233 | 185 |
| 1597 | 210 | 242 | 194 |
| 1598 | 196 | 221 | 182 |
| 1599 | 245 | 245 | 245 |
| 1600 | 245 | 245 | 245 |
| 1601 | 229 | 230 | 135 |
| 1602 | 253 | 253 | 136 |
| 1603 | 240 | 240 | 144 |
| 1604 | 251 | 250 | 153 |
| 1605 | 253 | 253 | 153 |
| 1606 | 229 | 198 | 167 |
| 1607 | 240 | 208 | 176 |
| 1608 | 238 | 225 | 198 |
| 1609 | 222 | 178 | 205 |
| 1610 | 232 | 191 | 217 |
| 1611 | 242 | 196 | 221 |
| 1612 | 227 | 157 | 234 |
| 1613 | 246 | 159 | 253 |
| 1614 | 237 | 161 | 231 |
| 1615 | 251 | 173 | 240 |
| 1616 | 250 | 170 | 244 |
| 1617 | 233 | 182 | 228 |
| 1618 | 252 | 186 | 246 |
| 1619 | 237 | 180 | 238 |
| 1620 | 251 | 189 | 249 |
| 1621 | 248 | 192 | 245 |
| 1622 | 233 | 202 | 209 |
| 1623 | 242 | 210 | 217 |
| 1624 | 244 | 223 | 212 |
| 1625 | 236 | 236 | 181 |
| 1626 | 252 | 249 | 186 |
| 1627 | 241 | 243 | 192 |
| 1628 | 249 | 248 | 196 |
| 1629 | 245 | 248 | 199 |
| 1630 | 209 | 235 | 209 |
| 1631 | 217 | 244 | 216 |
| 1632 | 201 | 222 | 198 |
| 1633 | 250 | 250 | 250 |
| 1634 | 250 | 250 | 250 |
| 1635 | 197 | 198 | 231 |
| 1636 | 208 | 208 | 240 |
| 1637 | 219 | 218 | 249 |
| 1638 | 165 | 230 | 231 |
| 1639 | 170 | 253 | 253 |
| 1640 | 176 | 240 | 240 |
| 1641 | 187 | 250 | 249 |
| 1642 | 187 | 253 | 253 |
| 1643 | 197 | 230 | 231 |
| 1644 | 204 | 253 | 253 |
| 1645 | 208 | 240 | 240 |
| 1646 | 219 | 250 | 249 |
| 1647 | 221 | 253 | 253 |
| 1648 | 229 | 230 | 199 |
| 1649 | 253 | 253 | 204 |
| 1650 | 240 | 240 | 208 |
| 1651 | 251 | 250 | 217 |
| 1652 | 251 | 249 | 221 |
| 1653 | 137 | 118 | 138 |
| 1654 | 151 | 122 | 151 |
| 1655 | 144 | 125 | 144 |
| 1656 | 150 | 130 | 149 |
| 1657 | 151 | 132 | 151 |
| 1658 | 140 | 140 | 139 |
| 1659 | 151 | 150 | 143 |
| 1660 | 151 | 143 | 151 |
| 1661 | 143 | 149 | 149 |
| 1662 | 144 | 144 | 144 |
| 1663 | 145 | 144 | 144 |
| 1664 | 148 | 146 | 144 |
| 1665 | 146 | 150 | 144 |
| 1666 | 141 | 141 | 136 |
| 1667 | 244 | 244 | 244 |
| 1668 | 244 | 244 | 244 |
| 1669 | 231 | 231 | 240 |
| 1670 | 240 | 231 | 240 |
| 1671 | 231 | 240 | 240 |
| 1672 | 240 | 240 | 239 |
| 1673 | 240 | 240 | 240 |
| 1674 | 244 | 242 | 242 |
| 1675 | 242 | 244 | 242 |
| 1676 | 242 | 242 | 244 |

APPENDIX C
Dbase.rgb: transparency precursor data

| Patch # | R | G | B |
|---------|-----|-----|-----|
| 1 | 0 | 0 | 0 |
| 2 | 6 | 0 | 2 |
| 3 | 5 | 3 | 6 |
| 4 | 7 | 1 | 4 |
| 5 | 7 | 3 | 4 |
| 6 | 0 | 4 | 4 |
| 7 | 2 | 4 | 8 |
| 8 | 10 | 4 | 4 |
| 9 | 2 | 1 | 1 |
| 10 | 12 | 7 | 4 |
| 11 | 2 | 7 | 4 |
| 12 | 10 | 5 | 3 |
| 13 | 4 | 1 | 2 |
| 14 | 10 | 8 | 6 |
| 15 | 23 | 0 | 4 |
| 16 | 7 | 7 | 4 |
| 17 | 5 | 6 | 3 |
| 18 | 16 | 4 | 7 |
| 19 | 23 | 1 | 3 |
| 20 | 34 | 4 | 0 |
| 21 | 36 | 4 | 7 |
| 22 | 56 | 8 | 6 |
| 23 | 51 | 7 | 4 |
| 24 | 56 | 4 | 7 |
| 25 | 12 | 38 | 7 |
| 26 | 16 | 42 | 8 |
| 27 | 17 | 78 | 4 |
| 28 | 22 | 41 | 4 |
| 29 | 26 | 40 | 7 |
| 30 | 17 | 4 | 12 |
| 31 | 18 | 8 | 16 |
| 32 | 15 | 4 | 29 |
| 33 | 20 | 8 | 21 |

-continued

APPENDIX C
Dbase.rgb: transparency precursor data

| Patch # | R | G | B |
|---|---|---|---|
| 34 | 26 | 4 | 29 |
| 35 | 5 | 5 | 5 |
| 36 | 1 | 5 | 4 |
| 37 | 3 | 7 | 59 |
| 38 | 4 | 4 | 65 |
| 39 | 2 | 1 | 93 |
| 40 | 10 | 1 | 70 |
| 41 | 19 | 4 | 86 |
| 42 | 5 | 22 | 9 |
| 43 | 13 | 29 | 17 |
| 44 | 20 | 32 | 22 |
| 45 | 7 | 82 | 3 |
| 46 | 8 | 85 | 3 |
| 47 | 8 | 116 | 3 |
| 48 | 11 | 91 | 3 |
| 49 | 15 | 99 | 7 |
| 50 | 38 | 18 | 8 |
| 51 | 51 | 20 | 4 |
| 52 | 55 | 28 | 4 |
| 53 | 35 | 7 | 16 |
| 54 | 44 | 1 | 27 |
| 55 | 55 | 7 | 32 |
| 56 | 60 | 3 | 2 |
| 57 | 62 | 1 | 3 |
| 58 | 77 | 2 | 3 |
| 59 | 74 | 7 | 4 |
| 60 | 84 | 3 | 3 |
| 61 | 100 | 6 | 5 |
| 62 | 100 | 1 | 6 |
| 63 | 123 | 1 | 7 |
| 64 | 113 | 6 | 4 |
| 65 | 124 | 5 | 1 |
| 66 | 62 | 7 | 0 |
| 67 | 69 | 15 | 1 |
| 68 | 79 | 24 | 1 |
| 69 | 10 | 10 | 10 |
| 70 | 7 | 10 | 5 |
| 71 | 62 | 7 | 13 |
| 72 | 72 | 4 | 20 |
| 73 | 83 | 4 | 28 |
| 74 | 26 | 4 | 63 |
| 75 | 41 | 5 | 70 |
| 76 | 50 | 5 | 84 |
| 77 | 28 | 7 | 14 |
| 78 | 45 | 20 | 23 |
| 79 | 36 | 63 | 0 |
| 80 | 43 | 73 | 7 |
| 81 | 49 | 84 | 1 |
| 82 | 10 | 157 | 5 |
| 83 | 11 | 154 | 4 |
| 84 | 15 | 181 | 8 |
| 85 | 11 | 153 | 4 |
| 86 | 14 | 161 | 5 |
| 87 | 7 | 71 | 7 |
| 88 | 10 | 73 | 11 |
| 89 | 14 | 81 | 18 |
| 90 | 7 | 10 | 49 |
| 91 | 12 | 16 | 60 |
| 92 | 17 | 17 | 78 |
| 93 | 7 | 1 | 128 |
| 94 | 11 | 0 | 130 |
| 95 | 13 | 4 | 163 |
| 96 | 18 | 4 | 149 |
| 97 | 22 | 4 | 160 |
| 98 | 13 | 8 | 180 |
| 99 | 0 | 4 | 255 |
| 100 | 10 | 1 | 161 |
| 101 | 14 | 1 | 178 |
| 102 | 17 | 7 | 171 |
| 103 | 16 | 16 | 16 |
| 104 | 15 | 15 | 10 |
| 105 | 1 | 1 | 111 |
| 106 | 7 | 0 | 121 |
| 107 | 15 | 2 | 130 |
| 108 | 5 | 60 | 42 |
| 109 | 9 | 67 | 52 |
| 110 | 14 | 74 | 67 |
| 111 | 8 | 131 | 10 |
| 112 | 10 | 136 | 13 |
| 113 | 12 | 144 | 16 |
| 114 | 36 | 221 | 37 |
| 115 | 54 | 223 | 50 |
| 116 | 23 | 203 | 19 |
| 117 | 32 | 217 | 31 |
| 118 | 153 | 237 | 134 |
| 119 | 38 | 113 | 5 |
| 120 | 60 | 114 | 6 |
| 121 | 53 | 129 | 4 |
| 122 | 26 | 43 | 8 |
| 123 | 49 | 64 | 17 |
| 124 | 29 | 2 | 46 |
| 125 | 47 | 13 | 75 |
| 126 | 24 | 4 | 120 |
| 127 | 43 | 5 | 132 |
| 128 | 56 | 4 | 149 |
| 129 | 63 | 4 | 63 |
| 130 | 75 | 0 | 71 |
| 131 | 87 | 5 | 83 |
| 132 | 63 | 4 | 11 |
| 133 | 83 | 16 | 21 |
| 134 | 61 | 48 | 2 |
| 135 | 69 | 61 | 1 |
| 136 | 79 | 69 | 3 |
| 137 | 21 | 21 | 21 |
| 138 | 22 | 20 | 16 |
| 139 | 92 | 9 | 3 |
| 140 | 102 | 13 | 7 |
| 141 | 113 | 19 | 1 |
| 142 | 96 | 8 | 8 |
| 143 | 108 | 8 | 26 |
| 144 | 119 | 4 | 35 |
| 145 | 138 | 3 | 4 |
| 146 | 146 | 0 | 4 |
| 147 | 180 | 3 | 4 |
| 148 | 151 | 4 | 5 |
| 149 | 162 | 2 | 4 |
| 150 | 195 | 4 | 4 |
| 151 | 199 | 5 | 7 |
| 152 | 197 | 0 | 6 |
| 153 | 201 | 0 | 4 |
| 154 | 209 | 4 | 4 |
| 155 | 129 | 3 | 6 |
| 156 | 139 | 12 | 6 |
| 157 | 156 | 13 | 4 |
| 158 | 137 | 1 | 8 |
| 159 | 148 | 5 | 28 |
| 160 | 160 | 2 | 36 |
| 161 | 95 | 3 | 54 |
| 162 | 109 | 2 | 80 |
| 163 | 121 | 5 | 92 |
| 164 | 97 | 7 | 8 |
| 165 | 115 | 27 | 21 |
| 166 | 94 | 58 | 6 |
| 167 | 107 | 63 | 1 |
| 168 | 112 | 69 | 3 |
| 169 | 59 | 98 | 7 |
| 170 | 75 | 105 | 7 |
| 171 | 26 | 26 | 26 |
| 172 | 29 | 24 | 22 |
| 173 | 82 | 120 | 2 |
| 174 | 56 | 35 | 7 |
| 175 | 79 | 63 | 17 |
| 176 | 56 | 0 | 49 |
| 177 | 79 | 7 | 73 |
| 178 | 54 | 4 | 125 |
| 179 | 68 | 8 | 134 |
| 180 | 82 | 4 | 150 |
| 181 | 24 | 1 | 177 |
| 182 | 33 | 2 | 174 |
| 183 | 43 | 4 | 177 |
| 184 | 28 | 2 | 104 |
| 185 | 51 | 4 | 124 |
| 186 | 25 | 36 | 47 |
| 187 | 50 | 55 | 66 |
| 188 | 25 | 97 | 10 |
| 189 | 39 | 120 | 19 |

-continued

APPENDIX C
Dbase.rgb: transparency precursor data

| Patch # | R | G | B |
|---|---|---|---|
| 190 | 18 | 172 | 8 |
| 191 | 34 | 199 | 13 |
| 192 | 55 | 217 | 29 |
| 193 | 53 | 223 | 52 |
| 194 | 36 | 221 | 36 |
| 195 | 18 | 195 | 13 |
| 196 | 42 | 220 | 36 |
| 197 | 22 | 200 | 14 |
| 198 | 51 | 221 | 43 |
| 199 | 154 | 238 | 133 |
| 200 | 96 | 230 | 82 |
| 201 | 14 | 120 | 48 |
| 202 | 14 | 119 | 55 |
| 203 | 14 | 124 | 56 |
| 204 | 7 | 45 | 93 |
| 205 | 31 | 31 | 31 |
| 206 | 35 | 29 | 28 |
| 207 | 5 | 62 | 101 |
| 208 | 13 | 68 | 113 |
| 209 | 4 | 8 | 170 |
| 210 | 9 | 3 | 182 |
| 211 | 15 | 9 | 195 |
| 212 | 5 | 8 | 171 |
| 213 | 7 | 1 | 162 |
| 214 | 10 | 7 | 170 |
| 215 | 11 | 5 | 182 |
| 216 | 19 | 3 | 177 |
| 217 | 13 | 4 | 170 |
| 218 | 14 | 5 | 168 |
| 219 | 18 | 4 | 170 |
| 220 | 21 | 7 | 174 |
| 221 | 27 | 4 | 181 |
| 222 | 6 | 1 | 180 |
| 223 | 12 | 3 | 186 |
| 224 | 17 | 6 | 173 |
| 225 | 6 | 13 | 169 |
| 226 | 10 | 31 | 169 |
| 227 | 11 | 48 | 177 |
| 228 | 9 | 102 | 89 |
| 229 | 12 | 112 | 97 |
| 230 | 17 | 119 | 112 |
| 231 | 21 | 199 | 31 |
| 232 | 24 | 209 | 51 |
| 233 | 37 | 221 | 67 |
| 234 | 35 | 220 | 31 |
| 235 | 24 | 205 | 17 |
| 236 | 34 | 215 | 31 |
| 237 | 26 | 209 | 24 |
| 238 | 23 | 200 | 17 |
| 239 | 36 | 36 | 36 |
| 240 | 40 | 35 | 34 |
| 241 | 90 | 229 | 81 |
| 242 | 17 | 198 | 15 |
| 243 | 27 | 214 | 30 |
| 244 | 152 | 238 | 132 |
| 245 | 106 | 231 | 81 |
| 246 | 48 | 215 | 25 |
| 247 | 16 | 171 | 9 |
| 248 | 27 | 211 | 27 |
| 249 | 21 | 90 | 36 |
| 250 | 36 | 110 | 61 |
| 251 | 26 | 23 | 90 |
| 252 | 52 | 51 | 116 |
| 253 | 25 | 4 | 172 |
| 254 | 49 | 7 | 183 |
| 255 | 29 | 5 | 173 |
| 256 | 38 | 6 | 175 |
| 257 | 55 | 5 | 183 |
| 258 | 53 | 7 | 177 |
| 259 | 63 | 4 | 183 |
| 260 | 79 | 4 | 187 |
| 261 | 63 | 4 | 100 |
| 262 | 85 | 4 | 121 |
| 263 | 59 | 30 | 44 |
| 264 | 83 | 60 | 63 |
| 265 | 67 | 89 | 5 |
| 266 | 93 | 112 | 17 |
| 267 | 65 | 157 | 1 |

-continued

APPENDIX C
Dbase.rgb: transparency precursor data

| Patch # | R | G | B |
|---|---|---|---|
| 268 | 84 | 168 | 4 |
| 269 | 91 | 186 | 6 |
| 270 | 97 | 96 | 7 |
| 271 | 110 | 103 | 1 |
| 272 | 118 | 115 | 4 |
| 273 | 42 | 42 | 42 |
| 274 | 44 | 41 | 39 |
| 275 | 89 | 35 | 5 |
| 276 | 113 | 62 | 13 |
| 277 | 91 | 6 | 44 |
| 278 | 114 | 2 | 70 |
| 279 | 88 | 4 | 116 |
| 280 | 106 | 3 | 133 |
| 281 | 118 | 4 | 147 |
| 282 | 136 | 2 | 57 |
| 283 | 148 | 1 | 85 |
| 284 | 160 | 2 | 96 |
| 285 | 130 | 6 | 12 |
| 286 | 155 | 1 | 27 |
| 287 | 129 | 46 | 4 |
| 288 | 140 | 60 | 0 |
| 289 | 154 | 71 | 5 |
| 290 | 179 | 1 | 1 |
| 291 | 190 | 1 | 4 |
| 292 | 203 | 3 | 1 |
| 293 | 189 | 3 | 5 |
| 294 | 199 | 4 | 28 |
| 295 | 212 | 4 | 39 |
| 296 | 198 | 1 | 6 |
| 297 | 193 | 3 | 0 |
| 298 | 198 | 1 | 5 |
| 299 | 199 | 4 | 4 |
| 300 | 211 | 5 | 3 |
| 301 | 204 | 7 | 1 |
| 302 | 203 | 4 | 8 |
| 303 | 204 | 3 | 6 |
| 304 | 197 | 5 | 5 |
| 305 | 203 | 2 | 1 |
| 306 | 202 | 3 | 0 |
| 307 | 47 | 47 | 47 |
| 308 | 49 | 47 | 45 |
| 309 | 199 | 5 | 4 |
| 310 | 199 | 5 | 4 |
| 311 | 203 | 5 | 4 |
| 312 | 228 | 7 | 2 |
| 313 | 255 | 1 | 6 |
| 314 | 203 | 0 | 0 |
| 315 | 207 | 23 | 21 |
| 316 | 206 | 4 | 4 |
| 317 | 208 | 7 | 6 |
| 318 | 213 | 6 | 3 |
| 319 | 214 | 5 | 6 |
| 320 | 199 | 0 | 3 |
| 321 | 208 | 1 | 8 |
| 322 | 216 | 10 | 0 |
| 323 | 202 | 1 | 4 |
| 324 | 213 | 3 | 44 |
| 325 | 215 | 4 | 40 |
| 326 | 177 | 4 | 85 |
| 327 | 189 | 0 | 91 |
| 328 | 207 | 7 | 97 |
| 329 | 172 | 1 | 5 |
| 330 | 198 | 4 | 22 |
| 331 | 173 | 53 | 4 |
| 332 | 183 | 64 | 7 |
| 333 | 192 | 73 | 2 |
| 334 | 128 | 92 | 3 |
| 335 | 141 | 104 | 3 |
| 336 | 153 | 115 | 0 |
| 337 | 128 | 32 | 11 |
| 338 | 147 | 63 | 18 |
| 339 | 124 | 4 | 50 |
| 340 | 147 | 0 | 72 |
| 341 | 52 | 52 | 52 |
| 342 | 55 | 52 | 51 |
| 343 | 123 | 5 | 129 |
| 344 | 143 | 3 | 142 |
| 345 | 157 | 6 | 155 |

APPENDIX C
Dbase.rgb: transparency precursor data

| Patch # | R | G | B |
|---|---|---|---|
| 346 | 89 | 2 | 179 |
| 347 | 104 | 7 | 189 |
| 348 | 120 | 1 | 187 |
| 349 | 94 | 8 | 101 |
| 350 | 115 | 2 | 129 |
| 351 | 86 | 28 | 42 |
| 352 | 113 | 52 | 62 |
| 353 | 92 | 89 | 5 |
| 354 | 116 | 111 | 18 |
| 355 | 93 | 147 | 1 |
| 356 | 111 | 155 | 1 |
| 357 | 121 | 166 | 3 |
| 358 | 101 | 229 | 62 |
| 359 | 94 | 221 | 28 |
| 360 | 79 | 200 | 11 |
| 361 | 52 | 148 | 5 |
| 362 | 78 | 172 | 13 |
| 363 | 60 | 83 | 34 |
| 364 | 85 | 105 | 61 |
| 365 | 58 | 33 | 84 |
| 366 | 81 | 59 | 111 |
| 367 | 61 | 6 | 170 |
| 368 | 84 | 4 | 190 |
| 369 | 62 | 8 | 180 |
| 370 | 68 | 7 | 193 |
| 371 | 90 | 1 | 183 |
| 372 | 38 | 1 | 172 |
| 373 | 52 | 5 | 177 |
| 374 | 64 | 2 | 182 |
| 375 | 57 | 57 | 57 |
| 376 | 61 | 58 | 57 |
| 377 | 22 | 7 | 173 |
| 378 | 38 | 4 | 186 |
| 379 | 22 | 12 | 145 |
| 380 | 45 | 40 | 165 |
| 381 | 19 | 83 | 83 |
| 382 | 38 | 102 | 111 |
| 383 | 12 | 151 | 25 |
| 384 | 18 | 179 | 33 |
| 385 | 17 | 191 | 14 |
| 386 | 56 | 224 | 57 |
| 387 | 92 | 228 | 82 |
| 388 | 24 | 198 | 17 |
| 389 | 45 | 221 | 44 |
| 390 | 28 | 215 | 33 |
| 391 | 18 | 194 | 16 |
| 392 | 92 | 230 | 82 |
| 393 | 18 | 194 | 16 |
| 394 | 51 | 223 | 51 |
| 395 | 29 | 215 | 31 |
| 396 | 58 | 225 | 56 |
| 397 | 25 | 209 | 26 |
| 398 | 18 | 197 | 15 |
| 399 | 31 | 218 | 32 |
| 400 | 61 | 225 | 57 |
| 401 | 24 | 206 | 21 |
| 402 | 26 | 209 | 25 |
| 403 | 62 | 225 | 58 |
| 404 | 26 | 209 | 25 |
| 405 | 25 | 206 | 24 |
| 406 | 19 | 191 | 14 |
| 407 | 19 | 191 | 15 |
| 408 | 19 | 191 | 15 |
| 409 | 62 | 62 | 62 |
| 410 | 67 | 63 | 63 |
| 411 | 38 | 222 | 42 |
| 412 | 22 | 209 | 38 |
| 413 | 16 | 201 | 33 |
| 414 | 24 | 217 | 50 |
| 415 | 5 | 167 | 96 |
| 416 | 6 | 177 | 104 |
| 417 | 7 | 188 | 116 |
| 418 | 6 | 92 | 141 |
| 419 | 0 | 101 | 146 |
| 420 | 6 | 107 | 159 |
| 421 | 7 | 15 | 195 |
| 422 | 3 | 16 | 193 |
| 423 | 14 | 24 | 204 |
| 424 | 6 | 0 | 176 |
| 425 | 10 | 1 | 169 |
| 426 | 20 | 1 | 175 |
| 427 | 18 | 7 | 170 |
| 428 | 18 | 5 | 168 |
| 429 | 18 | 7 | 172 |
| 430 | 23 | 3 | 168 |
| 431 | 17 | 3 | 174 |
| 432 | 22 | 1 | 168 |
| 433 | 22 | 3 | 173 |
| 434 | 25 | 5 | 168 |
| 435 | 22 | 6 | 173 |
| 436 | 25 | 0 | 175 |
| 437 | 30 | 1 | 182 |
| 438 | 22 | 5 | 173 |
| 439 | 32 | 2 | 189 |
| 440 | 34 | 1 | 171 |
| 441 | 21 | 4 | 171 |
| 442 | 28 | 1 | 180 |
| 443 | 68 | 68 | 68 |
| 444 | 73 | 70 | 70 |
| 445 | 30 | 5 | 176 |
| 446 | 5 | 6 | 167 |
| 447 | 14 | 7 | 179 |
| 448 | 11 | 0 | 182 |
| 449 | 17 | 5 | 181 |
| 450 | 25 | 1 | 190 |
| 451 | 4 | 2 | 187 |
| 452 | 11 | 1 | 178 |
| 453 | 20 | 11 | 194 |
| 454 | 7 | 90 | 206 |
| 455 | 1 | 92 | 209 |
| 456 | 3 | 95 | 203 |
| 457 | 4 | 157 | 136 |
| 458 | 4 | 161 | 143 |
| 459 | 3 | 171 | 154 |
| 460 | 59 | 224 | 105 |
| 461 | 30 | 218 | 103 |
| 462 | 23 | 212 | 92 |
| 463 | 34 | 221 | 45 |
| 464 | 17 | 200 | 33 |
| 465 | 19 | 201 | 24 |
| 466 | 19 | 201 | 17 |
| 467 | 54 | 223 | 50 |
| 468 | 24 | 208 | 23 |
| 469 | 26 | 212 | 26 |
| 470 | 94 | 230 | 81 |
| 471 | 61 | 225 | 56 |
| 472 | 34 | 219 | 31 |
| 473 | 33 | 219 | 31 |
| 474 | 92 | 230 | 81 |
| 475 | 29 | 216 | 30 |
| 476 | 28 | 212 | 30 |
| 477 | 73 | 73 | 73 |
| 478 | 79 | 77 | 77 |
| 479 | 15 | 190 | 12 |
| 480 | 55 | 225 | 57 |
| 481 | 17 | 198 | 16 |
| 482 | 11 | 141 | 81 |
| 483 | 24 | 163 | 101 |
| 484 | 26 | 73 | 128 |
| 485 | 47 | 95 | 150 |
| 486 | 33 | 40 | 213 |
| 487 | 47 | 10 | 198 |
| 488 | 28 | 4 | 173 |
| 489 | 56 | 4 | 179 |
| 490 | 57 | 8 | 211 |
| 491 | 55 | 4 | 190 |
| 492 | 79 | 7 | 182 |
| 493 | 65 | 6 | 175 |
| 494 | 85 | 6 | 190 |
| 495 | 81 | 4 | 182 |
| 496 | 109 | 7 | 189 |
| 497 | 125 | 2 | 184 |
| 498 | 55 | 7 | 175 |
| 499 | 84 | 1 | 198 |
| 500 | 60 | 9 | 143 |
| 501 | 83 | 31 | 166 |

APPENDIX C
Dbase.rgb: transparency precursor data

| Patch # | R | G | B |
|---|---|---|---|
| 502 | 63 | 74 | 84 |
| 503 | 89 | 99 | 113 |
| 504 | 51 | 135 | 21 |
| 505 | 50 | 159 | 28 |
| 506 | 156 | 238 | 132 |
| 507 | 65 | 206 | 12 |
| 508 | 63 | 221 | 37 |
| 509 | 60 | 207 | 15 |
| 510 | 35 | 217 | 31 |
| 511 | 78 | 78 | 78 |
| 512 | 85 | 83 | 83 |
| 513 | 102 | 205 | 12 |
| 514 | 124 | 228 | 37 |
| 515 | 127 | 227 | 32 |
| 516 | 97 | 131 | 6 |
| 517 | 123 | 151 | 14 |
| 518 | 94 | 76 | 38 |
| 519 | 119 | 98 | 68 |
| 520 | 94 | 13 | 89 |
| 521 | 114 | 35 | 117 |
| 522 | 97 | 3 | 172 |
| 523 | 120 | 5 | 192 |
| 524 | 101 | 7 | 186 |
| 525 | 112 | 7 | 188 |
| 526 | 133 | 7 | 189 |
| 527 | 138 | 1 | 191 |
| 528 | 152 | 3 | 200 |
| 529 | 167 | 1 | 193 |
| 530 | 130 | 7 | 109 |
| 531 | 152 | 2 | 130 |
| 532 | 126 | 17 | 45 |
| 533 | 151 | 54 | 60 |
| 534 | 130 | 88 | 6 |
| 535 | 153 | 110 | 15 |
| 536 | 132 | 141 | 8 |
| 537 | 147 | 152 | 2 |
| 538 | 160 | 164 | 1 |
| 539 | 164 | 95 | 1 |
| 540 | 178 | 105 | 7 |
| 541 | 191 | 117 | 7 |
| 542 | 166 | 26 | 6 |
| 543 | 183 | 60 | 14 |
| 544 | 164 | 0 | 47 |
| 545 | 83 | 83 | 83 |
| 546 | 91 | 90 | 90 |
| 547 | 194 | 7 | 79 |
| 548 | 172 | 4 | 139 |
| 549 | 185 | 1 | 143 |
| 550 | 202 | 4 | 154 |
| 551 | 215 | 5 | 88 |
| 552 | 214 | 5 | 92 |
| 553 | 216 | 2 | 95 |
| 554 | 213 | 5 | 9 |
| 555 | 221 | 4 | 26 |
| 556 | 217 | 32 | 3 |
| 557 | 224 | 45 | 2 |
| 558 | 227 | 61 | 2 |
| 559 | 211 | 7 | 2 |
| 560 | 205 | 4 | 4 |
| 561 | 214 | 1 | 5 |
| 562 | 220 | 8 | 10 |
| 563 | 224 | 18 | 10 |
| 564 | 216 | 1 | 26 |
| 565 | 216 | 1 | 22 |
| 566 | 210 | 6 | 52 |
| 567 | 219 | 4 | 46 |
| 568 | 218 | 1 | 55 |
| 569 | 217 | 5 | 94 |
| 570 | 216 | 6 | 92 |
| 571 | 206 | 4 | 121 |
| 572 | 214 | 1 | 83 |
| 573 | 215 | 1 | 106 |
| 574 | 222 | 12 | 13 |
| 575 | 219 | 22 | 29 |
| 576 | 223 | 19 | 43 |
| 577 | 219 | 28 | 4 |
| 578 | 213 | 31 | 4 |
| 579 | 88 | 88 | 88 |
| 580 | 98 | 97 | 97 |
| 581 | 218 | 73 | 1 |
| 582 | 215 | 52 | 4 |
| 583 | 214 | 82 | 2 |
| 584 | 208 | 87 | 4 |
| 585 | 220 | 102 | 4 |
| 586 | 230 | 113 | 1 |
| 587 | 211 | 19 | 11 |
| 588 | 230 | 54 | 21 |
| 589 | 217 | 1 | 59 |
| 590 | 219 | 6 | 86 |
| 591 | 212 | 5 | 146 |
| 592 | 212 | 3 | 146 |
| 593 | 210 | 0 | 153 |
| 594 | 176 | 3 | 193 |
| 595 | 189 | 3 | 188 |
| 596 | 201 | 2 | 201 |
| 597 | 166 | 0 | 117 |
| 598 | 193 | 1 | 134 |
| 599 | 163 | 17 | 44 |
| 600 | 180 | 60 | 65 |
| 601 | 163 | 87 | 4 |
| 602 | 181 | 110 | 15 |
| 603 | 168 | 147 | 4 |
| 604 | 180 | 150 | 0 |
| 605 | 190 | 161 | 1 |
| 606 | 129 | 193 | 9 |
| 607 | 147 | 214 | 18 |
| 608 | 159 | 229 | 32 |
| 609 | 130 | 132 | 5 |
| 610 | 151 | 152 | 16 |
| 611 | 120 | 79 | 29 |
| 612 | 143 | 98 | 57 |
| 613 | 94 | 94 | 94 |
| 614 | 104 | 103 | 104 |
| 615 | 122 | 11 | 89 |
| 616 | 146 | 42 | 115 |
| 617 | 124 | 4 | 172 |
| 618 | 151 | 6 | 190 |
| 619 | 151 | 6 | 184 |
| 620 | 156 | 4 | 189 |
| 621 | 160 | 4 | 191 |
| 622 | 140 | 7 | 189 |
| 623 | 192 | 7 | 185 |
| 624 | 173 | 8 | 189 |
| 625 | 90 | 1 | 182 |
| 626 | 115 | 3 | 190 |
| 627 | 91 | 3 | 141 |
| 628 | 114 | 19 | 166 |
| 629 | 88 | 69 | 89 |
| 630 | 115 | 95 | 117 |
| 631 | 98 | 122 | 40 |
| 632 | 119 | 145 | 58 |
| 633 | 94 | 204 | 17 |
| 634 | 139 | 235 | 80 |
| 635 | 87 | 208 | 17 |
| 636 | 101 | 206 | 15 |
| 637 | 127 | 233 | 78 |
| 638 | 43 | 220 | 36 |
| 639 | 23 | 194 | 13 |
| 640 | 75 | 226 | 65 |
| 641 | 75 | 226 | 65 |
| 642 | 26 | 209 | 21 |
| 643 | 71 | 225 | 56 |
| 644 | 24 | 197 | 14 |
| 645 | 57 | 223 | 55 |
| 646 | 19 | 189 | 14 |
| 647 | 99 | 99 | 99 |
| 648 | 110 | 109 | 110 |
| 649 | 36 | 126 | 76 |
| 650 | 45 | 155 | 93 |
| 651 | 56 | 74 | 132 |
| 652 | 81 | 91 | 149 |
| 653 | 53 | 3 | 196 |
| 654 | 79 | 19 | 211 |
| 655 | 64 | 7 | 188 |
| 656 | 96 | 4 | 193 |
| 657 | 98 | 0 | 177 |

APPENDIX C
Dbase.rgb: transparency precursor data

| Patch # | R | G | B |
|---------|-----|-----|-----|
| 658 | 113 | 6 | 192 |
| 659 | 157 | 4 | 193 |
| 660 | 125 | 4 | 184 |
| 661 | 156 | 4 | 195 |
| 662 | 35 | 5 | 171 |
| 663 | 54 | 1 | 186 |
| 664 | 73 | 1 | 195 |
| 665 | 27 | 6 | 180 |
| 666 | 62 | 7 | 208 |
| 667 | 17 | 63 | 193 |
| 668 | 39 | 86 | 210 |
| 669 | 17 | 129 | 132 |
| 670 | 37 | 148 | 146 |
| 671 | 92 | 230 | 115 |
| 672 | 93 | 230 | 117 |
| 673 | 33 | 219 | 35 |
| 674 | 33 | 219 | 34 |
| 675 | 55 | 224 | 52 |
| 676 | 20 | 198 | 16 |
| 677 | 50 | 222 | 44 |
| 678 | 47 | 222 | 44 |
| 679 | 28 | 213 | 29 |
| 680 | 23 | 202 | 21 |
| 681 | 104 | 104 | 104 |
| 682 | 115 | 115 | 116 |
| 683 | 25 | 212 | 28 |
| 684 | 88 | 230 | 79 |
| 685 | 89 | 230 | 92 |
| 686 | 57 | 224 | 87 |
| 687 | 17 | 197 | 33 |
| 688 | 85 | 232 | 146 |
| 689 | 84 | 233 | 157 |
| 690 | 20 | 211 | 140 |
| 691 | 1 | 151 | 185 |
| 692 | 0 | 153 | 196 |
| 693 | 0 | 161 | 208 |
| 694 | 0 | 62 | 203 |
| 695 | 7 | 65 | 205 |
| 696 | 16 | 91 | 214 |
| 697 | 13 | 13 | 200 |
| 698 | 14 | 22 | 207 |
| 699 | 17 | 83 | 215 |
| 700 | 16 | 28 | 204 |
| 701 | 20 | 54 | 211 |
| 702 | 7 | 82 | 211 |
| 703 | 8 | 116 | 206 |
| 704 | 10 | 160 | 205 |
| 705 | 14 | 149 | 210 |
| 706 | 28 | 133 | 211 |
| 707 | 6 | 128 | 207 |
| 708 | 7 | 131 | 214 |
| 709 | 5 | 141 | 203 |
| 710 | 28 | 221 | 171 |
| 711 | 85 | 236 | 187 |
| 712 | 11 | 205 | 189 |
| 713 | 30 | 217 | 87 |
| 714 | 20 | 206 | 99 |
| 715 | 109 | 109 | 109 |
| 716 | 120 | 120 | 122 |
| 717 | 65 | 228 | 130 |
| 718 | 54 | 224 | 53 |
| 719 | 89 | 230 | 79 |
| 720 | 26 | 214 | 29 |
| 721 | 26 | 214 | 29 |
| 722 | 19 | 203 | 20 |
| 723 | 27 | 214 | 30 |
| 724 | 28 | 215 | 30 |
| 725 | 23 | 204 | 24 |
| 726 | 28 | 217 | 53 |
| 727 | 36 | 220 | 57 |
| 728 | 20 | 209 | 128 |
| 729 | 54 | 228 | 148 |
| 730 | 11 | 122 | 177 |
| 731 | 29 | 141 | 201 |
| 732 | 35 | 37 | 213 |
| 733 | 47 | 75 | 217 |
| 734 | 37 | 1 | 194 |
| 735 | 48 | 15 | 205 |
| 736 | 56 | 30 | 207 |
| 737 | 87 | 1 | 184 |
| 738 | 116 | 4 | 194 |
| 739 | 130 | 6 | 201 |
| 740 | 62 | 1 | 186 |
| 741 | 97 | 13 | 214 |
| 742 | 61 | 51 | 183 |
| 743 | 84 | 78 | 203 |
| 744 | 64 | 114 | 127 |
| 745 | 87 | 133 | 147 |
| 746 | 24 | 198 | 58 |
| 747 | 53 | 221 | 88 |
| 748 | 19 | 186 | 13 |
| 749 | 114 | 114 | 114 |
| 750 | 126 | 125 | 127 |
| 751 | 55 | 223 | 54 |
| 752 | 69 | 226 | 65 |
| 753 | 17 | 187 | 12 |
| 754 | 28 | 213 | 29 |
| 755 | 29 | 213 | 29 |
| 756 | 70 | 226 | 65 |
| 757 | 70 | 226 | 64 |
| 758 | 92 | 229 | 81 |
| 759 | 29 | 210 | 25 |
| 760 | 108 | 229 | 50 |
| 761 | 105 | 213 | 20 |
| 762 | 70 | 188 | 22 |
| 763 | 101 | 220 | 39 |
| 764 | 96 | 119 | 89 |
| 765 | 119 | 139 | 118 |
| 766 | 92 | 61 | 132 |
| 767 | 117 | 85 | 152 |
| 768 | 93 | 4 | 199 |
| 769 | 115 | 14 | 216 |
| 770 | 110 | 5 | 181 |
| 771 | 133 | 3 | 189 |
| 772 | 186 | 4 | 190 |
| 773 | 207 | 5 | 185 |
| 774 | 217 | 3 | 200 |
| 775 | 213 | 1 | 185 |
| 776 | 198 | 2 | 193 |
| 777 | 161 | 2 | 189 |
| 778 | 144 | 4 | 181 |
| 779 | 156 | 2 | 185 |
| 780 | 134 | 1 | 198 |
| 781 | 151 | 7 | 177 |
| 782 | 123 | 5 | 141 |
| 783 | 120 | 120 | 120 |
| 784 | 131 | 131 | 133 |
| 785 | 147 | 18 | 162 |
| 786 | 124 | 66 | 85 |
| 787 | 144 | 96 | 112 |
| 788 | 128 | 122 | 39 |
| 789 | 150 | 142 | 66 |
| 790 | 131 | 183 | 7 |
| 791 | 154 | 219 | 24 |
| 792 | 133 | 204 | 12 |
| 793 | 148 | 204 | 12 |
| 794 | 160 | 224 | 27 |
| 795 | 173 | 181 | 6 |
| 796 | 183 | 202 | 10 |
| 797 | 192 | 220 | 18 |
| 798 | 163 | 128 | 4 |
| 799 | 188 | 149 | 14 |
| 800 | 159 | 76 | 37 |
| 801 | 180 | 96 | 65 |
| 802 | 159 | 6 | 105 |
| 803 | 178 | 36 | 116 |
| 804 | 171 | 4 | 177 |
| 805 | 193 | 3 | 189 |
| 806 | 175 | 3 | 191 |
| 807 | 188 | 6 | 181 |
| 808 | 200 | 0 | 182 |
| 809 | 212 | 4 | 179 |
| 810 | 215 | 7 | 192 |
| 811 | 215 | 7 | 179 |
| 812 | 214 | 8 | 115 |
| 813 | 213 | 0 | 132 |

-continued

APPENDIX C
Dbase.rgb: transparency precursor data

| Patch # | R | G | B |
|---|---|---|---|
| 814 | 206 | 8 | 46 |
| 815 | 228 | 41 | 66 |
| 816 | 194 | 81 | 6 |
| 817 | 125 | 125 | 125 |
| 818 | 137 | 136 | 138 |
| 819 | 226 | 105 | 9 |
| 820 | 205 | 137 | 7 |
| 821 | 217 | 145 | 6 |
| 822 | 230 | 157 | 4 |
| 823 | 225 | 90 | 1 |
| 824 | 230 | 117 | 4 |
| 825 | 225 | 153 | 7 |
| 826 | 229 | 109 | 2 |
| 827 | 228 | 117 | 4 |
| 828 | 217 | 34 | 8 |
| 829 | 228 | 56 | 21 |
| 830 | 233 | 73 | 27 |
| 831 | 218 | 6 | 53 |
| 832 | 221 | 5 | 72 |
| 833 | 210 | 7 | 91 |
| 834 | 208 | 1 | 147 |
| 835 | 213 | 5 | 164 |
| 836 | 214 | 4 | 220 |
| 837 | 205 | 4 | 147 |
| 838 | 207 | 7 | 176 |
| 839 | 204 | 4 | 188 |
| 840 | 216 | 4 | 187 |
| 841 | 214 | 7 | 179 |
| 842 | 222 | 2 | 219 |
| 843 | 214 | 3 | 194 |
| 844 | 213 | 0 | 116 |
| 845 | 206 | 3 | 128 |
| 846 | 216 | 8 | 142 |
| 847 | 213 | 7 | 52 |
| 848 | 215 | 27 | 68 |
| 849 | 229 | 40 | 56 |
| 850 | 216 | 79 | 4 |
| 851 | 130 | 130 | 130 |
| 852 | 142 | 141 | 143 |
| 853 | 230 | 95 | 5 |
| 854 | 226 | 106 | 11 |
| 855 | 217 | 138 | 6 |
| 856 | 237 | 148 | 4 |
| 857 | 220 | 160 | 1 |
| 858 | 219 | 147 | 2 |
| 859 | 219 | 155 | 2 |
| 860 | 207 | 184 | 4 |
| 861 | 213 | 207 | 8 |
| 862 | 230 | 221 | 15 |
| 863 | 202 | 133 | 4 |
| 864 | 223 | 153 | 9 |
| 865 | 197 | 76 | 34 |
| 866 | 225 | 97 | 57 |
| 867 | 204 | 4 | 97 |
| 868 | 226 | 30 | 115 |
| 869 | 214 | 1 | 175 |
| 870 | 217 | 3 | 188 |
| 871 | 215 | 2 | 188 |
| 872 | 206 | 5 | 191 |
| 873 | 215 | 8 | 181 |
| 874 | 174 | 1 | 194 |
| 875 | 185 | 7 | 189 |
| 876 | 198 | 4 | 180 |
| 877 | 174 | 3 | 193 |
| 878 | 192 | 1 | 185 |
| 879 | 161 | 1 | 145 |
| 880 | 182 | 18 | 165 |
| 881 | 157 | 71 | 87 |
| 882 | 176 | 94 | 110 |
| 883 | 153 | 113 | 35 |
| 884 | 175 | 135 | 65 |
| 885 | 135 | 135 | 135 |
| 886 | 148 | 148 | 149 |
| 887 | 162 | 173 | 7 |
| 888 | 185 | 207 | 15 |
| 889 | 171 | 218 | 19 |
| 890 | 180 | 226 | 23 |
| 891 | 188 | 211 | 11 |
| 892 | 89 | 214 | 19 |
| 893 | 90 | 226 | 52 |
| 894 | 159 | 206 | 12 |
| 895 | 157 | 233 | 43 |
| 896 | 163 | 234 | 42 |
| 897 | 148 | 236 | 77 |
| 898 | 138 | 207 | 16 |
| 899 | 127 | 170 | 25 |
| 900 | 145 | 203 | 33 |
| 902 | 148 | 137 | 123 |
| 903 | 123 | 56 | 135 |
| 904 | 146 | 84 | 152 |
| 905 | 122 | 6 | 200 |
| 906 | 148 | 12 | 217 |
| 907 | 143 | 5 | 184 |
| 908 | 149 | 4 | 187 |
| 909 | 174 | 7 | 180 |
| 910 | 170 | 4 | 183 |
| 911 | 153 | 6 | 183 |
| 912 | 138 | 1 | 196 |
| 913 | 149 | 4 | 190 |
| 914 | 158 | 2 | 198 |
| 915 | 200 | 7 | 193 |
| 916 | 168 | 4 | 185 |
| 917 | 89 | 0 | 189 |
| 918 | 106 | 17 | 204 |
| 919 | 141 | 141 | 141 |
| 920 | 153 | 154 | 155 |
| 921 | 89 | 44 | 181 |
| 922 | 114 | 77 | 200 |
| 923 | 95 | 112 | 127 |
| 924 | 118 | 131 | 145 |
| 925 | 38 | 175 | 43 |
| 926 | 75 | 201 | 81 |
| 927 | 93 | 228 | 63 |
| 928 | 52 | 215 | 28 |
| 929 | 40 | 221 | 38 |
| 930 | 105 | 231 | 81 |
| 931 | 34 | 203 | 19 |
| 932 | 34 | 220 | 39 |
| 933 | 44 | 221 | 46 |
| 934 | 34 | 219 | 43 |
| 935 | 44 | 221 | 53 |
| 936 | 54 | 223 | 79 |
| 937 | 30 | 174 | 118 |
| 938 | 31 | 210 | 145 |
| 939 | 57 | 107 | 173 |
| 940 | 81 | 127 | 198 |
| 941 | 54 | 26 | 201 |
| 942 | 77 | 68 | 209 |
| 943 | 83 | 1 | 189 |
| 944 | 101 | 16 | 212 |
| 945 | 103 | 25 | 210 |
| 946 | 31 | 56 | 210 |
| 947 | 34 | 81 | 214 |
| 948 | 62 | 93 | 207 |
| 949 | 17 | 111 | 215 |
| 950 | 14 | 135 | 216 |
| 951 | 8 | 190 | 164 |
| 952 | 33 | 227 | 187 |
| 953 | 146 | 146 | 146 |
| 954 | 159 | 160 | 161 |
| 955 | 23 | 210 | 100 |
| 956 | 11 | 202 | 127 |
| 957 | 23 | 206 | 26 |
| 958 | 55 | 224 | 54 |
| 959 | 40 | 223 | 45 |
| 960 | 13 | 198 | 47 |
| 961 | 23 | 211 | 49 |
| 962 | 52 | 223 | 114 |
| 963 | 29 | 217 | 99 |
| 964 | 28 | 217 | 114 |
| 965 | 25 | 221 | 159 |
| 966 | 24 | 222 | 166 |
| 967 | 10 | 202 | 171 |
| 968 | 4 | 193 | 221 |
| 969 | 8 | 206 | 206 |
| 970 | 21 | 226 | 226 |

APPENDIX C
Dbase.rgb: transparency precursor data

| Patch # | R | G | B |
|---|---|---|---|
| 971 | 3 | 122 | 206 |
| 972 | 7 | 142 | 216 |
| 973 | 2 | 140 | 206 |
| 974 | 6 | 120 | 214 |
| 975 | 6 | 133 | 214 |
| 976 | 5 | 169 | 205 |
| 977 | 1 | 174 | 218 |
| 978 | 17 | 222 | 217 |
| 979 | 4 | 178 | 211 |
| 980 | 10 | 203 | 208 |
| 981 | 64 | 237 | 227 |
| 982 | 19 | 215 | 226 |
| 983 | 13 | 209 | 213 |
| 984 | 69 | 229 | 144 |
| 985 | 35 | 220 | 123 |
| 986 | 16 | 206 | 145 |
| 987 | 151 | 151 | 151 |
| 988 | 163 | 165 | 166 |
| 989 | 11 | 199 | 136 |
| 990 | 30 | 223 | 158 |
| 991 | 13 | 199 | 57 |
| 992 | 12 | 201 | 118 |
| 993 | 41 | 223 | 126 |
| 994 | 8 | 196 | 148 |
| 995 | 9 | 200 | 175 |
| 996 | 7 | 180 | 223 |
| 997 | 6 | 199 | 213 |
| 998 | 19 | 103 | 210 |
| 999 | 13 | 106 | 209 |
| 1000 | 24 | 120 | 215 |
| 1001 | 65 | 36 | 201 |
| 1002 | 62 | 60 | 211 |
| 1003 | 104 | 75 | 218 |
| 1004 | 50 | 100 | 217 |
| 1005 | 84 | 117 | 218 |
| 1006 | 31 | 166 | 165 |
| 1007 | 22 | 198 | 189 |
| 1008 | 60 | 225 | 114 |
| 1009 | 24 | 210 | 124 |
| 1010 | 93 | 230 | 85 |
| 1011 | 28 | 209 | 43 |
| 1012 | 23 | 190 | 28 |
| 1013 | 97 | 230 | 82 |
| 1014 | 59 | 219 | 36 |
| 1015 | 48 | 215 | 32 |
| 1016 | 97 | 230 | 89 |
| 1017 | 30 | 202 | 32 |
| 1018 | 79 | 163 | 120 |
| 1019 | 124 | 175 | 146 |
| 1020 | 98 | 100 | 164 |
| 1021 | 156 | 156 | 156 |
| 1022 | 168 | 170 | 171 |
| 1023 | 118 | 121 | 191 |
| 1024 | 91 | 26 | 206 |
| 1025 | 110 | 52 | 203 |
| 1026 | 111 | 6 | 190 |
| 1027 | 106 | 12 | 211 |
| 1028 | 124 | 15 | 206 |
| 1029 | 154 | 2 | 196 |
| 1030 | 129 | 8 | 198 |
| 1031 | 139 | 4 | 192 |
| 1032 | 127 | 4 | 196 |
| 1033 | 145 | 9 | 207 |
| 1034 | 127 | 39 | 184 |
| 1035 | 149 | 75 | 200 |
| 1036 | 132 | 110 | 132 |
| 1037 | 152 | 129 | 150 |
| 1038 | 124 | 158 | 75 |
| 1039 | 150 | 185 | 114 |
| 1040 | 111 | 212 | 23 |
| 1041 | 144 | 235 | 78 |
| 1042 | 113 | 228 | 48 |
| 1043 | 140 | 231 | 47 |
| 1044 | 131 | 223 | 29 |
| 1045 | 181 | 241 | 75 |
| 1046 | 179 | 227 | 26 |
| 1047 | 196 | 223 | 21 |
| 1048 | 178 | 236 | 43 |
| 1049 | 195 | 243 | 75 |
| 1050 | 197 | 245 | 131 |
| 1051 | 189 | 233 | 32 |
| 1052 | 170 | 169 | 28 |
| 1053 | 191 | 189 | 39 |
| 1054 | 159 | 115 | 85 |
| 1055 | 161 | 161 | 161 |
| 1056 | 173 | 175 | 176 |
| 1057 | 179 | 129 | 108 |
| 1058 | 156 | 56 | 128 |
| 1059 | 176 | 76 | 149 |
| 1060 | 159 | 1 | 197 |
| 1061 | 186 | 7 | 217 |
| 1062 | 168 | 1 | 186 |
| 1063 | 189 | 5 | 190 |
| 1064 | 170 | 8 | 184 |
| 1065 | 174 | 0 | 190 |
| 1066 | 196 | 3 | 187 |
| 1067 | 181 | 7 | 188 |
| 1068 | 192 | 2 | 196 |
| 1069 | 214 | 4 | 188 |
| 1070 | 216 | 3 | 179 |
| 1071 | 211 | 7 | 179 |
| 1072 | 210 | 4 | 182 |
| 1073 | 216 | 0 | 187 |
| 1074 | 203 | 8 | 146 |
| 1075 | 225 | 14 | 159 |
| 1076 | 190 | 67 | 87 |
| 1077 | 220 | 86 | 109 |
| 1078 | 194 | 116 | 35 |
| 1079 | 221 | 136 | 63 |
| 1080 | 201 | 173 | 10 |
| 1081 | 225 | 202 | 12 |
| 1082 | 205 | 207 | 11 |
| 1083 | 218 | 246 | 74 |
| 1084 | 228 | 230 | 24 |
| 1085 | 245 | 192 | 6 |
| 1086 | 244 | 193 | 6 |
| 1087 | 248 | 230 | 25 |
| 1088 | 235 | 199 | 7 |
| 1089 | 167 | 167 | 167 |
| 1090 | 178 | 180 | 182 |
| 1091 | 231 | 209 | 10 |
| 1092 | 235 | 123 | 3 |
| 1093 | 216 | 138 | 6 |
| 1094 | 218 | 146 | 6 |
| 1095 | 234 | 71 | 37 |
| 1096 | 233 | 90 | 49 |
| 1097 | 226 | 103 | 54 |
| 1098 | 222 | 4 | 100 |
| 1099 | 224 | 32 | 105 |
| 1100 | 215 | 47 | 112 |
| 1101 | 217 | 1 | 173 |
| 1102 | 205 | 5 | 181 |
| 1103 | 218 | 7 | 184 |
| 1104 | 208 | 8 | 200 |
| 1105 | 218 | 2 | 191 |
| 1106 | 208 | 4 | 189 |
| 1107 | 204 | 1 | 188 |
| 1108 | 208 | 5 | 194 |
| 1109 | 216 | 6 | 189 |
| 1110 | 209 | 4 | 197 |
| 1111 | 211 | 3 | 187 |
| 1112 | 213 | 6 | 189 |
| 1113 | 204 | 4 | 189 |
| 1114 | 220 | 7 | 201 |
| 1115 | 213 | 4 | 186 |
| 1116 | 215 | 7 | 188 |
| 1117 | 218 | 6 | 144 |
| 1118 | 222 | 9 | 151 |
| 1119 | 216 | 17 | 163 |
| 1120 | 228 | 68 | 94 |
| 1121 | 219 | 80 | 96 |
| 1122 | 221 | 83 | 109 |
| 1123 | 172 | 172 | 172 |
| 1124 | 183 | 185 | 187 |
| 1125 | 234 | 115 | 30 |
| 1126 | 240 | 124 | 43 |

APPENDIX C
Dbase.rgb: transparency precursor data

| Patch # | R | G | B |
|---|---|---|---|
| 1127 | 238 | 133 | 58 |
| 1128 | 237 | 165 | 3 |
| 1129 | 246 | 178 | 5 |
| 1130 | 245 | 190 | 15 |
| 1131 | 240 | 252 | 121 |
| 1132 | 232 | 238 | 39 |
| 1133 | 244 | 221 | 16 |
| 1134 | 249 | 246 | 53 |
| 1135 | 226 | 229 | 23 |
| 1136 | 205 | 244 | 72 |
| 1137 | 212 | 210 | 12 |
| 1138 | 232 | 208 | 11 |
| 1139 | 210 | 224 | 20 |
| 1140 | 226 | 224 | 19 |
| 1141 | 199 | 240 | 48 |
| 1142 | 223 | 206 | 10 |
| 1143 | 196 | 163 | 25 |
| 1144 | 221 | 186 | 36 |
| 1145 | 190 | 111 | 83 |
| 1146 | 214 | 125 | 111 |
| 1147 | 191 | 50 | 133 |
| 1148 | 222 | 71 | 151 |
| 1149 | 206 | 2 | 202 |
| 1150 | 226 | 9 | 217 |
| 1151 | 210 | 4 | 187 |
| 1152 | 212 | 5 | 193 |
| 1153 | 255 | 6 | 255 |
| 1154 | 216 | 7 | 198 |
| 1155 | 205 | 7 | 187 |
| 1156 | 214 | 3 | 191 |
| 1157 | 177 | 177 | 177 |
| 1158 | 188 | 190 | 193 |
| 1159 | 213 | 6 | 181 |
| 1160 | 159 | 6 | 188 |
| 1161 | 168 | 8 | 187 |
| 1162 | 180 | 2 | 185 |
| 1163 | 160 | 7 | 192 |
| 1164 | 183 | 5 | 197 |
| 1165 | 158 | 48 | 182 |
| 1166 | 175 | 72 | 198 |
| 1167 | 153 | 113 | 130 |
| 1168 | 178 | 127 | 148 |
| 1169 | 161 | 159 | 95 |
| 1170 | 187 | 177 | 114 |
| 1171 | 168 | 238 | 60 |
| 1172 | 166 | 206 | 16 |
| 1173 | 162 | 226 | 32 |
| 1174 | 168 | 221 | 28 |
| 1175 | 179 | 211 | 21 |
| 1176 | 97 | 223 | 42 |
| 1177 | 76 | 202 | 23 |
| 1178 | 110 | 230 | 66 |
| 1179 | 104 | 229 | 73 |
| 1180 | 94 | 206 | 36 |
| 1181 | 133 | 149 | 135 |
| 1182 | 159 | 175 | 154 |
| 1183 | 129 | 104 | 169 |
| 1184 | 150 | 125 | 194 |
| 1185 | 122 | 36 | 203 |
| 1186 | 142 | 63 | 207 |
| 1187 | 136 | 1 | 192 |
| 1188 | 127 | 12 | 205 |
| 1189 | 132 | 22 | 208 |
| 1190 | 97 | 55 | 219 |
| 1191 | 182 | 182 | 182 |
| 1192 | 193 | 194 | 198 |
| 1193 | 95 | 46 | 210 |
| 1194 | 135 | 98 | 225 |
| 1195 | 89 | 95 | 219 |
| 1196 | 108 | 111 | 215 |
| 1197 | 83 | 149 | 163 |
| 1198 | 108 | 172 | 186 |
| 1199 | 151 | 240 | 162 |
| 1200 | 66 | 209 | 123 |
| 1201 | 20 | 189 | 21 |
| 1202 | 29 | 217 | 40 |
| 1203 | 94 | 230 | 88 |
| 1204 | 91 | 230 | 112 |
| 1205 | 23 | 207 | 111 |
| 1206 | 47 | 222 | 115 |
| 1207 | 48 | 228 | 157 |
| 1208 | 83 | 236 | 185 |
| 1209 | 28 | 157 | 218 |
| 1210 | 47 | 176 | 227 |
| 1211 | 46 | 95 | 214 |
| 1212 | 54 | 102 | 216 |
| 1213 | 94 | 104 | 206 |
| 1214 | 3 | 154 | 209 |
| 1215 | 3 | 167 | 214 |
| 1216 | 6 | 184 | 217 |
| 1217 | 62 | 237 | 215 |
| 1218 | 23 | 225 | 207 |
| 1219 | 39 | 224 | 145 |
| 1220 | 16 | 205 | 166 |
| 1221 | 49 | 229 | 172 |
| 1222 | 17 | 215 | 193 |
| 1223 | 15 | 207 | 177 |
| 1224 | 47 | 233 | 215 |
| 1225 | 187 | 187 | 187 |
| 1226 | 198 | 199 | 203 |
| 1227 | 7 | 201 | 195 |
| 1228 | 7 | 201 | 211 |
| 1229 | 14 | 216 | 215 |
| 1230 | 17 | 222 | 218 |
| 1231 | 57 | 236 | 226 |
| 1232 | 44 | 233 | 214 |
| 1233 | 18 | 222 | 208 |
| 1234 | 17 | 222 | 219 |
| 1235 | 38 | 230 | 212 |
| 1236 | 18 | 224 | 222 |
| 1237 | 24 | 227 | 218 |
| 1238 | 48 | 234 | 228 |
| 1239 | 10 | 204 | 221 |
| 1240 | 43 | 232 | 228 |
| 1241 | 43 | 232 | 228 |
| 1242 | 18 | 217 | 223 |
| 1243 | 34 | 229 | 225 |
| 1244 | 11 | 207 | 216 |
| 1245 | 11 | 204 | 220 |
| 1246 | 12 | 207 | 216 |
| 1247 | 47 | 233 | 221 |
| 1248 | 12 | 207 | 209 |
| 1249 | 14 | 211 | 217 |
| 1250 | 0 | 228 | 255 |
| 1251 | 24 | 224 | 198 |
| 1252 | 30 | 229 | 218 |
| 1253 | 52 | 236 | 224 |
| 1254 | 83 | 238 | 226 |
| 1255 | 15 | 208 | 210 |
| 1256 | 16 | 212 | 217 |
| 1257 | 16 | 146 | 208 |
| 1258 | 31 | 150 | 214 |
| 1259 | 193 | 193 | 193 |
| 1260 | 202 | 204 | 209 |
| 1261 | 50 | 155 | 217 |
| 1262 | 144 | 243 | 215 |
| 1263 | 78 | 238 | 230 |
| 1264 | 82 | 232 | 161 |
| 1265 | 12 | 197 | 150 |
| 1266 | 82 | 234 | 170 |
| 1267 | 98 | 230 | 117 |
| 1268 | 26 | 203 | 67 |
| 1269 | 77 | 227 | 108 |
| 1270 | 48 | 225 | 158 |
| 1271 | 50 | 223 | 177 |
| 1272 | 100 | 136 | 214 |
| 1273 | 121 | 169 | 233 |
| 1274 | 97 | 87 | 222 |
| 1275 | 120 | 82 | 216 |
| 1276 | 160 | 102 | 214 |
| 1277 | 121 | 30 | 201 |
| 1278 | 127 | 35 | 205 |
| 1279 | 138 | 70 | 211 |
| 1280 | 127 | 91 | 218 |
| 1281 | 150 | 116 | 218 |
| 1282 | 134 | 143 | 163 |

APPENDIX C
Dbase.rgb: transparency precursor data

| Patch # | R | G | B |
|---|---|---|---|
| 1283 | 155 | 172 | 186 |
| 1284 | 106 | 219 | 101 |
| 1285 | 135 | 213 | 133 |
| 1286 | 43 | 207 | 27 |
| 1287 | 0 | 210 | 30 |
| 1288 | 104 | 229 | 66 |
| 1289 | 160 | 232 | 41 |
| 1290 | 160 | 208 | 17 |
| 1291 | 173 | 233 | 45 |
| 1292 | 149 | 219 | 48 |
| 1293 | 198 | 198 | 198 |
| 1294 | 207 | 208 | 214 |
| 1295 | 175 | 210 | 43 |
| 1296 | 161 | 147 | 133 |
| 1297 | 182 | 166 | 146 |
| 1298 | 156 | 97 | 167 |
| 1299 | 175 | 115 | 187 |
| 1300 | 158 | 24 | 199 |
| 1301 | 182 | 53 | 207 |
| 1302 | 152 | 5 | 193 |
| 1303 | 164 | 8 | 212 |
| 1304 | 175 | 15 | 216 |
| 1305 | 205 | 1 | 178 |
| 1306 | 212 | 4 | 190 |
| 1307 | 221 | 4 | 209 |
| 1308 | 204 | 4 | 204 |
| 1309 | 222 | 2 | 197 |
| 1310 | 196 | 26 | 180 |
| 1311 | 222 | 55 | 199 |
| 1312 | 192 | 101 | 125 |
| 1313 | 217 | 119 | 143 |
| 1314 | 194 | 149 | 89 |
| 1315 | 219 | 169 | 108 |
| 1316 | 199 | 231 | 35 |
| 1317 | 223 | 222 | 20 |
| 1318 | 199 | 227 | 28 |
| 1319 | 208 | 206 | 15 |
| 1320 | 219 | 209 | 16 |
| 1321 | 241 | 239 | 44 |
| 1322 | 221 | 233 | 33 |
| 1323 | 253 | 218 | 17 |
| 1324 | 232 | 209 | 16 |
| 1325 | 233 | 246 | 75 |
| 1326 | 219 | 236 | 45 |
| 1327 | 203 | 203 | 203 |
| 1328 | 212 | 213 | 220 |
| 1329 | 216 | 237 | 42 |
| 1330 | 245 | 202 | 10 |
| 1331 | 234 | 240 | 44 |
| 1332 | 228 | 235 | 34 |
| 1333 | 248 | 240 | 44 |
| 1334 | 235 | 222 | 19 |
| 1335 | 242 | 221 | 19 |
| 1336 | 224 | 215 | 17 |
| 1337 | 245 | 227 | 24 |
| 1338 | 218 | 205 | 14 |
| 1339 | 218 | 216 | 19 |
| 1340 | 238 | 238 | 43 |
| 1341 | 244 | 253 | 123 |
| 1342 | 236 | 204 | 15 |
| 1343 | 234 | 159 | 27 |
| 1344 | 241 | 164 | 61 |
| 1345 | 234 | 170 | 124 |
| 1346 | 233 | 105 | 87 |
| 1347 | 239 | 112 | 101 |
| 1348 | 226 | 112 | 140 |
| 1349 | 233 | 46 | 129 |
| 1350 | 233 | 65 | 137 |
| 1351 | 235 | 69 | 143 |
| 1352 | 219 | 8 | 198 |
| 1353 | 220 | 7 | 202 |
| 1354 | 221 | 9 | 213 |
| 1355 | 206 | 2 | 193 |
| 1356 | 215 | 4 | 186 |
| 1357 | 212 | 8 | 183 |
| 1358 | 208 | 3 | 193 |
| 1359 | 212 | 2 | 187 |
| 1360 | 215 | 1 | 180 |
| 1361 | 208 | 208 | 208 |
| 1362 | 216 | 218 | 225 |
| 1363 | 212 | 0 | 179 |
| 1364 | 203 | 3 | 188 |
| 1365 | 211 | 6 | 187 |
| 1366 | 216 | 4 | 185 |
| 1367 | 211 | 7 | 187 |
| 1368 | 203 | 4 | 186 |
| 1369 | 214 | 8 | 196 |
| 1370 | 216 | 6 | 191 |
| 1371 | 216 | 4 | 191 |
| 1372 | 215 | 1 | 190 |
| 1373 | 207 | 6 | 190 |
| 1374 | 213 | 7 | 187 |
| 1375 | 217 | 4 | 190 |
| 1376 | 214 | 7 | 181 |
| 1377 | 216 | 8 | 186 |
| 1378 | 213 | 4 | 178 |
| 1379 | 215 | 5 | 193 |
| 1380 | 216 | 8 | 191 |
| 1381 | 213 | 6 | 179 |
| 1382 | 220 | 2 | 203 |
| 1383 | 207 | 1 | 189 |
| 1384 | 220 | 1 | 204 |
| 1385 | 228 | 25 | 178 |
| 1386 | 219 | 43 | 189 |
| 1387 | 226 | 58 | 199 |
| 1388 | 230 | 97 | 127 |
| 1389 | 238 | 106 | 133 |
| 1390 | 238 | 110 | 145 |
| 1391 | 230 | 147 | 102 |
| 1392 | 238 | 155 | 141 |
| 1393 | 226 | 166 | 112 |
| 1394 | 232 | 216 | 19 |
| 1395 | 213 | 213 | 213 |
| 1396 | 221 | 223 | 231 |
| 1397 | 243 | 235 | 38 |
| 1398 | 250 | 249 | 78 |
| 1399 | 233 | 243 | 54 |
| 1400 | 221 | 204 | 9 |
| 1401 | 241 | 240 | 42 |
| 1402 | 234 | 210 | 14 |
| 1403 | 234 | 203 | 12 |
| 1404 | 188 | 203 | 17 |
| 1405 | 196 | 236 | 43 |
| 1406 | 208 | 227 | 27 |
| 1407 | 195 | 207 | 54 |
| 1408 | 216 | 243 | 74 |
| 1409 | 192 | 143 | 128 |
| 1410 | 215 | 164 | 145 |
| 1411 | 188 | 91 | 167 |
| 1412 | 212 | 115 | 187 |
| 1413 | 194 | 27 | 214 |
| 1414 | 224 | 54 | 204 |
| 1415 | 192 | 1 | 195 |
| 1416 | 203 | 3 | 198 |
| 1417 | 216 | 8 | 209 |
| 1418 | 149 | 33 | 212 |
| 1419 | 161 | 49 | 221 |
| 1420 | 172 | 72 | 206 |
| 1421 | 154 | 103 | 216 |
| 1422 | 178 | 116 | 224 |
| 1423 | 161 | 146 | 168 |
| 1424 | 183 | 166 | 188 |
| 1425 | 165 | 202 | 126 |
| 1426 | 178 | 237 | 130 |
| 1427 | 125 | 230 | 61 |
| 1428 | 134 | 215 | 32 |
| 1429 | 219 | 219 | 219 |
| 1430 | 226 | 228 | 236 |
| 1431 | 174 | 239 | 77 |
| 1432 | 51 | 219 | 61 |
| 1433 | 64 | 220 | 65 |
| 1434 | 81 | 208 | 72 |
| 1435 | 117 | 201 | 158 |
| 1436 | 127 | 238 | 176 |
| 1437 | 123 | 135 | 209 |
| 1438 | 151 | 164 | 230 |

APPENDIX C
Dbase.rgb: transparency precursor data

| Patch # | R | G | B |
|---|---|---|---|
| 1439 | 119 | 71 | 204 |
| 1440 | 125 | 83 | 206 |
| 1441 | 149 | 111 | 220 |
| 1442 | 108 | 122 | 210 |
| 1443 | 148 | 133 | 208 |
| 1444 | 149 | 159 | 216 |
| 1445 | 32 | 210 | 202 |
| 1446 | 88 | 238 | 225 |
| 1447 | 57 | 226 | 151 |
| 1448 | 89 | 234 | 164 |
| 1449 | 41 | 218 | 154 |
| 1450 | 83 | 235 | 204 |
| 1451 | 62 | 233 | 216 |
| 1452 | 18 | 203 | 214 |
| 1453 | 21 | 216 | 223 |
| 1454 | 49 | 228 | 207 |
| 1455 | 148 | 243 | 231 |
| 1456 | 21 | 213 | 206 |
| 1457 | 85 | 238 | 231 |
| 1458 | 29 | 221 | 224 |
| 1459 | 24 | 217 | 222 |
| 1460 | 28 | 220 | 214 |
| 1461 | 29 | 221 | 225 |
| 1462 | 46 | 229 | 220 |
| 1463 | 224 | 224 | 224 |
| 1464 | 231 | 233 | 242 |
| 1465 | 21 | 216 | 214 |
| 1466 | 18 | 212 | 222 |
| 1467 | 22 | 220 | 224 |
| 1468 | 79 | 234 | 201 |
| 1469 | 22 | 218 | 204 |
| 1470 | 36 | 226 | 208 |
| 1471 | 58 | 184 | 224 |
| 1472 | 107 | 188 | 215 |
| 1473 | 115 | 237 | 232 |
| 1474 | 122 | 122 | 205 |
| 1475 | 132 | 137 | 214 |
| 1476 | 168 | 160 | 227 |
| 1477 | 125 | 187 | 201 |
| 1478 | 145 | 229 | 224 |
| 1479 | 87 | 213 | 137 |
| 1480 | 105 | 233 | 161 |
| 1481 | 82 | 218 | 152 |
| 1482 | 140 | 223 | 58 |
| 1483 | 169 | 220 | 74 |
| 1484 | 178 | 227 | 95 |
| 1485 | 171 | 195 | 162 |
| 1486 | 193 | 228 | 179 |
| 1487 | 162 | 136 | 207 |
| 1488 | 186 | 157 | 224 |
| 1489 | 158 | 76 | 218 |
| 1490 | 171 | 95 | 222 |
| 1491 | 189 | 106 | 207 |
| 1492 | 194 | 11 | 215 |
| 1493 | 210 | 19 | 212 |
| 1494 | 214 | 49 | 209 |
| 1495 | 193 | 84 | 216 |
| 1496 | 216 | 105 | 220 |
| 1497 | 229 | 229 | 229 |
| 1498 | 236 | 238 | 247 |
| 1499 | 184 | 130 | 160 |
| 1500 | 209 | 154 | 182 |
| 1501 | 191 | 187 | 129 |
| 1502 | 216 | 217 | 146 |
| 1503 | 171 | 234 | 55 |
| 1504 | 188 | 229 | 34 |
| 1505 | 202 | 218 | 25 |
| 1506 | 231 | 237 | 42 |
| 1507 | 248 | 249 | 72 |
| 1508 | 240 | 227 | 25 |
| 1509 | 229 | 211 | 16 |
| 1510 | 250 | 245 | 52 |
| 1511 | 234 | 198 | 58 |
| 1512 | 242 | 212 | 84 |
| 1513 | 255 | 231 | 92 |
| 1514 | 227 | 136 | 124 |
| 1515 | 234 | 146 | 135 |
| 1516 | 238 | 150 | 144 |
| 1517 | 230 | 88 | 166 |
| 1518 | 235 | 99 | 174 |
| 1519 | 224 | 114 | 187 |
| 1520 | 212 | 33 | 224 |
| 1521 | 225 | 38 | 210 |
| 1522 | 218 | 53 | 222 |
| 1523 | 213 | 4 | 189 |
| 1524 | 218 | 2 | 198 |
| 1525 | 218 | 5 | 197 |
| 1526 | 210 | 7 | 201 |
| 1527 | 222 | 1 | 198 |
| 1528 | 228 | 20 | 215 |
| 1529 | 220 | 37 | 224 |
| 1530 | 207 | 33 | 202 |
| 1531 | 234 | 234 | 234 |
| 1532 | 241 | 244 | 253 |
| 1533 | 227 | 51 | 200 |
| 1534 | 229 | 55 | 219 |
| 1535 | 228 | 80 | 215 |
| 1536 | 236 | 95 | 222 |
| 1537 | 227 | 124 | 233 |
| 1538 | 222 | 129 | 157 |
| 1539 | 232 | 143 | 164 |
| 1540 | 244 | 154 | 173 |
| 1541 | 226 | 184 | 127 |
| 1542 | 238 | 196 | 153 |
| 1543 | 215 | 220 | 121 |
| 1544 | 227 | 246 | 72 |
| 1545 | 253 | 225 | 23 |
| 1546 | 237 | 238 | 50 |
| 1547 | 255 | 255 | 0 |
| 1548 | 244 | 206 | 27 |
| 1549 | 188 | 223 | 75 |
| 1550 | 194 | 223 | 70 |
| 1551 | 198 | 213 | 97 |
| 1552 | 191 | 185 | 158 |
| 1553 | 216 | 210 | 177 |
| 1554 | 189 | 128 | 202 |
| 1555 | 214 | 153 | 227 |
| 1556 | 192 | 85 | 225 |
| 1557 | 204 | 97 | 226 |
| 1558 | 213 | 105 | 227 |
| 1559 | 166 | 130 | 218 |
| 1560 | 183 | 142 | 219 |
| 1561 | 201 | 160 | 232 |
| 1562 | 168 | 193 | 202 |
| 1563 | 195 | 217 | 218 |
| 1564 | 139 | 217 | 139 |
| 1565 | 239 | 239 | 239 |
| 1566 | 255 | 249 | 254 |
| 1567 | 140 | 224 | 138 |
| 1568 | 177 | 208 | 146 |
| 1569 | 89 | 235 | 195 |
| 1570 | 36 | 217 | 193 |
| 1571 | 110 | 237 | 211 |
| 1572 | 110 | 173 | 224 |
| 1573 | 135 | 185 | 214 |
| 1574 | 129 | 211 | 219 |
| 1575 | 20 | 202 | 221 |
| 1576 | 35 | 221 | 225 |
| 1577 | 23 | 210 | 223 |
| 1578 | 44 | 225 | 217 |
| 1579 | 25 | 200 | 212 |
| 1580 | 70 | 220 | 227 |
| 1581 | 75 | 216 | 214 |
| 1582 | 89 | 225 | 226 |
| 1583 | 111 | 214 | 220 |
| 1584 | 116 | 226 | 221 |
| 1585 | 116 | 205 | 185 |
| 1586 | 154 | 214 | 199 |
| 1587 | 176 | 228 | 214 |
| 1588 | 170 | 173 | 219 |
| 1589 | 187 | 183 | 223 |
| 1590 | 206 | 210 | 226 |
| 1591 | 194 | 130 | 218 |
| 1592 | 206 | 144 | 222 |
| 1593 | 218 | 154 | 206 |
| 1594 | 198 | 180 | 200 |

-continued

APPENDIX C
Dbase.rgb: transparency precursor data

| Patch # | R | G | B |
|---|---|---|---|
| 1595 | 219 | 210 | 214 |
| 1596 | 186 | 211 | 126 |
| 1597 | 200 | 229 | 145 |
| 1598 | 220 | 213 | 160 |
| 1599 | 245 | 245 | 245 |
| 1600 | 253 | 251 | 255 |
| 1601 | 223 | 237 | 60 |
| 1602 | 253 | 223 | 45 |
| 1603 | 239 | 214 | 63 |
| 1604 | 215 | 207 | 80 |
| 1605 | 242 | 209 | 83 |
| 1606 | 224 | 179 | 157 |
| 1607 | 238 | 191 | 168 |
| 1608 | 252 | 204 | 173 |
| 1609 | 222 | 127 | 198 |
| 1610 | 235 | 144 | 214 |
| 1611 | 215 | 158 | 228 |
| 1612 | 227 | 66 | 213 |
| 1613 | 229 | 31 | 208 |
| 1614 | 235 | 89 | 200 |
| 1615 | 237 | 97 | 201 |
| 1616 | 233 | 95 | 215 |
| 1617 | 230 | 125 | 223 |
| 1618 | 235 | 114 | 216 |
| 1619 | 237 | 141 | 227 |
| 1620 | 240 | 146 | 228 |
| 1621 | 238 | 141 | 222 |
| 1622 | 227 | 172 | 198 |
| 1623 | 239 | 188 | 206 |
| 1624 | 250 | 197 | 218 |
| 1625 | 229 | 240 | 155 |
| 1626 | 235 | 248 | 148 |
| 1627 | 241 | 242 | 164 |
| 1628 | 232 | 237 | 171 |
| 1629 | 231 | 229 | 175 |
| 1630 | 204 | 240 | 193 |
| 1631 | 215 | 250 | 199 |
| 1632 | 229 | 216 | 211 |
| 1633 | 250 | 250 | 250 |
| 1634 | 254 | 253 | 255 |
| 1635 | 195 | 168 | 219 |
| 1636 | 206 | 180 | 224 |
| 1637 | 212 | 192 | 221 |
| 1638 | 183 | 248 | 230 |
| 1639 | 159 | 235 | 235 |
| 1640 | 170 | 231 | 228 |
| 1641 | 205 | 216 | 217 |
| 1642 | 208 | 241 | 211 |
| 1643 | 197 | 236 | 211 |
| 1644 | 208 | 207 | 225 |
| 1645 | 215 | 253 | 231 |
| 1646 | 218 | 206 | 224 |
| 1647 | 217 | 226 | 203 |
| 1648 | 226 | 231 | 189 |
| 1649 | 238 | 235 | 195 |
| 1650 | 236 | 243 | 199 |
| 1651 | 250 | 201 | 211 |
| 1652 | 251 | 201 | 217 |
| 1653 | 227 | 165 | 224 |
| 1654 | 239 | 157 | 219 |
| 1655 | 237 | 173 | 228 |
| 1656 | 249 | 184 | 234 |
| 1657 | 249 | 186 | 229 |
| 1658 | 231 | 223 | 240 |
| 1659 | 254 | 236 | 223 |
| 1660 | 253 | 228 | 201 |
| 1661 | 238 | 247 | 238 |
| 1662 | 238 | 242 | 211 |
| 1663 | 241 | 245 | 210 |
| 1664 | 253 | 239 | 207 |
| 1665 | 236 | 247 | 210 |
| 1666 | 250 | 203 | 217 |
| 1667 | 255 | 255 | 255 |
| 1668 | 255 | 255 | 255 |
| 1669 | 240 | 240 | 209 |
| 1670 | 254 | 236 | 207 |
| 1671 | 239 | 245 | 221 |
| 1672 | 240 | 206 | 235 |
| 1673 | 230 | 247 | 238 |
| 1674 | 213 | 251 | 234 |
| 1675 | 230 | 251 | 223 |
| 1676 | 233 | 218 | 236 |

APPENDIX D

```
* Input Layer :    3 Neurons fully connected to Hidden layer
* Hidden Layer :   14 Neurons fully connected to Output layer
* Output Layer :   3 Neurons
* 1 Bias Neuron fully connected to Hidden and Output
**   Input → Hidden weights   **
*    Input 1         Input 2         Input 3         Bias
  −0.442736586   −0.623409628     0.925939232   −1.318630255
   0.390761213   −0.523850528    −0.794199828    0.389915371
  −0.062237680    0.900454106    −0.609265760    0.638924552
  −0.251614215   −0.869924483    0.507059054   −1.193555639
   0.589267421    1.247208658   −0.201817678   −0.242378778
   0.872374815    0.742210042   −0.308714505   −0.354207446
  −0.133642721    1.398686683    0.549923172   −0.520948811
   0.975541146   −0.402403146    1.048848840   −0.400613982
  −0.912802945    0.638310392   −0.283297317   −0.404199663
  −0.792644223   −0.121435503   −0.565998492    0.419756745
  −0.346402606   −1.252863484    1.827742432   −0.083786462
   0.405769046   −1.296117015   −0.518716257    0.337546105
   1.798235531   −0.608837188   −0.163968699    0.016968235
   0.964840914   −1.269434779    0.945630648   −0.675165394
**   Hidden → output weights   **
*    Output 1        Output 2        Output 3
   0.571908169    0.221515675    1.007163353
   0.268681112   −0.278919924   −1.027308743
  −0.884099627    0.823127289    0.000674341
  −1.005828712    0.426739593    0.763209790
   0.639980075    1.076764081   −0.479292934
   0.961454034    0.879561628    0.101335486
  −0.353316065    1.552545259    0.760079152
   0.870425982   −0.210038559    1.168321013
  −1.410277006    0.086453719    0.601415216
  −0.713774215   −0.885393597   −1.095775013
  −1.121825306   −1.242603117    1.726716248
  −0.559382966   −1.614395371   −1.113117723
   1.767996710   −1.013364897   −0.478047840
   0.931748193   −0.834048414    1.094327453
  −0.976110925   −0.167233221   −0.881178242      ← Bias
```

APPENDIX E

| Patch # | R | G | B |
|---|---|---|---|
| 1 | 12 | 11 | 10 |
| 2 | 14 | 11 | 11 |
| 3 | 13 | 12 | 12 |
| 4 | 14 | 11 | 11 |
| 5 | 14 | 12 | 11 |
| 6 | 12 | 13 | 11 |
| 7 | 12 | 12 | 13 |
| 8 | 15 | 12 | 11 |
| 9 | 12 | 11 | 10 |
| 10 | 16 | 13 | 11 |
| 11 | 12 | 14 | 11 |
| 12 | 15 | 12 | 11 |
| 13 | 13 | 11 | 11 |
| 14 | 15 | 14 | 11 |
| 15 | 22 | 10 | 11 |
| 16 | 14 | 13 | 11 |
| 17 | 13 | 13 | 11 |
| 18 | 18 | 11 | 12 |
| 19 | 22 | 10 | 11 |
| 20 | 30 | 11 | 9 |
| 21 | 31 | 11 | 11 |
| 22 | 50 | 11 | 11 |
| 23 | 45 | 11 | 10 |
| 24 | 50 | 10 | 11 |

-continued

APPENDIX E

| Patch # | R | G | B |
|---|---|---|---|
| 25 | 16 | 36 | 11 |
| 26 | 18 | 40 | 11 |
| 27 | 18 | 104 | 10 |
| 28 | 21 | 38 | 10 |
| 29 | 23 | 36 | 10 |
| 30 | 18 | 11 | 14 |
| 31 | 19 | 12 | 15 |
| 32 | 17 | 10 | 22 |
| 33 | 20 | 12 | 17 |
| 34 | 23 | 10 | 21 |
| 35 | 13 | 13 | 11 |
| 36 | 12 | 13 | 11 |
| 37 | 12 | 10 | 48 |
| 38 | 13 | 9 | 56 |
| 39 | 12 | 7 | 100 |
| 40 | 15 | 8 | 63 |
| 41 | 20 | 8 | 87 |
| 42 | 13 | 22 | 12 |
| 43 | 16 | 26 | 14 |
| 44 | 19 | 27 | 16 |
| 45 | 14 | 116 | 10 |
| 46 | 14 | 123 | 10 |
| 47 | 14 | 186 | 11 |
| 48 | 15 | 135 | 10 |
| 49 | 17 | 151 | 11 |
| 50 | 32 | 17 | 11 |
| 51 | 44 | 17 | 10 |
| 52 | 49 | 22 | 9 |
| 53 | 30 | 11 | 15 |
| 54 | 37 | 8 | 20 |
| 55 | 49 | 9 | 23 |
| 56 | 55 | 10 | 10 |
| 57 | 58 | 9 | 10 |
| 58 | 78 | 9 | 10 |
| 59 | 74 | 10 | 10 |
| 60 | 89 | 9 | 10 |
| 61 | 114 | 9 | 11 |
| 62 | 114 | 8 | 12 |
| 63 | 150 | 8 | 13 |
| 64 | 135 | 9 | 11 |
| 65 | 152 | 9 | 10 |
| 66 | 58 | 11 | 9 |
| 67 | 67 | 14 | 9 |
| 68 | 81 | 19 | 9 |
| 69 | 15 | 14 | 13 |
| 70 | 14 | 15 | 11 |
| 71 | 57 | 10 | 13 |
| 72 | 71 | 9 | 16 |
| 73 | 87 | 8 | 21 |
| 74 | 23 | 8 | 52 |
| 75 | 35 | 7 | 61 |
| 76 | 44 | 7 | 83 |
| 77 | 25 | 12 | 14 |
| 78 | 38 | 16 | 17 |
| 79 | 30 | 70 | 8 |
| 80 | 35 | 87 | 10 |
| 81 | 41 | 110 | 8 |
| 82 | 14 | 231 | 13 |
| 83 | 14 | 229 | 12 |
| 84 | 15 | 242 | 15 |
| 85 | 14 | 228 | 12 |
| 86 | 15 | 233 | 13 |
| 87 | 14 | 91 | 11 |
| 88 | 15 | 94 | 12 |
| 89 | 16 | 110 | 14 |
| 90 | 13 | 12 | 37 |
| 91 | 15 | 14 | 47 |
| 92 | 18 | 13 | 71 |
| 93 | 16 | 7 | 161 |
| 94 | 18 | 6 | 164 |
| 95 | 22 | 7 | 207 |
| 96 | 23 | 7 | 191 |
| 97 | 27 | 6 | 204 |
| 98 | 23 | 8 | 222 |
| 99 | 27 | 9 | 248 |
| 100 | 20 | 6 | 205 |
| 101 | 25 | 6 | 220 |
| 102 | 25 | 7 | 215 |
| 103 | 18 | 16 | 15 |

-continued

APPENDIX E

| Patch # | R | G | B |
|---|---|---|---|
| 104 | 17 | 17 | 12 |
| 105 | 13 | 7 | 132 |
| 106 | 16 | 6 | 150 |
| 107 | 20 | 6 | 164 |
| 108 | 12 | 64 | 27 |
| 109 | 13 | 74 | 35 |
| 110 | 15 | 84 | 49 |
| 111 | 13 | 208 | 13 |
| 112 | 14 | 213 | 14 |
| 113 | 14 | 221 | 15 |
| 114 | 22 | 250 | 27 |
| 115 | 34 | 250 | 32 |
| 116 | 17 | 247 | 19 |
| 117 | 20 | 249 | 24 |
| 118 | 176 | 247 | 115 |
| 119 | 30 | 174 | 10 |
| 120 | 51 | 170 | 10 |
| 121 | 42 | 197 | 10 |
| 122 | 23 | 40 | 11 |
| 123 | 41 | 66 | 13 |
| 124 | 25 | 8 | 34 |
| 125 | 40 | 9 | 67 |
| 126 | 24 | 7 | 147 |
| 127 | 41 | 6 | 167 |
| 128 | 59 | 5 | 191 |
| 129 | 59 | 7 | 52 |
| 130 | 76 | 5 | 64 |
| 131 | 94 | 6 | 82 |
| 132 | 59 | 9 | 13 |
| 133 | 87 | 13 | 16 |
| 134 | 55 | 42 | 8 |
| 135 | 65 | 60 | 8 |
| 136 | 79 | 72 | 8 |
| 137 | 20 | 19 | 16 |
| 138 | 21 | 18 | 14 |
| 139 | 101 | 11 | 10 |
| 140 | 118 | 12 | 11 |
| 141 | 135 | 15 | 9 |
| 142 | 108 | 10 | 12 |
| 143 | 127 | 9 | 20 |
| 144 | 145 | 7 | 26 |
| 145 | 171 | 8 | 12 |
| 146 | 181 | 7 | 12 |
| 147 | 213 | 8 | 14 |
| 148 | 187 | 8 | 13 |
| 149 | 198 | 8 | 13 |
| 150 | 222 | 9 | 14 |
| 151 | 224 | 9 | 16 |
| 152 | 223 | 7 | 16 |
| 153 | 225 | 8 | 15 |
| 154 | 229 | 9 | 15 |
| 155 | 159 | 8 | 12 |
| 156 | 173 | 11 | 12 |
| 157 | 192 | 11 | 12 |
| 158 | 170 | 8 | 13 |
| 159 | 184 | 7 | 23 |
| 160 | 196 | 6 | 30 |
| 161 | 106 | 6 | 43 |
| 162 | 130 | 5 | 79 |
| 163 | 149 | 5 | 100 |
| 164 | 109 | 10 | 12 |
| 165 | 139 | 17 | 16 |
| 166 | 104 | 51 | 9 |
| 167 | 125 | 57 | 8 |
| 168 | 132 | 66 | 8 |
| 169 | 51 | 138 | 10 |
| 170 | 71 | 148 | 10 |
| 171 | 23 | 21 | 18 |
| 172 | 25 | 20 | 16 |
| 173 | 79 | 176 | 9 |
| 174 | 50 | 28 | 10 |
| 175 | 79 | 59 | 12 |
| 176 | 50 | 7 | 37 |
| 177 | 81 | 7 | 65 |
| 178 | 52 | 5 | 156 |
| 179 | 71 | 6 | 170 |
| 180 | 96 | 4 | 193 |
| 181 | 32 | 6 | 219 |
| 182 | 39 | 6 | 217 |

APPENDIX E

| Patch # | R | G | B |
|---|---|---|---|
| 183 | 49 | 6 | 219 |
| 184 | 26 | 6 | 119 |
| 185 | 49 | 6 | 154 |
| 186 | 22 | 27 | 31 |
| 187 | 41 | 42 | 47 |
| 188 | 22 | 144 | 11 |
| 189 | 30 | 186 | 14 |
| 190 | 16 | 238 | 14 |
| 191 | 22 | 246 | 17 |
| 192 | 35 | 249 | 22 |
| 193 | 34 | 250 | 33 |
| 194 | 22 | 250 | 26 |
| 195 | 15 | 246 | 17 |
| 196 | 26 | 249 | 26 |
| 197 | 17 | 247 | 17 |
| 198 | 32 | 249 | 29 |
| 199 | 177 | 248 | 114 |
| 200 | 85 | 249 | 54 |
| 201 | 15 | 188 | 30 |
| 202 | 15 | 185 | 35 |
| 203 | 15 | 193 | 36 |
| 204 | 13 | 33 | 93 |
| 205 | 26 | 24 | 20 |
| 206 | 29 | 22 | 19 |
| 207 | 11 | 56 | 105 |
| 208 | 14 | 62 | 126 |
| 209 | 17 | 8 | 214 |
| 210 | 22 | 7 | 223 |
| 211 | 26 | 8 | 231 |
| 212 | 18 | 8 | 215 |
| 213 | 19 | 6 | 206 |
| 214 | 20 | 8 | 214 |
| 215 | 23 | 7 | 223 |
| 216 | 27 | 6 | 219 |
| 217 | 23 | 7 | 214 |
| 218 | 23 | 7 | 212 |
| 219 | 26 | 7 | 214 |
| 220 | 28 | 7 | 217 |
| 221 | 34 | 6 | 222 |
| 222 | 20 | 7 | 222 |
| 223 | 24 | 7 | 226 |
| 224 | 25 | 7 | 216 |
| 225 | 18 | 10 | 213 |
| 226 | 18 | 17 | 212 |
| 227 | 17 | 30 | 219 |
| 228 | 12 | 143 | 78 |
| 229 | 13 | 162 | 89 |
| 230 | 15 | 171 | 114 |
| 231 | 16 | 247 | 23 |
| 232 | 17 | 248 | 33 |
| 233 | 23 | 250 | 44 |
| 234 | 22 | 250 | 24 |
| 235 | 17 | 248 | 19 |
| 236 | 22 | 249 | 24 |
| 237 | 18 | 248 | 21 |
| 238 | 17 | 247 | 18 |
| 239 | 29 | 27 | 23 |
| 240 | 33 | 26 | 22 |
| 241 | 76 | 249 | 53 |
| 242 | 15 | 246 | 18 |
| 243 | 18 | 249 | 24 |
| 244 | 174 | 248 | 112 |
| 245 | 100 | 249 | 52 |
| 246 | 30 | 249 | 21 |
| 247 | 15 | 238 | 14 |
| 248 | 18 | 249 | 22 |
| 249 | 19 | 126 | 22 |
| 250 | 27 | 162 | 39 |
| 251 | 23 | 14 | 90 |
| 252 | 43 | 30 | 132 |
| 253 | 31 | 6 | 215 |
| 254 | 56 | 6 | 223 |
| 255 | 34 | 6 | 216 |
| 256 | 43 | 6 | 218 |
| 257 | 64 | 5 | 223 |
| 258 | 60 | 6 | 219 |
| 259 | 75 | 5 | 223 |
| 260 | 100 | 4 | 226 |
| 261 | 61 | 6 | 111 |
| 262 | 95 | 5 | 150 |
| 263 | 52 | 19 | 28 |
| 264 | 85 | 45 | 42 |
| 265 | 61 | 116 | 9 |
| 266 | 98 | 158 | 12 |
| 267 | 52 | 225 | 10 |
| 268 | 75 | 231 | 11 |
| 269 | 81 | 239 | 12 |
| 270 | 106 | 123 | 9 |
| 271 | 126 | 135 | 8 |
| 272 | 138 | 158 | 9 |
| 273 | 34 | 32 | 26 |
| 274 | 36 | 31 | 24 |
| 275 | 96 | 25 | 9 |
| 276 | 135 | 53 | 11 |
| 277 | 100 | 7 | 32 |
| 278 | 137 | 5 | 64 |
| 279 | 99 | 5 | 141 |
| 280 | 130 | 4 | 170 |
| 281 | 150 | 4 | 190 |
| 282 | 169 | 5 | 49 |
| 283 | 184 | 4 | 91 |
| 284 | 196 | 4 | 111 |
| 285 | 161 | 9 | 14 |
| 286 | 191 | 6 | 24 |
| 287 | 159 | 33 | 9 |
| 288 | 174 | 49 | 8 |
| 289 | 190 | 64 | 9 |
| 290 | 212 | 8 | 13 |
| 291 | 219 | 8 | 14 |
| 292 | 226 | 9 | 14 |
| 293 | 219 | 8 | 14 |
| 294 | 224 | 7 | 27 |
| 295 | 230 | 7 | 36 |
| 296 | 223 | 8 | 16 |
| 297 | 221 | 9 | 13 |
| 298 | 223 | 8 | 15 |
| 299 | 224 | 9 | 15 |
| 300 | 230 | 9 | 15 |
| 301 | 227 | 10 | 13 |
| 302 | 226 | 8 | 16 |
| 303 | 227 | 8 | 16 |
| 304 | 223 | 9 | 15 |
| 305 | 226 | 8 | 14 |
| 306 | 225 | 9 | 13 |
| 307 | 38 | 36 | 29 |
| 308 | 40 | 36 | 28 |
| 309 | 224 | 9 | 14 |
| 310 | 224 | 9 | 14 |
| 311 | 226 | 9 | 15 |
| 312 | 236 | 10 | 15 |
| 313 | 242 | 8 | 19 |
| 314 | 226 | 8 | 14 |
| 315 | 229 | 14 | 20 |
| 316 | 227 | 9 | 15 |
| 317 | 228 | 9 | 15 |
| 318 | 230 | 9 | 15 |
| 319 | 231 | 9 | 16 |
| 320 | 224 | 8 | 15 |
| 321 | 228 | 8 | 17 |
| 322 | 232 | 11 | 13 |
| 323 | 225 | 8 | 15 |
| 324 | 230 | 6 | 41 |
| 325 | 231 | 7 | 38 |
| 326 | 210 | 5 | 93 |
| 327 | 217 | 4 | 105 |
| 328 | 226 | 5 | 114 |
| 329 | 207 | 8 | 14 |
| 330 | 224 | 8 | 23 |
| 331 | 208 | 38 | 10 |
| 332 | 215 | 51 | 11 |
| 333 | 220 | 64 | 10 |
| 334 | 156 | 108 | 8 |
| 335 | 172 | 131 | 9 |
| 336 | 185 | 151 | 8 |
| 337 | 158 | 21 | 12 |
| 338 | 184 | 50 | 13 |
| 339 | 152 | 6 | 40 |
| 340 | 182 | 5 | 71 |

-continued

APPENDIX E

| Patch # | R | G | B |
|---|---|---|---|
| 341 | 43 | 41 | 33 |
| 342 | 46 | 40 | 32 |
| 343 | 155 | 4 | 164 |
| 344 | 181 | 4 | 184 |
| 345 | 195 | 4 | 199 |
| 346 | 114 | 4 | 220 |
| 347 | 138 | 4 | 227 |
| 348 | 160 | 3 | 225 |
| 349 | 107 | 6 | 113 |
| 350 | 143 | 4 | 165 |
| 351 | 91 | 17 | 27 |
| 352 | 135 | 32 | 42 |
| 353 | 98 | 109 | 9 |
| 354 | 136 | 150 | 12 |
| 355 | 92 | 212 | 9 |
| 356 | 119 | 217 | 10 |
| 357 | 133 | 225 | 10 |
| 358 | 91 | 249 | 38 |
| 359 | 79 | 248 | 21 |
| 360 | 62 | 244 | 15 |
| 361 | 39 | 220 | 11 |
| 362 | 66 | 234 | 13 |
| 363 | 52 | 99 | 19 |
| 364 | 86 | 137 | 36 |
| 365 | 51 | 18 | 76 |
| 366 | 81 | 36 | 119 |
| 367 | 69 | 5 | 213 |
| 368 | 108 | 4 | 227 |
| 369 | 72 | 6 | 221 |
| 370 | 84 | 5 | 229 |
| 371 | 116 | 4 | 223 |
| 372 | 43 | 5 | 215 |
| 373 | 59 | 5 | 219 |
| 374 | 77 | 5 | 223 |
| 375 | 48 | 46 | 37 |
| 376 | 53 | 47 | 37 |
| 377 | 28 | 7 | 216 |
| 378 | 45 | 6 | 226 |
| 379 | 24 | 9 | 186 |
| 380 | 41 | 19 | 208 |
| 381 | 17 | 98 | 70 |
| 382 | 27 | 129 | 113 |
| 383 | 14 | 227 | 19 |
| 384 | 16 | 241 | 23 |
| 385 | 15 | 245 | 17 |
| 386 | 36 | 250 | 36 |
| 387 | 79 | 249 | 54 |
| 388 | 18 | 246 | 18 |
| 389 | 28 | 250 | 29 |
| 390 | 19 | 249 | 25 |
| 391 | 15 | 246 | 18 |
| 392 | 78 | 249 | 54 |
| 393 | 15 | 246 | 18 |
| 394 | 32 | 250 | 33 |
| 395 | 19 | 249 | 24 |
| 396 | 38 | 250 | 36 |
| 397 | 18 | 248 | 22 |
| 398 | 15 | 246 | 18 |
| 399 | 20 | 249 | 24 |
| 400 | 40 | 250 | 36 |
| 401 | 17 | 248 | 20 |
| 402 | 18 | 248 | 21 |
| 403 | 41 | 250 | 37 |
| 404 | 18 | 248 | 21 |
| 405 | 18 | 248 | 21 |
| 406 | 16 | 245 | 17 |
| 407 | 16 | 245 | 17 |
| 408 | 16 | 245 | 17 |
| 409 | 54 | 52 | 41 |
| 410 | 61 | 52 | 42 |
| 411 | 23 | 250 | 29 |
| 412 | 16 | 248 | 27 |
| 413 | 14 | 247 | 24 |
| 414 | 17 | 249 | 33 |
| 415 | 10 | 233 | 80 |
| 416 | 11 | 238 | 91 |
| 417 | 11 | 241 | 107 |
| 418 | 11 | 107 | 172 |
| 419 | 9 | 127 | 179 |
| 420 | 11 | 135 | 196 |
| 421 | 21 | 11 | 231 |
| 422 | 18 | 11 | 230 |
| 423 | 24 | 14 | 235 |
| 424 | 20 | 6 | 219 |
| 425 | 21 | 6 | 213 |
| 426 | 28 | 6 | 218 |
| 427 | 25 | 7 | 214 |
| 428 | 25 | 7 | 212 |
| 429 | 26 | 7 | 215 |
| 430 | 29 | 6 | 212 |
| 431 | 26 | 6 | 217 |
| 432 | 29 | 6 | 212 |
| 433 | 29 | 6 | 216 |
| 434 | 30 | 6 | 212 |
| 435 | 29 | 7 | 216 |
| 436 | 32 | 5 | 218 |
| 437 | 37 | 5 | 223 |
| 438 | 29 | 7 | 216 |
| 439 | 40 | 6 | 227 |
| 440 | 39 | 5 | 215 |
| 441 | 28 | 6 | 215 |
| 442 | 35 | 6 | 222 |
| 443 | 62 | 59 | 47 |
| 444 | 69 | 61 | 49 |
| 445 | 36 | 6 | 219 |
| 446 | 18 | 8 | 211 |
| 447 | 24 | 8 | 221 |
| 448 | 23 | 6 | 223 |
| 449 | 26 | 7 | 222 |
| 450 | 35 | 6 | 228 |
| 451 | 20 | 7 | 226 |
| 452 | 23 | 6 | 220 |
| 453 | 29 | 8 | 230 |
| 454 | 14 | 91 | 235 |
| 455 | 12 | 97 | 236 |
| 456 | 12 | 103 | 233 |
| 457 | 9 | 220 | 150 |
| 458 | 9 | 223 | 161 |
| 459 | 9 | 229 | 175 |
| 460 | 39 | 249 | 81 |
| 461 | 19 | 249 | 81 |
| 462 | 16 | 248 | 68 |
| 463 | 21 | 250 | 30 |
| 464 | 15 | 247 | 24 |
| 465 | 15 | 247 | 21 |
| 466 | 15 | 247 | 18 |
| 467 | 34 | 250 | 32 |
| 468 | 17 | 248 | 21 |
| 469 | 18 | 249 | 22 |
| 470 | 81 | 249 | 53 |
| 471 | 40 | 250 | 35 |
| 472 | 21 | 249 | 24 |
| 473 | 21 | 249 | 24 |
| 474 | 78 | 249 | 53 |
| 475 | 19 | 249 | 24 |
| 476 | 19 | 249 | 23 |
| 477 | 68 | 66 | 53 |
| 478 | 77 | 72 | 57 |
| 479 | 14 | 245 | 16 |
| 480 | 35 | 250 | 36 |
| 481 | 15 | 246 | 18 |
| 482 | 13 | 213 | 62 |
| 483 | 17 | 229 | 86 |
| 484 | 20 | 65 | 152 |
| 485 | 35 | 99 | 183 |
| 486 | 37 | 20 | 239 |
| 487 | 56 | 7 | 232 |
| 488 | 34 | 6 | 216 |
| 489 | 65 | 5 | 221 |
| 490 | 73 | 6 | 238 |
| 491 | 66 | 5 | 228 |
| 492 | 98 | 5 | 223 |
| 493 | 76 | 5 | 218 |
| 494 | 109 | 5 | 227 |
| 495 | 102 | 4 | 223 |
| 496 | 145 | 4 | 226 |
| 497 | 165 | 3 | 223 |
| 498 | 62 | 6 | 218 |

-continued

APPENDIX E

| Patch # | R | G | B |
|---|---|---|---|
| 499 | 111 | 4 | 232 |
| 500 | 62 | 6 | 183 |
| 501 | 95 | 11 | 209 |
| 502 | 54 | 68 | 69 |
| 503 | 90 | 106 | 114 |
| 504 | 40 | 206 | 15 |
| 505 | 37 | 229 | 18 |
| 506 | 180 | 247 | 112 |
| 507 | 45 | 246 | 16 |
| 508 | 42 | 249 | 25 |
| 509 | 40 | 247 | 17 |
| 510 | 22 | 249 | 24 |
| 511 | 75 | 74 | 58 |
| 512 | 86 | 81 | 65 |
| 513 | 94 | 245 | 15 |
| 514 | 126 | 248 | 25 |
| 515 | 130 | 248 | 23 |
| 516 | 101 | 191 | 10 |
| 517 | 141 | 212 | 12 |
| 518 | 103 | 76 | 21 |
| 519 | 144 | 111 | 43 |
| 520 | 105 | 7 | 90 |
| 521 | 138 | 13 | 137 |
| 522 | 124 | 4 | 215 |
| 523 | 160 | 4 | 228 |
| 524 | 132 | 4 | 225 |
| 525 | 149 | 4 | 226 |
| 526 | 175 | 4 | 226 |
| 527 | 181 | 3 | 227 |
| 528 | 195 | 3 | 231 |
| 529 | 206 | 3 | 227 |
| 530 | 162 | 5 | 130 |
| 531 | 189 | 4 | 167 |
| 532 | 156 | 10 | 32 |
| 533 | 189 | 32 | 42 |
| 534 | 159 | 99 | 9 |
| 535 | 188 | 140 | 12 |
| 536 | 156 | 198 | 10 |
| 537 | 173 | 209 | 10 |
| 538 | 186 | 219 | 10 |
| 539 | 198 | 108 | 9 |
| 540 | 210 | 125 | 10 |
| 541 | 218 | 147 | 11 |
| 542 | 202 | 17 | 12 |
| 543 | 216 | 45 | 13 |
| 544 | 200 | 5 | 41 |
| 545 | 83 | 81 | 65 |
| 546 | 95 | 93 | 74 |
| 547 | 221 | 5 | 83 |
| 548 | 206 | 4 | 180 |
| 549 | 215 | 3 | 185 |
| 550 | 223 | 3 | 197 |
| 551 | 230 | 5 | 100 |
| 552 | 229 | 5 | 107 |
| 553 | 230 | 4 | 113 |
| 554 | 230 | 9 | 17 |
| 555 | 233 | 7 | 27 |
| 556 | 232 | 20 | 13 |
| 557 | 235 | 30 | 12 |
| 558 | 236 | 45 | 11 |
| 559 | 230 | 10 | 14 |
| 560 | 227 | 9 | 15 |
| 561 | 231 | 8 | 16 |
| 562 | 233 | 10 | 18 |
| 563 | 235 | 13 | 17 |
| 564 | 231 | 7 | 27 |
| 565 | 232 | 7 | 25 |
| 566 | 229 | 6 | 49 |
| 567 | 232 | 6 | 44 |
| 568 | 232 | 5 | 54 |
| 569 | 230 | 5 | 110 |
| 570 | 230 | 5 | 107 |
| 571 | 225 | 4 | 155 |
| 572 | 229 | 4 | 94 |
| 573 | 229 | 4 | 132 |
| 574 | 234 | 11 | 19 |
| 575 | 233 | 13 | 26 |
| 576 | 234 | 11 | 37 |
| 577 | 233 | 18 | 13 |
| 578 | 231 | 20 | 13 |
| 579 | 90 | 90 | 71 |
| 580 | 107 | 105 | 84 |
| 581 | 232 | 62 | 10 |
| 582 | 232 | 36 | 12 |
| 583 | 231 | 77 | 10 |
| 584 | 228 | 86 | 11 |
| 585 | 232 | 113 | 11 |
| 586 | 235 | 132 | 11 |
| 587 | 230 | 13 | 16 |
| 588 | 237 | 35 | 19 |
| 589 | 231 | 5 | 59 |
| 590 | 231 | 5 | 97 |
| 591 | 227 | 4 | 188 |
| 592 | 227 | 3 | 188 |
| 593 | 226 | 3 | 196 |
| 594 | 211 | 3 | 227 |
| 595 | 218 | 3 | 224 |
| 596 | 224 | 3 | 230 |
| 597 | 201 | 3 | 148 |
| 598 | 219 | 3 | 174 |
| 599 | 200 | 10 | 34 |
| 600 | 215 | 36 | 48 |
| 601 | 198 | 92 | 9 |
| 602 | 213 | 135 | 13 |
| 603 | 197 | 200 | 10 |
| 604 | 206 | 201 | 10 |
| 605 | 212 | 212 | 11 |
| 606 | 139 | 239 | 13 |
| 607 | 162 | 245 | 17 |
| 608 | 176 | 247 | 23 |
| 609 | 154 | 186 | 10 |
| 610 | 180 | 209 | 13 |
| 611 | 146 | 79 | 16 |
| 612 | 179 | 109 | 33 |
| 613 | 100 | 100 | 80 |
| 614 | 116 | 115 | 96 |
| 615 | 150 | 6 | 93 |
| 616 | 182 | 16 | 133 |
| 617 | 162 | 4 | 215 |
| 618 | 193 | 4 | 226 |
| 619 | 192 | 4 | 223 |
| 620 | 197 | 3 | 225 |
| 621 | 200 | 3 | 226 |
| 622 | 183 | 4 | 226 |
| 623 | 219 | 4 | 222 |
| 624 | 209 | 4 | 225 |
| 625 | 116 | 4 | 222 |
| 626 | 154 | 4 | 227 |
| 627 | 108 | 4 | 181 |
| 628 | 145 | 6 | 209 |
| 629 | 92 | 52 | 77 |
| 630 | 136 | 90 | 122 |
| 631 | 106 | 174 | 21 |
| 632 | 139 | 204 | 32 |
| 633 | 82 | 245 | 16 |
| 634 | 154 | 249 | 51 |
| 635 | 71 | 246 | 17 |
| 636 | 92 | 245 | 16 |
| 637 | 135 | 249 | 50 |
| 638 | 26 | 249 | 26 |
| 639 | 17 | 245 | 17 |
| 640 | 55 | 249 | 41 |
| 641 | 55 | 249 | 41 |
| 642 | 18 | 248 | 20 |
| 643 | 51 | 249 | 35 |
| 644 | 18 | 246 | 17 |
| 645 | 37 | 249 | 35 |
| 646 | 16 | 244 | 17 |
| 647 | 108 | 108 | 87 |
| 648 | 126 | 125 | 105 |
| 649 | 26 | 189 | 54 |
| 650 | 31 | 222 | 73 |
| 651 | 46 | 59 | 157 |
| 652 | 78 | 81 | 181 |
| 653 | 65 | 5 | 231 |
| 654 | 102 | 8 | 237 |
| 655 | 77 | 5 | 227 |
| 656 | 127 | 4 | 229 |

APPENDIX E -continued

| Patch # | R | G | B |
|---|---|---|---|
| 657 | 127 | 4 | 219 |
| 658 | 151 | 4 | 228 |
| 659 | 198 | 3 | 228 |
| 660 | 165 | 4 | 223 |
| 661 | 198 | 3 | 229 |
| 662 | 39 | 6 | 214 |
| 663 | 65 | 5 | 225 |
| 664 | 94 | 4 | 230 |
| 665 | 34 | 7 | 222 |
| 666 | 80 | 6 | 236 |
| 667 | 20 | 45 | 229 |
| 668 | 34 | 74 | 237 |
| 669 | 14 | 184 | 149 |
| 670 | 24 | 205 | 166 |
| 671 | 79 | 249 | 91 |
| 672 | 80 | 249 | 94 |
| 673 | 21 | 249 | 26 |
| 674 | 21 | 249 | 25 |
| 675 | 35 | 250 | 33 |
| 676 | 16 | 246 | 18 |
| 677 | 31 | 250 | 29 |
| 678 | 29 | 250 | 29 |
| 679 | 19 | 249 | 23 |
| 680 | 17 | 247 | 20 |
| 681 | 116 | 117 | 95 |
| 682 | 133 | 136 | 115 |
| 683 | 17 | 249 | 23 |
| 684 | 72 | 249 | 51 |
| 685 | 74 | 249 | 64 |
| 686 | 37 | 249 | 60 |
| 687 | 15 | 246 | 24 |
| 688 | 67 | 248 | 138 |
| 689 | 64 | 248 | 155 |
| 690 | 14 | 246 | 139 |
| 691 | 9 | 205 | 216 |
| 692 | 8 | 205 | 224 |
| 693 | 8 | 211 | 230 |
| 694 | 13 | 48 | 234 |
| 695 | 16 | 50 | 235 |
| 696 | 18 | 90 | 238 |
| 697 | 25 | 9 | 233 |
| 698 | 25 | 13 | 237 |
| 699 | 20 | 75 | 239 |
| 700 | 25 | 15 | 235 |
| 701 | 25 | 34 | 238 |
| 702 | 15 | 76 | 237 |
| 703 | 12 | 143 | 233 |
| 704 | 11 | 210 | 229 |
| 705 | 13 | 195 | 233 |
| 706 | 20 | 168 | 235 |
| 707 | 11 | 165 | 233 |
| 708 | 12 | 169 | 236 |
| 709 | 10 | 187 | 230 |
| 710 | 16 | 246 | 182 |
| 711 | 63 | 247 | 195 |
| 712 | 10 | 241 | 208 |
| 713 | 19 | 249 | 62 |
| 714 | 15 | 247 | 78 |
| 715 | 124 | 126 | 103 |
| 716 | 142 | 144 | 125 |
| 717 | 43 | 249 | 115 |
| 718 | 34 | 250 | 34 |
| 719 | 74 | 249 | 51 |
| 720 | 18 | 249 | 23 |
| 721 | 18 | 249 | 23 |
| 722 | 15 | 247 | 20 |
| 723 | 18 | 249 | 24 |
| 724 | 19 | 249 | 24 |
| 725 | 17 | 247 | 21 |
| 726 | 19 | 249 | 35 |
| 727 | 23 | 249 | 37 |
| 728 | 14 | 246 | 120 |
| 729 | 32 | 248 | 144 |
| 730 | 12 | 160 | 213 |
| 731 | 20 | 183 | 229 |
| 732 | 40 | 18 | 239 |
| 733 | 44 | 53 | 240 |
| 734 | 47 | 5 | 230 |
| 735 | 58 | 8 | 235 |
| 736 | 64 | 13 | 236 |
| 737 | 112 | 4 | 224 |
| 738 | 156 | 4 | 229 |
| 739 | 174 | 4 | 232 |
| 740 | 76 | 4 | 225 |
| 741 | 132 | 6 | 238 |
| 742 | 61 | 25 | 223 |
| 743 | 92 | 49 | 233 |
| 744 | 51 | 144 | 139 |
| 745 | 82 | 171 | 169 |
| 746 | 18 | 246 | 37 |
| 747 | 34 | 249 | 61 |
| 748 | 16 | 243 | 16 |
| 749 | 132 | 134 | 111 |
| 750 | 151 | 151 | 133 |
| 751 | 35 | 250 | 34 |
| 752 | 49 | 250 | 41 |
| 753 | 15 | 244 | 16 |
| 754 | 19 | 249 | 23 |
| 755 | 19 | 249 | 23 |
| 756 | 50 | 250 | 41 |
| 757 | 50 | 250 | 40 |
| 758 | 79 | 249 | 53 |
| 759 | 19 | 248 | 21 |
| 760 | 101 | 249 | 31 |
| 761 | 97 | 246 | 18 |
| 762 | 54 | 242 | 17 |
| 763 | 91 | 248 | 25 |
| 764 | 102 | 158 | 68 |
| 765 | 139 | 184 | 113 |
| 766 | 100 | 34 | 158 |
| 767 | 140 | 60 | 186 |
| 768 | 124 | 4 | 232 |
| 769 | 158 | 5 | 238 |
| 770 | 145 | 4 | 221 |
| 771 | 175 | 3 | 226 |
| 772 | 217 | 3 | 225 |
| 773 | 226 | 3 | 221 |
| 774 | 229 | 3 | 229 |
| 775 | 228 | 3 | 221 |
| 776 | 222 | 3 | 226 |
| 777 | 201 | 3 | 225 |
| 778 | 186 | 3 | 221 |
| 779 | 197 | 3 | 223 |
| 780 | 178 | 3 | 231 |
| 781 | 192 | 4 | 218 |
| 782 | 156 | 4 | 182 |
| 783 | 142 | 144 | 121 |
| 784 | 156 | 161 | 143 |
| 785 | 186 | 6 | 205 |
| 786 | 152 | 44 | 71 |
| 787 | 180 | 87 | 112 |
| 788 | 156 | 167 | 21 |
| 789 | 185 | 194 | 39 |
| 790 | 145 | 235 | 12 |
| 791 | 171 | 245 | 19 |
| 792 | 143 | 243 | 15 |
| 793 | 164 | 242 | 15 |
| 794 | 177 | 246 | 21 |
| 795 | 197 | 230 | 12 |
| 796 | 203 | 239 | 15 |
| 797 | 208 | 244 | 18 |
| 798 | 195 | 173 | 10 |
| 799 | 214 | 200 | 13 |
| 800 | 197 | 66 | 21 |
| 801 | 215 | 96 | 43 |
| 802 | 195 | 5 | 126 |
| 803 | 212 | 12 | 137 |
| 804 | 207 | 3 | 218 |
| 805 | 220 | 3 | 224 |
| 806 | 211 | 3 | 226 |
| 807 | 217 | 4 | 220 |
| 808 | 223 | 3 | 220 |
| 809 | 227 | 3 | 217 |
| 810 | 229 | 4 | 225 |
| 811 | 228 | 4 | 217 |
| 812 | 229 | 5 | 144 |
| 813 | 228 | 3 | 171 |
| 814 | 228 | 7 | 41 |

-continued

APPENDIX E

| Patch # | R | G | B |
|---|---|---|---|
| 815 | 236 | 19 | 57 |
| 816 | 222 | 77 | 11 |
| 817 | 149 | 152 | 129 |
| 818 | 166 | 168 | 150 |
| 819 | 234 | 117 | 13 |
| 820 | 224 | 180 | 12 |
| 821 | 229 | 189 | 12 |
| 822 | 233 | 202 | 12 |
| 823 | 234 | 90 | 10 |
| 824 | 235 | 140 | 11 |
| 825 | 231 | 199 | 13 |
| 826 | 235 | 125 | 11 |
| 827 | 234 | 140 | 11 |
| 828 | 233 | 21 | 14 |
| 829 | 237 | 37 | 18 |
| 830 | 238 | 57 | 20 |
| 831 | 232 | 6 | 50 |
| 832 | 232 | 5 | 76 |
| 833 | 228 | 5 | 104 |
| 834 | 226 | 3 | 190 |
| 835 | 228 | 3 | 206 |
| 836 | 229 | 3 | 236 |
| 837 | 225 | 4 | 189 |
| 838 | 226 | 4 | 216 |
| 839 | 225 | 3 | 223 |
| 840 | 229 | 3 | 222 |
| 841 | 228 | 4 | 217 |
| 842 | 231 | 3 | 236 |
| 843 | 228 | 3 | 226 |
| 844 | 228 | 4 | 148 |
| 845 | 225 | 4 | 165 |
| 846 | 229 | 4 | 183 |
| 847 | 230 | 7 | 49 |
| 848 | 232 | 12 | 62 |
| 849 | 237 | 19 | 46 |
| 850 | 232 | 71 | 11 |
| 851 | 157 | 160 | 137 |
| 852 | 173 | 174 | 158 |
| 853 | 236 | 98 | 12 |
| 854 | 235 | 119 | 13 |
| 855 | 229 | 179 | 12 |
| 856 | 235 | 190 | 12 |
| 857 | 228 | 207 | 12 |
| 858 | 229 | 192 | 11 |
| 859 | 228 | 202 | 12 |
| 860 | 220 | 228 | 13 |
| 861 | 221 | 239 | 15 |
| 862 | 228 | 242 | 19 |
| 863 | 223 | 174 | 11 |
| 864 | 231 | 199 | 13 |
| 865 | 225 | 63 | 22 |
| 866 | 236 | 94 | 38 |
| 867 | 225 | 4 | 115 |
| 868 | 234 | 10 | 138 |
| 869 | 228 | 3 | 215 |
| 870 | 229 | 3 | 223 |
| 871 | 228 | 3 | 223 |
| 872 | 225 | 3 | 225 |
| 873 | 229 | 4 | 219 |
| 874 | 210 | 3 | 228 |
| 875 | 216 | 4 | 225 |
| 876 | 222 | 3 | 219 |
| 877 | 210 | 3 | 227 |
| 878 | 219 | 3 | 222 |
| 879 | 198 | 3 | 188 |
| 880 | 214 | 5 | 207 |
| 881 | 195 | 47 | 74 |
| 882 | 212 | 78 | 110 |
| 883 | 189 | 144 | 19 |
| 884 | 210 | 178 | 39 |
| 885 | 164 | 167 | 145 |
| 886 | 180 | 183 | 166 |
| 887 | 187 | 226 | 12 |
| 888 | 204 | 241 | 16 |
| 889 | 190 | 244 | 18 |
| 890 | 197 | 246 | 20 |
| 891 | 205 | 241 | 16 |
| 892 | 73 | 247 | 18 |
| 893 | 75 | 249 | 32 |
| 894 | 178 | 242 | 15 |
| 895 | 174 | 248 | 28 |
| 896 | 181 | 248 | 28 |
| 897 | 166 | 249 | 49 |
| 898 | 150 | 243 | 16 |
| 899 | 145 | 228 | 16 |
| 900 | 165 | 242 | 21 |
| 901 | 155 | 146 | 80 |
| 902 | 182 | 172 | 122 |
| 903 | 151 | 25 | 165 |
| 904 | 182 | 54 | 186 |
| 905 | 164 | 4 | 232 |
| 906 | 193 | 5 | 238 |
| 907 | 185 | 4 | 223 |
| 908 | 191 | 3 | 225 |
| 909 | 209 | 4 | 220 |
| 910 | 207 | 3 | 222 |
| 911 | 194 | 4 | 222 |
| 912 | 182 | 3 | 230 |
| 913 | 191 | 3 | 226 |
| 914 | 200 | 3 | 230 |
| 915 | 223 | 4 | 226 |
| 916 | 206 | 3 | 223 |
| 917 | 117 | 4 | 227 |
| 918 | 142 | 6 | 234 |
| 919 | 172 | 175 | 154 |
| 920 | 186 | 190 | 174 |
| 921 | 104 | 17 | 221 |
| 922 | 141 | 42 | 232 |
| 923 | 99 | 130 | 138 |
| 924 | 136 | 160 | 165 |
| 925 | 26 | 239 | 26 |
| 926 | 60 | 245 | 53 |
| 927 | 79 | 249 | 39 |
| 928 | 33 | 249 | 22 |
| 929 | 25 | 250 | 27 |
| 930 | 99 | 249 | 52 |
| 931 | 22 | 247 | 19 |
| 932 | 21 | 250 | 27 |
| 933 | 27 | 250 | 30 |
| 934 | 21 | 249 | 29 |
| 935 | 27 | 249 | 34 |
| 936 | 35 | 249 | 53 |
| 937 | 20 | 234 | 111 |
| 938 | 19 | 245 | 147 |
| 939 | 44 | 116 | 210 |
| 940 | 74 | 144 | 228 |
| 941 | 62 | 11 | 234 |
| 942 | 84 | 28 | 236 |
| 943 | 107 | 4 | 227 |
| 944 | 137 | 6 | 237 |
| 945 | 137 | 8 | 237 |
| 946 | 32 | 34 | 237 |
| 947 | 31 | 66 | 238 |
| 948 | 56 | 79 | 235 |
| 949 | 17 | 129 | 238 |
| 950 | 14 | 174 | 237 |
| 951 | 10 | 237 | 183 |
| 952 | 18 | 246 | 200 |
| 953 | 178 | 181 | 161 |
| 954 | 192 | 196 | 181 |
| 955 | 16 | 247 | 78 |
| 956 | 11 | 245 | 121 |
| 957 | 17 | 248 | 22 |
| 958 | 35 | 250 | 34 |
| 959 | 25 | 250 | 30 |
| 960 | 13 | 246 | 31 |
| 961 | 17 | 249 | 32 |
| 962 | 32 | 249 | 93 |
| 963 | 19 | 249 | 76 |
| 964 | 18 | 248 | 96 |
| 965 | 15 | 247 | 165 |
| 966 | 15 | 247 | 175 |
| 967 | 10 | 241 | 189 |
| 968 | 9 | 232 | 233 |
| 969 | 9 | 239 | 222 |
| 970 | 13 | 243 | 231 |
| 971 | 11 | 156 | 233 |
| 972 | 11 | 186 | 236 |

APPENDIX E

| Patch # | R | G | B |
|---|---|---|---|
| 973 | 10 | 186 | 232 |
| 974 | 12 | 150 | 237 |
| 975 | 11 | 172 | 236 |
| 976 | 9 | 218 | 228 |
| 977 | 9 | 221 | 234 |
| 978 | 12 | 243 | 227 |
| 979 | 9 | 224 | 230 |
| 980 | 10 | 238 | 224 |
| 981 | 37 | 245 | 229 |
| 982 | 12 | 240 | 233 |
| 983 | 11 | 239 | 226 |
| 984 | 47 | 248 | 137 |
| 985 | 21 | 248 | 108 |
| 986 | 13 | 244 | 149 |
| 987 | 184 | 187 | 168 |
| 988 | 195 | 200 | 187 |
| 989 | 11 | 243 | 137 |
| 990 | 17 | 247 | 163 |
| 991 | 13 | 247 | 37 |
| 992 | 12 | 245 | 107 |
| 993 | 24 | 248 | 112 |
| 994 | 10 | 241 | 158 |
| 995 | 10 | 240 | 195 |
| 996 | 10 | 224 | 236 |
| 997 | 9 | 236 | 228 |
| 998 | 18 | 113 | 236 |
| 999 | 15 | 121 | 235 |
| 1000 | 19 | 144 | 237 |
| 1001 | 74 | 14 | 233 |
| 1002 | 65 | 32 | 238 |
| 1003 | 128 | 40 | 239 |
| 1004 | 42 | 95 | 239 |
| 1005 | 84 | 118 | 238 |
| 1006 | 19 | 221 | 190 |
| 1007 | 14 | 238 | 210 |
| 1008 | 39 | 249 | 92 |
| 1009 | 16 | 246 | 113 |
| 1010 | 80 | 249 | 56 |
| 1011 | 19 | 248 | 29 |
| 1012 | 18 | 244 | 21 |
| 1013 | 86 | 249 | 54 |
| 1014 | 39 | 249 | 25 |
| 1015 | 30 | 249 | 23 |
| 1016 | 86 | 249 | 60 |
| 1017 | 20 | 247 | 23 |
| 1018 | 68 | 221 | 113 |
| 1019 | 141 | 222 | 153 |
| 1020 | 106 | 91 | 200 |
| 1021 | 189 | 192 | 175 |
| 1022 | 200 | 204 | 192 |
| 1023 | 137 | 122 | 223 |
| 1024 | 118 | 9 | 235 |
| 1025 | 140 | 19 | 234 |
| 1026 | 148 | 4 | 227 |
| 1027 | 145 | 5 | 237 |
| 1028 | 167 | 5 | 235 |
| 1029 | 196 | 3 | 229 |
| 1030 | 172 | 4 | 231 |
| 1031 | 182 | 4 | 228 |
| 1032 | 170 | 4 | 230 |
| 1033 | 190 | 4 | 234 |
| 1034 | 164 | 12 | 223 |
| 1035 | 188 | 35 | 231 |
| 1036 | 161 | 114 | 147 |
| 1037 | 186 | 145 | 173 |
| 1038 | 146 | 217 | 47 |
| 1039 | 181 | 231 | 95 |
| 1040 | 108 | 246 | 18 |
| 1041 | 161 | 249 | 50 |
| 1042 | 110 | 249 | 30 |
| 1043 | 152 | 248 | 30 |
| 1044 | 137 | 247 | 21 |
| 1045 | 203 | 248 | 49 |
| 1046 | 197 | 246 | 21 |
| 1047 | 211 | 244 | 20 |
| 1048 | 197 | 248 | 29 |
| 1049 | 214 | 248 | 49 |
| 1050 | 218 | 247 | 110 |
| 1051 | 205 | 247 | 24 |
| 1052 | 199 | 223 | 18 |
| 1053 | 215 | 233 | 24 |
| 1054 | 197 | 136 | 63 |
| 1055 | 194 | 197 | 181 |
| 1056 | 204 | 208 | 197 |
| 1057 | 214 | 155 | 98 |
| 1058 | 193 | 24 | 153 |
| 1059 | 211 | 40 | 183 |
| 1060 | 200 | 3 | 229 |
| 1061 | 218 | 4 | 237 |
| 1062 | 206 | 3 | 223 |
| 1063 | 218 | 3 | 225 |
| 1064 | 207 | 4 | 222 |
| 1065 | 210 | 3 | 225 |
| 1066 | 221 | 3 | 223 |
| 1067 | 214 | 4 | 224 |
| 1068 | 220 | 3 | 228 |
| 1069 | 228 | 3 | 223 |
| 1070 | 229 | 3 | 217 |
| 1071 | 227 | 4 | 218 |
| 1072 | 227 | 3 | 220 |
| 1073 | 229 | 3 | 222 |
| 1074 | 224 | 4 | 188 |
| 1075 | 232 | 5 | 201 |
| 1076 | 221 | 39 | 77 |
| 1077 | 234 | 59 | 112 |
| 1078 | 222 | 142 | 21 |
| 1079 | 234 | 172 | 41 |
| 1080 | 219 | 222 | 14 |
| 1081 | 228 | 236 | 17 |
| 1082 | 217 | 239 | 16 |
| 1083 | 226 | 248 | 50 |
| 1084 | 228 | 245 | 23 |
| 1085 | 235 | 230 | 15 |
| 1086 | 234 | 230 | 15 |
| 1087 | 235 | 244 | 24 |
| 1088 | 231 | 234 | 16 |
| 1089 | 199 | 202 | 188 |
| 1090 | 208 | 211 | 203 |
| 1091 | 229 | 238 | 17 |
| 1092 | 236 | 150 | 12 |
| 1093 | 229 | 179 | 12 |
| 1094 | 229 | 191 | 12 |
| 1095 | 239 | 52 | 26 |
| 1096 | 238 | 81 | 33 |
| 1097 | 236 | 106 | 35 |
| 1098 | 232 | 4 | 121 |
| 1099 | 234 | 11 | 121 |
| 1100 | 231 | 17 | 128 |
| 1101 | 229 | 3 | 213 |
| 1102 | 225 | 3 | 219 |
| 1103 | 229 | 4 | 220 |
| 1104 | 226 | 4 | 229 |
| 1105 | 229 | 3 | 224 |
| 1106 | 226 | 3 | 224 |
| 1107 | 224 | 3 | 223 |
| 1108 | 226 | 3 | 226 |
| 1109 | 229 | 3 | 223 |
| 1110 | 227 | 3 | 228 |
| 1111 | 227 | 3 | 222 |
| 1112 | 228 | 3 | 224 |
| 1113 | 225 | 3 | 224 |
| 1114 | 230 | 4 | 229 |
| 1115 | 228 | 3 | 222 |
| 1116 | 229 | 4 | 223 |
| 1117 | 230 | 4 | 185 |
| 1118 | 231 | 4 | 193 |
| 1119 | 229 | 5 | 205 |
| 1120 | 237 | 37 | 91 |
| 1121 | 234 | 53 | 91 |
| 1122 | 235 | 55 | 113 |
| 1123 | 203 | 206 | 193 |
| 1124 | 211 | 214 | 207 |
| 1125 | 238 | 134 | 21 |
| 1126 | 239 | 149 | 28 |
| 1127 | 239 | 164 | 38 |
| 1128 | 234 | 210 | 13 |
| 1129 | 236 | 220 | 14 |
| 1130 | 236 | 229 | 18 |

-continued

APPENDIX E

| Patch # | R | G | B |
|---|---|---|---|
| 1131 | 236 | 247 | 98 |
| 1132 | 230 | 246 | 30 |
| 1133 | 233 | 242 | 20 |
| 1134 | 236 | 247 | 39 |
| 1135 | 227 | 244 | 22 |
| 1136 | 220 | 248 | 48 |
| 1137 | 221 | 240 | 17 |
| 1138 | 230 | 238 | 17 |
| 1139 | 219 | 244 | 20 |
| 1140 | 227 | 243 | 20 |
| 1141 | 214 | 248 | 32 |
| 1142 | 226 | 238 | 16 |
| 1143 | 219 | 214 | 18 |
| 1144 | 230 | 229 | 24 |
| 1145 | 222 | 122 | 63 |
| 1146 | 232 | 139 | 106 |
| 1147 | 220 | 18 | 163 |
| 1148 | 233 | 31 | 186 |
| 1149 | 226 | 3 | 230 |
| 1150 | 232 | 4 | 235 |
| 1151 | 227 | 3 | 222 |
| 1152 | 228 | 3 | 226 |
| 1153 | 238 | 4 | 243 |
| 1154 | 229 | 4 | 228 |
| 1155 | 225 | 4 | 223 |
| 1156 | 228 | 3 | 224 |
| 1157 | 207 | 209 | 198 |
| 1158 | 214 | 217 | 211 |
| 1159 | 228 | 4 | 219 |
| 1160 | 199 | 4 | 225 |
| 1161 | 206 | 4 | 224 |
| 1162 | 213 | 3 | 222 |
| 1163 | 201 | 4 | 227 |
| 1164 | 215 | 3 | 229 |
| 1165 | 197 | 15 | 221 |
| 1166 | 211 | 30 | 230 |
| 1167 | 189 | 117 | 142 |
| 1168 | 212 | 136 | 170 |
| 1169 | 196 | 210 | 71 |
| 1170 | 217 | 222 | 98 |
| 1171 | 189 | 248 | 38 |
| 1172 | 187 | 241 | 16 |
| 1173 | 180 | 247 | 23 |
| 1174 | 188 | 245 | 21 |
| 1175 | 199 | 242 | 18 |
| 1176 | 85 | 248 | 27 |
| 1177 | 59 | 245 | 18 |
| 1178 | 106 | 249 | 41 |
| 1179 | 97 | 249 | 46 |
| 1180 | 84 | 245 | 23 |
| 1181 | 159 | 192 | 141 |
| 1182 | 191 | 216 | 166 |
| 1183 | 157 | 89 | 205 |
| 1184 | 183 | 121 | 224 |
| 1185 | 161 | 11 | 234 |
| 1186 | 182 | 25 | 235 |
| 1187 | 179 | 3 | 228 |
| 1188 | 170 | 5 | 234 |
| 1189 | 176 | 7 | 235 |
| 1190 | 123 | 23 | 240 |
| 1191 | 211 | 213 | 202 |
| 1192 | 217 | 218 | 215 |
| 1193 | 120 | 17 | 237 |
| 1194 | 171 | 66 | 241 |
| 1195 | 98 | 73 | 239 |
| 1196 | 125 | 98 | 237 |
| 1197 | 73 | 194 | 189 |
| 1198 | 110 | 212 | 210 |
| 1199 | 171 | 247 | 157 |
| 1200 | 47 | 245 | 108 |
| 1201 | 16 | 244 | 19 |
| 1202 | 19 | 249 | 28 |
| 1203 | 82 | 249 | 59 |
| 1204 | 77 | 249 | 87 |
| 1205 | 16 | 246 | 94 |
| 1206 | 29 | 249 | 95 |
| 1207 | 28 | 248 | 159 |
| 1208 | 60 | 247 | 193 |
| 1209 | 19 | 202 | 236 |
| 1210 | 29 | 217 | 238 |
| 1211 | 39 | 87 | 238 |
| 1212 | 46 | 98 | 238 |
| 1213 | 102 | 90 | 234 |
| 1214 | 9 | 203 | 232 |
| 1215 | 9 | 215 | 233 |
| 1216 | 9 | 227 | 232 |
| 1217 | 35 | 246 | 222 |
| 1218 | 14 | 244 | 219 |
| 1219 | 22 | 248 | 142 |
| 1220 | 12 | 243 | 181 |
| 1221 | 27 | 247 | 180 |
| 1222 | 12 | 243 | 210 |
| 1223 | 12 | 242 | 195 |
| 1224 | 24 | 245 | 223 |
| 1225 | 214 | 215 | 206 |
| 1226 | 220 | 220 | 218 |
| 1227 | 9 | 239 | 215 |
| 1228 | 9 | 237 | 227 |
| 1229 | 11 | 241 | 226 |
| 1230 | 12 | 243 | 227 |
| 1231 | 31 | 245 | 229 |
| 1232 | 23 | 245 | 222 |
| 1233 | 12 | 244 | 221 |
| 1234 | 12 | 243 | 228 |
| 1235 | 20 | 245 | 222 |
| 1236 | 12 | 243 | 229 |
| 1237 | 14 | 244 | 226 |
| 1238 | 25 | 244 | 231 |
| 1239 | 10 | 237 | 232 |
| 1240 | 22 | 244 | 231 |
| 1241 | 22 | 244 | 231 |
| 1242 | 12 | 241 | 231 |
| 1243 | 18 | 244 | 230 |
| 1244 | 10 | 238 | 229 |
| 1245 | 10 | 237 | 231 |
| 1246 | 10 | 238 | 229 |
| 1247 | 24 | 245 | 227 |
| 1248 | 10 | 239 | 224 |
| 1249 | 11 | 240 | 228 |
| 1250 | 8 | 241 | 242 |
| 1251 | 14 | 245 | 212 |
| 1252 | 16 | 244 | 226 |
| 1253 | 27 | 245 | 228 |
| 1254 | 57 | 244 | 228 |
| 1255 | 11 | 239 | 225 |
| 1256 | 11 | 240 | 228 |
| 1257 | 14 | 192 | 132 |
| 1258 | 21 | 193 | 234 |
| 1259 | 217 | 219 | 211 |
| 1260 | 22 | 222 | 221 |
| 1261 | 33 | 195 | 235 |
| 1262 | 155 | 244 | 218 |
| 1263 | 51 | 244 | 231 |
| 1264 | 61 | 248 | 162 |
| 1265 | 11 | 241 | 160 |
| 1266 | 60 | 247 | 174 |
| 1267 | 88 | 249 | 94 |
| 1268 | 18 | 247 | 44 |
| 1269 | 58 | 249 | 83 |
| 1270 | 28 | 247 | 161 |
| 1271 | 28 | 246 | 189 |
| 1272 | 105 | 152 | 235 |
| 1273 | 133 | 194 | 240 |
| 1274 | 114 | 58 | 241 |
| 1275 | 151 | 46 | 238 |
| 1276 | 197 | 69 | 237 |
| 1277 | 160 | 9 | 233 |
| 1278 | 167 | 10 | 234 |
| 1279 | 177 | 31 | 237 |
| 1280 | 160 | 57 | 239 |
| 1281 | 185 | 96 | 238 |
| 1282 | 160 | 173 | 189 |
| 1283 | 184 | 205 | 209 |
| 1284 | 104 | 247 | 74 |
| 1285 | 154 | 243 | 120 |
| 1286 | 27 | 247 | 21 |
| 1287 | 10 | 249 | 25 |
| 1288 | 97 | 249 | 41 |

-continued

APPENDIX E

| Patch # | R | G | B |
|---|---|---|---|
| 1289 | 178 | 248 | 27 |
| 1290 | 180 | 242 | 17 |
| 1291 | 193 | 247 | 29 |
| 1292 | 168 | 246 | 29 |
| 1293 | 220 | 221 | 214 |
| 1294 | 224 | 223 | 224 |
| 1295 | 199 | 242 | 27 |
| 1296 | 196 | 184 | 138 |
| 1297 | 213 | 204 | 155 |
| 1298 | 192 | 71 | 203 |
| 1299 | 209 | 97 | 220 |
| 1300 | 199 | 7 | 231 |
| 1301 | 216 | 16 | 234 |
| 1302 | 194 | 4 | 228 |
| 1303 | 205 | 4 | 236 |
| 1304 | 212 | 5 | 237 |
| 1305 | 225 | 3 | 217 |
| 1306 | 227 | 3 | 224 |
| 1307 | 231 | 3 | 232 |
| 1308 | 225 | 3 | 231 |
| 1309 | 231 | 3 | 227 |
| 1310 | 222 | 7 | 219 |
| 1311 | 232 | 16 | 229 |
| 1312 | 222 | 85 | 137 |
| 1313 | 233 | 113 | 164 |
| 1314 | 223 | 193 | 66 |
| 1315 | 233 | 211 | 92 |
| 1316 | 213 | 246 | 26 |
| 1317 | 226 | 243 | 20 |
| 1318 | 213 | 245 | 23 |
| 1319 | 220 | 239 | 17 |
| 1320 | 225 | 239 | 18 |
| 1321 | 233 | 246 | 33 |
| 1322 | 225 | 246 | 26 |
| 1323 | 236 | 240 | 21 |
| 1324 | 230 | 238 | 19 |
| 1325 | 232 | 247 | 52 |
| 1326 | 225 | 246 | 32 |
| 1327 | 223 | 223 | 217 |
| 1328 | 226 | 225 | 227 |
| 1329 | 223 | 247 | 30 |
| 1330 | 234 | 235 | 17 |
| 1331 | 231 | 246 | 32 |
| 1332 | 228 | 246 | 27 |
| 1333 | 235 | 246 | 33 |
| 1334 | 230 | 242 | 21 |
| 1335 | 233 | 242 | 21 |
| 1336 | 227 | 241 | 19 |
| 1337 | 234 | 243 | 23 |
| 1338 | 225 | 238 | 17 |
| 1339 | 224 | 242 | 19 |
| 1340 | 232 | 246 | 32 |
| 1341 | 237 | 247 | 101 |
| 1342 | 232 | 236 | 18 |
| 1343 | 236 | 205 | 20 |
| 1344 | 239 | 209 | 40 |
| 1345 | 238 | 208 | 118 |
| 1346 | 239 | 101 | 72 |
| 1347 | 240 | 110 | 93 |
| 1348 | 236 | 98 | 161 |
| 1349 | 236 | 15 | 158 |
| 1350 | 237 | 27 | 166 |
| 1351 | 237 | 30 | 175 |
| 1352 | 230 | 4 | 228 |
| 1353 | 230 | 4 | 230 |
| 1354 | 231 | 4 | 234 |
| 1355 | 225 | 3 | 226 |
| 1356 | 228 | 3 | 222 |
| 1357 | 228 | 4 | 220 |
| 1358 | 226 | 3 | 226 |
| 1359 | 227 | 3 | 222 |
| 1360 | 228 | 3 | 218 |
| 1361 | 225 | 225 | 220 |
| 1362 | 227 | 227 | 229 |
| 1363 | 227 | 3 | 217 |
| 1364 | 224 | 3 | 223 |
| 1365 | 227 | 3 | 222 |
| 1366 | 229 | 3 | 221 |
| 1367 | 227 | 4 | 223 |
| 1368 | 224 | 3 | 222 |
| 1369 | 228 | 4 | 227 |
| 1370 | 229 | 3 | 224 |
| 1371 | 229 | 3 | 224 |
| 1372 | 228 | 3 | 224 |
| 1373 | 226 | 3 | 224 |
| 1374 | 228 | 4 | 222 |
| 1375 | 229 | 3 | 224 |
| 1376 | 228 | 4 | 219 |
| 1377 | 229 | 4 | 222 |
| 1378 | 228 | 3 | 217 |
| 1379 | 229 | 3 | 226 |
| 1380 | 229 | 4 | 225 |
| 1381 | 228 | 4 | 217 |
| 1382 | 230 | 3 | 230 |
| 1383 | 226 | 3 | 224 |
| 1384 | 230 | 3 | 230 |
| 1385 | 233 | 6 | 216 |
| 1386 | 231 | 11 | 224 |
| 1387 | 234 | 18 | 229 |
| 1388 | 237 | 73 | 142 |
| 1389 | 239 | 87 | 151 |
| 1390 | 239 | 91 | 170 |
| 1391 | 237 | 181 | 87 |
| 1392 | 239 | 182 | 151 |
| 1393 | 236 | 206 | 99 |
| 1394 | 230 | 241 | 20 |
| 1395 | 227 | 226 | 222 |
| 1396 | 229 | 228 | 231 |
| 1397 | 234 | 245 | 30 |
| 1398 | 237 | 247 | 56 |
| 1399 | 231 | 247 | 38 |
| 1400 | 226 | 237 | 16 |
| 1401 | 233 | 246 | 32 |
| 1402 | 231 | 239 | 18 |
| 1403 | 231 | 236 | 17 |
| 1404 | 208 | 239 | 17 |
| 1405 | 212 | 247 | 30 |
| 1406 | 219 | 245 | 23 |
| 1407 | 217 | 241 | 33 |
| 1408 | 226 | 248 | 50 |
| 1409 | 222 | 173 | 131 |
| 1410 | 232 | 197 | 155 |
| 1411 | 218 | 56 | 204 |
| 1412 | 230 | 90 | 219 |
| 1413 | 222 | 7 | 236 |
| 1414 | 233 | 16 | 232 |
| 1415 | 220 | 3 | 227 |
| 1416 | 224 | 3 | 228 |
| 1417 | 229 | 4 | 233 |
| 1418 | 192 | 9 | 237 |
| 1419 | 203 | 15 | 240 |
| 1420 | 209 | 30 | 234 |
| 1421 | 191 | 71 | 237 |
| 1422 | 211 | 88 | 239 |
| 1423 | 195 | 170 | 195 |
| 1424 | 212 | 191 | 212 |
| 1425 | 196 | 238 | 111 |
| 1426 | 204 | 247 | 110 |
| 1427 | 131 | 249 | 37 |
| 1428 | 145 | 246 | 22 |
| 1429 | 229 | 228 | 225 |
| 1430 | 231 | 229 | 233 |
| 1431 | 197 | 248 | 50 |
| 1432 | 33 | 249 | 39 |
| 1433 | 44 | 249 | 41 |
| 1434 | 67 | 246 | 45 |
| 1435 | 123 | 237 | 165 |
| 1436 | 132 | 246 | 178 |
| 1437 | 144 | 144 | 233 |
| 1438 | 179 | 180 | 239 |
| 1439 | 150 | 34 | 234 |
| 1440 | 157 | 48 | 234 |
| 1441 | 185 | 86 | 239 |
| 1442 | 121 | 122 | 234 |
| 1443 | 180 | 133 | 232 |
| 1444 | 178 | 178 | 233 |
| 1445 | 18 | 240 | 218 |
| 1446 | 63 | 244 | 228 |

APPENDIX E

| Patch # | R | G | B |
|---|---|---|---|
| 1447 | 35 | 248 | 150 |
| 1448 | 71 | 248 | 165 |
| 1449 | 23 | 246 | 158 |
| 1450 | 59 | 245 | 213 |
| 1451 | 36 | 245 | 223 |
| 1452 | 12 | 237 | 228 |
| 1453 | 13 | 241 | 231 |
| 1454 | 26 | 245 | 218 |
| 1455 | 159 | 242 | 229 |
| 1456 | 13 | 241 | 221 |
| 1457 | 59 | 244 | 231 |
| 1458 | 16 | 242 | 231 |
| 1459 | 14 | 241 | 230 |
| 1460 | 15 | 242 | 225 |
| 1461 | 16 | 242 | 231 |
| 1462 | 24 | 244 | 227 |
| 1463 | 231 | 230 | 227 |
| 1464 | 232 | 230 | 235 |
| 1465 | 13 | 241 | 226 |
| 1466 | 12 | 239 | 231 |
| 1467 | 13 | 242 | 231 |
| 1468 | 54 | 246 | 211 |
| 1469 | 13 | 243 | 218 |
| 1470 | 19 | 244 | 220 |
| 1471 | 37 | 222 | 235 |
| 1472 | 104 | 221 | 230 |
| 1473 | 105 | 242 | 231 |
| 1474 | 144 | 119 | 232 |
| 1475 | 158 | 144 | 235 |
| 1476 | 199 | 171 | 238 |
| 1477 | 136 | 220 | 220 |
| 1478 | 158 | 238 | 227 |
| 1479 | 73 | 245 | 129 |
| 1480 | 97 | 247 | 160 |
| 1481 | 64 | 245 | 152 |
| 1482 | 156 | 247 | 35 |
| 1483 | 195 | 245 | 47 |
| 1484 | 204 | 246 | 67 |
| 1485 | 201 | 229 | 172 |
| 1486 | 216 | 240 | 184 |
| 1487 | 196 | 136 | 231 |
| 1488 | 214 | 163 | 237 |
| 1489 | 198 | 34 | 239 |
| 1490 | 208 | 55 | 240 |
| 1491 | 219 | 72 | 233 |
| 1492 | 222 | 4 | 236 |
| 1493 | 228 | 5 | 234 |
| 1494 | 230 | 14 | 234 |
| 1495 | 221 | 40 | 237 |
| 1496 | 231 | 65 | 238 |
| 1497 | 232 | 231 | 229 |
| 1498 | 233 | 231 | 236 |
| 1499 | 216 | 136 | 188 |
| 1500 | 228 | 170 | 209 |
| 1501 | 219 | 227 | 120 |
| 1502 | 230 | 239 | 140 |
| 1503 | 192 | 248 | 35 |
| 1504 | 206 | 246 | 25 |
| 1505 | 216 | 243 | 21 |
| 1506 | 230 | 246 | 31 |
| 1507 | 237 | 247 | 51 |
| 1508 | 232 | 243 | 24 |
| 1509 | 229 | 239 | 19 |
| 1510 | 236 | 247 | 38 |
| 1511 | 235 | 235 | 38 |
| 1512 | 238 | 239 | 60 |
| 1513 | 240 | 244 | 69 |
| 1514 | 236 | 155 | 127 |
| 1515 | 238 | 169 | 144 |
| 1516 | 239 | 172 | 158 |
| 1517 | 236 | 48 | 202 |
| 1518 | 237 | 63 | 209 |
| 1519 | 234 | 87 | 219 |
| 1520 | 229 | 8 | 239 |
| 1521 | 233 | 9 | 234 |
| 1522 | 231 | 15 | 239 |
| 1523 | 228 | 3 | 223 |
| 1524 | 229 | 3 | 228 |
| 1525 | 230 | 3 | 227 |
| 1526 | 227 | 4 | 230 |
| 1527 | 231 | 3 | 228 |
| 1528 | 233 | 5 | 235 |
| 1529 | 232 | 9 | 239 |
| 1530 | 227 | 8 | 231 |
| 1531 | 233 | 232 | 231 |
| 1532 | 235 | 232 | 238 |
| 1533 | 234 | 14 | 229 |
| 1534 | 234 | 16 | 237 |
| 1535 | 234 | 34 | 236 |
| 1536 | 237 | 49 | 238 |
| 1537 | 234 | 92 | 241 |
| 1538 | 234 | 128 | 183 |
| 1539 | 237 | 152 | 190 |
| 1540 | 240 | 167 | 198 |
| 1541 | 235 | 222 | 119 |
| 1542 | 238 | 225 | 158 |
| 1543 | 230 | 242 | 102 |
| 1544 | 230 | 248 | 49 |
| 1545 | 236 | 242 | 23 |
| 1546 | 233 | 246 | 36 |
| 1547 | 232 | 247 | 19 |
| 1548 | 235 | 237 | 23 |
| 1549 | 212 | 245 | 48 |
| 1550 | 215 | 245 | 45 |
| 1551 | 221 | 241 | 70 |
| 1552 | 218 | 220 | 169 |
| 1553 | 230 | 231 | 187 |
| 1554 | 218 | 115 | 229 |
| 1555 | 229 | 149 | 238 |
| 1556 | 221 | 40 | 240 |
| 1557 | 226 | 54 | 240 |
| 1558 | 230 | 64 | 240 |
| 1559 | 200 | 119 | 237 |
| 1560 | 213 | 138 | 236 |
| 1561 | 223 | 162 | 240 |
| 1562 | 196 | 219 | 219 |
| 1563 | 216 | 229 | 225 |
| 1564 | 159 | 243 | 128 |
| 1565 | 235 | 233 | 232 |
| 1566 | 238 | 233 | 237 |
| 1567 | 160 | 245 | 125 |
| 1568 | 206 | 237 | 142 |
| 1569 | 68 | 246 | 204 |
| 1570 | 19 | 243 | 209 |
| 1571 | 99 | 244 | 217 |
| 1572 | 113 | 203 | 236 |
| 1573 | 152 | 214 | 229 |
| 1574 | 136 | 232 | 228 |
| 1575 | 13 | 236 | 232 |
| 1576 | 18 | 242 | 231 |
| 1577 | 14 | 239 | 232 |
| 1578 | 23 | 243 | 226 |
| 1579 | 15 | 236 | 227 |
| 1580 | 44 | 240 | 232 |
| 1581 | 51 | 239 | 225 |
| 1582 | 67 | 240 | 230 |
| 1583 | 105 | 235 | 228 |
| 1584 | 110 | 240 | 227 |
| 1585 | 118 | 236 | 201 |
| 1586 | 176 | 235 | 211 |
| 1587 | 199 | 237 | 220 |
| 1588 | 199 | 193 | 233 |
| 1589 | 213 | 201 | 234 |
| 1590 | 223 | 222 | 231 |
| 1591 | 221 | 113 | 236 |
| 1592 | 226 | 136 | 237 |
| 1593 | 231 | 158 | 228 |
| 1594 | 221 | 203 | 220 |
| 1595 | 229 | 224 | 224 |
| 1596 | 214 | 240 | 109 |
| 1597 | 221 | 243 | 134 |
| 1598 | 232 | 235 | 163 |
| 1599 | 236 | 234 | 234 |
| 1600 | 238 | 234 | 237 |
| 1601 | 228 | 246 | 40 |
| 1602 | 238 | 242 | 33 |
| 1603 | 236 | 240 | 42 |
| 1604 | 229 | 239 | 54 |

-continued
APPENDIX E

| Patch # | R | G | B |
|---|---|---|---|
| 1605 | 238 | 238 | 59 |
| 1606 | 234 | 211 | 170 |
| 1607 | 238 | 218 | 182 |
| 1608 | 241 | 226 | 185 |
| 1609 | 233 | 109 | 226 |
| 1610 | 236 | 134 | 233 |
| 1611 | 229 | 158 | 238 |
| 1612 | 234 | 22 | 235 |
| 1613 | 234 | 8 | 233 |
| 1614 | 236 | 44 | 229 |
| 1615 | 237 | 54 | 229 |
| 1616 | 236 | 50 | 236 |
| 1617 | 235 | 96 | 238 |
| 1618 | 236 | 78 | 236 |
| 1619 | 237 | 124 | 239 |
| 1620 | 237 | 132 | 239 |
| 1621 | 237 | 125 | 237 |
| 1622 | 234 | 189 | 219 |
| 1623 | 237 | 204 | 222 |
| 1624 | 239 | 209 | 228 |
| 1625 | 234 | 244 | 147 |
| 1626 | 235 | 246 | 135 |
| 1627 | 237 | 243 | 159 |
| 1628 | 235 | 242 | 170 |
| 1629 | 235 | 239 | 178 |
| 1630 | 221 | 242 | 196 |
| 1631 | 226 | 243 | 200 |
| 1632 | 233 | 227 | 220 |
| 1633 | 237 | 235 | 235 |
| 1634 | 238 | 235 | 237 |
| 1635 | 219 | 181 | 233 |
| 1636 | 224 | 194 | 234 |
| 1637 | 227 | 207 | 231 |
| 1638 | 202 | 241 | 226 |
| 1639 | 176 | 238 | 232 |
| 1640 | 191 | 237 | 229 |
| 1641 | 222 | 228 | 225 |
| 1642 | 223 | 240 | 214 |
| 1643 | 216 | 239 | 215 |
| 1644 | 224 | 220 | 231 |
| 1645 | 224 | 241 | 225 |
| 1646 | 229 | 218 | 231 |
| 1647 | 228 | 235 | 211 |
| 1648 | 232 | 238 | 195 |
| 1649 | 236 | 238 | 200 |
| 1650 | 235 | 241 | 202 |
| 1651 | 240 | 214 | 223 |
| 1652 | 240 | 212 | 227 |
| 1653 | 234 | 169 | 236 |
| 1654 | 237 | 155 | 234 |
| 1655 | 236 | 178 | 237 |
| 1656 | 239 | 189 | 238 |
| 1657 | 239 | 193 | 236 |
| 1658 | 233 | 225 | 236 |
| 1659 | 239 | 234 | 224 |
| 1660 | 240 | 234 | 208 |
| 1661 | 234 | 236 | 230 |
| 1662 | 235 | 239 | 213 |
| 1663 | 236 | 240 | 212 |
| 1664 | 240 | 237 | 211 |
| 1665 | 235 | 241 | 211 |
| 1666 | 239 | 214 | 227 |
| 1667 | 238 | 235 | 237 |
| 1668 | 238 | 235 | 237 |
| 1669 | 236 | 238 | 212 |
| 1670 | 240 | 236 | 212 |
| 1671 | 235 | 238 | 220 |
| 1672 | 236 | 213 | 236 |
| 1673 | 231 | 237 | 230 |
| 1674 | 223 | 240 | 228 |
| 1675 | 232 | 240 | 220 |
| 1676 | 234 | 222 | 234 |

APPENDIX F
Q60.rgb: Q60, RGB scan data

| Patch # | R | G | B |
|---|---|---|---|
| 1 | 95 | 83 | 167 |
| 2 | 192 | 82 | 163 |
| 3 | 191 | 67 | 113 |
| 4 | 185 | 61 | 77 |
| 5 | 179 | 60 | 42 |
| 6 | 198 | 119 | 42 |
| 7 | 183 | 184 | 50 |
| 8 | 93 | 150 | 43 |
| 9 | 53 | 130 | 69 |
| 10 | 54 | 144 | 118 |
| 11 | 58 | 163 | 195 |
| 12 | 59 | 96 | 169 |
| 13 | 104 | 89 | 173 |
| 14 | 167 | 73 | 147 |
| 15 | 182 | 66 | 110 |
| 16 | 182 | 59 | 81 |
| 17 | 185 | 67 | 54 |
| 18 | 136 | 96 | 34 |
| 19 | 118 | 136 | 36 |
| 20 | 87 | 144 | 38 |
| 21 | 48 | 124 | 58 |
| 22 | 43 | 126 | 96 |
| 23 | 41 | 119 | 140 |
| 24 | 69 | 104 | 181 |
| 25 | 106 | 87 | 152 |
| 26 | 133 | 75 | 122 |
| 27 | 150 | 70 | 110 |
| 28 | 148 | 70 | 81 |
| 29 | 153 | 77 | 64 |
| 30 | 127 | 91 | 45 |
| 31 | 125 | 127 | 55 |
| 32 | 98 | 141 | 67 |
| 33 | 58 | 122 | 71 |
| 34 | 55 | 121 | 98 |
| 35 | 64 | 118 | 129 |
| 36 | 88 | 108 | 164 |
| 37 | 99 | 88 | 112 |
| 38 | 112 | 83 | 104 |
| 39 | 122 | 81 | 96 |
| 40 | 118 | 80 | 83 |
| 41 | 124 | 93 | 81 |
| 42 | 116 | 99 | 75 |
| 43 | 129 | 125 | 87 |
| 44 | 108 | 131 | 91 |
| 45 | 79 | 112 | 83 |
| 46 | 75 | 113 | 98 |
| 47 | 81 | 113 | 119 |
| 48 | 98 | 105 | 128 |
| 49 | 152 | 122 | 197 |
| 50 | 188 | 116 | 174 |
| 51 | 211 | 110 | 146 |
| 52 | 213 | 109 | 125 |
| 53 | 214 | 117 | 105 |
| 54 | 200 | 138 | 92 |
| 55 | 181 | 187 | 56 |
| 56 | 130 | 182 | 81 |
| 57 | 97 | 178 | 117 |
| 58 | 80 | 173 | 142 |
| 59 | 75 | 180 | 210 |
| 60 | 134 | 152 | 209 |
| 61 | 152 | 129 | 189 |
| 62 | 182 | 120 | 159 |
| 63 | 197 | 114 | 138 |
| 64 | 195 | 113 | 124 |
| 65 | 199 | 125 | 117 |
| 66 | 189 | 146 | 115 |
| 67 | 189 | 186 | 96 |
| 68 | 142 | 185 | 109 |
| 69 | 110 | 175 | 118 |
| 70 | 96 | 173 | 143 |
| 71 | 97 | 173 | 194 |
| 72 | 142 | 151 | 193 |
| 73 | 147 | 131 | 160 |
| 74 | 161 | 125 | 148 |
| 75 | 171 | 123 | 136 |
| 76 | 169 | 122 | 127 |
| 77 | 176 | 134 | 124 |
| 78 | 177 | 153 | 125 |

APPENDIX F
Q60.rgb: Q60, RGB scan data

| Patch # | R | G | B |
|---|---|---|---|
| 79 | 193 | 185 | 142 |
| 80 | 159 | 178 | 132 |
| 81 | 127 | 166 | 133 |
| 82 | 116 | 162 | 142 |
| 83 | 122 | 159 | 168 |
| 84 | 147 | 150 | 170 |
| 85 | 194 | 172 | 218 |
| 86 | 226 | 170 | 203 |
| 87 | 230 | 166 | 187 |
| 88 | 230 | 167 | 170 |
| 89 | 229 | 165 | 150 |
| 90 | 230 | 175 | 138 |
| 91 | 220 | 214 | 118 |
| 92 | 184 | 215 | 144 |
| 93 | 147 | 209 | 163 |
| 94 | 129 | 208 | 187 |
| 95 | 137 | 209 | 229 |
| 96 | 172 | 181 | 222 |
| 97 | 195 | 175 | 216 |
| 98 | 210 | 171 | 204 |
| 99 | 215 | 169 | 188 |
| 100 | 217 | 166 | 172 |
| 101 | 216 | 167 | 154 |
| 102 | 218 | 180 | 153 |
| 103 | 224 | 215 | 136 |
| 104 | 197 | 221 | 164 |
| 105 | 163 | 213 | 177 |
| 106 | 148 | 213 | 196 |
| 107 | 154 | 212 | 226 |
| 108 | 179 | 186 | 219 |
| 109 | 192 | 183 | 212 |
| 110 | 201 | 178 | 200 |
| 111 | 205 | 177 | 189 |
| 112 | 206 | 174 | 181 |
| 113 | 204 | 177 | 171 |
| 114 | 208 | 192 | 176 |
| 115 | 221 | 220 | 180 |
| 116 | 208 | 224 | 187 |
| 117 | 179 | 212 | 190 |
| 118 | 172 | 215 | 205 |
| 119 | 178 | 213 | 222 |
| 120 | 188 | 191 | 218 |
| 121 | 232 | 239 | 236 |
| 122 | 224 | 238 | 238 |
| 123 | 202 | 236 | 238 |
| 124 | 185 | 232 | 237 |
| 125 | 168 | 229 | 236 |
| 126 | 154 | 225 | 234 |
| 127 | 143 | 220 | 231 |
| 128 | 129 | 215 | 229 |
| 129 | 117 | 210 | 227 |
| 130 | 107 | 205 | 224 |
| 131 | 96 | 198 | 221 |
| 132 | 80 | 183 | 211 |
| 133 | 232 | 239 | 235 |
| 134 | 235 | 227 | 235 |
| 135 | 233 | 197 | 228 |
| 136 | 232 | 183 | 224 |
| 137 | 230 | 169 | 219 |
| 138 | 228 | 156 | 215 |
| 139 | 226 | 144 | 208 |
| 140 | 223 | 131 | 202 |
| 141 | 217 | 111 | 187 |
| 142 | 213 | 102 | 181 |
| 143 | 207 | 91 | 170 |
| 144 | 205 | 90 | 169 |
| 145 | 233 | 239 | 236 |
| 146 | 235 | 238 | 224 |
| 147 | 236 | 236 | 205 |
| 148 | 237 | 233 | 185 |
| 149 | 236 | 227 | 164 |
| 150 | 238 | 226 | 147 |
| 151 | 236 | 223 | 132 |
| 152 | 235 | 218 | 118 |
| 153 | 234 | 215 | 104 |
| 154 | 233 | 211 | 88 |
| 155 | 230 | 206 | 76 |
| 156 | 222 | 194 | 56 |
| 157 | 232 | 238 | 235 |
| 158 | 226 | 227 | 222 |
| 159 | 207 | 203 | 202 |
| 160 | 190 | 183 | 182 |
| 161 | 169 | 161 | 161 |
| 162 | 149 | 144 | 145 |
| 163 | 134 | 126 | 124 |
| 164 | 114 | 108 | 105 |
| 165 | 99 | 93 | 87 |
| 166 | 86 | 78 | 72 |
| 167 | 73 | 62 | 52 |
| 168 | 59 | 48 | 43 |
| 169 | 233 | 239 | 236 |
| 170 | 235 | 226 | 224 |
| 171 | 234 | 195 | 194 |
| 172 | 231 | 175 | 171 |
| 173 | 227 | 161 | 149 |
| 174 | 225 | 145 | 134 |
| 175 | 222 | 129 | 117 |
| 176 | 217 | 114 | 101 |
| 177 | 212 | 100 | 88 |
| 178 | 205 | 89 | 75 |
| 179 | 197 | 74 | 63 |
| 180 | 176 | 57 | 44 |
| 181 | 232 | 239 | 237 |
| 182 | 224 | 236 | 224 |
| 183 | 206 | 230 | 204 |
| 184 | 188 | 222 | 182 |
| 185 | 171 | 213 | 163 |
| 186 | 158 | 207 | 143 |
| 187 | 140 | 197 | 126 |
| 188 | 125 | 188 | 109 |
| 189 | 110 | 176 | 93 |
| 190 | 99 | 166 | 80 |
| 191 | 86 | 152 | 66 |
| 192 | 65 | 122 | 48 |
| 193 | 230 | 237 | 234 |
| 194 | 224 | 227 | 234 |
| 195 | 205 | 203 | 228 |
| 196 | 185 | 184 | 223 |
| 197 | 167 | 165 | 216 |
| 198 | 149 | 150 | 210 |
| 199 | 131 | 134 | 203 |
| 200 | 112 | 120 | 195 |
| 201 | 97 | 108 | 187 |
| 202 | 85 | 99 | 180 |
| 203 | 72 | 85 | 165 |
| 204 | 59 | 68 | 140 |
| 205 | 141 | 112 | 98 |
| 206 | 175 | 139 | 118 |
| 207 | 207 | 168 | 143 |
| 208 | 233 | 191 | 165 |
| 209 | 146 | 108 | 98 |
| 210 | 181 | 135 | 121 |
| 211 | 212 | 165 | 149 |
| 212 | 234 | 200 | 180 |
| 213 | 166 | 111 | 102 |
| 214 | 196 | 147 | 136 |
| 215 | 213 | 162 | 153 |
| 216 | 234 | 187 | 177 |
| 217 | 234 | 240 | 237 |
| 218 | 232 | 232 | 230 |
| 219 | 223 | 220 | 216 |
| 220 | 206 | 200 | 198 |
| 221 | 198 | 193 | 194 |
| 222 | 187 | 181 | 182 |
| 223 | 175 | 170 | 172 |
| 224 | 165 | 158 | 159 |
| 225 | 152 | 147 | 148 |
| 226 | 142 | 136 | 136 |
| 227 | 130 | 125 | 126 |
| 228 | 121 | 115 | 116 |
| 229 | 111 | 107 | 108 |
| 230 | 101 | 96 | 97 |
| 231 | 90 | 87 | 87 |
| 232 | 81 | 77 | 76 |
| 233 | 70 | 68 | 68 |
| 234 | 58 | 55 | 55 |

| | APPENDIX F | | |
|---|---|---|---|
| | Q60.rgb: Q60, RGB scan data | | |
| Patch # | R | G | B |
| 235 | 47 | 44 | 44 |
| 236 | 33 | 31 | 32 |

I claim:

1. A method for providing a neural network including the steps of:
   providing a neural network structure including a plurality of neurons for receiving a first color value from among a first set of color values which first color value is to be transformed into a corresponding second color value from among a second set of color values and for providing an output indication of the corresponding second color value; and
   training the neural network structure on a plurality of ordered pairs, each ordered pair comprising a first color value from among the first set of color values and a corresponding second color value from among the second set of color values.

2. A method according to claim 1 wherein one or both of the plurality of first color values and the plurality of second color values is a systematic representation of the respectively corresponding one of the first and second sets of color values.

3. A method according to claim 2 wherein one of the first and second sets of color values is defined within a color coordinate system and wherein each region of a predetermined size within the order coordinate system is represented by at least one color value within the plurality of color values corresponding to the set of color values defined within the color coordinate system.

4. A method according to claim 2 wherein one of the first and second sets of color values is defined within a color coordinate system which may be partitioned into regions and wherein each region within the partition is represented by at least one color value within the plurality of color values corresponding to the set of color values defined within the color coordinate system.

5. A method according to claim 1 and wherein said first set of color values is identical to the second set of color values.

6. A method according to claim 1 and wherein each second color value, represented in visual form, is substantially identical in appearance to the corresponding first color value, represented in visual form.

7. A method according to claim 1 and wherein said plurality of neurons comprises:
   an input layer of neurons comprising at least one input neuron;
   at least one hidden layer of neurons each comprising at least one hidden neuron; and
   an output layer of neurons comprising at least one output neuron.

8. A method according to claim 7 wherein the first color value is also to be transformed into a corresponding third color value from among a third set of color values, the neural network structure is operative to provide an output indication of the corresponding second and third color values, the output layer of neurons comprises at least a first plurality of output neurons corresponding to the dimension of the second color value and a second plurality of output neurons corresponding to the dimension of a third color value and each ordered pair comprises a first color value and a corresponding concatenation of a second color value and a third color value.

9. A method according to claim 8 wherein the appearance of the second color value, when represented using a predetermined first color output device, is similar to the appearance of the third color value, when represented using a predetermined second color output device.

10. A method according to claim 7 wherein each neuron in the at least one hidden layer and in the output layer comprises summing means for computing a weighted sum of a plurality of inputs.

11. A method according to claim 7 wherein each neuron in the at least one hidden layer and in the output layer also comprises means for computing a nonlinear function of the output of said summing means.

12. A method according to claim 11 and wherein the nonlinear functions corresponding to substantially all of the neurons in the at least one hidden layer and in the output layer are equal.

13. A method according to claim 1 wherein said neural network structure is a feed-forward network structure.

14. A method according to claim 1 wherein each ordered pair is characterized in that there is a predetermined relationship between the second color value and the corresponding first color value.

15. A method according to claim 4 wherein the plurality of regions comprises regions of non-equal size.

16. A method according to claim 4 wherein the plurality of regions comprises regions of equal size.

17. A method according to claim 1 and also comprising the step of subsequently employing the neural network for transforming a first color value from the first plurality of color values into a second color value from the second plurality of color values.

18. A method according to claim 17 and also comprising the step of employing the second color value obtained by transforming the first color value in order to control operation of a color processing system to be calibrated.

19. A method according to claim 1 wherein at least one interneuron connection is defined between a pair of neurons from among the plurality of neurons in the neural network and wherein said step of training comprises the steps of:
   providing the first color value of an individual ordered pair to the neural network;
   back-propagating an error value indicative of the difference between the second color value of said individual ordered pair and the output of the neural network for the first color value; and
   modifying at least one of the at least one interneuron connections.

20. A method according to claim 19 wherein each of the at least one interneuron connections defines a weight associated therewith and said step of modifying comprises the step of changing the value of the weight.

21. Apparatus for providing a neural network including:
   a neural network structure including a plurality of neurons for receiving a first color value from among a first set of color values which first color value is to be transformed into a corresponding second color value from among a second set of color values and for providing an output indication of the corresponding second color value; and means for training the neural network structure on a plurality of ordered pairs, each ordered pair comprising a first color value from among the first set of color values and a corresponding second color value from among the second set of color values.

22. Apparatus according to claim 21 wherein one or both of the plurality of first values and the plurality of second color values is a systematic representation of the respectively corresponding one of the first and second sets of color values.

23. A neural network comprising:
a trained neural network structure including a plurality of neurons for receiving a first color value from among a first set of color values which first color value is to be transformed into a corresponding second color value from among a second set of color values and for providing an output indication of the corresponding second color value.

24. A neural network according to claim 23 wherein the trained neural network structure was trained on a plurality of ordered pairs, each ordered pair comprising a first color value from among the first set of color values and a corresponding second color value from among the second set of color values, one or both of the plurality of first color values and the plurality of second color values being a systematic representation of the respective corresponding one of the first and second sets of color values.

25. A neural network according to claim 23 wherein the second color value includes a black component and the neural network structure is characterized in that at least some of the color content of the first color value is transformed to the black component of the second color value.

26. A method for transforming a first color value from among a first set of color values into a second color value from among a second set of color values, the method comprising the steps of:
providing a trained neural network structure including a plurality of neurons for receiving a first color value from among the first set of color values which first color value is to be transformed into a corresponding second color value from among the second set of color values and for providing an output indication of the corresponding second color value; and
employing the trained neural network structure in order to transform a first color value from among the first set of color values into a second color value from among the second set of color values.

27. A method according to claim 26 wherein the trained neural network structure was trained on a plurality of ordered pairs, each ordered pair comprising a first color value from among the first set of color values and a corresponding second color value from among the second set of color values, one or both of the plurality of first values and the plurality of second color values being a systematic representation of the respective corresponding one of the first and second sets of color values.

28. A method according to claim 26 and also comprising the step of controlling operation of a color processing system to be calibrated using the second color value obtained in said employing step.

29. A method according to claim 28 wherein said step of controlling comprises the step of using said color writing device to create upon a second substrate a duplicate of an analog representation of a color image upon a first substrate.

30. A method according to claim 28 wherein said step of controlling comprises the step of using said color processing system to create an input copy of a color image which, when processed by said calibrated system, will result in a given output copy of said color image.

31. A method according to claim 28 wherein said color processing system to be calibrated comprises a color reading device operative to convert an analog representation of a color image into a digital representation thereof.

32. A method according to claim 28 wherein said color processing system to be calibrated comprises a color writing device operative to convert a digital representation of a color image into an analog representation thereof.

33. A method according to claim 32 wherein said color writing device comprises a color monitor display.

34. A method for constructing a look-up table relating a first multiplicity of values to a second multiplicity of values comprising the steps of:
providing an artificial neural network relating the first multiplicity of values to the second multiplicity of values;
providing a plurality of look-up table addresses;
operating the artificial neural network on the plurality of look-up table addresses, thereby to obtain a plurality of processed look-up table addresses; and
storing the plurality of processed look-up table addresses as the contents of the look-up table.

35. A method according to claim 34 wherein the first and second multiplicities of values respectively comprise first and second multiplicities of color values.

36. A method according to claim 34 wherein the step of providing an artifical neural network comprises the steps of:
providing artificial neural network training data representing the first and second multiplicity of values; and
employing the artifical neural network training data to train an artifical neural network.

37. Apparatus for constructing a look-up table relating a first multiplicity of values to a second multiplicity of values comprising:
an artifical neural network relating the first multiplicity of values to the second multiplicity of values;
means for operating the artificial neural network on a plurality of look-up table addresses, thereby to obtain a plurality of processed look-up table addresses; and
means for storing the plurality of processed look-up table addresses as the contents of the look-up table.

38. Digital storage apparatus comprising:
a representation of a look-up table relating a first multiplicity of values to a second multiplicity of values, the look-up table having been constructed by the following method:
providing an artificial neural network relating the first multiplicity of values to the second multiplicity of values;
providing a plurality of look-up table addresses;
operating the artificial neural network on the plurality of look-up table addresses, thereby to obtain a plurality of processed look-up table addresses; and
storing the plurality of processed look-up table addresses as the contents of the look-up table.

39. A method for constructing apparatus for sampling the color processing characteristics of a color processing device, said color processing device being operative to convert a first representation of a color image into a second representation thereof, the method comprising the step of repeating at least once the steps of:

providing first and second representations of a color image, said representations respectively comprising a first multiplicity of first color values and a second multiplicity of second color values corresponding thereto, said first and second representations being characterized in that processing said first representation with said color processing device defines said second representation;

providing an artificial neural network which, when operated on each individual one of the second multiplicity of second color values, gives a value substantially equal to the corresponding one of said first multiplicity of first color values; and operating the artifical neural network on the first representation of the color image, thereby to provide a third representation thereof.

40. A system for constructing apparatus for sampling the color processing characteristics of a color processing device, said color processing device being operative to convert a first representation of a color image to a second representation thereof, the system comprising:

means for providing first and second representations of a color image, said representations respectively comprising a first multiplicity of first color values and a second multiplicity of second color values corresponding thereto, said first and second representations being characterized in that processing said first representations with said color processing device defines said second representation;

an artificial neural network which, when operated on each individual one of the second multiplicity of second color values, gives a value substantially equal to the corresponding one of said first multiplicity of first color values; and means for operating the artifical neural network on the first representation of the color image, thereby to provide a third representation thereof.

* * * * *